US009835961B2

(12) United States Patent
Wada et al.

(10) Patent No.: US 9,835,961 B2
(45) Date of Patent: Dec. 5, 2017

(54) PHTHALOCYANINE CRYSTAL, AND ELECTROPHOTOGRAPHIC PHOTORECEPTOR, ELECTROPHOTOGRAPHIC PHOTORECEPTOR CARTRIDGE AND IMAGE-FORMING DEVICE USING THE SAME

(71) Applicant: MITSUBISHI CHEMICAL CORPORATION, Minato-ku (JP)

(72) Inventors: Mitsuo Wada, Kanagawa (JP); Kazutaka Ida, Kanagawa (JP); Teruyuki Mitsumori, Kanagawa (JP); Hiroaki Takamura, Kanagawa (JP); Tadashi Mizushima, Kanagawa (JP)

(73) Assignee: MITSUBISHI CHEMICAL CORPORATION, Minato-ku (JP)

( * ) Notice: Subject to any disclaimer, the term of this patent is extended or adjusted under 35 U.S.C. 154(b) by 0 days.

(21) Appl. No.: 14/922,794

(22) Filed: Oct. 26, 2015

(65) Prior Publication Data
US 2016/0109816 A1    Apr. 21, 2016

Related U.S. Application Data

(63) Continuation of application No. 12/293,830, filed as application No. PCT/JP2007/055744 on Mar. 20, 2007.

(30) Foreign Application Priority Data

Mar. 20, 2006 (JP) .................................. 2006-077251
Mar. 28, 2006 (JP) .................................. 2006-088867
(Continued)

(51) Int. Cl.
*G03G 21/16* (2006.01)
*G03G 5/06* (2006.01)
(Continued)

(52) U.S. Cl.
CPC ......... *G03G 5/0696* (2013.01); *C09B 47/045* (2013.01); *C09B 67/0016* (2013.01); *C09B 67/0026* (2013.01)

(58) Field of Classification Search
CPC ............ C09B 67/0016; C09B 67/0026; C03G 5/0696
(Continued)

(56) References Cited

U.S. PATENT DOCUMENTS 4,994,566 A    2/1991 Mimura et al.
5,008,173 A    4/1991 Mimura et al.
(Continued)

FOREIGN PATENT DOCUMENTS

JP    61 217050    9/1986
JP    62 67094     3/1987
(Continued)

OTHER PUBLICATIONS

Office Action dated Oct. 6, 2015 in Japanese Patent Application No. 2014-147716 (with unedited computer generated English translation).
(Continued)

*Primary Examiner* — Peter Vajda
*Assistant Examiner* — Rashid Alam
(74) *Attorney, Agent, or Firm* — Oblon, McClelland, Maier & Neustadt, L.L.P.

(57) ABSTRACT

Provided is an excellent phthalocyanine crystal having high sensitivity and little fluctuation in sensitivity for a humidity change in a use environment and applicable to the martial for solar battery, electronic paper, electrophotographic photoreceptor, etc. Namely, phthalocyanine crystal obtained by bringing a phthalocyanine crystal precursor into contact with an aromatic aldehyde compound to convert the crystal form. Also, provided is an electrophotographic photoreceptor that
(Continued)

not only exhibits high sensitivity but also has little fluctuation in sensitivity for a humidity change in a use environment. Further, provided is an electrophotographic photoreceptor cartridge and an image-forming device, both of which can produce a stable quality images for a humidity change in a use environment by using the electrophotographic photoreceptor.

7 Claims, 50 Drawing Sheets

(30) Foreign Application Priority Data

Jun. 9, 2006 (JP) .................................. 2006-161372
Jun. 16, 2006 (JP) .................................. 2006-167881

(51) Int. Cl.
  *C09B 67/12* (2006.01)
  *C09B 67/50* (2006.01)
  *C09B 47/04* (2006.01)

(58) Field of Classification Search
  USPC .......................................................... 430/78
  See application file for complete search history.

(56) References Cited

U.S. PATENT DOCUMENTS

| | | | |
|---|---|---|---|
| 5,132,197 | A | 7/1992 | Iuchi et al. |
| 5,182,382 | A | 1/1993 | Mayo et al. |
| 5,183,886 | A | 2/1993 | Takagishi |
| 5,194,354 | A | 3/1993 | Takai et al. |
| 5,213,929 | A | 5/1993 | Takano et al. |
| 5,272,264 | A | 12/1993 | Takagishi |
| 5,371,213 | A * | 12/1994 | Mayo .................. C09B 67/0026 540/141 |
| 5,786,121 | A | 7/1998 | Richter et al. |
| 6,057,071 | A | 5/2000 | Ohashi et al. |
| 6,291,120 | B1 | 9/2001 | Nishigaki et al. |
| 2002/0099204 | A1 | 7/2002 | Wolleb et al. |
| 2006/0057481 | A1 | 3/2006 | Kondoh et al. |
| 2006/0198659 | A1 | 9/2006 | Niimi |
| 2010/0232830 | A1 | 9/2010 | Wada et al. |
| 2012/0257907 | A1 | 10/2012 | Wada et al. |

FOREIGN PATENT DOCUMENTS

| | | |
|---|---|---|
| JP | 63 20365 | 1/1988 |
| JP | 2 28265 | 1/1990 |
| JP | 04-221962 | 8/1990 |
| JP | 3 9962 | 1/1991 |
| JP | 3 50270 | 3/1991 |
| JP | 3 54264 | 3/1991 |
| JP | 3 54265 | 3/1991 |
| JP | 3 128973 | 5/1991 |
| JP | 3 220193 | 9/1991 |
| JP | 4 277562 | 1/1992 |
| JP | 4 224872 | 8/1992 |
| JP | 4 266972 | 9/1992 |
| JP | 5 202309 | 8/1993 |
| JP | 9 87540 | 3/1997 |
| JP | 9-95623 A | 4/1997 |
| JP | 63 366 | 1/1998 |
| JP | 10 513573 | 12/1998 |
| JP | 11-65183 | 3/1999 |
| JP | 2000-7933 A | 1/2000 |
| JP | 2000-206710 A | 7/2000 |
| JP | 2003 177561 | 6/2003 |
| JP | 2003 186217 | 7/2003 |
| JP | 2003 207912 | 7/2003 |
| JP | 2003 215825 | 7/2003 |
| JP | 2003-335738 A | 11/2003 |
| JP | 2007-179038 A | 7/2007 |
| JP | 2012-256074 | 12/2012 |
| JP | 2013-33264 | 2/2013 |

OTHER PUBLICATIONS

Office Action dated Jul. 12, 2012 in Japanese Patent Application No. 2007-073260 (with English-language translation).
Office Action (Final Rejection) issued in corresponding Japanese Patent Application No. 2007-073260, dated Mar. 22, 2013, with English-language translation.
Office Action dated Jan. 14, 2014 in Japanese Patent Application No. 2012-204901 (with English language translation).
Notification of Reasons for Refusal in corresponding Japanese Patent Application No. 2012-204898 dated Mar. 4, 2014 with English language translation.
Notification of Reasons for Refusal in corresponding Japanese Patent Application No. 2012-204899 dated Mar. 18, 2014 with English language translation.
Notification of Reasons for Refusal in corresponding Japanese Patent Application No. 2012-204900 dated Mar. 4, 2014 with English language translation.
Office Action dated Apr. 22, 2014 in corresponding Japanese Patent Application No. 2012-204901 with English language translation.
Office Action dated Jul. 1, 2014, in Japanese Patent Application No. 2012-204899 with English translation.
Office Action dated Jun. 3, 2014 in Japanese Patent Application No. 2013-138597 (with English language translation).
Oda, Y. et al., "Near-Infrared Sensitive Photoreceptors Incorporating a New Polymorph of Oxotitanium Phthalocyanine", Journal of the Society of Electrophotography of Japan, vol. 29, No. 3, pp. 250-258 (1990) (with partial English translation).
Miyazaki, H., "Photoreceptors of digital electrophotography", Journal of the Society of Electrophotography of Japan, vol. 32, No. 3, pp. 282-289 (1993).
Daimon, K. et al., "A Novel Crystal Form of Hydroxygallium Phthalocyanine and its Xerographic Property in a Photoreceptor", Fuji Xerox Technical Report, No. 12 (1998) (with English abstract).
Notification of Reasons for Refusal in corresponding Japanese Patent Application No. 2014-147716, dated Jun. 2, 2015, with English translation thereof.

* cited by examiner

PHTHALOCYANINE CRYSTAL, AND ELECTROPHOTOGRAPHIC PHOTORECEPTOR, ELECTROPHOTOGRAPHIC PHOTORECEPTOR CARTRIDGE AND IMAGE-FORMING DEVICE USING THE SAME

CROSS REFERENCE TO RELATED APPLICATION

This application is a Continuation of application Ser. No. 12/293,830, filed Nov. 26, 2008, which was a National Stage entry under 35 USC 371 of PCT/JP07/55744, filed on Mar. 20, 2007, and claims priority to Japanese Patent Application No. 2006-077251, filed on Mar. 20, 2006; Japanese Patent Application No. 2006-088867, filed on Mar. 28, 2006; Japanese Patent Application No. 2006-161372, filed on Jun. 9, 2006; and Japanese Patent Application No. 2006-167881, filed on Jun. 16, 2006.

TECHNICAL FIELD

The present invention relates to a phthalocyanine crystal obtained by converting the crystal form of a phthalocyanine crystal precursor as well as an electrophotographic photoreceptor, an electrophotographic photoreceptor cartridge, and an image-forming device using the phthalocyanine crystal. Particularly, it relates to an excellent phthalocyanine crystal which is highly sensitive to LED light and semiconductor laser light, has little fluctuation in sensitivity for a humidity change in a use environment, and applicable to the material for solar battery, electronic paper, electrophotographic photoreceptor, etc., as well as an electrophotographic photoreceptor, an electrophotographic photoreceptor cartridge, and an image-forming device that not only exhibits high sensitivity but also has little fluctuation in sensitivity for a humidity change in a use environment.

BACKGROUND ART

Recently, organic optical devices capable of being utilized in solar battery, electronic paper, electrophotography, etc have been intensively investigated. Of these, especially, electrophotographic technology has been widely used and applied not only in the field of copying machines but also in the field of various printers and printing machines in recent years because the technology is excellent in immediacy and can produce high-quality images.

As an electrophotographic photoreceptor (hereinafter, optionally abbreviated as "photoreceptor") that is the core of the electrophotography technology, photoreceptors using inorganic photoconductors such as selenium, arsenic-selenium alloy, and zinc oxide have been conventionally employed but recently, the mainstream becomes the photoreceptors using organic photoconductive materials, which have the advantages of entailing no pollution, ensuring easy film formation and manufacture, having high freedom in material selection and combination, etc.

The sensitivity of the electrophotographic photoreceptors using organic photoconductive materials varies depending on the wavelength of exposure light and the kind of the charge generation substance.

As the charge generation substance having sensitivity to long-wavelength light of 600 to 800 nm, phthalocyanine compounds have been attracting attention. Especially, intensive studies have been conducted on metal-containing phthalocyanines such as chloroaluminum phthalocyanine, chloroindium phthalocyanine, oxyvanadium phthalocyanine, hydroxygallium phthalocyanine, chlorogallium phthalocyanine, magnesium phthalocyanine, and oxytitanium phthalocyanine, as well as metal-free phthalocyanines and the likes.

With regard to the phthalocyanine compounds, it is reported that even if the structure of the individual molecule is identical, a phthalocyanine compound may different in charge generation efficiency according to the regularity (crystal form) in arrangement of crystal, which is an agglomerate of molecules (see Non-Patent Documents 1 and 2).

In recent years, as the electrophotographic process in copying machines, laser printers, plain paper faxes, and the like has been advanced to be high-speed and full-colored one, it is essential to have high sensitivity and high-speed responding ability, so that it is inevitable to develop a more highly sensitive charge generation substance.

For high sensitivity, it is essential to have charge generation substances having a high charge generating ability. Of these, eager studies have been conducted on oxytitanium phthalocyanine exhibiting high sensitivity to LD exposure that is the current mainstream. The above oxytitanium phthalocyanine is known to show crystal polymorphism. As known crystal forms, there have been reported a large number of crystal forms such as α-form (see Patent Document 1), β-form (see Patent Document 2), C-form (see Patent Document 3), D-form (see Patent Document 4), Y-form (see Patent Document 5), M-form (see Patent Document 6), M-α-form (see Patent Document 7), and I-form (see Patent Document 8).

Among these crystal forms, a crystal form having a main peak at Bragg angle (2θ±0.2°) of 27.2° toward CuKα characteristic X-ray (wavelength 1.541 angstrom) (hereinafter, optionally referred to as "particular crystal form" in some cases) is known to exhibit high quantum efficiency and high sensitivity.

Moreover, other than the crystal composed of oxytitanium phthalocyanine molecule alone, mixed crystals composed of oxytitanium phthalocyanine and the other phthalocyanine or other pigment or the like are also widely known to form the above particular crystal form and exhibit high sensitivity (see Patent Document 9).

The above phthalocyanine crystals containing oxytitanium phthalocyanines having the particular crystal form are known to have very high sensitivity. It is considered that the high sensitivity is exhibited because water molecules are present in the crystals and function as sensitizers. However, the water molecules acting as sensitizers freely come in and out the crystals depending on humidity change in the environment of the crystals and hence the phthalocyanine crystals have a disadvantage that the water molecules may be eliminated from the crystals and bring about decrease in sensitivity when the humidity in the environment of the crystals becomes low.

The disadvantage that the decrease in sensitivity by the elimination of water molecules with the humidity decrease may result in a problem of a difference between the densities of the resulting images outputted under a usual humidity condition and under a dry and low humidity condition in the case where the phthalocyanine crystals are used as photographic photoreceptors in laser printers, copying machines, and the like. Particularly, in full-color laser printers and copying machines come into wide use in recent years, the decrease in image density remarkably appears in color tone change of full-color images and the like and hence becomes a serious problem.

As explained above, phthalocyanine crystals containing oxytitanium phthalocyanines having the particular crystal form exhibit high sensitivity but have a problem that the properties remarkably change depending on change in a use environment.

On the other hand, there has been reported V-form hydroxygallium phthalocyanine as a charge generation substance with little change in electrical properties for a humidity change. This V-form hydroxygallium phthalocyanine has an advantage of very little fluctuation in sensitivity for a humidity change but is poor in sensitivity as compared with the oxytitanium phthalocyanine having a particular crystal form and hence it is current situation that electrical properties are insufficient for the requirement for recent high-speed image-forming devices where a number of sheets are printed per unit time in full color (see Non-Patent Document 3).

Furthermore, in order to suppress the sensitivity change of the oxytitanium phthalocyanine having a particular crystal form for a humidity change, a method of adding a moisturizing agent to the charge generation layer has been reported (see Patent Documents 10 to 12). However, in these technologies, only humidity dependence according to residual potential is improved but the sensitivity fluctuation for a humidity change is not sufficiently improved. Since image deterioration depending on a humidity change tends to occur not in solid black images but in halftone images, it is necessary to reduce fluctuation of sensitivity. Actually, in a light decay curve of the oxytitanium phthalocyanine having a particular crystal form, it is understood that fluctuation of potential part according to halftone (absolute value of potential is around from 100 to 300 V) is large for a humidity change and thus it is still insufficient for the requirement of reducing the potential fluctuation.

Non-Patent Document 1: Journal of the Society of Electrophotography of Japan, Vol. 29, No. 3, pp. 250-258.
Non-Patent Document 2: Journal of the Society of Electrophotography of Japan, Vol. 32, No. 3, pp. 282-289.
Non-Patent Document 3: Fuji Xerox Technical Report No. 12 1998
Patent Document 1: JP-A-61-217050
Patent Document 2: JP-A-62-67094
Patent Document 3: JP-A-63-366
Patent Document 4: JP-A-2-8265
Patent Document 5: JP-A-63-20365
Patent Document 6: JP-A-3-54265
Patent Document 7: JP-A-3-54264
Patent Document 8: JP-A-3-128973
Patent Document 9: JP-A-3-9962
Patent Document 10: JP-A-2003-207912
Patent Document 11: JP-A-2003-186217
Patent Document 12: JP-A-2003-215825

DISCLOSURE OF THE INVENTION

Problems that the Invention is to Solve

The above phthalocyanine crystals showing the particular crystal form (the cases of the "phthalocyanine crystals" refer to all crystals containing phthalocyanine compounds including not only crystals composed of single phthalocyanine compound alone but also mixed crystals composed of two or more phthalocyanine compounds and mixed crystals composed of phthalocyanine compound and the other molecule; the "phthalocyanine compound" will be mentioned below) exhibit very high sensitivity. The high sensitivity is exhibited because water molecules are present in the crystals and function as sensitizers. However, the water molecules acting as sensitizers freely come into the crystals and out from the crystals depending on a humidity change in the environment of the crystals and hence the phthalocyanine crystals have a problem that the water molecules may be eliminated from the crystals and bring about decrease in sensitivity when the humidity becomes low.

The problem that the decrease in sensitivity by the elimination of water molecules with the humidity decrease may result in a problem of a difference between the densities of the resulting images outputted under a usual humidity condition and under a dry and low humidity condition in the case where the phthalocyanine crystals having the particular crystal form are used as photographic photoreceptors in laser printers, copying machines, and the like. Particularly, in full-color laser printers and copying machines come into wide use in recent years, the decrease in image density remarkably appears as a color tone change of full-color images and the like and hence becomes a serious problem.

The above phthalocyanine crystal having the particular crystal form is produced by bringing a phthalocyanine as a precursor into contact with a particular compound to convert the crystal form. In the crystal form-converting step, the crystal form is constructed by the interaction between the compound molecule used and the phthalocyanine. On this occasion, depending on the compound used, the interaction with the phthalocyanine varies and thus various crystal forms and particle shapes are shown depending on the difference of production processes. Moreover, the properties as the electrophotographic photoreceptor, such as charge generating ability (sensitivity), charging property, and decay at dark also depend on the production process and hence it is very difficult to predict the performance in advance.

As above, the above phthalocyanine crystals having the particular crystal form exhibit high sensitivity but have a problem that the properties remarkably change depending on a change in a use environment. As mentioned above, it is a current situation that an electrophotographic photoreceptor having higher sensitivity and little fluctuation in sensitivity for a humidity change in a use environment has been widely desired in recent mainstream laser printers, copying machines, and the like capable of printing a number of sheets per unit time in full color with high quality, but has not yet been developed.

The invention has been achieved in consideration of the above demands. Namely, an object of the invention is to provide a phthalocyanine crystal having high sensitivity and having little fluctuation in sensitivity for a humidity change in an use environment, to provide an electrophotographic photoreceptor that not only exhibits high sensitivity but also has little fluctuation in sensitivity for a humidity change in a use environment, and further to provide an electrophotographic photoreceptor cartridge and an image-forming device, both of which can produce stable quality images for a humidity change in a use environment by using the electrophotographic photoreceptor.

Means for Solving the Problems

The present inventors have presumed that the compound used at the conversion of the crystal form of a phthalocyanine crystal precursor may deeply participate in the fluctuation in sensitivity of the resulting electrophotographic photoreceptor for a humidity change and, as a result of the extensive studies for solving the above problems, the inventors have found that phthalocyanine crystal obtained by converting the crystal form of the phthalocyanine crystal precursor in the presence of a particular compound has high sensitivity and also little fluctuation in sensitivity for a humidity change in a use environment and it is also possible to obtain an electrophotographic photoreceptor having high sensitivity and also little fluctuation in sensitivity for a humidity change in a use environment. Thus, they have accomplished the invention.

Namely, the gist of the invention lies in a phthalocyanine crystal, which is obtained through a step of bringing a phthalocyanine crystal precursor into contact with an aromatic aldehyde compound to convert the crystal form.

The other gist of the invention lies in a phthalocyanine crystal, which is obtained through a step of bringing a phthalocyanine crystal precursor into contact with an organic compound having no functional group showing acidity in the presence of at least one compound selected from the group consisting of organic acids, organic acid anhydrides, and organic acid esters having a heteroatom to convert the crystal form.

The still other gist of the invention lies in a phthalocyanine crystal, which is obtained through a step of bringing a phthalocyanine crystal precursor into contact with an organic compound which is in a liquid state under conditions of 1013 hPa and 25° C. and does not have a functional group showing acidity in the presence of an aromatic compound which is solid under conditions of 1013 hPa and 25° C. and has an electron-withdrawing substituent to convert the crystal form.

The other gist of the invention lies in a phthalocyanine crystal, which is obtained through a step of bringing a phthalocyanine crystal precursor into contact with an aromatic compound having an oxygen atom-containing group and a halogen atom having an atomic weight of 30 or more to convert the crystal form.

The above oxygen atom-containing group is preferably a group selected from the group consisting of a carbonyl group-containing organic group, a nitro group, and an ether group.

The above step of converting the crystal form is preferably carried out in the presence of water.

Also, the phthalocyanine crystal is preferably a crystal containing oxytitanium phthalocyanine.

Moreover, the above phthalocyanine crystal preferably has a main diffraction peak at Bragg angle (2θ±0.2°) of 27.2° toward CuKα characteristic X-ray (wavelength 1.541 angstrom).

The other gist of the invention lies in an electrophotographic photoreceptor comprising an electroconductive substrate and a photosensitive layer formed on the substrate, wherein the photosensitive layer contains the above phthalocyanine crystal.

The other gist of the invention lies in an electrophotographic photoreceptor comprising:

a photosensitive layer having a film thickness of 35±2.5 μm, wherein a half-decay exposure E½ at a temperature of 25° C. and a relative humidity of 50% rh satisfies the following expression (1), a half-decay exposure E½ at a temperature of 25° C. and a relative humidity of 50% rh satisfies the following expression (1), and an absolute value of the difference in surface potential at the same exposure does not exceed 50V in the range of the exposure of 0 to 10 times the half-decay exposure E½ when a light decay curve at a temperature of 25° C. and a relative humidity of 50% rh is compared with a light decay curve at a temperature of 25° C. and a relative humidity of 10% rh:

$$E1/2 \leq 0.059 \tag{1}$$

where, in the formula (1), E½ represents exposure (μJ/cm$^2$) of light having a wavelength of 780 nm required for decaying the absolute value |V0| of the surface potential V0 of the photoreceptor from 550V to 275V;

a photosensitive layer having a film thickness of 30±2.5 μm formed on the substrate, wherein a half-decay exposure E½ at a temperature of 25° C. and a relative humidity of 50% rh satisfies the following expression (2) and an absolute value of the difference in surface potential at the same exposure does not exceed 50V in the range of the exposure of 0 to 10 times the half-decay exposure E½ when a light decay curve at a temperature of 25° C. and a relative humidity of 50% rh is compared with a light decay curve at a temperature of 25° C. and a relative humidity of 10% rh:

$$E1/2 \leq 0.061 \tag{2}$$

where, in the formula (2), E½ represents exposure (μJ/cm$^2$) of light having a wavelength of 780 nm required for decaying the absolute value |V0| of the surface potential V0 of the photoreceptor from 550V to 275V;

a photosensitive layer having a film thickness of 25±2.5 μm formed on the substrate, wherein a half-decay exposure E½ at a temperature of 25° C. and a relative humidity of 50% rh satisfies the following expression (3) and an absolute value of the difference in surface potential at the same exposure does not exceed 50V in the range of the exposure of 0 to 10 times the half-decay exposure E½ when a light decay curve at a temperature of 25° C. and a relative humidity of 50% rh is compared with a light decay curve at a temperature of 25° C. and a relative humidity of 10% rh:

$$E1/2 \leq 0.066 \tag{3}$$

where, in the formula (3), E½ represents exposure (μJ/cm$^2$) of light having a wavelength of 780 nm required for decaying the absolute value |V0| of the surface potential V0 of the photoreceptor from 550V to 275V;

a photosensitive layer having a film thickness of 20±2.5 μm formed on the substrate, wherein a half-decay exposure E½ at a temperature of 25° C. and a relative humidity of 50% rh satisfies the following expression (4) and an absolute value of the difference in surface potential at the same exposure does not exceed 50V in the range of the exposure of 0 to 10 times the half-decay exposure E½ when a light decay curve at a temperature of 25° C. and a relative humidity of 50% rh is compared with a light decay curve at a temperature of 25° C. and a relative humidity of 10% rh:

$$E1/2 \leq 0.079 \tag{4}$$

where, in the formula (4), E½ represents exposure (μJ/cm$^2$) of light having a wavelength of 780 nm required for decaying the absolute value |V0| of the surface potential V0 of the photoreceptor from 550V to 275V; or a photosensitive layer having a film thickness of 15±2.5 μm formed on the substrate, wherein a half-decay exposure E1/2 at a temperature of 25° C. and a relative humidity of 50% rh satisfies the following expression (5) and an absolute value of the difference in surface potential at the same exposure does not exceed 50V in the range of the exposure of 0 to 10 times the half-decay exposure E½ when a light decay curve at a temperature of 25° C. and a relative humidity of 50% rh is compared with a light decay curve at a temperature of 25° C. and a relative humidity of 10% rh:

$$E1/2 \leq 0.090 \tag{5}$$

where, in the formula (5), E½ represents exposure (μJ/cm$^2$) of light having a wavelength of 780 nm required for decaying the absolute value |V0| of the surface potential V0 of the photoreceptor from 550V to 275V.

In any of the above electrophotographic photoreceptors, the photosensitive layer preferably contains oxytitanium phthalocyanine.

Moreover, the other gist of the invention lies in an electrophotographic photoreceptor cartridge comprising:
the above electrophotographic photoreceptor; and
at least one of
a charge unit for charging the electrophotographic photoreceptor,
an exposure unit for exposing the charged electrophotographic photoreceptor to form an electrostatic latent image thereon,
a development unit for developing the electrostatic latent image formed on the electrophotographic photoreceptor, and
a cleaning unit for cleaning an upper side of the electrophotographic photoreceptor.

Furthermore, the other gist of the invention lies in an image-forming device comprising:
the above electrophotographic photoreceptor; and
a charge unit for charging the electrophotographic photoreceptor,
an exposure unit for exposing the charged electrophotographic photoreceptor to form an electrostatic latent image thereon, and
a development unit for developing the electrostatic latent image formed on the electrophotographic photoreceptor.

Advantages of the Invention

The phthalocyanine crystal of the invention has an advantage of having high sensitivity and also little fluctuation in sensitivity for a humidity change in a use environment.

Moreover, the electrophotographic photoreceptor of the invention has an advantage of having high sensitivity and also little fluctuation in sensitivity for a humidity change in a use environment.

Furthermore, the electrophotographic photoreceptor cartridge and image-forming device of the invention has an advantage of capable of providing stable quality images for a humidity change in a use environment.

DESCRIPTION OF REFERENCE NUMERALS AND SIGNS

Figure 1:
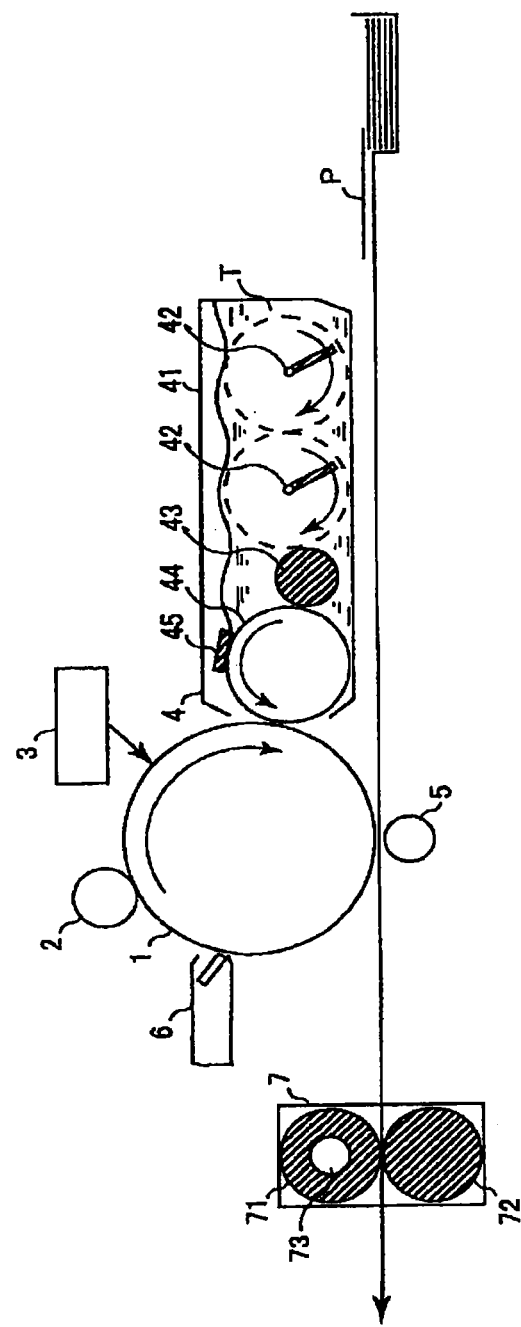
FIG. 1 is a schematic view illustrating a composition of the substantial part of one embodiment of the image-forming device of the invention.
Figure 2:
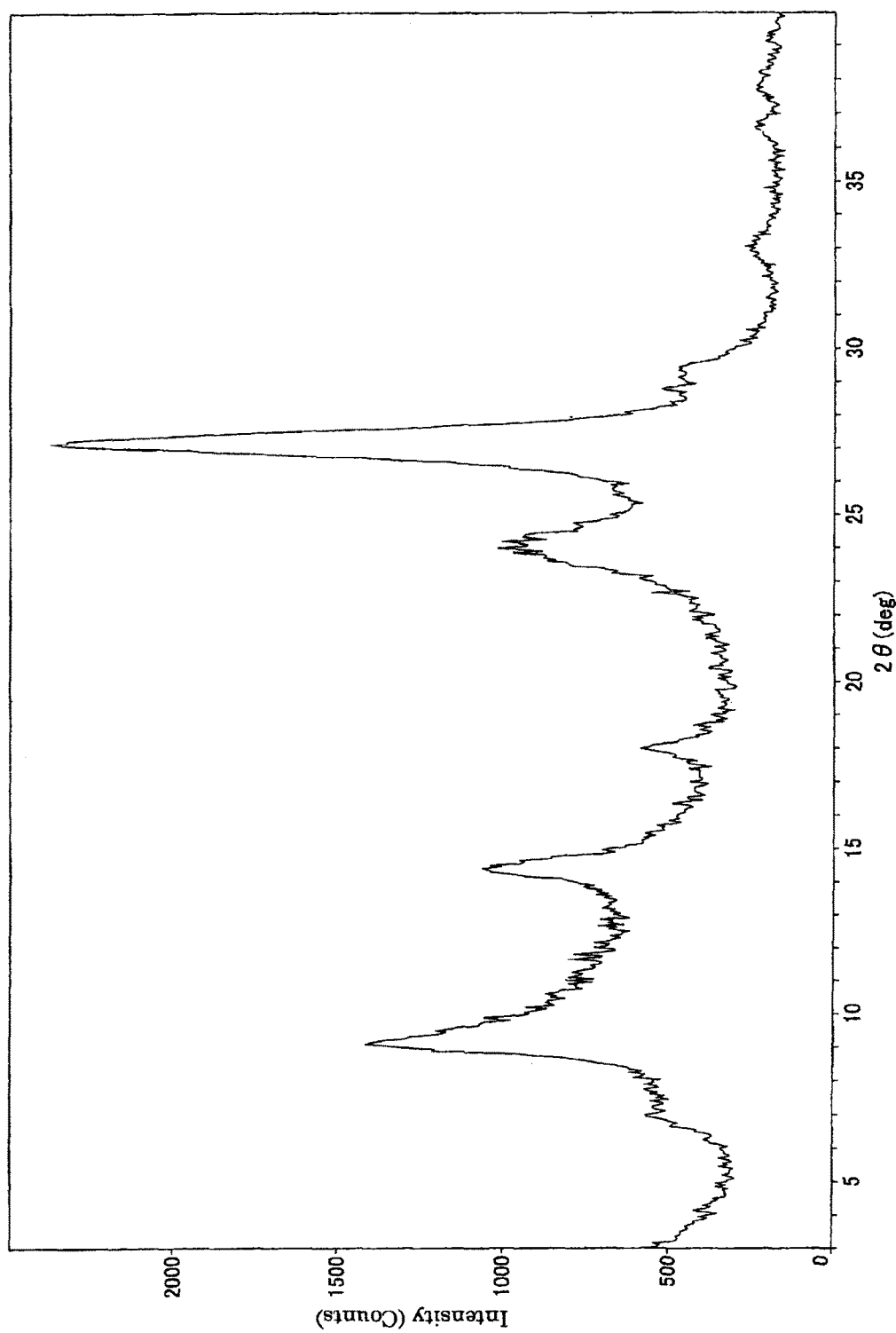
FIG. 2 illustrates an example of a powder X-ray diffraction spectrum of a low-phthalocyanine crystal.
Figure 3:
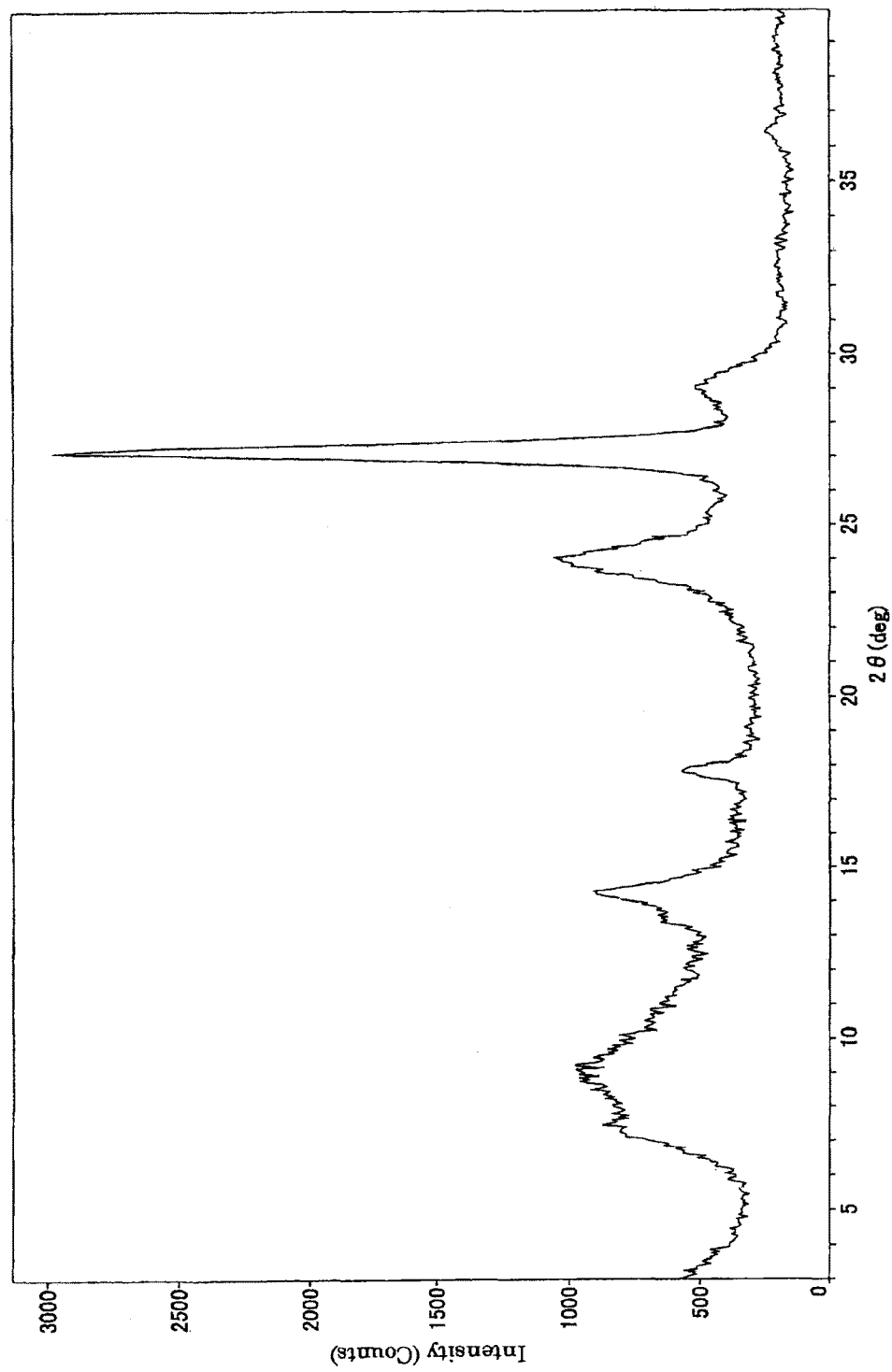
FIG. 3 illustrates an example of a powder X-ray diffraction spectrum of a low-phthalocyanine crystal.
Figure 4:
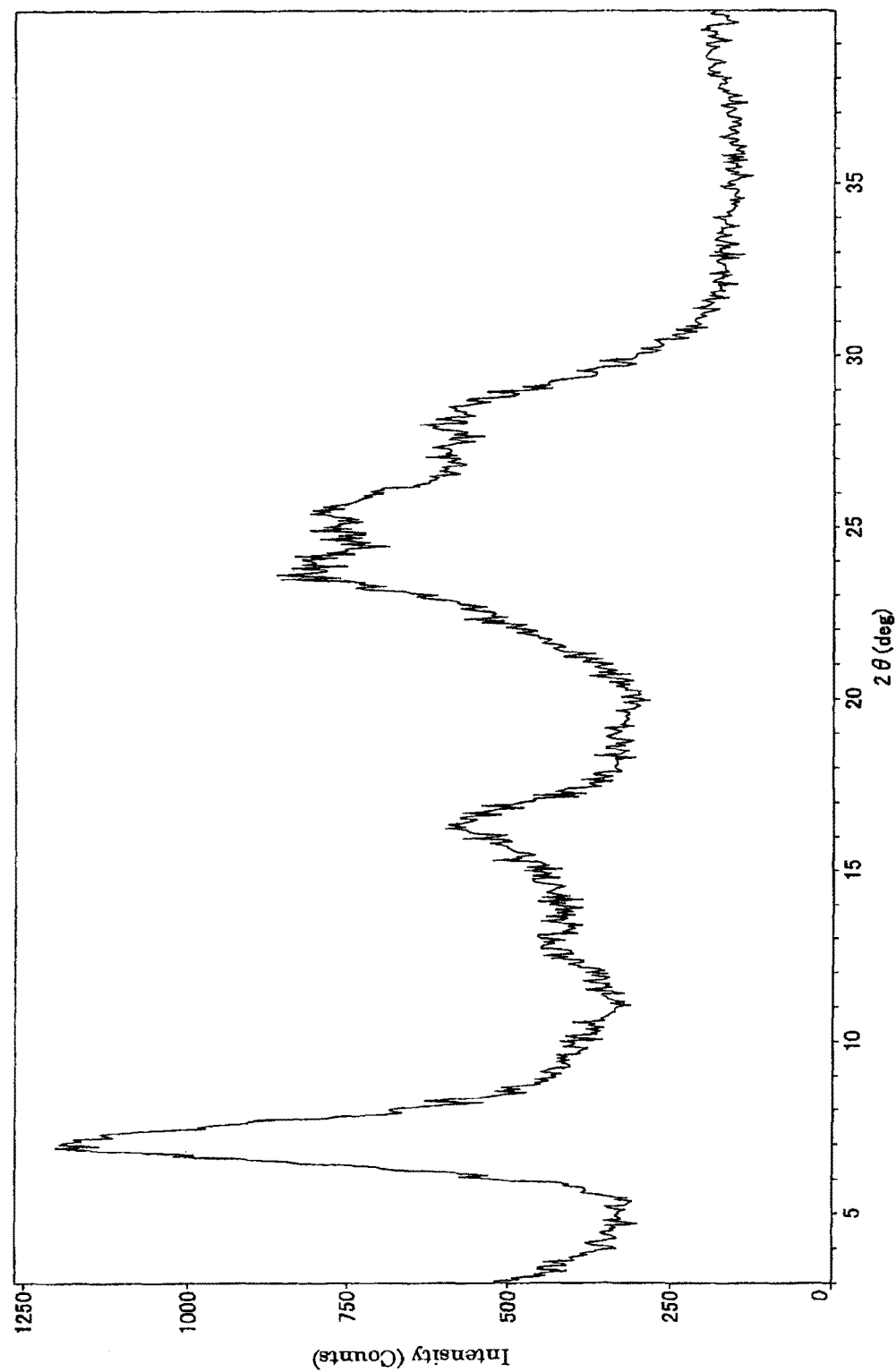
FIG. 4 illustrates an example of a powder X-ray diffraction spectrum of an amorphous phthalocyanine.
Figure 5:
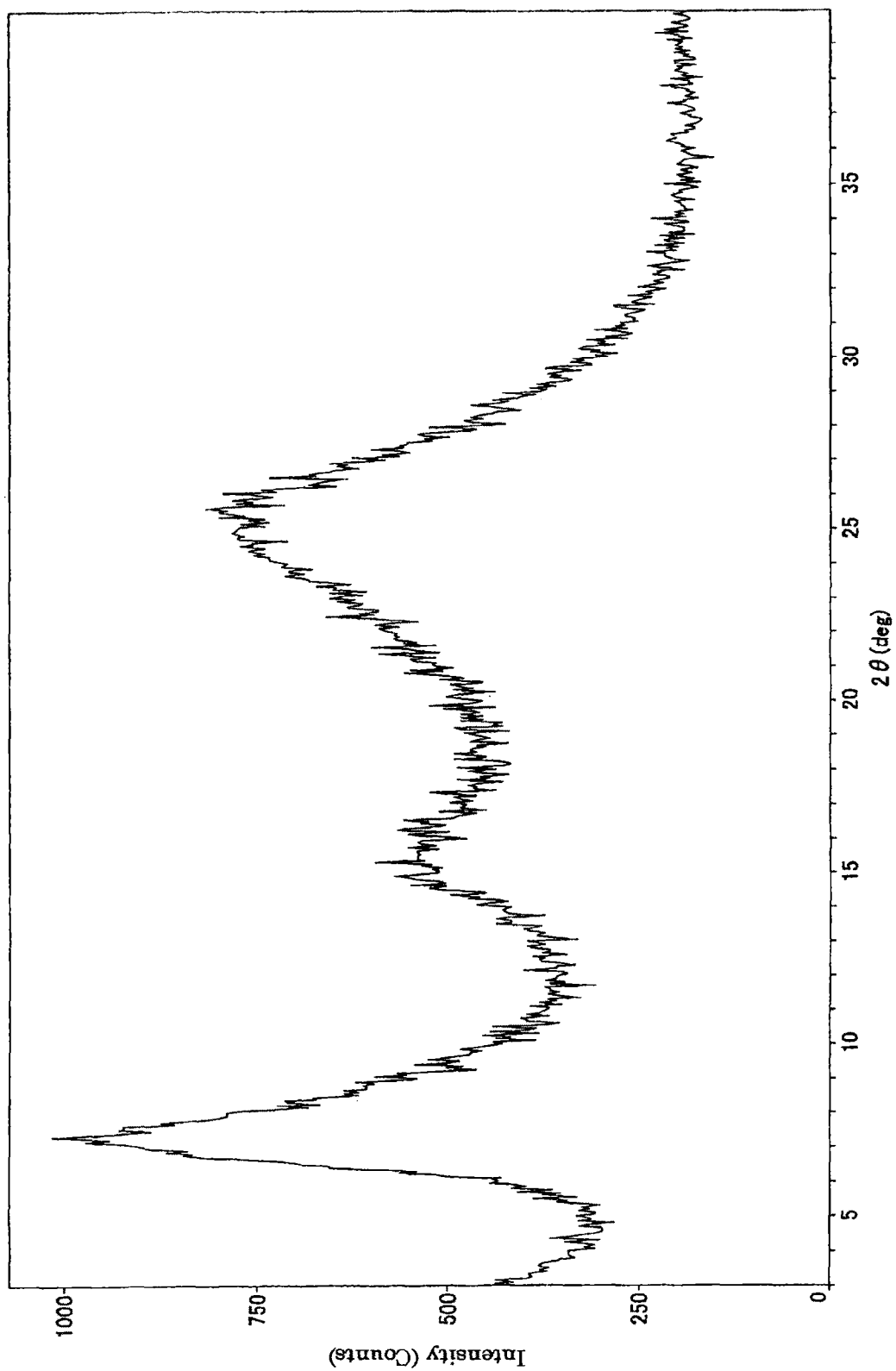
FIG. 5 illustrates an example of a powder X-ray diffraction spectrum of an amorphous phthalocyanine.

1 photoreceptor (electrophotographic photoreceptor)
2 charging device (charging roller; charge unit)
3 exposure device (exposure unit)
4 developing device (development unit)
5 transfer device
6 cleaning device (cleaning unit)
7 fixing device
41 developing bath
42 agitator
43 feeding roller
44 developing roller
45 regulating member
71 upper fixing member (fixing roller)
72 lower fixing member (fixing roller)
73 heating device
T toner
P recording paper (paper, medium)

BEST MODE FOR CARRYING OUT THE INVENTION

The present invention will be explained in detail hereinafter but the invention should by no means be limited to the following explanation and can be implemented with various variations within the range of the gist.

[I. Crystalline Phthalocyanine]

The phthalocyanine crystal of the invention is obtained through a step of bringing a phthalocyanine crystal precursor into contact with a particular compound to convert the crystal form (hereinafter optionally referred to as "crystal form-converting step") in the presence of a particular compound according to need.

The crystal form-converting step may be classified into the following (A) to (D) depending on the kind of the particular compound to be brought into contact with the phthalocyanine crystal precursor (hereinafter optionally referred to as "contact compound for converting the crystal form") and the particular compound to be present on this occasion according to need (hereinafter optionally referred to as "co-existing compound for converting the crystal form" and the contact compound for converting the crystal form and the co-existing compound for converting the crystal form are optionally collectively referred to as "compound for converting the crystal form").

(A) The crystal form is converted by bringing a phthalocyanine crystal precursor into contact with an aromatic aldehyde compound. Namely, as the contact compound for converting the crystal form, an aromatic aldehyde compound is used (hereinafter the aromatic aldehyde compound is sometimes referred to as "compound (A) for converting the crystal form".

(B) The crystal form is converted by bringing a phthalocyanine crystal precursor into contact with an organic compound having no functional group showing acidity (hereinafter optionally referred to as "non-acidic organic acid compound") in the presence of at least one compound selected from the group consisting of organic acids, organic acid anhydrides, and organic acid esters having a heteroatom (hereinafter optionally referred to as "particular organic acid compound"). Namely, a particular organic acid compound is used as the co-existing compound for converting the crystal form and a non-acidic organic acid compound is used as the contact compound for converting the crystal form (hereinafter these particular organic acid compound and non-acidic organic acid compound are sometimes collectively referred to as "compound (B) for converting the crystal form")

(C) The crystal form is converted by bringing a phthalocyanine crystal precursor into contact with an organic compound which is in a liquid state under conditions of 1013 hPa and 25° C. and does not have a functional group showing acidity (hereinafter optionally referred to as "non-acidic particular organic compound") in the presence of an aromatic compound which is solid under conditions of 1013 hPa and 25° C. and has an electron-withdrawing substituent (hereinafter optionally referred to as "electron-withdrawing particular aromatic compound"). Namely, an electron-withdrawing particular aromatic compound is used as the co-existing compound for converting the crystal form and a non-acidic particular organic compound is used as the contact compound for converting the crystal form (hereinafter these particular organic acid compound and non-acidic organic acid compound are sometimes collectively referred to as "compound (C) for converting the crystal form").

(D) The crystal form is converted by bringing a phthalocyanine crystal precursor into contact with an aromatic compound having an oxygen atom-containing group and a halogen atom having an atomic weight of 30 or more (hereinafter optionally referred to as "particular substituent-containing aromatic compound"). Namely, a particular substituent-containing aromatic compound is used as the contact compound for converting the crystal form (hereinafter the particular substituent-containing aromatic compound is sometimes referred to as "compound (D) for converting the crystal form").

In the crystal form-converting step, among the aforementioned compounds for converting the crystal form (A) to (D), any one of the compounds for converting the crystal form may be used singly or two or more of the compounds for converting the crystal form may be used in combination at any combination and in any ratio.

In the following, unless otherwise stated, common items will be explained together regardless of the kind of the compounds for converting the crystal form and only the items intrinsic to each of the compounds (A) to (D) for converting the crystal form are explained individually.

[Composition of Crystalline Phthalocyanine]

In the invention, the "phthalocyanine crystal" means a crystal containing one or two or more phthalocyanine compounds. Namely, not only a crystal composed of one phthalocyanine compound alone but also a mixed crystal of a plurality of phthalocyanine compounds or a mixed crystal composed of one or two or more phthalocyanine compounds and the other molecule is called "phthalocyanine crystal" in the invention.

Also, in the invention, the "phthalocyanine compound" means a compound having a phthalocyanine skeleton. Specific examples thereof include metal-free phthalocyanine; phthalocyanines having a planar molecular structure, such as cooper phthalocyanine, zinc phthalocyanine, and lead phthalocyanine; phthalocyanines having a shuttlecock structure in the molecule, such as oxytitanium phthalocyanine, oxyvanadium phthalocyanine, chloroaluminum phthalocyanine, chlorogallium phthalocyanine, chloroindium phthalocyanine, and hydroxygallium phthalocyanine; phthalocyanines having a spinning top structure in the molecule, such as dichlorotin phthalocyanine, dichlorosilicon phthalocyanine, dihydroxytin phthalocyanine, and dihydroxysilicon phthalocyanine; and the like.

In the case where the phthalocyanine crystal of the invention is composed of a single phthalocyanine, a phthalocyanine having a shuttlecock structure is desirable in view of characteristic properties as an electrographic photoreceptor. Moreover, among the phthalocyanines having a shuttlecock structure, the central metal of molecule of the phthalocyanine compound is preferably in an oxide, chloride, or hydroxide state since the properties as an electrographic photoreceptor is satisfactory. In view of easiness of the production of the phthalocyanine crystal, the central metal is more preferably in an oxide state. As specific examples, oxytitanium phthalocyanine or oxyvanadium phthalocyanine is particularly preferred and oxytitanium phthalocyanine is most preferred.

On the other hand, in the case where the phthalocyanine crystal of the invention consists of a plurality of molecules, there may be mentioned a case where it is composed of a mixed crystal of a plurality of phthalocyanine compounds (i.e., it does not contain a compound other than a phthalocyanine compound) and a case where it is composed of a mixed crystal composed of one or two or more phthalocyanine compounds and the other molecule (i.e., it contains a compound other than a phthalocyanine compound). In view of crystal stability, the case where it is composed of a mixed crystal of a plurality of phthalocyanine compounds (i.e., it does not contain a compound other than a phthalocyanine compound) is preferred.

In the case where the phthalocyanine crystal of the invention is a mixed crystal, it preferably contains phthalocyanine(s) having a shuttlecock structure as a main component in view of the properties as an electrographic photoreceptor. In the phthalocyanine compound to be contained as the main component (hereinafter optionally referred to as "main component phthalocyanine compound"), the central metal of the molecule is preferably in an oxide, chloride, or hydroxide state. In view of easiness of the production of phthalocyanine crystal, the central metal is more preferably in an oxide state. As specific examples, oxytitanium phthalocyanine or oxyvanadium phthalocyanine is particularly preferred and oxytitanium phthalocyanine is most preferred. The content of the main component phthalocyanine compound is usually 60% by weight or more relative to the phthalocyanine crystal as a mixed crystal. Since the crystal form-regulating ability decreases when the content is low, the content is preferably 70% by weight or more. The content is more preferably 80% by weight or more in view of crystal stability during dispersing and is further preferably 85% by weight or more in view of the properties when the phthalocyanine crystal is used as an electrographic photoreceptor.

Moreover, in the case where the phthalocyanine crystal of the invention is a mixed crystal, the phthalocyanine compound contained as the phthalocyanine compound other than the aforementioned main-component phthalocyanine compound (herainafter optionally referred to as "phthalocyanine compound other than the main component") is preferably a phthalocyanine compound having a shuttlecock structure or a phthalocyanine compound having a planar molecular structure in view of crystal stability. In particular, in view of the properties of the electrographic photoreceptor, oxyvanadium phthalocyanine, chlorogallium phthalocyanine, hydroxygallium phthalocyanine, and chloroindium phthalocyanine are preferred among the phthalocyanine compounds having a shuttlecock structure, and metal-free phthalocyanine, zinc phthalocyanine, and lead phthalocyanine are preferred among the phthalocyanines having a planar molecular structure. Among them, oxyvanadium phthalocyanine, chlorogallium phthalocyanine, chloroindium phthalocyanine, hydroxygallium phthalocyanine, and metal-free phthalocyanine are more preferred. Since vacant space in the mixed crystal further increases, a metal-free phthalocyanine having a planar molecular structure is particularly preferred. The phthalocyanine compound other than the main component may be used singly or two or more thereof may be used in combination at any combination and in any ratio but the use of only one compound is preferred. The content of the phthalocyanine compound other than the main component is usually 40% by weight or less relative to the phthalocyanine crystal as a mixed crystal. Since the crystal form-regulating ability decreases when the content is too high, the content is preferably 30% by weight or less. The content is preferably 20% by weight or less in view of crystal stability during dispersing and is further preferably 15% by weight or less in view of the electrographic properties. However, when the content of the phthalocyanine compound other than the main component is too low, the effect of the compound is sometimes not obtained, so that the content is preferably 0.1% by weight or more, more preferably 0.5% by weight or more.

[Crystalline Phthalocyanine Precursor]

The phthalocyanine crystal of the invention is obtained through the step of bringing a phthalocyanine crystal precursor into contact with a compound for converting the crystal form to convert the crystal form. The "phthalocyanine crystal precursor" means a substance which affords the phthalocyanine crystal by subjecting the substance to a treatment of converting the crystal form (hereinafter sometimes referred to as "crystal form-converting treatment"). Therefore, the phthalocyanine crystal precursor may be any of one phthalocyanine compound, a mixture of two or more phthalocyanine compounds, and a mixture of one or two or more phthalocyanine compounds and one or two or more other compounds (in the following, a phthalocyanine compound or a mixture containing phthalocyanine compound(s) is sometimes collectively referred to as "phthalocyanine"). Moreover, the existing sate is not particularly limited but, in view of the crystal form-regulating ability at the crystal conversion, as the phthalocyanine crystal precursor, an amorphous phthalocyanine or a low-phthalocyanine crystal having the same molecular structure as the phthalocyanine crystal to be obtained is used.

In the invention, the "low-phthalocyanine crystal" means a phthalocyanine which does not have peaks having a half bandwidth of 0.30° or less within the range of 0° to 40° in terms of Bragg angle (2θ±0.2°) toward CuK$_\alpha$ characteristic X-ray (wavelength 1.541 angstrom) in a powder X-ray diffraction (hereinafter sometimes abbreviated as "XRD") spectrum. When the half bandwidth is too small, the phthalocyanine molecule is in a state having a certain degree of constant regularity and long-term order in the solid, and the crystal form-regulating ability decreases at the conversion of the crystal form, so that the low-phthalocyanine crystal to be used as the phthalocyanine crystal precursor in the invention is preferably one which does not have any peaks having a half bandwidth of usually 0.35° or less, further 0.40° or less, particularly 0.45° or less.

In the present Description, measurement of the powder X-ray diffraction spectrum of phthalocyanines, determination of Bragg angle (2θ±0.2°) toward CuK$_\alpha$ characteristic X-ray (wavelength 1.541 angstrom), and calculation of the peak half bandwidth are carried out under the following conditions.

As a measuring apparatus for the powder X-ray diffraction spectrum, a powder X-ray diffractometer of a converging optical system using a CuKα(CuKα$_1$+CuKα$_2$) ray as an X-ray source (e.g., PW1700 manufactured by PANalytical Co.) is employed.

The conditions for measuring the powder X-ray diffraction are a scanning range (2θ) of 3.0 to 40.0°, a scanning step width of 0.05°, a scanning speed of 3.0°/min, a divergence slit of 1°, a scattering slit of 1°, and a receiving slit of 0.2 mm.

The peak half bandwidth can be calculated by the profile fitting method. The profile fitting can be performed using a powder X-ray diffraction pattern-analyzing software JADE5.0+ manufactured by MDI. The calculation conditions are as follows. Namely, background is fixed to an ideal position within the whole measurement range (2θ=3.0 to 40.0°). As the fitting function, a Peason-VII function considering contribution of CuKα$_2$ is used. As variations of the fitting function, three variations, i.e., a diffraction angle (2θ), a peak height, and a peak half bandwidth (β$_0$) are precisely determined. With eliminating the influence of CuKα$_2$, the diffraction angle (2θ), peak height, and peak half bandwidth (β$_0$) derived from CuKα$_1$ are calculated. Asymmetry is fixed to 0 and a figure constant to 1.5.

A peak half bandwidth (β) derived from a sample is determined by correcting the peak half bandwidth (β$_0$) calculated by the above profile fitting using a peak half bandwidth (β$_{Si}$) of 111 peak (2θ=28.442°) of standard Si (NIST Si 640b) calculated under the same measurement conditions and the same profile fitting conditions, according to the following equation.

$$\beta = \sqrt{\beta_o^2 - \beta_{Si}^2}$$

In this connection, although the boundary of the low-phthalocyanine crystals and the amorphous phthalocyanines is not clear, it is possible to use any of them as a preferable phthalocyanine crystal precursor. In the following, the low-phthalocyanine crystals and the amorphous phthalocyanines are collectively referred to as "low-crystalline/amorphous phthalocyanines" in the case where they are referred to without particular distinction.

As mentioned below, a crystal form (particular crystal form) having a main diffraction peak at Bragg angle (2θ±0.2°) of 27.2° toward CuK$_\alpha$ characteristic X-ray (wavelength 1.541 angstrom) is preferred. The low-phthalocyanine crystal having a peak at around 27.2° is preferred as the phthalocyanine crystal precursor since the former has regularity similar to the phthalocyanine crystal having the particular crystal form and is excellent in crystal form-regulating ability into the above particular crystal form. The low-phthalocyanine crystal on this occasion does not contain peaks having a half bandwidth ranging usually 0.30° or less, preferably 0.35° or less, more preferably 0.40° or less, further preferably 0.45° or less.

On the other hand, in the case where the low-crystalline/amorphous phthalocyanine having no peaks at around 27.2° is used as a phthalocyanine crystal precursor, the crystallinity is desirably low since the crystal form-regulating ability into the phthalocyanine crystal having the above particular crystal form is poor. The low-phthalocyanine crystal on this occasion does not contain peaks having a half bandwidth ranging usually 0.30° or less, preferably 0.50° or less, more preferably 0.70° or less, further preferably 0.90° or less.

FIGS. 2 to 5 show examples of powder X-ray diffraction spectra of the low-crystalline/amorphous phthalocyanines. In this connection, these X-ray diffraction spectra are exemplified in order to explain the invention in detail. Unless they contradict the gist of the invention, the phthalocyanines usable as the phthalocyanine crystal precursors in the invention are not limited to the low-crystalline/amorphous phthalocyanines having these X-ray diffraction spectra.

Phthalocyanines having crystallinity (phthalocyanine crystals) are in a state where phthalocyanine molecules have certain regularity and long-term order in solid and have a clear peak when powder X-ray diffraction spectra are measured. Contrarily, the low-crystalline/amorphous phthalocyanines are in a state that regularity of the molecular alignment and long-term order of the molecular alignment are decreased and show a harrow figure or, even when they have peaks, the half bandwidth is very broadened as the powder X-ray diffraction spectra exemplified in FIGS. 2 to 5.

In the invention, as processes for preparing the low-crystalline/amorphous phthalocyanines to be phthalocyanine crystal precursors, it is possible to use known processes for preparation, for example, chemical treatment processes such as acid paste process and acid slurry process, mechanical treatment processes such as pulverization and grinding but the chemical treatment processes are preferred since more homogeneous low-crystalline/amorphous phthalocyanines are obtained. Of these, the acid paste process is more preferred.

[Compound for Converting Crystal Form]
[Aromatic Aldehyde Compound]

The compound (A) for converting the crystal form is an aromatic aldehyde compound. The aromatic aldehyde compound is used as the contact compound for converting the crystal form.

The aromatic aldehyde compound to be used for obtaining the phthalocyanine crystal of the invention is a compound having an aldehyde group that is directly bonded to an aromatic ring.

In the aromatic aldehyde compound to be used in the invention, the number of the aromatic rings is not particularly limited so long as it is a compound having one or more aromatic rings which satisfy the Hückel's rule but the value of n is usually 5 or less in the formula 4n+2 (n is an integer) in the Hückel's rule. Of these, in consideration of operability at the crystal conversion and properties of the photographic photoreceptor of phthalocyanine crystal, the value of n is preferably 3 or less, more preferably 2 or less, and further preferably 1.

The kind of the aromatic rings includes aromatic hydrocarbon rings consisting of carbon atoms and hydrogen atoms and aromatic heterocycles wherein heteroatom(s) such as nitrogen atom(s), sulfur atom(s), and/or oxygen atom(s) are incorporated into the aromatic ring.

Specific examples of the aromatic ring include known aromatic hydrocarbon ring structures and aromatic heterocyclic structures, for example, anthracene, phenanthrene, acridine, phenanthridine, phenanthroline, phenazine, and the like in the case where n is 3; naphthalene, azulene, quinoline, isoquinoline, quinoxaline, naphthylidine, and the like in the case where n is 2; benzene, pyridine, pyrazine, pyrrole, thiophene, furan, thiazole, oxazole, imidazole, and the like in the case where n is 1. The above aromatic hydrocarbon ring structures and aromatic heterocyclic structures may have a condensed ring having no aromaticity.

Moreover, the number of the aldehyde groups per molecule contained in the aromatic aldehyde compound to be used in the invention is not particularly limited but is usually 1 or more and usually 4 or less, preferably 2 or less.

As a substituent that the aromatic aldehyde compound to be used in the invention may have other than the aldehyde group, there may be possible a known substituent, e.g., an alkyl group such as a methyl group, an ethyl group, an isopropyl group, or a cyclohexyl group; an alkoxy group such as a methoxy group, an ethoxy group, or a propyloxy group; an aralkyloxy groups such as benzyloxy group; an aryloxy groups such as a phenoxy group; a thioalkyl group such as a thiomethyl group or a thioethyl group; an aryl group such as a phenyl group or a naphthyl group; a nitro group; a cyano group; a carboxy group; a sulfo group; a sulfino group; a sulfeno group; a hydroxy group; a mercapto group; a halogen atom such as a chlorine atom, a bromine atom, and a fluorine atom; a ketone group such as an acetyl group; an amido group such as carboxamido group; a substituted or unsubstituted amino group such an amino group, a monomethylamino group, or a methylethylamino group; an ester group such as a methyloxycarbonyl group or an ethyloxycarbonyl group; a halogenated alkyl group such as a trifluoromethyl group; and the like.

Among the above examples of the substituent, the substituents having a carbon chain in the substituent, such as an alkyl group, an alkoxy group, a substituted amino group, an ester group, and a ketone group may have any of linear, branched, and cyclic structures in the carbon chain portion but a linear or branched structure is preferred since too large structure of the carbon chain part of these substituents may adversely influence crystal stability. Moreover, the number of carbon atoms of the carbon chain portion in these substituents is usually 20 or less. When the number of carbon atoms of the carbon chain portion is too large, the effect of the aromatic aldehyde compound decreases, so that the number of the carbon atoms is preferably 15 or less, more preferably 10 or less.

Among the above substituents, from the viewpoint of the crystal form-regulating ability and charge-generating ability, preferred are a halogen atom, an alkyl group, an alkoxy group, a ketone group, an ester group, a carboxyl group, a nitro group, and the like and more preferred are a halogen atom, a ketone group, and an alkoxy group.

The number of the substituents that the aromatic aldehyde compound to be used in the invention has other than the aldehyde group is not particularly limited. However, in consideration of the operability in the crystal conversion and the properties of photographic photoreceptor of the phthalocyanine crystal, the number thereof is preferably 5 or less, more preferably 3 or less, further preferably 1 or less. In this connection, the substituents other than the aldehyde group may be combined together to form a ring structure.

Examples of the aromatic aldehyde compound include those having an aromatic hydrocarbon ring and those having an aromatic heterocyclic ring.

Specific examples of the aromatic aldehyde compound having an aromatic hydrocarbon ring include benzaldehydes such as fluorobenzaldehyde, chlorobenzaldehyde, methoxybenzaldehyde, nitorbenzaldehyde, phenylbenzaldehyde, and 1,2,3,4-tetrahydronaphthaldehyde; naphthaldehydes such as 1-naphthaldehyde and 2-naphthaldehyde, and anthaldehydes such as 9-anthaldehyde.

Specific examples of the aromatic aldehyde compound having an aromatic heterocyclic ring include pyridinecarbaldehydes such as 2-pyridinecarbaldehyde; quinolinecarbaldehydes such as 2-quinolinecarbaldehyde; thiophenealdehydes such as 2-thiophenealdehyde; and pyrrolecarbaldehydes such as pyrrole-2-carbaldehyde.

Among the above aromatic aldehyde compounds, in view of the crystal-converting ability, preferred are aromatic aldehyde compounds wherein the aldehyde group is directly bonded to the aromatic hydrocarbon ring and, in particular, more preferred are benzaldehydes in view of stability for environmental fluctuation when used in the electrophotographic photoreceptor.

In this connection, the above aromatic aldehyde compounds may be used singly or two or more thereof may be used in combination at any combination and in any ratio.

Moreover, one or more aromatic aldehyde compounds may be mixed with one or more other compounds and the mixture may be brought into contact with the phthalocyanine crystal precursor. In this case, the kind of the other compound to be used in combination with the aromatic aldehyde compound is not particularly limited unless it adversely influences the phthalocyanine crystal precursor used and the phthalocyanine crystal to be obtained. However, in the case where the other compound other than the aromatic aldehyde compound is used in combination, it is preferred that the ratio of the aromatic aldehyde compound to the total amount of the aromatic aldehyde compound and the other compound is usually 50% by weight or more, particularly 75% by weight or more.

The amount of the aromatic aldehyde compound to be used varies depending on the procedure to be used for contact treatment and cannot be categorically defined. However, in general, the amount ranges usually 50% by weight or more, preferably 100% by weight or more and usually 2000% by weight or less, preferably 1000% by weight or less in terms of the weight ratio to the phthalocyanine crystal precursor. In this connection, in the case where two or more aromatic aldehyde compounds are used in combination, the ratio of the total thereof may satisfy the above range.

[Particular Organic Acid Compound]

The compound (B) for converting the crystal form consists of at least one compound selected from the group consisting of organic acids, organic acid anhydrides, and organic acid esters having a heteroatom and an organic compound having no acidic functional group (non-acidic organic compound). The particular organic acid compound is used as a co-existing compound for converting the crystal form and the non-acidic organic compound is used as the contact compound for converting the crystal form.

The phthalocyanine crystal of the invention is obtained by bringing the above phthalocyanine crystal precursor into contact with a non-acidic organic compound to be mentioned below in the presence of at least one compound selected from the group consisting of organic acids, organic acid anhydrides, and organic acid esters having a heteroatom (hereinafter, optionally abbreviated as "particular organic acid compound") to convert the crystal form.

<Organic Acid>

The organic acid is a generic term of the compounds showing acidity. Specifically, it is a compound having a functional group showing acidity (hereinafter optionally abbreviated as "acidic functional group"), such as a carboxylic acid, a sulfonic acid, a sulfinic acid, a sulfenic acid, a phenol, an enol, a thiol, a phosphonic acid, a phosphoric acid, a boric acid, an imidic acid, a hydrazonic acid, a hydroxymic acid, or a hydroxamic acid.

The organic acid to be used in the invention is not particularly limited so long as it is a compound having any of the aforementioned various acidic functional groups but, in view of the versatility and stability of the reagent, an organic acid having an acidic functional group composed of a carbon atom, an oxygen atom, a sulfur atom, a phosphorus atom, and/or a boron atom is usually used. Examples of such an organic acid include a carboxylic acid, a sulfonic acid, a sulfinic acid, a phenol, a thiol, a phosphonic acid, phosphoric acid, boronic acid, boric acid, and the like. Of these, in consideration of the properties of the electrophotographic photoreceptor to be obtained using the resulting phthalocyanine crystal as a material, preferred are a carboxylic acid, a sulfonic acid, a phenol, a phosphonic acid, phosphoric acid, and boronic acid and more preferred are a carboxylic acid, a sulfonic acid, a phosphonic acid, phosphoric acid, and boronic acid.

The acidic functional group may have any known structure and examples thereof include a carboxyl group, a thiocarboxyl group, a dithiocarboxyl group, a mercaptocarbonyl group, a hydroperoxy group, a sulfo group, a sulfino group, a sulfeno group, a phenolic hydroxyl group, a thiol group, a phosphinico group, a phosphono group, a selenono group, a selenino group, an arsinico group, an arsono group, a boronic acid group, a boranic acid group, and the like. Among these acidic functional groups, in view of the versatility and stability of the starting material, an acidic functional group composed of a carbon atom, an oxygen atom, a sulfur atom, a phosphorus atom, and/or a boron atom is usually preferred. More preferred are a carboxyl group, a thiocarboxyl group, a sulfo group, a sulfino group, a sulfeno group, a phenolic hydroxyl group, a thiol group, a phosphinico group, a phosphono group, a boronic acid group, and a boranic acid group and, in view of the properties as an electrophotographic photoreceptor, further preferred are a carboxyl group, a phosphinico group, a phosphono group, a sulfo group, and a boronic acid group.

The organic acid to be used in the invention exhibits the advantages of the invention through the existence of the acidic functional group in the structure. Therefore, one molecule of the organic acid contains at least one acidic functional group but may contain a plurality of the groups. In the case where a plurality of the acidic functional groups are contained in one molecule of the organic acid, these acidic functional groups may be the same or different from each other. However, when the number of the acidic functional group per one molecule of the organic acid is too large, the solubility toward the non-acidic organic compound to be used in combination decreases, so that the number is preferably 10 or less, more preferably 7 or less, further preferably 4 or less.

The organic acid can be fractionalized into an acidic functional group portion and a portion other than the acidic functional group portion (an organic residue portion) from the viewpoint of the structure. The structure of the acidic functional group portion is as mentioned above but the structure of the organic residue portion is not particularly limited and may have any known structure. However, the molecule of the phthalocyanine compound (hereinafter sometimes abbreviated as "phthalocyanine molecule") has a large number of $\pi$ electrons in the structure and the phthalocyanine crystal is constructed by the phthalocyanine molecules through developed interaction of the $\pi$ electrons, so that the incorporation of the organic acid into the phthalocyanine crystal is facilitated as the interaction between the phthalocyanine molecule and the organic acid increases. Therefore, in order to increase the interaction between the organic acid and the phthalocyanine molecule, the organic residue portion of the organic acid has preferably a structure having $\pi$ electrons. The number of the $\pi$ electrons contained in the organic residue portion is not particularly limited and it is sufficient to contain at least two $\pi$ electrons per one molecule of the organic acid (i.e., at least one carbon-carbon double bond). However, form the viewpoint of increasing the interaction with the phthalocyanine molecule, the organic residue portion preferably contains a structure having an aromaticity that satisfies the Hückel's rule.

The molecular weight of the organic acid to be used in the invention is not particularly limited but ranges usually 50 or more, preferably 100 or more and usually 1200 or less, preferably 1000 or less. When the molecular weight of the organic acid is too small, the solubility in water increases and thereby the amount thereof in the phthalocyanine crystal decreases, so that the advantages of the invention tend to lower. Moreover, when the molecular weight of the organic acid is too large, the molecular volume of the organic acid becomes too large, so that the amount thereof in the phthalocyanine crystal decreases and hence the advantages of the invention tends to lower. In particular, when the molecular volume of organic residue portion of the organic acid is too large, the incorporation into the phthalocyanine crystal becomes difficult, so that the molecular weight of the organic residue portion is usually 1000 or less, preferably 500 or less, more preferably 400 or less, further preferably 300 or less.

As the state of the organic acid, there may be a state of the organic acid as it is, a state where the organic acid is ionized, a state where an ion of the organic acid is bonded to a counter ion to form a salt, or the like. However, in the invention, since it is presumed that the organic residue portion contributes the exhibition of the advantages through the incorporation of the organic acid itself into the crystal, the organic acid to be used in the invention may be any of the aforementioned states.

As mentioned below, in the invention, the co-existence of water is preferred at the contact of the phthalocyanine crystal precursor with the non-acidic organic compound in the presence of the particular organic acid compound. Therefore, it is possible to use, as the particular organic acid compound, a compound which is a compound other than the organic acid at a stage before the contact treatment but is converted into the organic acid by the contact with water through hydrolysis or the like. In the following, such a compound is also collectively referred to as "organic acid".

<Organic Acid Anhydride>

The organic acid anhydride is a compound having a bond wherein two acyl groups share one oxygen atom (hereinafter optionally referred to as "acid anhydride bond"). As main organic acid anhydrides, there may be mentioned those wherein two molecules of an organic acid having one acidic functional group form an acid anhydride bond between the molecules and those wherein an organic acid having two or more acidic functional groups forms an acid anhydride bond in a single molecule. The former is further classified into those wherein two molecules of the same kind of an organic acid form an acid anhydride bond and those wherein two molecules of different kinds of organic acids form an acid anhydride bond. The kind of the organic acid anhydride to be used in the invention is not particularly limited and it may be any of these organic acid anhydrides.

Examples of the organic acid anhydride include carboxylic acid anhydrides wherein two molecules of the same kind of a carboxylic acid form an acid anhydride bond between the molecules, such as acetic anhydride, propionic anhydride, butyric anhydride, and trifluoroacetic anhydride; carboxylic acid anhydrides wherein two molecules of different kinds of dicarboxylic acids form an acid anhydride bond between the molecules, such as acetic propionic anhydride and acetic trifluoroacetic anhydride; carboxylic anhydrides wherein a dicarboxylic acid forms an acid anhydride bond in the same molecule, such as phthalic anhydride, maleic anhydride, succinic anhydride, 1,2-naphthoic anhydride, and 1,8-naphthoic anhydride; sulfonic anhydride wherein two molecules of the same or different kind of sulfonic acid(s) form an acid anhydride bond between the molecules, such as benzenesulfonic anhydride; sulfinic anhydride wherein two molecules of the same or different kind of sulfinic acid(s) form an acid anhydride bond between the molecules, such as benzenesulfinic anhydride; linear or cyclic organic acid anhydride wherein two molecules of the same or different kind of organic acid(s) form an acid anhydride bond between the molecules, such as benzensulfonic benzenesulfinic anhydride and cyclic sulfoacetic anhydride; and the like. Of these, as the organic acid anhydride to be used in the invention, from the viewpoint of the properties as the electrophotographic photoreceptor, preferred are carboxylic anhydrides composed of the same acids, carboxylic anhydrides composed of different acids, carboxylic anhydrides having an acid anhydride bond within a molecule, and sulfonic acid anhydrides, and more preferred are carboxylic anhydrides composed of the same acids and carboxylic anhydrides having an acid anhydride bond within a molecule.

In this connection, the structure of the portion other than the acid anhydride bond of the organic acid anhydride to be used (organic residue portion) in the invention is not particularly limited and may be any structure but is preferably a structure having π electrons for the reasons illustrated in the article of the above <Organic Acid>. The number of the π electrons contained in the organic residue portion is not particularly limited and it is sufficient to contain at least two π electrons per one molecule of the organic acid (i.e., at least one carbon-carbon double bond). However, form the viewpoint of increasing the interaction with the phthalocyanine molecule, the organic residue portion preferably contains a structure having aromaticity that satisfies the Hückel's rule.

The molecular weight of the organic acid anhydride is not particularly limited but is usually 1000 or less, preferably 500 or less, more preferably 400 or less, further preferably 300 or less since the anhydride tends to be hardly incorporated into phthalocyanine crystal when the anhydride is too large. On the other hand, when the molecular weight of the organic acid is too small, the interaction with the phthalocyanine molecule decreases and the amount thereof in the phthalocyanine crystal is reduced, so that the advantages of the invention tends to lower. Thus, a lower limit of the molecular weight is usually 50 or more, preferably 100 or more.

<Organic Acid Ester Having Heteroatom>

The organic acid ester having a heteroatom is an organic compound wherein the acidic functional group portion of the organic acid having a heteroatom is changed into an organic acid ester showing no acidity. As an example, there may be mentioned a compound showing no acidity wherein a sulfonic group having acidity is changed into a methyl sulfonate group.

The heteroatom generally means an atom other than a carbon atom and a hydrogen atom among the atoms constituting an organic compound. However, an organic acid usually contains at least oxygen and/or nitrogen atoms in the acidic functional group. Therefore, when oxygen and nitrogen atoms are included in the heteroatom, all the organic acid esters are included in the organic acid esters having a heteroatom and thus the definition is not appropriate. Accordingly, in the invention, atoms other than carbon, hydrogen, nitrogen, and oxygen atoms are defined as heteroatoms.

In general, as heteroatoms to be introduced into the structures of organic compounds, there may be mentioned boron, sulfur, phosphorus, silicon, selenium, tellurium atoms, and the like. However, as heteroatoms contained in the organic acid esters to be used in the invention, boron, sulfur, and phosphorus atoms are usually used. Of these, sulfur and phosphorus atoms are preferred in consideration of versatility of the organic acid esters to be used in the invention.

In the structure of the organic acid ester to be used in the invention, the site to which the heteroatom is introduced is not particularly limited and may be introduced into any site but the heteroatom is preferably contained in the acidic functional group portion (e.g., sulfo or phosphono groups, etc.) in the structure of the organic acid before it is derivatized into the organic acid ester. Namely, the organic acid ester to be used in the invention preferably has an acid ester group containing a heteroatom.

In the structure of the organic acid ester group containing a heteroatom to be used in the invention, the structure of the portion other than the acid ester group containing a heteroatom (organic residue portion) is not particularly limited and may be any structure but a structure having π electrons is preferred for the reasons illustrated in the article of the above <Organic Acid>. The number of the π electrons contained in the organic residue portion is not particularly limited and it is sufficient to contain at least two π electrons per one molecule of the organic acid (i.e., at least one carbon-carbon double bond). However, form the viewpoint of increasing the interaction with the phthalocyanine molecule, the organic residue portion preferably contains a structure having aromaticity that satisfies the Hückel's rule.

Examples of the organic acid ester containing a heteroatom include phosphonic acid esters such as dimethyl methylphosphonate, dimethyl phenylphosphonate, dimethyl methylphosphonate, and diethyl pheylphosphonate; phosphoric acid esters such as dimethyl methyl phosphate and dimethyl phenyl phosphate; sulfonic acid esters such as methyl methanesulfonate, methyl benzenesulfonate, and ethyl benzenesulfonate; sulfinic acid esters such as methyl methylsulfinate and methyl phenylsulfinate; sulfinoic acid esters such as methyl methylsulfinoate and methyl phenylsulfinoate; boronic acid esters such as dimethyl methylboronate and dimethyl penylboronate; and the like. Of these, in view of versatility of the reagent, preferred are phosphonic acid esters, phosphoric acid esters, sulfonic acid esters, and boronic acid esters and more preferred are phosphonic acid esters and sulfonic acid esters.

The molecular weight of the organic acid ester containing a heteroatom is not particularly limited but is usually 1000 or less, preferably 500 or less, more preferably 400 or less, further preferably 300 or less since the ester tends to be hardly incorporated into phthalocyanine crystal when the ester is too large. On the other hand, when the molecular weight of the organic acid ester containing a heteroatom is too small, the interaction with the phthalocyanine molecule reduces and the amount of the organic acid ester containing a heteroatom in the phthalocyanine crystal decreases, so that the advantages of the invention tends to lower. Thus, a lower limit of the molecular weight is usually 50 or more, preferably 100 or more.

<Others>

As the particular organic acid compound, any compound of the aforementioned organic acids, organic acid anhydrides, and organic acid esters containing a heteroatom is used. Any one particular organic acid compound may be used singly or two or more particular organic acid compounds may be used in combination in any combinations and ratio. In particular, in the case where two or more particular organic acid compounds may be used in combination, among three categories, i.e., the organic acid, the organic acid anhydride, and the organic acid ester containing a heteroatom, two or more compounds may be selected from any one categories and used in combination or one or two or more compounds may be selected from each of any two or all three categories and used in combination.

Moreover, the existing form of the particular organic acid compound is also not particularly limited and may be any of liquid, gas, or solid.

[Non-Acidic Organic Compound]

The phthalocyanine crystal of the invention is obtained by bringing the aforementioned phthalocyanine crystal precursor into contact with an organic compound having no acidic functional group (it is optionally abbreviated as "non-acidic organic compound") in the presence of the aforementioned organic acid compound.

The non-acidic organic compound to be used in the invention is referred to an organic compound which does not have an acidic functional group illustrated in the above article of <Organic Acid> in the structure. With the non-acidic organic compound to be used in the invention, the kind thereof is not particularly limited so long as it has an ability of converting the crystal form.

The non-acidic organic compound is roughly classified into an aliphatic compound and an aromatic compound (in the following, they are optionally referred to as "non-acidic aliphatic compound" and "non-acidic aromatic compound", respectively).

Examples of the non-acidic aliphatic compound include saturated or unsaturated aliphatic hydrocarbon compounds such as pinene, terpinene, hexane, cyclohexane, octane, decane, 2-methylpentane, ligroin, and petroleum benzine; aliphatic ether compounds such as diethyl ether, diisopropyl ether, dibutyl ether, dimethyl cellosolve, ethylene glycol dibutyl ether, tetrahydrofuran, 1,4-dioxane, and 1,3-dioxolane; halogenated aliphatic compounds such as dichloromethane, chloroform, carbon tetrachloride, 1,2-dichloroethane, and 1,2,2,2-tetrachloroethane; aliphatic ketone compounds such as methyl ethyl ketone, methyl isobutyl ketone, diisopropyl ketone, diisobutyl ketone, cyclohexanone, and cyclopentanone; aliphatic ester compounds such as ethyl acetate, propyl acetate, butyl acetate, isobutyl acetate, hexyl acetate, butyl acrylate, methyl propionate, and cyclohexyl acetate; aliphatic alcohol compounds such as methanol, ethanol, and butanol; aliphatic aldehyde compounds such as n-propylaldehyde and n-butylaldehyde; and the like. In this connection, the hydrocarbon skeletons contained in these non-acidic aliphatic compounds may be chain (straight chain or branched chain) or cyclic one or may be those wherein chain and cyclic one are combined.

On the other hand, examples of the non-acidic aromatic compound include aromatic hydrocarbon compounds such as toluene, xylene, naphthalene, biphenyl, and terphenyl; halogenated aromatic hydrocarbon compounds such as monochlorobenzene, dichlorobenzene, trichlorobenzene, dichlorotoluene, chloronaphthalene, and bromobenzene; aromatic nitro compounds such as nitrobenznene and fluoronitrobenzene; aromatic ester compounds such as butyl benzoate, methyl chlorobenzoate, methyl methylbenzoate, and phenyl acetate; aromatic ether compounds such as diphenyl ether, anisole, and chloroanisole; aromatic aldehyde compounds such as benzaldehyde and chlorobenzaldehyde; aromatic ketone compounds such as acetophenone and chloroacetophenone; heterocyclic aromatic compounds such as thiophene, furan, quinoline, and picoline; and the like.

Among these non-acidic organic compounds, in view of the crystal form-converting ability, preferred are aliphatic compounds or aromatic compounds containing a halogen atom or an oxygen atom or aromatic hydrocarbon compounds. Of these, in consideration of stability of the resulting phthalocyanine crystal at dispersing, more preferred are halogenated aliphatic compounds, aliphatic ether compounds, aliphatic ketone compounds, aliphatic ester compounds, aromatic hydrocarbon compounds, halogenated aromatic compounds, aromatic nitro compounds, aromatic ketone compounds, aromatic ester compounds, and aromatic aldehyde compounds. From the viewpoint of the properties of the electrophotographic photoreceptor using the resulting phthalocyanine crystal as a material, further preferred are aliphatic ether compounds, halogenated aromatic compounds, aromatic nitro compounds, aromatic ketone compounds, aromatic ester compounds, and aromatic aldehyde compounds.

In this connection, these non-acidic organic compounds sometimes belong simultaneously to a plurality of compound groups of the aforementioned compound groups depending on the kind of the substituent and the like in the structure (for example, nitrochlorobenzene belongs to both of the "halogenated aromatic compound" and the "aromatic nitro compound") but such a non-acidic organic compound is judged as one having all the attributes of a plurality of these classifications (for example, nitrochlorobenzene has attributes of both of the halogenated aromatic compound and the aromatic nitro compound).

Any one of these non-acidic organic compounds may be used singly or two or more thereof may be used in combination at any combination and in any ratio.

The existing form or the non-acidic organic compound is not particularly limited and may be any of liquid, gas, or solid but, since the contact treatment of the non-acidic organic compound with the phthalocyanine crystal is usually carried out in a state where the non-acidic organic compound is liquid, the melting point of the non-acidic organic compound is usually 150° C. or lower, preferably 100° C. or lower, more preferably 80° C. or lower.

The molecular weight of the non-acidic organic compound is also not particularly limited but, since the contact treatment of the non-acidic organic compound with the phthalocyanine crystal is usually carried out in a state where the non-acidic organic compound is liquid, too large molecular weight of the non-acidic organic compound is not desirable. Specifically, the molecular weight of the non-acidic organic compound is usually 1000 or less, preferably 500 or less, more preferably 400 or less, further preferably 300 or less. On the other hand, when the molecular weight of the non-acidic organic compound is too small, the boiling point thereof is generally lowered and is easily vaporized and thus the handling properties at production tends to be impaired, so that a lower limit of the molecular weight is usually 50 or more, preferably 100 or more.

[Combined Use of Particular Organic Acid Compound and Non-Acidic Organic Compound]

The mechanism why the properties of the electrophotographic photoreceptor using the resulting phthalocyanine crystal as a material are improved by combined use of the particular organic acid compound and the non-acidic organic compound as the compound (B) for converting the crystal form at the crystal conversion treatment of the phthalocyanine crystal precursor is not clear. However, it is presumed that the advantages of the invention is obtained by more efficient incorporation of the particular organic acid compound simultaneously used into phthalocyanine crystal realized by the co-existence of the non-acidic organic compound at the crystal conversion treatment.

[Electron-Withdrawing Particular Aromatic Compound]

The compound (C) for converting the crystal form is composed of the aromatic compound which is solid under conditions of 1013 hPa and 25° C. and has an electron-withdrawing substituent (hereinafter optionally referred to as "electron-withdrawing particular aromatic compound") and the organic compound which is in a liquid state under conditions of 1013 hPa and 25° C. and does not have a functional group showing acidity (hereinafter optionally referred to as "non-acidic particular organic compound"). The electron-withdrawing particular aromatic compound is used as the co-existing compound for converting the crystal form and the non-acidic particular organic compound is used as the contact compound for converting the crystal form.

The electron-withdrawing particular aromatic compound is an aromatic compound which is solid under conditions of 1013 hPa and 25° C. and has an electron-withdrawing substituent (hereinafter optionally referred to as "electron-withdrawing group").

The phthalocyanine crystal of the invention is obtained by bringing the aforementioned phthalocyanine crystal precursor into contact with the non-acidic particular organic compound in the presence of the electron-withdrawing particular aromatic compound to convert the crystal form.

In the invention, the "electron-withdrawing group" refers to a substituent wherein the substituent constant $\sigma_p^0$ in the Hammett rule (hereinafter, sometimes simply referred to as "substituent constant $\sigma_p^0$") shows a positive value. The "Hammett relation rule" is an empirical rule used for explaining the effect of a substituent on the electron state of an aromatic ring in an aromatic compound. In general, as described in "Kagaku Binran Kiso-hen II revised 4th edition" edited by the Chemical Society of Japan (published by Maruzen on Sep. 30, 1993), page 379, the value is calculated as a value obtained by subtracting pKa of a benzoic acid having the substituent from pKa of unsubstituted benzoic acid. The value of the substituent constant $\sigma_p^0$ becomes a positive value having a large absolute value as the electron-withdrawing property enhances and the value becomes a negative value having a large absolute value as the electron-donating property enhances when the value in the case of hydrogen is regarded as zero. Accordingly, by using the substituent constant $\sigma_p^0$, it becomes possible to surmise and express the electron state and electron density of an aromatic compound having a substituent. For representative substituents, the values of substituent constant $\sigma_p^0$ described in "Kagaku Binran Kiso-hen II revised 4th edition" edited by the Chemical Society of Japan (published by Maruzen on Sep. 30, 1993) are shown in the following Table 1. In the invention, for substituent for which the values of the substituent constant $\sigma_p^0$ are described in the above literature, the values are used. For substituents not described, the values are determined by the measurement under the same conditions as the measuring conditions of the values of the substituent constant $\sigma_p^0$ described in "Kagaku Binran Kiso-hen II revised 4th edition" edited by the Chemical Society of Japan (published by Maruzen on Sep. 30, 1993), followed by calculation.

TABLE 1

| Substituent | Substituent constant $\sigma_p^0$ |
|---|---|
| —N(CH$_3$)$_2$ | −0.43 |
| —OH | −0.16 |
| —CH$_3$ | −0.12 |
| —OCH$_3$ | −0.10 |

TABLE 1-continued

| Substituent | Substituent constant $\sigma_p^0$ |
|---|---|
| —CH=CH$_2$ | −0.01 |
| —H | 0.00 |
| —Ph (phenyl group) | 0.04 |
| —F | 0.20 |
| —Cl | 0.28 |
| —Br | 0.30 |
| —COOCH$_3$ | 0.46 |
| —COCH$_3$ | 0.49 |
| —CHO | 0.53 |
| —CF$_3$ | 0.54 |
| —CN | 0.67 |
| —NO$_2$ | 0.81 |

The kind of the electron-withdrawing group contained in the electron-withdrawing particular aromatic compound to be used in the invention is not particularly limited so long as it has a value of the substituent constant $\sigma_p^0$ larger than 0. However, in view of the stability of the properties of the resulting electrophotographic photoreceptor against environmental fluctuation, an electron-withdrawing group having a value of the substituent constant $\sigma_p^0$ of usually 0.200 or more, particularly 0.300 or more is preferred.

The number of the electron-withdrawing groups contained in the electron-withdrawing particular aromatic compound to be used in the invention is not particularly limited so long as it is one or more. When the number of the electron-withdrawing groups is too large, the solubility to the non-acidic particular organic compound decreases and the effect obtained is lowered, so that the number is preferably 5 or less, more preferably 4 or less, further preferably 3 or less. In the case where the electron-withdrawing particular aromatic compound has two or more electron-withdrawing groups, they may be the same or different from each other.

Specific examples of the electron-withdrawing group contained in the electron-withdrawing particular aromatic compound to be used in the invention include a fluorine atom, a chlorine atom, a bromine atom, an iodine atom, a cyano group, an aldehyde group, a nitro group, a nitroso group, an acyl group, an alkoxycarbonyl group, an aryloxycarbonyl group, an aralkyloxycarbonyl group, an alkoxysulfonyl group, an alkoxysulfinyl group, an alkylsulfonyloxy group, an alkylsulfinyloxy group, a fluoroalkyl group, a carboxyamido group, a sulfonamido group, a carboxyimido group, an azo group, an aryl group, a thioalkyl group, a carboxyl group, a sulfo group, a sulfino group, a sulfeno group, a phosphinico group, a phosphono group, a boronic acid group, a boranic acid group, and the like. Of these, in view of versatility and stability of the electron-withdrawing particular aromatic compound, a fluorine atom, a chlorine atom, a cyano group, an aldehyde group, a nitro group, an acyl group, an alkoxycarbonyl group, an aryloxycarbonyl group, an aralkyloxycarbonyl group, a fluoroalkyl group, a carboxyl group, a sulfo group, and boronic acid group are preferred. More preferred are a cyano group, a nitro group, an acyl group, an alkoxycarbonyl group, an aryloxycarbonyl group, an aralkyloxycarbonyl group, a carboxyl group, and boronic acid group, and further preferred are a cyano group, a nitro group, an acyl group, an alkoxycarbonyl group, an aryloxycarbonyl group, an aralkyloxycarbonyl group, and a carboxyl group.

When the molecular weight of the electron-withdrawing group contained in the electron-withdrawing particular aromatic compound to be used in the invention is too large, the molecular volume of the whole compound increases and the compound tends to be hardly incorporated into the phthalocyanine crystal, so that the molecular weight is usually 300 or less, preferably 250 or less, more preferably 200 or less, further preferably 150 or less.

The electron-withdrawing particular aromatic compound to be used in the invention can be separated into an electron-withdrawing group portion and a portion other than the electron-withdrawing group (aromatic ring portion) from the viewpoint of its structure.

The structure of the aromatic ring portion of the electron-withdrawing particular aromatic compound to be used in the invention may be any structure so long as it is a structure having π electrons having number of 4n+2 (where n is an integer of 0 or more) in a planar cyclic polyene, i.e., a structure having aromaticity that satisfies the Hückel's rule. When the structure of the aromatic ring portion is too large, many adverse effects such as decrease in solubility may sometimes result in, so that n is preferably 5 or less, more preferably 4 or less, further preferably 3 or less in the Hückel's rule.

Examples of the aromatic ring portion of the electron-withdrawing particular aromatic compound to be used in the invention include aromatic rings consisting of benzene, naphthalene, azulene, anthracene, phenanthrene, fluorene, pyrene, and perylene; aromatic rings containing heteroatom(s), such as pyrrole, thiophene, furan, sirole, pyridine, indole, chroman, benzothiophene, benzofuran, quinoline, isoquinoline, carbazole, acridine, phenoxazine, and thianthrene; and the like. Of these aromatic rings, form the viewpoint of the solubility to the non-acidic particular organic compounds, an aromatic ring wherein the number of elements constituting the aromatic ring is 14 or less is preferred and an aromatic ring wherein the number of elements is 10 or less is more preferred. Moreover, an aromatic ring composed of a hydrocarbon is more preferred and benzene and naphthalene are further preferred.

When the molecular weight of the aromatic ring portion of the electron-withdrawing particular aromatic compound to be used in the invention is too large, the electron-withdrawing particular aromatic compound tends to be hardly incorporated into the phthalocyanine crystal, so that the molecular weight is usually 1000 or less, preferably 500 or less, more preferably 300 or less, further preferably 200 or less.

The electron-withdrawing particular aromatic compound to be used in the invention may have a substituent other than the aforementioned electron-withdrawing group. Examples of the substituent which the electron-withdrawing particular aromatic compound may contain other than the electron-withdrawing groups include an alkyl group, an aralkyl group, an alkoxy group, an aryloxy group, an aralkyloxy group, an alkenyl group, a phenolic hydroxyl group, a substituted or unsubstituted amino group, and the like. Since the advantages of the invention are hardly obtained when the electron-donating property increases, an alkyl group and an alkenyl group are preferred and an alkyl group is more preferred. When the molecular weight is too large, the molecular volume of the whole electron-withdrawing particular aromatic compound becomes large and thus the compound is hardly incorporated into the phthalocyanine crystal as in the case of the electron-withdrawing group, so that the molecular weight is usually 300 or less, preferably 250 or less, more preferably 200 or less, further preferably 150 or less.

Moreover, the electron-withdrawing particular aromatic compound to be used in the invention is solid under conditions of 1013 hPa (760 mmHg) and 25° C. The compound satisfying such a requirement is preferred for the reason that it has a strong interaction with a phthalocyanine molecule.

Examples of the structure of the electron-withdrawing particular aromatic compound to be suitably used in the invention are mentioned below. However, the following structures are simply illustrated as examples and the structures of the electron-withdrawing particular aromatic compound usable in the invention are not limited to the following examples. Electron-withdrawing particular aromatic compounds having any structure can be used unless they contradict the gist of the invention. In the following structural formulae, "Me" represents a methyl group, "Ph" represents a phenyl group, and "Bz" represents a benzoyl group.

[Chem 1]

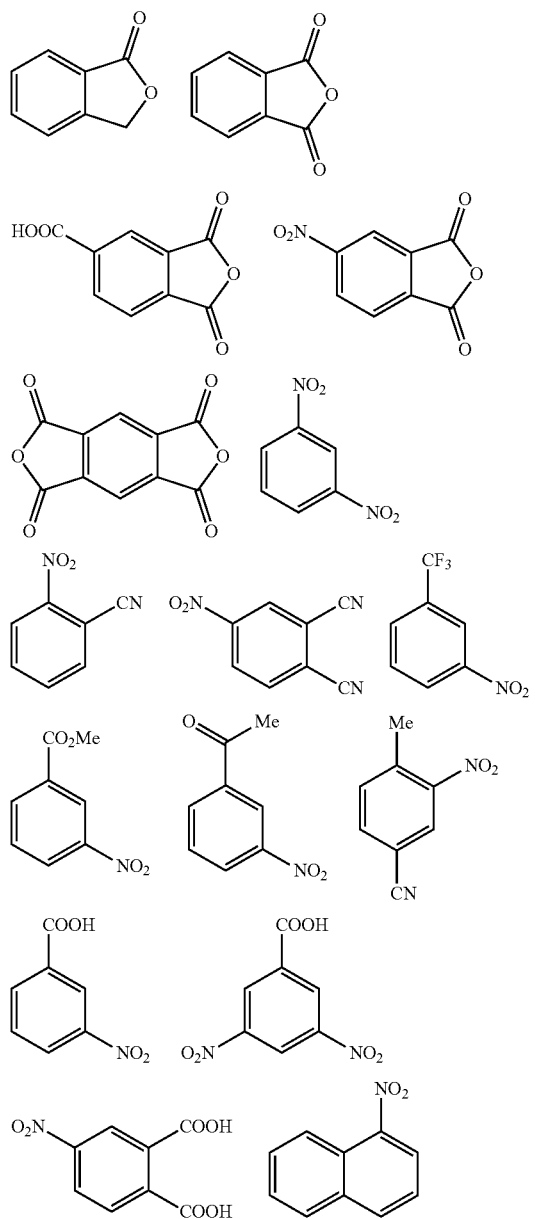

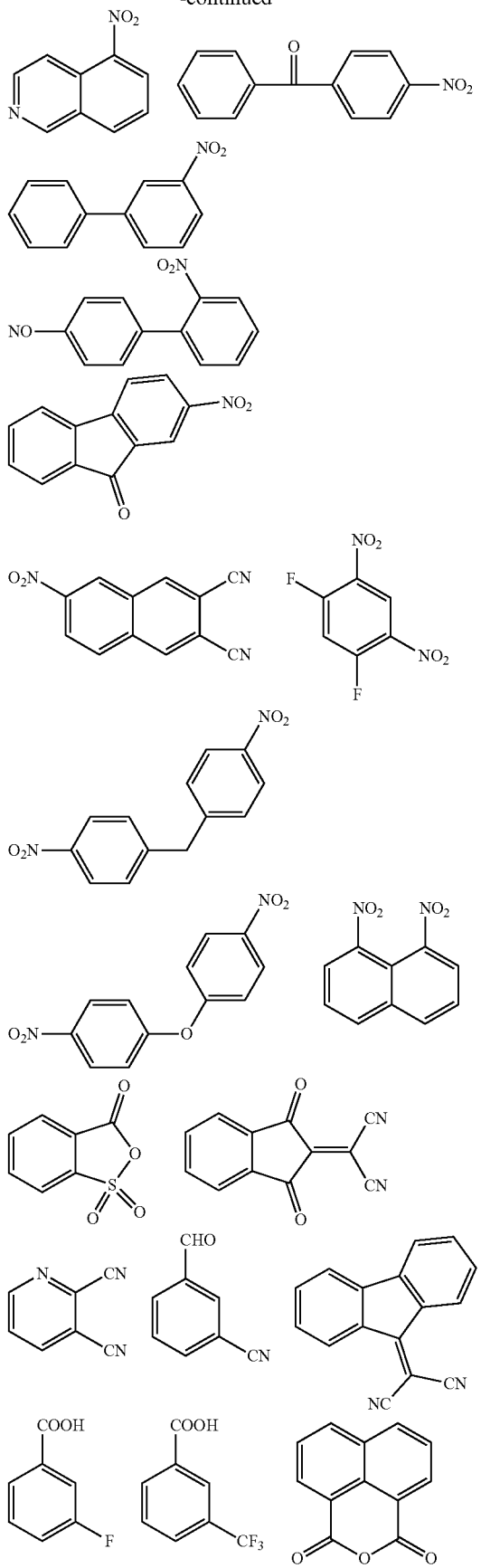

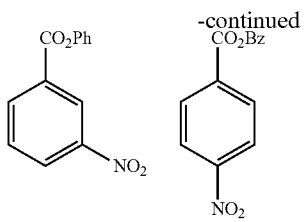

In this connection, as the electron-withdrawing particular aromatic compound, any one may be used singly or two or more may be used in combination at any combination and in any ratio.

[Non-Acidic Particular Organic Compound]

The non-acidic particular organic compound is referred to an organic compound which is in a liquid state under conditions of 1013 hPa and 25° C. and does not have a functional group showing acidity. Namely, among the non-acidic organic compounds explained in the article of the compound (B) for converting the crystal form, the compound which is in a liquid state under conditions of 1013 hPa and 25° C. corresponds to the non-acidic particular organic compound.

In the invention, the "functional group showing acidity" is a functional group contained in the structure of an organic acid, which functions for showing acidity. Examples include a carboxyl group, a thicarboxyl group, a dithiocarboxyl group, a mercaptocarbonyl group, a hydroperoxy group, a sulfo group, a sulfino group, a sulfino group, a sulfeno acid group, a phenolic hydroxy group, a thiol group, a phosphinico group, a phosphono group, a selenono group, a selenino group, an arsinico group, an arsono group, a boronic acid group, a boranic acid group, and the like as explained in the article of the above "Organic Acid". The non-acidic particular organic compounds to be used in the invention are organic compounds which do not have any functional group showing the acidity thereof.

The non-acidic particular organic compound to be used in the invention may have any structure but the compound is preferably an organic compound having no unsubstituted amino group, monosubstituted amino group, and alcoholic hydroxyl group form the viewpoint of regulating the crystal form at the contact with the phthalocyanine crystal precursor.

The non-acidic particular organic compound to be used in the invention is roughly classified into an aliphatic compound and an aromatic compound (hereinafter, they are optionally referred to as a "non-acidic particular aliphatic compound" and a "non-acidic particular aromatic compound", respectively).

Examples of the non-acidic particular aliphatic compound include saturated or unsaturated aliphatic hydrocarbon compounds such as pinene, terpinene, hexane, cyclohexane, octane, decane, 2-methylpentane, ligroin, petroleum benzin; aliphatic ether compounds such as diethyl ether, diisopropyl ether, dibutyl ether, dimethyl cellosolve, ethylene glycol dibutyl ether, tetrahydrofuran, 1,4-dioxane, and 1,3-dioxolane; halogenated aliphatic compounds such as dichloromethane, chloroform, carbon tetrachloride, 1,2-dichloroethane, and 1,2,2,2-tetrachloroethane; aliphatic ketone compounds such as methyl ethyl ketone, methyl isobutyl ketone, diisopropyl ketone, diisobutyl ketone, cyclohexanone, and cyclopentanone; aliphatic ester compounds such as ethyl acetate, propyl acetate, butyl acetate, isobutyl acetate, hexyl acetate, butyl acrylate, methyl propionate, cyclohexyl acetate; aliphatic alcohol compounds such as methanol, ethanolm and butanol; aliphatic aldehyde compounds such as n-propylaldehyde and n-butylaldehyde; and the like. In this connection, the hydrocarbon skeleton contained in the non-acidic particular aliphatic compound may be chain (linear chain or branched chain) or cyclic one or may be those wherein chain and cyclic one are combined.

On the other hand, examples of the non-acidic particular aromatic compound include aromatic hydrocarbon compounds such as toluene, xylene, naphthalene, biphenyl, and terphenyl; halogenated aromatic hydrocarbon compounds such as monochlorobenzene, dichlorobenzene, trichlorobenzene, dichlorotoluene, chloronaphthalene, and bromobenzene; aromatic nitro compounds such as nitrobenznene and fluoronitrobenzene; aromatic ester compounds such as butyl benzoate, methyl chlorobenzoate, methyl methylbenzoate, and phenyl acetate; aromatic ether compounds such as diphenyl ether, anisole, and chloroanisole; aromatic aldehyde compounds such as benzaldehyde and chlorobenzaldehyde; aromatic ketone compounds such as acetophenone and chloroacetophenone; heterocyclic aromatic compounds such as thiophene, furan, quinoline, and picoline; and the like.

Among these non-acidic particular organic compounds, in view of the crystal form-converting ability, preferred are aliphatic compounds or aromatic compounds containing a halogen atom or an oxygen atom or aromatic hydrocarbon compounds. Of these, in consideration of stability of the resulting phthalocyanine crystal at dispersing, more preferred are halogenated aliphatic compounds, aliphatic ether compounds, aliphatic ketone compounds, aliphatic ester compounds, aromatic hydrocarbon compounds, halogenated aromatic compounds, aromatic nitro compounds, aromatic ketone compounds, aromatic ester compounds, and aromatic aldehyde compounds. From the viewpoint of the properties of the electrophotographic photoreceptor using the resulting phthalocyanine crystal as a material, further preferred are aliphatic ether compounds, halogenated aromatic compounds, aromatic nitro compounds, aromatic ketone compounds, aromatic ester compounds, and aromatic aldehyde compounds.

In this connection, these non-acidic particular organic compounds sometimes belong simultaneously to a plurality of compound groups of the aforementioned compound groups depending on the kind of the substituent and the like in the structure (for example, nitrochlorobenzene belongs to both of the "halogenated aromatic compound" and the "aromatic nitro compound") but such a non-alcoholic organic compound is judged as one having all the attributes of a plurality of these classifications (for example, nitrochlorobenzene has attributes of both of the halogenated aromatic compound and the aromatic nitro compound).

Moreover, the non-acidic particular organic compound is in a liquid state under conditions of 1013 hPa (760 mmHg) and 25° C.

The molecular weight of the non-acidic particular organic compound is not particularly limited but, since the viscosity or the like increases with the increase in the molecular weight and productivity decreases, the molecular weight of the non-acidic particular organic compound is usually 1000 or less, preferably 500 or less, more preferably 400 or less, further preferably 300 or less. On the other hand, when the molecular weight of the non-acidic particular organic compound is too small, the boiling point thereof is generally lowered and is easily vaporized and thus the handling properties at production tends to be impaired, so that a lower limit of the molecular weight is usually 50 or more, preferably 100 or more.

Any one of the non-acidic particular organic compounds may be used singly or two or more thereof may be used in combination at any combination and in any ratio.

[Combined Use of Electron-Withdrawing Particular Aromatic Compound and Non-Acidic Particular Organic Compound]

The mechanism why the existence of the electron-withdrawing particular aromatic compound at the conversion of the crystal form influences the properties of the phthalocyanine crystal as an electrophotographic photoreceptor is not clear. However, it is presumed that the advantages of the invention is obtained by more efficient incorporation of the electron-withdrawing particular aromatic compound into the phthalocyanine crystal realized by the co-existence of the non-acidic particular organic compound and the electron-withdrawing particular aromatic compound.

[Particular Substituent-Containing Aromatic Compound]

The compound (D) for converting the crystal form is an aromatic compound having an oxygen atom-containing group and a halogen atom having an atomic weight of 30 or more as substituents (hereinafter optionally referred to as "particular substituent-containing aromatic compound"). The particular substituent-containing aromatic compound is used as a contact compound for converting the crystal form.

As the aromatic skeleton of the particular substituent-containing aromatic compound, there may be mentioned aromatic hydrocarbon skeletons such as benzene, naphthalene, anthracene, phenanthrene, biphenyl, and terphenyl and heterocyclic aromatic skeletones such as pyrrole, thiophene, furan, pyridine, quinoline, isoquinoline, and phenanthroline. However, since the regulating ability into the aforementioned particular crystal form that is a suitable crystal form in the phthalocyanine crystal of the invention decreases when the aromatic skeleton portion has heteroatom(s) such as nitrogen, oxygen, and/or sulfur, the aromatic hydrocarbon skeleton is preferred. The particular substituent-containing aromatic compound is preferably in a liquid state at the time when it is brought into contact with the phthalocyanine crystal precursor. Since it is difficult to be in a liquid state when the molecular weight of the aromatic skeleton portion is large, skeletons such as benzene, naphthalene, biphenyl, pyrrole, thiophene, furan, and pyridine are usually used. Of these, aromatic hydrocarbon skeletons such as benzene, naphthalene, and biphenyl are preferred. From the viewpoint of the electrophotographic properties of phthalocyanine crystal, benzene is particularly preferred.

Moreover, since the contact of the particular substituent-containing aromatic compound with the phthalocyanine crystal precursor is usually carried out at 100° C. or lower, the melting point of the particular substituent-containing aromatic compound is usually 100° C. or lower. When the melting point is too high, the handling property of the particular substituent-containing aromatic compound decreases at the contact with the phthalocyanine crystal precursor, so that the melting point of the particular substituent-containing aromatic compound is preferably 80° C. or lower, more preferably 60° C. or lower.

As the halogen atom having an atomic weight of 30 or more contained in the particular substituent-containing aromatic compound, there may be mentioned a chlorine atom, a bromine atom, or an iodine atom but, in view of the handling at the production, a chlorine atom and a bromine atom are preferred and, in view of the properties as an electrophotographic photoreceptor, a chlorine atom is more preferred.

The halogen atom having an atomic weight of 30 or more contained in the particular substituent-containing aromatic compound is usually directly bonded to the aromatic skeleton. The number of the halogen atoms having an atomic weight of 30 or more is arbitrary but, since the freezing point elevates and the handling property at the production decreases as the number of the halogen atoms increases, the number is preferably 3 or less and, in view of the sensitivity of the electrophotographic photoreceptor, it is more preferably 2 or less. In particular, the compound is particularly preferably a halogen-monosubstituted aromatic compound.

The kind of the oxygen atom-containing group contained in the particular substituent-containing aromatic compound is not particularly limited but examples thereof include a phenolic hydroxyl group; an aldehyde group; a carboxylic acid group; a nitroso group; a nitro group; an imidic acid group; a hydroximic acid; a hydroxamic acid group; a cyanic acid group; an isocyanic acid group; an azoxy group; an amido group; acyl groups such as an acetyl group and a phenoxy group; ether groups such as a methoxy group, a benzyloxy group, and a phenoxy group; acetal groups such as dimethyl acetal group, a methyl ethyl acetal group, and an ethylene acetal group. Of these groups, a group having a substituent capable of being further substituted, such as an alkyl chain, may be further substituted.

Of the above oxygen atom-containing groups, in view of the crystal-regulating ability, substituents having a carbonyl group, such as an aldehyde group, an ester group, an acyl group, and an acyloxy group, a nitro group, and an ether group are preferred. In particular, an aldehyde group, a nitro group, an ether group, an ester group, an acyl group, and an acyloxy group are more preferred.

It is presumed that the crystal form-regulating ability at the contact with the phthalocyanine crystal precursor is increased by the use of the particular substituent-containing aromatic compound and the particular substituent-containing aromatic compound is icorporated into the phthalocyanine crystal precursor to thereby exhibit the advantages of the invention, so that the oxygen atom-containing group may be directly bonded to the aromatic ring and also may be bonded to the aromatic ring through a divalent organic residue (excluding an arylene group).

In the case where the oxygen atom-containing group is bonded to the aromatic ring through a divalent organic residue, the molecular volume of the particular substituent-containing aromatic compound increases by the organic residue and the compound is hardly incorporated into phthalocyanine crystal, so that the molecular weight of the organic residue portion is usually 100 or less, preferably 50 or less. However, it is more preferred that the oxygen atom-containing group does not have the divalent organic residue and is directly bonded to the aromatic ring through the oxygen atom like an ether group or the atom directly bonded to the aromatic ring has an oxygen atom, like the carbon atom of a carbonyl group or the nitrogen atom of a nitro group.

The molecular weight per oxygen atom-containing group is usually 300 or less. When the molecular weight is too large, the properties of the electrophotographic photoreceptor decreases, so that the molecular weight is preferably 250 or less, more preferably 200 or less, further preferably 150 or less.

When the number of the oxygen atom-containing groups contained in the particular substituent-containing aromatic compound is too large, both of the molecular weight and molecular volume of the particular substituent-containing aromatic compound increase and thus the advantages obtained by the use of the particular substituent-containing aromatic compound decreases, so that the number is usually 5 or less, preferably 3 or less, more preferably 2 or less, and further preferably 1.

In addition to the oxygen atom-containing group and the halogen atom having an atomic weight of 30 or less, the particular substituent-containing aromatic compound may have the other substituent(s) on the aromatic ring. As the other substituent, there may be mentioned alkyl groups such as a methyl group, an ethyl group, an isopropyl group, and a cyclohexyl group; thioalkyl groups such as a thiomethyl group and a thioethyl group; a cyano group; a mercapto group; substituted or unsubstituted amino groups such as an amino group, a monomethylamino group, and a methylethylamino group; halogenated alkyl groups such as a trifluoromethyl group; known substituents containing no oxygen atom, such as a fluorine atom; a halogen atom having an atomic weight of 29 or less; and the like.

Among the above examples of the other substituent, with regard to the substituents having a carbon chain, such as alkyl groups, substituted alkyl groups, and halogenated alkyl groups, the carbon chain portion may have any structure of linear chain, branched chain, and cyclic one. However, when the structure of the carbon chain portion of these substituents is too large, stability of the resulting phthalocyanine crystal is adversely affected, so that the structure is preferably a structure of a linear or branched chain, more preferably a linear chain. Moreover, the carbon number of the carbon chain portion is usually 20 or less but, since the effect of the particular substituent-containing aromatic compound decreases when the carbon number of the carbon chain portion is too large, it is preferably 15 or less, more preferably 10 or less, further preferably 6 or less.

Among the above examples of the other substituent, in the consideration of the crystal-regulating ability at the crystal conversion, a fluorine atom or an alkyl group is preferred. In particular, since the crystal-regulating ability at the crystal conversion decreases when three-dimensional molecular volume as a substituent increases, a methyl group, an ethyl group, or a fluorine group is more preferred and a methyl group or a fluorine atom is further preferred.

In this connection, any one of the above particular substituent-containing aromatic compounds may be used singly or two or more thereof may be used in combination at any combination and in any ratio.

Moreover, one or two or more particular substituent-containing aromatic compounds may be mixed with one or two or more other compounds and then brought into contact with the phthalocyanine crystal precursor. In this case, the kind of the other compound to be used in combination with the particular substituent-containing aromatic compound is not particularly limited so long as it does not adversely affect the phthalocyanine crystal precursor to be used and the resulting phthalocyanine crystal. However, in the case where the other compound other than the particular substituent-containing aromatic compound is used in combination, it is preferred that the ratio of the particular substituent-containing aromatic compound to the total amount of the particular substituent-containing aromatic compound and the other compound is usually 50% by weight or more, particularly 75% by weight or more.

The amount of the particular substituent-containing aromatic compound to be used varies depending on the method to be used in the contact treatment and cannot be categorically defined but, in general, the weight ratio to the phthalocyanine crystal precursor is in the range of usually 50% by weight or more, preferably 100% by weight or more and usually 2000% by weight or less, preferably 1000% by weight or less. In the case where two or more particular substituent-containing aromatic compounds are used in combination, the total ratio of them is to fall within the above range.

[Crystal Form Conversion Step]

In the crystal form conversion step, the crystal form of the phthalocyanine crystal precursor is converted using the aforementioned compound for converting the crystal form. Namely, the phthalocyanine crystal precursor is brought into contact with the contact compound for converting the crystal form in the presence of the co-existing compound for converting the crystal form to be used according to need, thereby the crystal form being converted.

In the crystal form conversion step, as mentioned above, any one of the above compounds (A) to (D) for converting the crystal form may be used singly or two or more thereof may be used in combination at any combination and in any ratio.

[Contact Procedure]

In the crystal form conversion step, the method for bringing the phthalocyanine crystal precursor into contact with at least one compound for converting the crystal form selected from the compounds for converting the crystal form is not particularly limited and any known method may be used.

In particular, the phthalocyanine crystal precursor is generally brought into contact with the compound for converting the crystal form in the presence of water and the method is suitable for obtaining the phthalocyanine crystal of the invention. In the case of using water, the amount thereof is not particularly limited but the weight ratio to the compound for converting the crystal form is preferably in the range of usually 100% by weight or more, particularly 500% by weight or more and usually 5000% by weight or less, particularly 1500% by weight or less. In the case where two or more compounds for converting the crystal form are used in combination, it is preferred that the total ratio of them is to fall within the above range.

As the specific contact method of the compound for converting the crystal form with the phthalocyanine crystal precursor, there may be, for example, mentioned a method of bringing the phthalocyanine crystal precursor into contact with a vapor or liquid containing the compound for converting the crystal form or a solution containing the compound for converting the crystal form with stirring, a method of bringing the phthalocyanine crystal precursor into contact with the compound for converting the crystal form with adding mechanical force together with a medium in an apparatus such as automatic mortar, planetary mill, vibration ball mill, CF mill, roller mill, sand mill, or kneader, and the like method.

The temperature at the time when the compound for converting the crystal form is brought into contact with the phthalocyanine crystal precursor is not particularly limited but is usually 150° C. or lower. Therefore, all the the contact compounds for converting the crystal form to be used in the invention desirably have a melting point of usually 150° C. or lower. When the melting point of the contact compound for converting the crystal form is too high, the handling property of the contact compound for converting the crystal form at the crystal conversion decreases, so that it is preferably 120° C. or lower, more preferably 80° C. or lower.

By the contact treatment (i.e., crystal form conversion treatment) of the compound for converting the crystal form with the phthalocyanine crystal precursor, the phthalocyanine crystal is obtained. The resulting phthalocyanine crystal of the invention may be washed using water and various organic solvents according to need. The phthalocyanine crystal of the invention obtained after the contact treatment or after washing is usually in a wet cake state. As mentioned above, since it is considered that the advantages of the invention are obtained by the incorporation of the compound for converting the crystal form into the phthalocyanine crystal at the time when the phthalocyanine crystal precursor is brought into contact with the compound for converting the crystal form at the crystal conversion, the content of the phthalocyanine in the wet cake (weight of the phthalocyanine relative to the total weight of the wet cake) is not particularly limited and may be any amount.

The wet cake of the phthalocyanine crystal of the invention obtained after the contact treatment or after washing is usually subject to a drying step. As the drying method, it is possible to dry the wet cake by a known method such as air-blow drying, heat-drying, vacuum drying, or freeze-drying.

The phthalocyanine crystal of the invention obtained by the above method usually takes a form where primary particles are agglomerated to form secondary particles. The particle diameter largely varies depending on the conditions, formulation, and the like at the contact of the compound for converting the crystal form with the phthalocyanine crystal precursor but, in consideration of dispersibility, the primary particle size is preferably 500 nm or less, and in view of film-forming ability by application, is preferably 250 nm or less.

In the invention, the definition whether the crystal conversion is achieved or not before and after the contact of the phthalocyanine crystal precursor with the compound for converting the crystal form is as follows. Namely, the case where individual peaks of the powder X-ray diffraction spectra before and after the contact are entirely the same is defined as no occurrence of crystal conversion and the case where difference in information of the peak positions, presence of the peaks, the peak half bandwidth, and the like is observed even a little is defined as occurrence of crystal conversion.

[Crystal Form of Crystalline Phthalocyanine]

The crystal form of the phthalocyanine crystal of the invention may be any crystal form as far as it is a crystal form different from that of the phthalocyanine crystal precursor. Particularly, from the viewpoint of the properties of the electrophotographic photoreceptor in the case of using the phthalocyanine crystal as a material for the electrophotographic photoreceptor, preferred is a crystal form which has a main peak at Bragg angle (2θ±0.2°) of 27.2° toward CuKα characteristic X-ray (wavelength 1.541 angstrom) (hereinafter, optionally referred to as "particular crystal form").

Although the mechanism for obtaining the advantages of the invention is no clear, it is considered that, at the time when the phthalocyanine crystal precursor is brought into contact with the compound for converting the crystal form to construct the crystal form, the phthalocyanine ring and the compound for converting the crystal form interact with each other to incorporate the compound for converting the crystal form into the phthalocyanine crystal and also the incorporated compound for converting the crystal form interacts with water present in the crystal as a sensitizer to thereby suppress the elimination of water from the inside of the crystal under a low humid condition, enable the presence of the water molecule in the phthalocyanine crystal even under the low humid condition, and suppress sensitivity decrease induced by the elimination of water as a sensitizer or the compound for converting the crystal form plays a role as a sensitizer instead of the water molecule which is a sensitizer.

In particular, since the above particular crystal form is low in crystal density and has a lot of vacant space portions in the crystal as compared with the other crystal forms, the compound for converting the crystal form is easily incorporated into the crystal at the time when the phthalocyanine crystal is brought into contact with the compound for converting the crystal form to construct the aforementioned particular crystal form.

In the case where the phthalocyanine crystal precursor is brought into contact with the aromatic aldehyde compound to obtain the phthalocyanine crystal of the invention, it is considered that, at the time when the crystal form is constructed, the π electrons of the phthalocyanine ring and the aromatic ring portion of the aromatic aldehyde compound interact with each other to incorporate the aromatic aldehyde compound into the phthalocyanine crystal and also the aldehyde group portion of the incorporated aromatic aldehyde compound interacts with water present in the crystal as a sensitizer to thereby suppress the elimination of water from the inside of the crystal under a low humid condition, enable the presence of the water molecule in the phthalocyanine crystal even under the low humid condition, and suppress sensitivity decrease induced by the elimination of water as a sensitizer or the aromatic ring portion of the aromatic aldehyde compound plays a role as a sensitizer instead of the water molecule which is a sensitizer.

In the case where the phthalocyanine crystal precursor is brought into contact with the non-acidic organic compound in the presence of the particular organic acid compound to obtain the phthalocyanine crystal of the invention, it is considered that, at the time when the crystal form is constructed, the particular organic acid compound is incorporated into the phthalocyanine crystal and also the incorporated particular organic acid compound interacts with water present in the crystal as a sensitizer to thereby suppress the elimination of water from the inside of the crystal under a low humid condition, enable the presence of the water molecule in the phthalocyanine crystal even under the low humid condition, and suppress sensitivity decrease induced by the elimination of water as a sensitizer or the particular organic acid compound plays a role as a sensitizer instead of the water molecule which is a sensitizer.

In particular, since the above particular crystal form is low in crystal density and has a lot of vacant space portions in the crystal as compared with the other crystal forms, the particular organic acid compound is easily incorporated into the phthalocyanine crystal and plays a role as a sensitizer in the phthalocyanine crystal at the time when the non-acidic organic compound is brought into contact with the phthalocyanine crystal precursor in the presence of the particular organic acid compound to construct the aforementioned particular crystal form.

In the case where the phthalocyanine crystal precursor is brought into contact with the non-acidic particular organic compound in the presence of the electron-withdrawing particular aromatic compound to obtain the phthalocyanine crystal of the invention, it is considered that, at the time when the crystal form is constructed, the electron-withdrawing particular aromatic compound is incorporated into the phthalocyanine crystal and also the incorporated electron-withdrawing particular aromatic compound interacts with water present in the crystal as a sensitizer to thereby suppress the elimination of water from the inside of the crystal under a low humid condition, enable the presence of the water molecule in the phthalocyanine crystal even under the low humid condition, and suppress sensitivity decrease induced by the elimination of water as a sensitizer or the electron-withdrawing particular aromatic compound plays a role as a sensitizer instead of the water molecule which is a sensitizer.

In particular, since the above particular crystal form is low in crystal density and has a lot of vacant space portions in the crystal as compared with the other crystal forms, the electron-withdrawing particular aromatic compound is easily incorporated into the phthalocyanine crystal and plays a role as a sensitizer in the phthalocyanine crystal at the time when the non-acidic particular organic compound is brought into contact with the phthalocyanine crystal precursor in the presence of the electron-withdrawing particular aromatic compound to construct the aforementioned particular crystal form.

In the case where the phthalocyanine crystal precursor is brought into contact with the particular substituent-containing aromatic compound to obtain the phthalocyanine crystal of the invention, it is considered that the above particular substituent-containing aromatic compound is excellent in crystal form-regulating ability at the time when the crystal form is converted into the particular crystal form because the compound has a halogen atom having an atomic weight of 30 or more as well as the particular substituent-containing aromatic compound is incorporated into the phthalocyanine crystal at the crystal conversion and the oxygen atom-containing group in the particular substituent-containing aromatic compound plays a role as a sensitizer in the crystal.

In particular, since the above particular crystal form is low in crystal density and has a lot of vacant space portions in the crystal as compared with the other crystal forms, the π electrons of the phthalocyanine ring and the aromatic ring portion of the particular substituent-containing aromatic compound interacts with each other to thereby incorporate the particular substituent-containing aromatic compound easily into the phthalocyanine crystal and plays a role as a sensitizer in the phthalocyanine crystal at the time when the particular substituent-containing aromatic compound is brought into contact with the phthalocyanine crystal precursor to construct the aforementioned particular crystal form.

For the above reasons, the phthalocyanine crystal of the invention desirably has the aforementioned particular crystal form.

In the case where the phthalocyanine crystal has the aforementioned particular crystal form, as combinations of definite peaks shown together with the peak at 27.2°, the following (i) to (iii) may be mentioned.
(i) 9.6°, 24.1°, 27.2°
(ii) 9.5°, 9.7°, 24.1°, 27.2°
(iii) 9.0°, 14.2°, 23.9°, 27.1°

In particularly, among the combinations of the peaks of the above (i) to (iii), those showing the above combinations (i) or (ii) are preferred because of excellent crystal stability at dispersing.

Particularly, a crystal form having main diffraction peaks at 7.3°, 9.6°, 11.6°, 14.2°, 18.0°, 24.1°, and 27.2° or a crystal form having main diffraction peaks at 7.3°, 9.5°, 9.7°, 11.6°, 14.2°, 18.0°, 24.2°, and 27.2° is more preferred from the viewpoint of decay in the dark and residual potential in the case of using it as a material for an electrophotographic photoreceptor.

In this connection, since a phthalocyanine crystal having a peak at around 26.2° or 28.6° rearranges into the other crystal form at dispersing to invite decrease in electrophotographic properties, the phthalocyanine crystal of the invention preferably has no definite peak at around 26.2° or 28.6°.

As mentioned above, it is considered that the effect of the compound for converting the crystal form in the phthalocyanine crystal of the invention is obtained through the incorporation of the compound for converting the crystal form into the phthalocyanine crystal by bringing the phthalocyanine crystal precursor into contact with the compound for converting the crystal form at the crystal conversion and is not dependent on the molecular orientation in the crystal. Thus, in the preferable combination of the peaks mentioned above, it is considered that the intensity ratio between individual peaks does not correlate to the advantages of the invention. Therefore, these peaks may have any intensity ratio but usually, a peak at around 27.2° or a peak at around 9.6° becomes largest in many cases.

[Chlorinated Oxytitanium Phthalocyanine]

In the case of oxytitanium phthalocyanine crystal (crystal or mixed crystal containing at least oxytitanium phthalocyanine) suitable as the phthalocyanine crystal of the invention, oxytitanium phthalocyanine whose phthalocyanine ring is chlorinated (chlorinated oxytitanium phthalocyanine) is contained in the crystal in some cases. Since it is considered that the advantages of the invention are exhibited through the incorporation of the compound for converting the crystal form, existence of much space is preferred in the oxytitanium phthalocyanine crystal so that a large amount of the compound for converting the crystal form is incorporated. The chlorinated oxytitanium phthalocyanine has a chloro group in the phthalocyanine ring portion and the molecular volume increases as compared with unsubstituted oxytitanium phthalocyanine. Therefore, when the chlorinated oxytitanium phthalocyanine is present in the crystal, the space for incorporating the compound for converting the crystal form decreases. For the above reason, the oxytitanium phthalocyanine for use in as a phthalocyanine crystal precursor for the production of the crystalline oxytitanium phthalocyanine (hereinafter abbreviated as "crystalline oxytitanium phthalocyanine precursor") preferably has a less content of the chlorinated oxytitanium phthalocyanine.

Although it is possible to measure the content of the chlorinated oxytitanium phthalocyanine in the crystalline oxytitanium phthalocyanine precursor by any conventionally known analytical methods, the content can be determined by the elemental analysis and mass spectrum measurement described in JP-2001-115054. As specific conditions for the elemental analysis and mass spectrum measurement, the following conditions may be, for example, mentioned.

<Conditions for Measuring Chlorine Content (Elemental Analysis)>

A crystalline oxytitanium phthalocyanine precursor is precisely weighed in an amount of 100 mg and placed on a quartz board, which is then completely combusted in a temperature-elevating electric furnace (e.g., QF-02 manufactured by Mitsubishi Chemical Corporation) and the resulting combustion gas is quantitatively absorbed in 15 ml of water. The resulting absorbed solution is diluted to 50 ml and subjected to chlorine analysis by ion chromatography ("DX-120" manufactured by Dionex). The following shows conditions for the ion chromatography.

Column: Dionex Ion Pak AG12A+AS12A
Eluent: 2.7 mM sodium carbonate ($Na_2CO_3$)/0.3 mM sodium hydrogen carbonate ($NaHCO_3$)
Flow rate: 1.3 ml/min Injection amount: 50 μl
<Conditions for Mass Spectrum Measurement>
(a) Sample Preparation In a 50 mL glass vessel is placed 0.50 g of a crystalline oxytitanium phthalocyanine precursor together with 30 g of glass beads (ϕ1.0 to 1.4 mm) and 10 g of cyclohexanone, and the whole is subjected to dispersion treatment using a dye dispersion testing machine (paint shaker) for 3 hours, whereby a 5% by weight dispersion liquid of oxytitanyl phthalocyanine is formed. One μl of the 5% by weight dispersion liquid of oxytitanium phthalocyanine is put in a 20 ml sample vial and 5 ml of chloroform is added thereto. The product is then ultrasonically dispersed for 1 hour, whereby a 10 ppm dispersion liquid of oxytitanium phthalocyanine is prepared.

(b) Measuring Apparatus/Conditions:

Measuring apparatus: JMS-700/MStaion manufactured by JEOL Corp.
Ionization mode: DCI(-)
Reaction gas: isobutane (pressure in ionization chamber: $1\times10^{-5}$ Torr)
Filament rate: 0->0.90 A (1 A/min)
Mass spectrometric ability: 2000
Scanning method: MF-Linear
Scanning mass range: 500 to 600
Time for scanning the whole mass range: 0.8 second
Cycle time: 0.5 second (c) Method for Calculating Mass Spectrum Peak Intensity Ratio of Chlorinated Oxytitanium Phthalocyanine to Unsubstituted Oxytitanium Phthalocyanine:

One μl of the 10 ppm dispersion liquid of oxytitanium phthalocyanine prepared in the above procedure was applied onto the filament of the DCI probe and subjected to mass spectrum measurement under the aforementioned conditions. Based on the obtained mass spectrum, a ratio of the peak area at m/z=610, which corresponds to molecular ions of the chlorinated oxytitanyl phthalocyanine, to the peak area at m/z=576, which corresponds to molecular ions of the nonsubstituted oxytitanyl phthalocyanine, obtained from the ion chromatography ("610" peak area/"576" peak area) is calculated as a mass spectrum peak intensity ratio.

The amount of the chlorinated oxytitanyl phthalocyanine contained in the crystalline oxytitanyl phthalocyanine precursor, which is obtained by the measurement based on the aforementioned <Conditions for Measuring Chlorine Content (Elemental Analysis)>, is preferably 0.4% by weight or less, more preferably 0.3% by weight or less, further preferably 0.2% by weight or less.

Moreover, the mass spectrum peak intensity ratio of the chlorinated oxytitanyl phthalocyanine to the unsaturated oxytitanyl phthalocyanine, which is obtained by the measurement based on the aforementioned <Conditions for Mass Spectrum Measurement>, is preferably 0.050 or less, more preferably 0.040 or less, more preferably 0.030 or less.

[Others]

The mechanism why the use of the compound for converting the crystal form influences the properties of the phthalocyanine crystal as an electrophotographic photoreceptor is not clear. However, as mentioned above, it is considered that the advantages of the invention are obtained by the incorporation of the compound for converting the crystal form into the phthalocyanine crystal at the crystal conversion.

The amount of the compound for converting the crystal form to be incorporated into the crystal varies depending on the production process and is not particularly limited. However, the amount is usually 0.1 part by weight or more per 100 parts by weight of the phthalocyanine crystal. Particularly, since the advantages of the invention decreases when the incorporated amount of the compound for converting the crystal form is small, the amount is preferably 0.2 part by weight or more, more preferably 0.3 part by weight or more. However, since stability of the phthalocyanine crystal decreases when the incorporated amount of the compound for converting the crystal form is too large, the amount is preferably 10 parts by weight or less, more preferably 7 parts by weight or less. In this connection, in the case where a plurality of the compounds for converting the crystal form are present in the phthalocyanine crystal, it is preferred that the total amount falls within the above range.

The content of the contact compound for converting the crystal form in the phthalocyanine crystal can be calculated by the measurement according to a known gravimetric analysis. In particular, the phthalocyanine crystal having the aforementioned particular crystal form is known to cause crystal transformation at around 220 to 270° C. and the compound contained in the crystal is released at the crystal transformation. Accordingly, in the thermal gravimetric analysis of the phthalocyanine crystal having the aforementioned particular crystal form, it is possible to calculate the amount of the contact compound for converting the crystal form contained based on the weight difference before and after the crystal transformation (e.g. the weight difference between 200° C. and 300° C.)

<Properties of Electrophotographic Photoreceptor>

The characteristics of the electrophotographic photoreceptor of the invention lies in small half-decay exposure and high sensitivity as well as very little fluctuation of light decay property for a humidity change.

The smaller half-decay exposure enables decrease in energy of exposing light in the image-forming device such as a printer or a copying machine and hence consuming electric power of light source can be reduced, so that the case is preferred. An electrophotographic photoreceptor usually has different electric capacitance depending on film thickness of the sensitive layer and hence, when the film thickness is different, the amount of the surface charge is different even at the same potential. Namely, the half-decay exposure of the photoreceptor when quantum efficiency is 1 varies depending on the film thickness.

In the invention, the technical concepts that the half-decay exposure is small and the sensitivity is high as well as the fluctuation of the light decay property by humidity is extremely little are common but, for the above reasons, the half-decay exposure E½ and the degree of fluctuation of the light decay property by humidity in the invention are defined with classifying the film thickness and considering the half-decay exposure when the quantum efficiency is 1. Thereby, it is possible to define the electrophotographic photoreceptor where the properties for the image-forming device are particularly suitable in that film thickness.

In the case of the photoreceptor wherein the thickness of the sensitive layer is 35±2.5 μm, the half-decay exposure E½ at a temperature of 25° C. and a relative humidity of 50% rh is usually 0.059 or less, preferably 0.054 or less, more preferably 0.051 or less, most preferably 0.049 or less.

In the case of the photoreceptor wherein the thickness of the sensitive layer is 30±2.5 μm, the half-decay exposure E½ at a temperature of 25° C. and a relative humidity of 50% rh is usually 0.061 or less, preferably 0.056 or less, more preferably 0.053 or less, most preferably 0.051 or less.

In the case of the photoreceptor wherein the thickness of the sensitive layer is 25±2.5 μm, the half-decay exposure E½ at a temperature of 25° C. and a relative humidity of 50% rh is usually 0.066 or less, preferably 0.061 or less, more preferably 0.058 or less, most preferably 0.055 or less.

In the case of the photoreceptor wherein the thickness of the sensitive layer is 20±2.5 μm, the half-decay exposure E½ at a temperature of 25° C. and a relative humidity of 50% rh is usually 0.079 or less, preferably 0.073 or less, more preferably 0.069 or less, most preferably 0.066 or less.

In the case of the photoreceptor wherein the thickness of the sensitive layer is 15±2.5 μm, the half-decay exposure E½ at a temperature of 25° C. and a relative humidity of 50% rh is usually 0.090 or less, preferably 0.083 or less, more preferably 0.079 or less, most preferably 0.075 or less.

However, with regard to the half-decay exposure E½ in the invention, exposure of light (μJ/cm$^2$) having a wavelength of 780 nm necessary for decaying an absolute value |V0| of the surface potential V0 of an electrophotographic photoreceptor from 550 V to 275 V is defined as the half-decay exposure E½. The measuring method will be mentioned below in the article of <Measuring Method of Half-Decay Exposure Energy E½>.

The film thickness of the sensitive layer in the invention refers to the film thickness of the total of the charge generation layer and the charge transport layer in the case of the multilayer photoreceptor and refers to the film thickness of the sensitive layer in the case of the single-layer photoreceptor. In the case where the surface protective layer is present, the film thickness including the surface protective layer is regarded as the film thickness of the photoreceptor layer. In the case where layers other than the charge generation layer, the charge transfer layer, the single-layer sensitive layer, and the surface protective layer are present (e.g., an intermediate layer), the film thickness of the layers are not included in the film thickness of the photosensitive layer. It is possible to measure the film thickness by various methods but, for example, it is possible to measure it using Surfcom 570A manufactured by Tokyo Seimitsu Co., Ltd.

The fluctuation of the light decay property for a humidity change is preferably little, in the invention, when the light decay curve at a temperature of 25° C. and a relative humidity of 50% rh is compared with the light decay curve at a temperature of 25° C. and a relative humidity of 10% rh, but an absolute value of the difference of the surface potential at the same exposure (hereinafter referred to as "environmental fluctuation dependence", the measuring method of which will be mentioned in the article of "Environmental Fluctuation Dependence") is usually 50 V or less, preferably 40 V or less, more preferably 35 V or less, further preferably 30 V or less, and suitably 20 V or less within the range where the exposure is 0 to 10 times the half-decay exposure E½. The smaller the environmental fluctuation dependence is, the smaller the image deterioration derived from the environmental fluctuation is.

When such an electrophotographic photoreceptor is used in a process cartridge or an image-forming device, a large number of sheets can be printed per unit time and also consuming electric power is little and image defects derived from the environmental fluctuation can be reduced.

In the invention, the measuring environment for the half-decay exposure E½ and light decay curve are defined by the temperature and relative humidity but the measurement is desirably carried out in an environment where an error is as little as possible.

The methods for measuring the temperature and relative humidity are not particularly limited but usually, they are measured by a method in accordance with the method standardized by Japanese Industrial Standards (JIS). For the temperature, the measuring method is defined in JIS Z8704, Z8705, and Z8707 and, for the humidity, the measuring method is defined in JIS Z8806.

Specifically, with regard to the temperature, when it falls within the range of ±2° C. of the temperature defined in the invention, the temperature is judged to correspond to the temperature defined in the invention.

Moreover, with regard to the humidity, when it falls within the range of ±5% of the humidity defined in the invention in terms of relative humidity, the humidity is judged to correspond to the humidity defined in the invention.

<Measuring Method of Half-Decay Exposure Energy E½>

The half-decay exposure ½ in the invention is a value measured using a commercially available photoreceptor evaluating apparatus (Cynthia 55, manufactured by Gentec Co.) in a static mode. Specifically, it is measured by the procedure illustrated in the following.

A charging device is disposed at an angle of 0°, an exposing device and a surface potentiometer probe at an angle of 90°, and an erasing device at an angle of 270° C. The charging device, surface potentiometer probe, and erasing device are disposed so that the distance from the photoreceptor surface is 2 mm.

First, the photoreceptor is electrically charged in a dark place by being passed at a constant rotation speed (30 rpm) on a scorotron charging device, which is set in such a manner that the electrical discharge is carried out so that the surface potential of the photoreceptor is adjusted to be about −700 V. When the photoreceptor surface after electrical charging reaches the probe position, it is stopped and, 2.5 seconds after it is stopped, it is irradiated with monochromatic light of 780 nm obtained from an attached spectroscopic light source system POLAS34 in the intensity of 0.15 μW/cm$^2$ for 7.5 seconds. At this time, the exposure required for increasing the surface potential of the photoreceptor from −550 V to −275 V is measured. After the photoreceptor is again rotated and subjected to full arc erase by the erasing device, the same operations are carried out. The cycle is repeated six times and the measured values of the exposure obtained in 5 cycles excluding first cycle are averaged and the resulting average value is determined as half-decay exposure E½ (μJ/cm$^2$)

Although the case of a negatively charged photoreceptor is illustrated as an example in the above, it is suitable to make the potential positive in the case of a positively charged photoreceptor.

In this connection, after the photoreceptor to be measured is allowed to stand under the environment of a temperature of 25° C.±2° C. and a humidity of 50%±5% for 5 hours or more, the measurement of the half-decay exposure E½ is carried out under the same environment.

<Measuring Method of Environmental Fluctuation Dependence>

The environmental fluctuation dependence in the invention is obtained by mounting the photoreceptor on an electrophotographic property evaluating apparatus, which is manufactured according to the standard of the Society of Electrophotography ["Zoku Denshishashin Gijutsu No Kiso To Oyo", edited by the Society of Electrophotography, issued by Corona Publishing Co. Ltd, pp. 404-405] and evaluating electrical properties through a cycle of charging, exposure, measurement of potential, and erase. Specifically, it is determined by the procedure illustrated in the following.

A charging device is disposed at an angle of −70°, an exposing device at an angle of 0° C., a surface potentiometer probe at an angle of 36°, and an erasing device at an angle of −150° C. Individual devices are disposed so that the distance from the photoreceptor surface is 2 mm. For the charging, a scorotron charging device is used. As an exposing lamp, a halogen lamp JDR110V-85WLN/K7 manufactured by Ushio, Inc. is used and monochromatic light of 780 nm is formed using a filter MX0780 manufactured by Asahi Bunko. LED light of 660 nm is used as an erasing light.

The photoreceptor is charged with rotation at a constant rotation speed (60 rpm) so that an absolute value of initial surface potential of the photoreceptor is 700 V (+700 V in the case of a positively charged photoreceptor and −700 V in the case of a negatively charged photoreceptor). When the charged photoreceptor surface passes through an exposure portion irradiated with monochromatic light of 780 nm and reaches the probe position, the surface potential is measured (time for exposure to potential measurement: 2 The monochromatic light of 780 nm is passed through ND filter to change light intensity, the photoreceptor is irradiated with the light in an exposure 0 to 10 times the half-decay exposure E½, and surface potential is measured at each exposure. The operations are carried out under the environment of a temperature of 25° C.±2° C. and a humidity of 50% rh±5% (hereinafter suitably sometimes referred to as "NN environment") and potential after exposure under the NN environment (hereinafter suitably sometimes referred to as "$V_{NN}$") at each exposure is measured.

Thereafter, the same operations are carried out under the environment of a temperature of 25° C.±2° C. and a humidity of 10% rh±5% (hereinafter suitably sometimes referred to as "NL environment") and potential after exposure under the NL environment (hereinafter suitably sometimes referred to as "$V_{NL}$") at each exposure is measured.

An absolute value ($|V_{NN}-V_{NL}|$) of the difference between the potential $V_{NN}$ after exposure under the NN environment and the potential $V_{NL}$ after exposure under the NL environment at the same exposure is calculated and the maximum value is determined as environmental fluctuation dependence.

In this connection, at the measurement of the potential after exposure under the NN environment and the NL environment, it is carried out after the photoreceptors to be measured are allowed to stand under the NN environment (a temperature of 25° C.±2° C. and a humidity of 50% rh±5%) and under the NL environment (a temperature of 25° C.±2° C. and a humidity of 10% rh±5%) for 5 hours or more, respectively.

<Measuring Method of Sensitivity Retention>

The sensitivity retention for a humidity change (hereinafter, optionally sometimes referred to as "sensitivity retention") in the invention is obtained by evaluating electrical properties through a cycle of charging, exposure, measurement of potential, and erase using the same measuring apparatus as in the above measuring method of the environmental fluctuation dependence under the same measuring apparatus conditions.

The photoreceptor is charged with rotation at a constant rotation speed (60 rpm) so as that an absolute value of initial surface potential of the photoreceptor is 700 V (+700 V in the case of a positively charged photoreceptor and −700 V in the case of a negatively charged photoreceptor). When the charged photoreceptor surface passes through an exposure portion irradiated with monochromatic light of 780 nm and reaches the probe position, the surface potential is measured (time for exposure to potential measurement: 100 ms). The monochromatic light of 780 nm is passed through ND filter to change light intensity, the photoreceptor is irradiated with the light, and irradiation energy (exposure) is measured when surface potential is 350 V as an absolute value of initial surface potential (+350 V in the case of a positively charged photoreceptor and −350 V in the case of a negatively charged photoreceptor).

A value obtained by measuring the irradiation energy (exposure) under the NN environment (unit: μJ/cm²) is regarded as standard humidity sensitivity (hereinafter optionally sometimes referred to as "$En_{1/2}$") and a value obtained by measuring the irradiation energy (exposure) under the NL environment (unit: μJ/cm²) is regarded as low humidity sensitivity (hereinafter optionally sometimes referred to as "$El_{1/2}$").

In this connection, as in the case of the above measuring method of the environmental fluctuation dependence, at the measurement of the potential after exposure under the NN environment and the NL environment, it is carried out after the photoreceptors to be measured are allowed to stand under the NN environment and under the NL environment for 5 hours or more, respectively.

The sensitivity retention for a humidity change is calculated by calculation according to the following equation using the resulting standard humidity sensitivity $En_{1/2}$ and low humidity sensitivity $El_{1/2}$ (unit: %).

$$\text{Sensitivity retention (\%) for humidity change} = \text{Standard humidity sensitivity } En_{1/2}(\mu J/cm^2)/\text{low humidity sensitivity } El_{1/2}(\mu J/cm^2) \times 100 \quad \text{[Num 2]}$$

[II. Electrophotographic Photoreceptor]

The following will describe the electrophotographic photoreceptor of the invention. The electrophotographic photoreceptor of the invention is an electrophotographic photoreceptor having a photosensitive layer formed on an electroconductive substrate and satisfying the above properties or an electrophotographic photoreceptor containing the phthalocyanine crystal of the invention in the photosensitive layer.

[II-1. Electroconductive Substrate]

As the electroconductive substrate, there may be mainly used a metal material such as aluminum, aluminum alloy, stainless steel, copper, or nickel; a resin material to which electroconductivity is imparted by being mixed with an electroconductive powder such as metal, carbon, or tin oxide; or a resin, glass, or paper material on whose surface an electroconductive material such as aluminum, nickel, or ITO (indium oxide tin oxide alloy) is vapor-deposited or applied. Its shape may be, for example, a drum shape, a sheet shape, a belt shape, etc. Besides, it is also possible to use an electroconductive substrate made of a metal material whose surface is coated with an electroconductive material having an appropriate resistance value for controlling properties such as electroconductivity and surface nature as well as for defect covering.

The surface of the electroconductive substrate may be smooth, or may be roughened using a special cutting method or a grinding treatment. Alternatively, it may also be roughened by mixing a material constituting the substrate with particles having appropriate particle size. Moreover, it is also possible to use a drawn tube as it is without conducting cutting treatment in order to reduce cost. Particularly, in the case of using uncut aluminum base material obtained by drawing process, impact process, ironing, or the like, the case is preferred since attached matter such as stain and foreign matter present on the surface, small scratches, and the like disappear and a uniform and clean base material is obtained.

When a metal material such as aluminum alloy is used as the electroconductive substrate, it may be used after anodic oxidation film formation. The anodic oxidation film is formed by anodic oxidation treatment in an acidic bath such as chromic acid, sulfuric acid, oxalic acid, boric acid, or sulfamic acid but the anodic oxidation treatment in sulfuric acid affords better results. In the case of the anodic oxidation in sulfuric acid, it is preferred that the sulfuric acid concentration is set in the range of 100 to 300 g/l, the dissolving aluminum concentration in the range of 2 to 15 g/l, the liquid temperature in the range of 15 to 30° C., the electrolysis voltage in the range of 10 to 20 V, the current density in the range of 0.5 to 2 A/dm$^2$ but they are not limited to the above conditions.

When the average film thickness of the anodic oxidation film is too thick, higher concentration of a sealing liquid and stronger sealing conditions such as high-temperature/long-term treatment are required. Therefore, productivity becomes worse and also surface defects such as specks, stains, and powdering tend to occur on the film surface. From such viewpoints, the anodic oxidation film is preferably formed in an average film thickness of usually 20 μm or less, particularly 7 μm or less.

In the case where the anodic oxidation film is formed, sealing treatment is preferably carried out. The sealing treatment may be carried out by a usual method but, for example, a low-temperature sealing treatment of immersion in an aqueous solution containing nickel fluoride as a main component or a high-temperature sealing treatment of immersion in an aqueous solution containing nickel acetate as a main component is preferably carried out.

In the case of the low-temperature sealing treatment, the concentration of an aqueous nickel fluoride solution to be used can be suitably selected but more preferable result is obtained particularly in the range of 3 to 6 g/l. The pH of the aqueous nickel fluoride solution may be usually 4.5 or higher, preferably 5.5 or higher and usually 6.5 or lower, preferably 6.0 or lower for the treatment. As a pH regulator, there may be used oxalic acid, boric acid, formic acid, acetic acid, sodium hydroxide, sodium acetate, aqueous ammonia, and the like. Moreover, for further improving physical properties of the film, cobalt fluoride, cobalt acetate, nickel sulfate, a surfactant, or the like may be added to the aqueous nickel fluoride solution. For smooth sealing treatment, the treating temperature may be in the range of usually 25° C. or higher, preferably 30° C. or higher and usually 40° C. or lower, preferably 35° C. or lower. The treating time is preferably in the range of 1 to 3 minutes per 1 μm of the thickness of the film. Then, the low-temperature sealing treatment is finished after washing with water and drying.

In the case of the high-temperature sealing treatment, as the sealing agent, an aqueous solution of a metal salt such as nickel acetate, cobalt acetate, lead acetate, nickel acetate-cobalt, or barium nitrate can be used but particularly, nickel acetate is preferably used. In the case of using the aqueous nickel acetate solution, it is preferably used in the concentration range of usually 5 to 20 g/l. The pH of the aqueous nickel acetate solution is preferably in the range of usually 5.0 to 6.0 for the treatment. As the pH regulator, aqueous ammonia, sodium acetate, or the like can be used. For improving the physical properties of the film, sodium acetate, an organic carboxylic acid, an anionic or nonionic surfactant, or the like may be added to the aqueous nickel acetate solution. The treating temperature is in the range of usually 80° C. or higher and usually 100° C. or lower, preferably 90° C. or higher and preferably 98° C. or lower. The treating time is usually 10 minutes or more, preferably 20 minutes or more. Then, the high-temperature sealing treatment is finished after washing with water and drying.

[II-2. Undercoat Layer]

Between the electroconductive substrate and the below-mentioned photosensitive layer, an undercoat layer may be formed for the purpose of improving properties such as adhesive property and blocking property. As the undercoat layer, a binder resin, a material obtained by dispersing particles of a metal oxide or the like into the binder resin, or the like is used.

Examples of metal oxide particles usable for the undercoat layer include metal oxide particles containing a single metal element, such as titanium oxide, aluminum oxide, silicon oxide, zirconium oxide, zinc oxide, iron oxide, etc.; and metal oxide particles containing a plurality of metal elements, such as calcium titanate, strontium titanate, barium titanate, etc. One kind of these metal oxide particles may be used singly or plural kinds thereof may be used as a mixture at any combination and in any ratio. Among these metal particles, titanium oxide and aluminum oxide are preferred and particularly, titanium oxide is preferred. The titanium oxide particles may be subjected to the treatment with an inorganic substance such as tin oxide, aluminum oxide, antimony oxide, zirconium oxide, or silicon oxide or an organic substance such as stearic acid, a polyol, or a silicone. As a crystal form of the titanium oxide particles, any of rutile, anatase, brookite, and amorphous can be used. Moreover, those containing plural crystal states may be contained.

The metal oxide particles can be arbitrarily selected from a wide variety of particle sizes, although their average primary particle size is preferred to be within the range of usually 10 nm or more and usually 100 nm or less, particularly 50 nm or less, in view of the properties and the stability of the liquid.

It is desired to form the undercoat layer in such a manner that the above metal oxide particles are dispersed in binder resin. Examples of binder resin used for the undercoat layer include known binder resins, e.g., epoxy resins, polyethylene resins, polypropylene resins, acrylic resins, methacrylic resins, polyamide resins, vinyl chloride resin, vinyl acetate resin, phenol resins, polycarbonate resins, polyurethane resins, polyimide resins, vinylidene chloride resins, polyvinyl acetal resins, vinyl chloride-vinyl acetate copolymers, polyvinyl alcohol resins, polyurethane resins, polyacrylic acid resins, polyacrylamide resins, polyvinylpyrrolidone resins, polyvinylpyridine resins, water-soluble polyester resins, cellulose ester resins such as nitrocellulose, cellulose ether resins, casein, gelatin, polyglutamic acid, starch, starch acetate, amino starch, organic zirconium compounds such as zirconium chelate compound and zirconium alkoxide compound, organic titanyl compounds such as titanyl chelate compound and titanyl alkoxide compound, silane coupling agents, and the like. They may be used singly, or may be used in the form of being hardened with a hardening agent. Among them, alcohol-soluble copolymerized polyamides and modified polyamides exhibit good dispersibility and coatability and are therefore preferred.

The mixing ratio of the metal oxide particles to the binder resin can be arbitrarily selected but the ratio is preferably in the range of usually 10% by weight or more and 500% by weight or less in view of the stability and coatability of the dispersion liquid.

In addition, for the purpose of preventing image defects, pigment particles, resin particles, and the like may be contained in the undercoat layer.

The thickness of the undercoat layer can be selected arbitrarily, but the thickness is preferably in the range of usually 0.01 μm or more, preferably 0.1 μm or more and usually 30 µm or less, preferably 20 µm or less from the viewpoint of the properties of the photoreceptor and the coatability.

[II-3. Photosensitive Layer]

A photosensitive layer is formed on the electroconductive substrate (when the aforementioned undercoat layer is formed, on the undercoat layer). The photosensitive layer comprises a charge generation substance, a charge transport substance, and a binder resin.

As the structure of the photosensitive layer, there may be mentioned a photosensitive layer having a single layer structure (hereinafter, optionally referred to as "single-layer photosensitive layer") in which the charge generation substance and the charge transport substance are present in the same layer with being dispersed in binder resin and a function-separated photosensitive layer having a layered structure (hereinafter also called "multilayer photosensitive layer") comprising a charge generation layer in which the charge generation substance is dispersed in binder resin and a charge transport layer in which the charge transport substance is dispersed in binder resin. Both of these types can be used. In the case of the multilayer photosensitive layer, there can be mentioned a normally-layered photosensitive layer wherein the charge generation layer and the charge transport layer are layered in the named order from the side of the electroconductive substrate and an inversely-layered photosensitive layer wherein the charge transport layer and the charge generation layer are layered in the named order from the side of the electroconductive substrate. Any of them can be adopted. The following will explain each structure.

<Charge Generation Layer of Multilayer Photosensitive Layer>

The charge generation layer of the multilayer photosensitive layer is formed according to a method wherein a binder resin is dissolved or dispersed in a solvent or a dispersion medium and also a charge generation substance is dispersed to prepare a coating solution and the coating solution is applied onto the electroconductive substrate (when the undercoat layer is formed, onto the undercoat layer) in the case of the normally-layered photoreceptor or onto the charge transport layer in the case of the inversely-layered photoreceptor so that fine particles of the charge generation substance is bound by the binder resin.

Charge Generation Substance:

As the charge generation substance, any conventionally known charge generation substances can be used so long as they satisfy the gist of the invention. Preferably, the phthalocyanine crystal of the invention is used. In the case of using the phthalocyanine crystal of the invention, any one may be used singly or two or more thereof may be used in combination at any combination and in any ratio. Moreover, the phthalocyanine crystal of the invention alone may be used as the charge generation substance but the phthalocyanine crystal of the invention may be combined with the other charge generation substance and they may be also used in a mixed state.

The particle size of the phthalocyanine crystal of the invention to be used as the charge generation substance is preferably sufficiently small. Specifically, it is used in a size of preferably 1 µm or less, more preferably 0.5 µm or less.

As the other charge generation substances that is used in a mixed state with the phthalocyanine crystal of the invention, known various dyes and pigments may be mentioned. Examples of the dyes and pigments include phthalocyanine pigments, azo pigments, dithioketopyrrolopyrrole pigments, squalene (squalilium pigments), quinacridone pigments, indigo pigments, perylene pigments, polycyclic quinone pigments, anthanthrone pigments, benzimidazole pigments, and the like. Of these, phthalocyanine pigments and azo pigments are preferred in view of light sensitivity. In this connection, any one of the other charge generation substances may be used singly or two or more thereof may be used in combination at any composition and combination.

Binder Resin:

The kind of the binder resin used for the charge generation layer is not particularly limited and examples thereof include insulating resins, e.g., polyvinyl butyral resins, polyvinyl formal resins, polyvinyl acetal resins such as partly-acetalized polyvinyl butyral resins (in which a part of the butyrals is modified by formals, acetals, or the likes), polyarylate resins, polycarbonate resins, polyester resins, modified ether-based polyester resins, phenoxy resins, polyvinyl chloride resins, polyvinylidene chloride resins, polyvinyl acetate resins, polystyrene resins, acrylic resins, methacrylic resins, polyacrylamide resins, polyamide resins, polyvinylpyridine resins, cellulose-based resins, polyurethane resins, epoxy resins, silicone resins, polyvinyl alcohol resins, polyvinylpyrrolidone resins, casein, vinyl chloride/vinyl acetate-based copolymers such as vinyl chloride/vinyl acetate copolymers, hydroxyl-modified vinyl chloride/vinyl acetate copolymers, carboxyl-modified vinyl chloride/vinyl acetate copolymers, and vinyl chloride/vinyl acetate/maleic anhydride copolymers, styrene/butadiene copolymers, vinylidene chloride/acrylonitrile copolymers, styrene/alkyd resins, silicone/alkyd resins, and phenol/formaldehyde resins, as well as organic photoconductive polymers such as poly-N-vinylcarbazole, polyvinylanthracene, and polyvinylperylene. The binder resin can be selected from them and used but is not limited these polymers. Any of these binder resins may be used singly or two or more thereof may be used in combination at any combination and in any ratio.

Mixing Ratio:

In the charge generation layer, the mixing ratio (by weight) of the charge generation substance to the binder resin is, relative to 100 parts by weight of the binder resin, in the range of usually 10 parts by weight or more, preferably 30 parts by weight or more and usually 1000 parts by weight or less, preferably 500 parts by weight or less. When the ratio of the charge generation substance is too high, the stability of the coating solution may decline due to, e.g., the agglomeration of the charge generation substance, while when the ratio is too low, the sensitivity as the photoreceptor may decrease. It is hence preferred that the substance is used within the above-mentioned range.

Solvent or Dispersion Medium:

As the solvent or dispersion medium to be used for preparing a coating solution, examples thereof include saturated aliphatic solvents such as pentane, hexane, octane, and nonane; aromatic solvents such as toluene, xylene, and anisole; halogenated aromatic solvents such as chlorobenzene, dichlorobenzene, and chloronaphthalene; amide-based solvents such as dimethyl formamide and N-methyl-2-pyrrolidone; alcohol-based solvents such as methanol, ethanol, isopropanol, n-butanol, and benzil alcohol; aliphatic polyhydric alcohols such as glycerin and polyethyleneglycol; chain and cyclic ketone-based solvents such as acetone, cyclohexanone, and methyl ethyl ketone, 4-methoxy-4-methyl-2-pentanon; ester-based solvents such as methyl formate, ethyl acetate, and n-butyl acetate; halogenated hydrocarbon solvents such as methylene chloride, chloroform, and 1,2-dichloroethane; chain and cyclic ether-based solvents such as diethyl ether, dimethoxyethane, tetrahydrofuran, 1,4-dioxane, methyl cellosolve, and ethyl cellosolve;

aprotic polar solvents such as acetonitrile, dimethylsulfoxide, sulfolane, and hexamethylphosphoric triamide; nitrogen-containing compounds such as n-butylamine, isopropanolamine, diethylamine, triethanolamine, ethylenediamine, triethylenediamine, and triethylamine; mineral oils such as ligroin; water; and the like. Among them, preferred are those that do not dissolve the above undercoat layer. Any one of these solvents and dispersion media may be used singly or two or more thereof may be used in combination at any combination and in any ratio.

Procedure for Dispersion:

As the method for dispersing the charge generation substance in the solvent or dispersion medium, any known dispersion method such as a ball mil dispersion method, an attritor dispersion method, or a sand mill dispersion method can be used. On this occasion, it is effective to pulverize the charge generation substance to a particle size of usually 0.5 μm or less, preferably 0.3 μm or less, more preferably 0.15 μm or less.

Film Thickness:

The film thickness of the charge generation layer is in the range of usually 0.1 μm or more, preferably 0.15 μm or more and usually 10 μm or less, preferably 0.6 μm or less.

<Charge Transport Layer of Multilayer Photosensitive Layer>

The charge transfer layer of the multilayer photosensitive layer is formed according to a method wherein a binder resin is dissolved or dispersed in a solvent or a dispersion medium and also a charge transport substance is dispersed thereinto to prepare a coating solution and the coating solution is applied onto the charge transport layer in the case of the normally-layered photoreceptor or onto the electroconductive substrate (when the undercoat layer is formed, onto the undercoat layer) in the case of the inversely-layered photoreceptor so that fine particles of the charge transport substance is bound by the binder resin.

Binder Resin:

Examples of the binder resin include polymers and copolymers of vinyl compounds such as butadiene resins, styrene resins, vinyl acetate resins, vinyl chloride resins, acrylic acid ester resins, methacrylic acid ester resins, vinyl alcohol resins, and ethyl vinyl ethers, as well as polyvinyl butyral resins, polyvinyl formal resins, partly-modified polyvinyl acetals, polycarbonate resins, polyester resins, polyarylate resins, polyamide resins, polyurethane resins, cellulose ester resins, phenoxy resins, silicone resins, silicone-alkyd resins, poly-N-vinylcarbazole resin, and the like. These binder resins may be modified with a silicon reagent. Among the above binder resins, polycarbonate resins and polyarylate resins are particularly preferred.

Among the polycarbonate resins and polyarylate resins, polycarbonate resins and polyarylate resins containing a bisphenol residue and/or a biphenol residue represented by the following structural formulae are preferred in view of sensitivity and residual potential. Particularly, polycarbonate resins are more preferred in view of mobility.

[Chem 2]

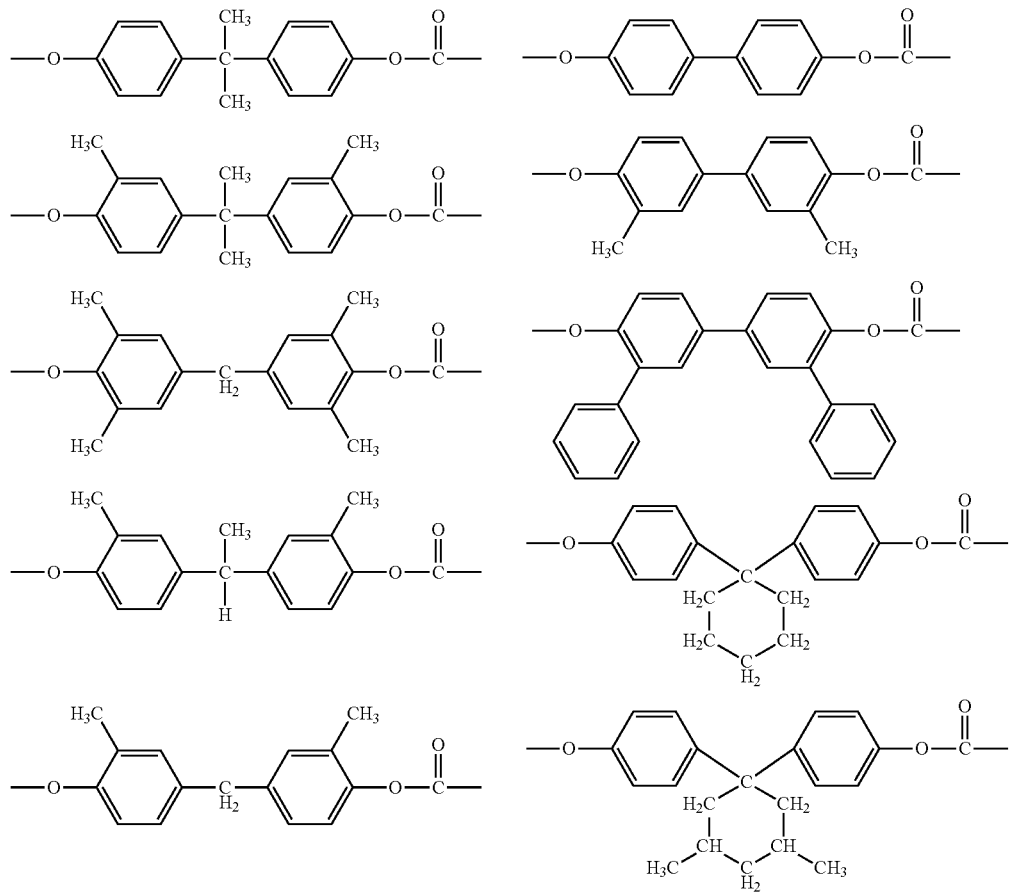

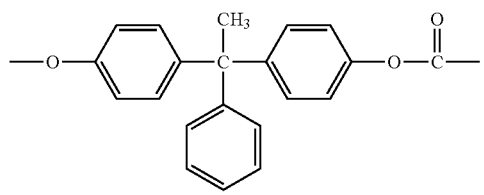
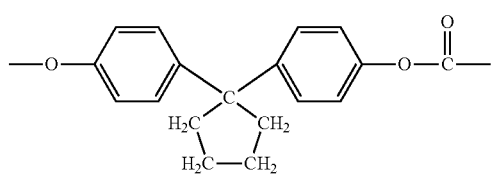
[Chem 3]
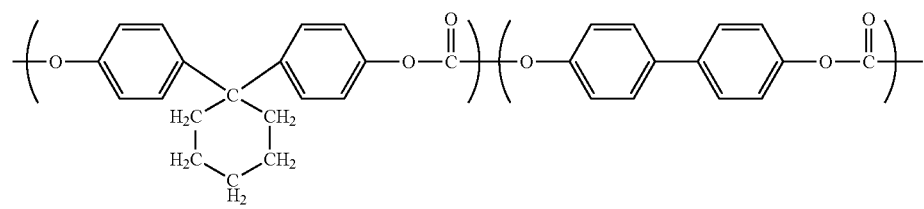
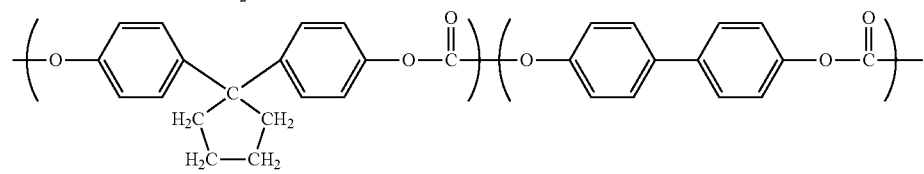
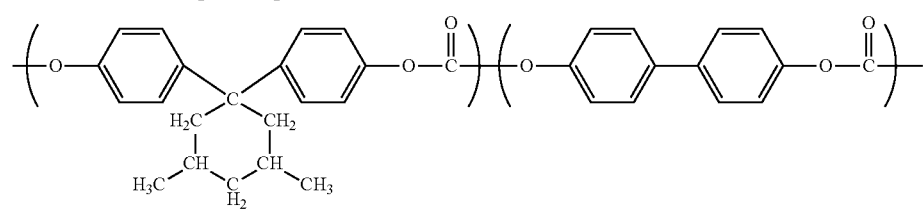
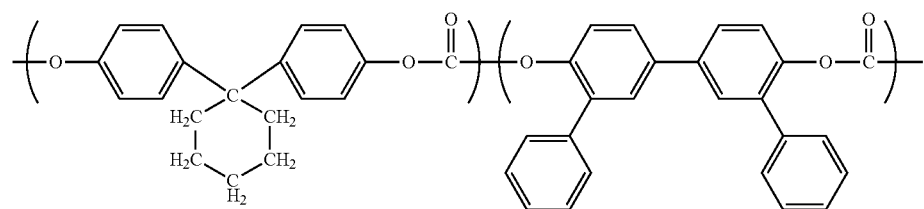
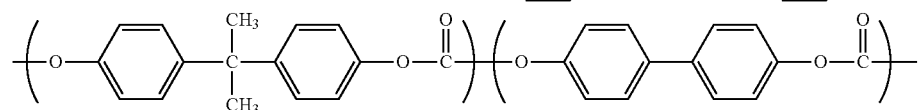
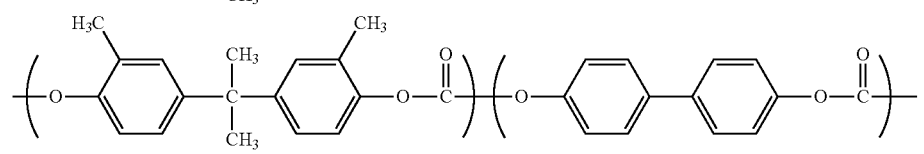
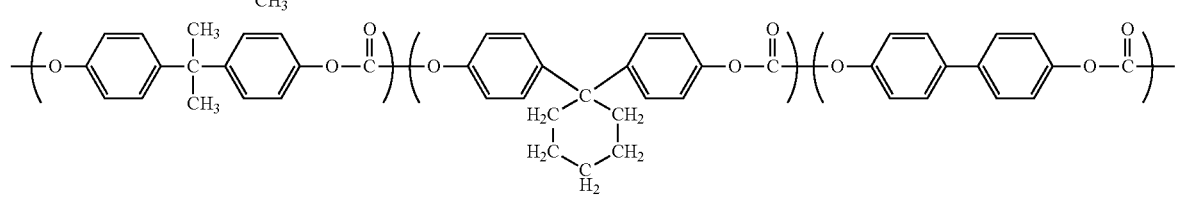
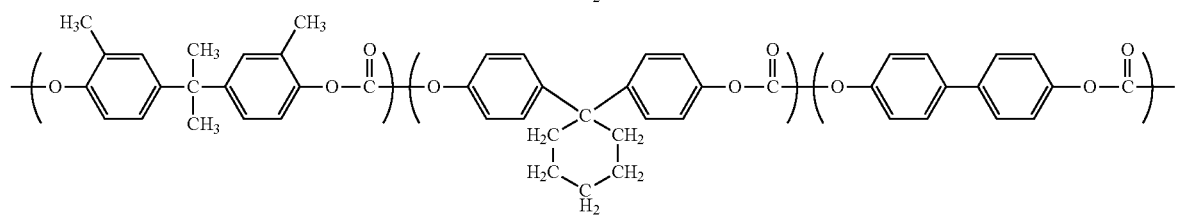

In this connection, these binder resin can be used after crosslinked by heat, light, or the like using an appropriate curing agent.

Moreover, any one of the binder resins may be used singly or two or more thereof may be used as a mixture at any combination and in any ratio.

Charge Transport Substance:

The charge transport substance is not particularly limited so long as it is a known substance. There may be, for example, mentioned electron-withdrawing substances including aromatic nitro compounds such as 2,4,7-trinitrofluorenone, cyano Compounds such as tetracyanoquinodimethane, and quinone compounds such as diphenoquinone; electron-donating substances including heterocyclic compounds such as carbazole derivatives, indole derivatives, imidazole derivatives, oxazole derivatives, pyrazole derivatives, thiadiazole derivatives, and benzofuran derivatives, as well as aniline derivatives, hydrazone derivatives, aromatic amine derivatives, stilbene derivatives, butadiene derivatives, and enamine derivatives, in addition to the compounds in which two or more of these compounds are linked with each other and polymers whose main chain or side chain has one or more of these compounds; and the like. Of these, preferred are carbazole derivatives, aromatic amine derivatives, stilbene derivatives, butadiene derivatives, and enamine derivatives, as well as the compounds in which two or more of these compounds are linked with each other.

Mixing Ratio:

The ratio of the binder resin to the charge transport substance is, relative to 100 parts by weight of the binder resin, usually 20 parts by weight or more, preferably 30 parts by weight or more in the viewpoint of reducing residual potential, more preferably 40 parts by weight or less in view of stability during repetitive use and charge mobility. On the other hand, the ratio is usually 150 parts by weight or less in the viewpoint of the thermal stability of the photosensitive layer, preferably 120 parts by weight or less in view of compatibility between the charge transport substance and the binder resin, more preferably 100 parts by weight or less in view of print resistance, especially preferably 80 parts by weight or less in view of abrasion resistance.

Solvent or Dispersion Medium and Procedure for Dispersion:

The kind of the solvent or dispersion medium and a procedure for dispersing the charge transport substance in the solvent or dispersion medium are as explained in the article of <Charge generation Layer of Multilayer Photosensitive Layer>.

Film Thickness:

The film thickness of the charge transport layer is not particularly limited, but is in the range of usually 5 μm or more, preferably 10 μm or more, and usually 50 μm or less, preferably 45 μm or less, still preferably 30 μm or less in view of long-life and image stability as well as high resolution.

(Single-Layer Photosensitive Layer)

The single-layer photosensitive layer is formed by applying a coating solution, which has been obtained by dissolving or dispersing the charge generation substance, the charge transport substance, and a binder resin in a solvent, onto the electroconductive substrate (when an undercoat layer is formed, onto the undercoat layer) and subjected to drying to bind the fine particles of the charge generation substance and the charge transport substance with the binder resin. As the charge generation substance, those explained in the above article of <Charge Generation Layer of Multilayer Photosensitive Layer> can be used and, as the charge transport substance and the binder resin, those explained in the above article of <Charge Transport Layer of Multilayer Photosensitive Layer> can be used. The ratio of the charge generation substance and the charge transport substance to the binder resin is also as explained in the above article of <Charge Generation Layer of Multilayer Photosensitive Layer> and <Charge Transport Layer of Multilayer Photosensitive Layer>, respectively.

When the amount of the phthalocyanine crystal dispersed in the single-layer photosensitive layer is too small, a sufficient sensitivity is not obtained, while when the amount is too large, there arise disadvantages such as deterioration in charging property and decline in sensitivity. Therefore, for example, the ratio of the charge generation substance to 100 parts by weight of the binder resin is in the range of preferably 0.1% by weight or more, more preferably 1% by weight or more and preferably 50% by weight or less, more preferably 20% by weight or less.

The kind of the solvent or dispersion medium and a procedure for dispersing the charge transport substance in the solvent or dispersion medium are as explained in the article of <Charge generation Layer of Multilayer Photosensitive Layer>.

The film thickness of the single-layer photosensitive layer is in the range of usually 5 μm or more, preferably 10 μm or more and usually 100 μm or less, preferably 50 μm or less.

(Other Components)

In this connection, the photosensitive layer may contain additives such as well-known antioxidants, plasticizers, ultraviolet absorbers, electron-withdrawing compounds, leveling agents, and visible-light shielding agents for the purpose of improving film-forming ability, flexibility, coatability, stain resistance, gas resistance, light resistance, and the like.

[II-4. Other Layers]

As the constitution of the electrophotographic photoreceptor, in addition to individual layers explained above, the other layers may be formed unless they deviate from the gist of the invention.

For example, it is possible to form a protective layer on the photosensitive layer for the purposes of protecting the photosensitive layer against attrition and preventing or lessening degradation of the photosensitive layer due to causes such as electric discharge products generated from the charging device. The protective layer is formed by incorporating the electroconductive material into an appropriate binder resin or it is also possible to adopt copolymers using compounds having charge transport ability, such as triphenylamine skeletons described in JP-A-9-190004. As the electroconductive material, it is possible to use aromatic amino compounds such as TPD (N,N'-diphenyl-N,N'-bis-(m-tolyl)benzidine); metal oxides such as antimony oxide, indium oxide, tin oxide, titanium oxide, tin oxide-antimony oxide, aluminum oxide, and zinc oxide; and the like, although the usable compounds are not limited thereto. As the binder resin used for the protective layer, there can be used known resins such as polyamide resins, polyurethane resins, polyester resins, epoxy resins, polyketone resins, polycarbonate resins, polyvinyl ketone resins, polystyrene resins, polyacrylamide resins, siloxane resins, as well as copolymers containing skeletons having charge transport ability, such as triphenylamine skeletons described in JP-A-9-190004, and the aforementioned resins. The protective layer is constituted preferably so as to have an electric resistance of $10^9$ to $10^{14}$ Ω·cm. When the electric resistance is too high, residual potential may rise and bring about a lot of fogging on images, while when the electric resistance is too low, blurring of images and reduction in resolution of images tends to occur. Moreover, the protective layer must be formed in such a manner as not to substantially prevent incident light from passing therethrough during image exposure.

For the purpose of reducing friction resistance and preventing abrasion of the surface of the electrophotographic photoreceptor as well as improving transfer efficiency of toner from the electrophotographic photoreceptor to a transfer belt or a paper form, the surface layer (photosensitive layer, protective layer, or the like) of the electrophotographic photoreceptor may contain a fluorine resin, a silicone resin, polyethylene resin, or the like. Moreover, the particles of these resins and the particles of inorganic compounds may be contained.

[II-5. Method of Forming Individual Layers]

These individual layers constituting the photoreceptor is formed by sequentially applying the coating solutions obtained by the above methods, through repetition of the application and drying processes, for each of the layers, on the substrate using known coating methods.

In the case of forming the photosensitive layer of the single-layer photoreceptor and the charge transport layer of the multilayer photoreceptor, the solid content of the coating solution is preferably in the range of usually 5% by weight or more, particularly 10% by weight or more and usually 40% by weight or less, particularly 35% by weight or less. Moreover, the viscosity of the coating solution is preferably in the range of usually 10 mPa·s or higher, preferably 50 mPa·s or higher and usually 500 mPa·s or lower, preferably 400 mPa·s or lower.

In the case of forming the charge generation layer of the multilayer photoreceptor, the solid content of the coating solution is preferably in the range of usually 0.1% by weight or more, particularly 1% by weight or more and usually 15% by weight or less, particularly 10% by weight or less. Moreover, the viscosity of the coating solution is preferably in the range of usually 0.01 mPa·s or more, particularly 0.1 mPa·s or more and usually 20 mPa·s or less, particularly 10 mPa·s or less.

The application methods of the coating solution may include a dip coating method, a spray coating method, a spinner coating method, a bead coating method, a wire-bar coating method, a blade coating method, a roller coating method, an air knife coating method, a curtain coating method, and the like. Also, it is possible to use any other known coating methods.

The drying process of the coating solution is not particularly limited but the coating solution is preferably first dried to touch at room temperature and then heat-dried under a still or ventilated condition. Heating temperature may be in a temperature range of particularly 30 to 200° C. for 1 minute to two hours and may be either kept constant or varied during the drying process.

[III. Image-Forming Device]

Next, explanation will be given of an embodiment of the image-forming device using the electrophotographic photoreceptor of the invention (image-forming device of the invention) with reference to FIG. 1, which shows the constitution of the substantial part of the device. However, the embodiments of the examples are not limited to the following explanation, and can be implemented with arbitrary modification unless they deviate from the gist of the invention.

As shown in FIG. 1, the image-forming device is constituted by an electrophotographic photoreceptor 1, a charging device 2, an exposing device 3, and a developing device 4, with optionally provided as necessary, a transfer device 5, a cleaning device 6, and a fixing device 7.

The electrophotographic photoreceptor 1 is not particularly limited as long as the aforementioned electrophotographic photoreceptor of the invention is used and FIG. 1 indicates, as an example, a drum-shaped photoreceptor in which the aforementioned photosensitive layer is formed on the cylindrical surface of the electroconductive substrate. Along the circumferential surface of the electrophotographic photoreceptor 1 are disposed a charging device 2, an exposing device 3, a developing device 4, a transfer device 5, and a cleaning device 6, respectively.

The charging device 2 is intended to electrically charge the electrophotographic photoreceptor 1 and capable of electrically charging the surface of the electrophotographic photoreceptor 1 uniformly to a predetermined electric potential. As the charging device, there may be frequently used corona charging devices such as corotrons and scorotrons; direct charging devices wherein a direct charging member to which a voltage is applied is then brought into contact with the photoreceptor's surface so as to carry out electrical charging (contact-type charging device); contact-type charging devices such as charging brushes; and the like. Examples of the direct electrical charging means include contact charging devices such as charging rollers and charging brushes. As an example of the electrical charging device 2, FIG. 1 indicates a roller-type charging device (charging roller). As the direct electrical charging means, it is possible to carry out either charging that involves aerial electric discharge or injection charging that does not involve aerial electric discharge. As the voltage applied during charging, there may be used either a direct current alone or a superimposed current in which an alternating current is superimposed on a direct current.

There is no particular limitation on the type of the exposing device 3 so long as it can carry out exposure of the electrophotographic photoreceptor 1 to thereby form an electrostatic latent image on the photosensitive surface of the electrophotographic photoreceptor 1. Specific examples include halogen lamps, fluorescent lamps, lasers such as semiconductor laser and He—Ne laser, LED, and the like. It is also possible to carry out exposure of the photoreceptor using an exposing method from inside the photoreceptor. The light used for the exposure may be selected arbitrarily and, for example, the exposure may be carried out with monochromatic light having a wavelength of about 780 nm, monochromatic light having slightly shorter wavelengths of about 600 nm to 700 nm, and monochromatic light having short wavelengths of about 380 nm to 500 nm.

The developing device 4 is not particularly limited in its type, and any known device using either dry development method, such as cascade development, mono-component insulating toner development, mono-component conductive toner development, and two-component magnetic brush development or wet process development method can be employed. FIG. 1 shows a constitution in which the developing device 4 comprises a developing bath 41, agitators 42, a feeding roller 43, a developing roller 44, and a regulating member 45, and toner T is stored in the developing bath 41. In addition, the developing device 4 may be provided, as necessary, with a supplying device (not shown in the figure) for supplying the toner T. The supplying device is constituted in such a manner as to be capable of supplying the toner T from a receptacle such as a bottle or a cartridge.

The feeding roller 43 is composed of an electroconductive sponge or the like. The developing roller 44 may be formed as a metal roll made of iron, stainless steel, aluminum, nickel, etc.; a resin roll in which such a metal roll is coated with a resin such as a silicone resin, a urethane resin, or a fluorine resin; or the like. If necessary, the surface of the developing roller 44 may undergo smoothing processing or roughening processing.

The developing roller 44 is disposed between the electrophotographic photoreceptor 1 and the feeding roller 43 and is in direct contact with each of the electrophotographic photoreceptor 1 and the feeding roller 43. The feeding roller 43 and the developing roller 44 are each rotated by a rotation drive mechanism (not shown in the figure). The feeding roller 43 carries the stored toner T and provides it to the developing roller 44. The developing roller 44 carries the toner T provided by the feeding roller 43 and brings it into contact with the surface of the electrophotographic photoreceptor 1.

The regulating member 45 may be formed as a resin blade made of a silicone resin, a urethane resin, or the like; a metal blade made of stainless steel, aluminum, copper, brass, phosphor bronze, or the like; a blade in which such a metal blade is resin-coated; or the like. The regulating member 45 is in direct contact with the developing roller 44 and pressed onto the developing roller 44 under a predetermined force (normal blade linear load is from 5 to 500 g/cm) by means of a spring or the like. If necessary, the regulating member 45 may also be equipped with the function of charging the toner T by means of frictional charging with the toner T.

The agitators 42 are each rotated by a rotation drive mechanism so as to agitate the toner T and transfer the toner T toward the feeding roller 43. There may also be provided plural agitators 42 whose blades are different with each other in their shapes, sizes, etc.

As the toner, it is possible to use not only pulverized toner but also chemical toner obtained by suspension granulation, suspension polymerization, emulsion polymerization agglomeration process, or the like. Particularly, in the case of the chemical toner, a toner having a small particle size of about 4 to 8 μm is used, and it may have any shape from a substantially spherical shape to a shape deviating from spherical such as a potato shape or a rugby ball. The polymerization toner is superior in charging uniformity and transferring ability and hence suitable for enhancing image quality.

The kind of the toner T is not limited and it is possible to use not only powdery toner but also chemical toner obtained by suspension granulation, suspension polymerization, emulsion polymerization agglomeration process, or the like. In the case of the chemical toner, a toner having a small particle size of about 4 to 8 μm is used, and it may have any shape from a substantially spherical shape to a shape deviating from spherical such as a potato shape or a rugby ball. In particular, the polymerization toner is superior in charging uniformity and transferring ability and hence suitable for enhancing image quality.

With regard to the shape of the toner to be used in the image-forming device of the invention, the average circularity measured by a flow type particle image analyzer is preferably 0.940 or more, more preferably 0.950 or more, further preferably 0.960 or more. When the shape of the toner is nearer to spherical form, localization of the charging within the toner particle hardly occurs, so that a developing property tends to be homogeneous. Moreover, an upper limit of the above average circularity is not limited so long as it is 1.000 or less. However, when the shape of the toner approaches a spherical form, insufficient cleaning is apt to occur and it is difficult to produce a completely spherical toner, so that the value is preferably 0.995 or less, more preferably 0.990 or less.

In this connection, the above average circularity is used as a convenient way to express the shape of the toner particle quantitatively. In the invention, measurement is carried out using a flow type particle image analyzer FPIA-2000 manufactured by Sysmex Corp., and the circularity [a] of the particle measured is determined from the following equation (A):

$$\text{Circularity } a = L_0/L \qquad (A)$$

wherein $L_0$ represents circumference length of the circle having a projection area the same as that of a particle image and L represents circumference length of the particle image subjected to image treatment.

The above circularity is a measure of degree of unevenness of the toner particle. The circularity is 1.00 in the case where the toner is completely spherical and the value decreases as the surface shape is complicated.

A specific method for measuring the average circularity is as follows. Namely, a surfactant (preferably an alkylbenzenesulfonate salt) as a dispersant is added into 20 mL of water from which impurities in a vessel are removed in advance, followed by addition of about 0.05 g of a sample to be measured (toner). The suspension containing the sample dispersed therein is irradiated with ultrasonic wave for 30 seconds to achieve a dispersion concentration of 3.0 to 8.0×1000/μL and circularity distribution of the particles having a circle-corresponding diameter having 0.60 μm to less than 160 μm is measured.

Various kinds of the toners may be usually obtained depending on the production process but any one can be used as the toner to be used in the image-forming device of the invention.

The kinds of toner and the kinds of the production process of the toner are explained below.

The toner of the invention may be produced by any conventionally known processes and, for example, a polymerization process, a melt suspension process, and the like are mentioned but preferred is a so-called polymerization process toner wherein the toner is formed in an aqueous medium. As the polymerization process toner, a suspension polymerization process toner, an emulsion polymerization agglomeration process toner, and the like may be mentioned, for example. In particular, the emulsion polymerization agglomeration process is a process wherein a toner is produced by agglomerating polymer resin fine particles, colorant, and the like in a liquid medium and the particle size and circularity of the toner can be regulated by controlling agglomeration conditions, so that the process is preferred.

Moreover, in order to improve releasing ability, low-temperature fixing ability, high-temperature offset property, filming resistance, etc. of the toner, a method of incorporating a low-softening-point substance (so-called wax) into the toner has been proposed. In the melt kneading pulverizing method, it is difficult to increase the amount of wax contained in the toner and about 5% by weight relative to the polymer (binder resin) is regarded as a limit. Contrarily, in the polymerization toner, as described in JP-A-5-88409 and JP-A-11-143125, it is possible to contain the low-softening-point substance in a large amount (5 to 30% by weight). In this connection, the polymer herein is one of the materials constituting the toner and, for example, is obtained by polymerizing a polymerizable monomer in the case of the toner to be produced by the emulsion polymerization agglomeration process to be mentioned below.

[Toner to be produced by Emulsion Polymerization Agglomeration Process]

The following will describe further in detail the toner to be produced by the emulsion polymerization agglomeration process.

In the case of producing the toner by the emulsion polymerization agglomeration process, as production steps thereof, a polymerization step, a mixing step, an agglomeration step, a fusion step, and a washing/drying step are usually carried out. Namely, in general, polymer primary particles are obtained by emulsion polymerization (polymerization step), materials to be dispersed, such as a colorant (pigment), wax, and a charge-regulating agent are mixed according to need (mixing step), an agglomerating agent id added to the dispersion liquid to agglomerate the primary particles into a particle agglomerate (agglomeration step), an operation for attaching fine particles or the like is carried out according to need and subsequently fusion is carried out to obtain particles (fusion step), and the resulting particles are washed and dried (washing/drying step), thereby mother particles being obtained.

1. Polymerization Step

The fine particles of the polymer (polymer primary particles) are not particularly limited. Therefore, any of fine particles obtained by polymerizing polymerizable monomer(s) by a suspension polymerization process, an emulsion polymerization process, or the like and fine particles obtained by pulverizing a lump of a polymer such as a resin may be used as the polymer primary particles. However, those obtained by a polymerization process, particularly an emulsion polymerization process, specifically an emulsion polymerization process using wax as a seed are preferred. When wax is used as a seed in the emulsion polymerization process, there is obtained fine particles where wax is wrapped with the polymer as the polymer primary particles. According to the process, the wax can be contained in the toner without exposing the wax on the toner surface. Therefore, the device members is not stained by the wax, the charging property of the toner is not impaired, and low-temperature fixing property and high-temperature offset property, filming resistance, release property, and the like can be improved.

The following will describe a method wherein emulsion polymerization is carried out using wax as a seed to thereby obtain primary particles of a polymer.

The emulsion polymerization may be carried out according to the hitherto known method. Usually, wax is dispersed in a liquid medium in the presence of an emulsifier to form wax fine particles, to which a polymerization initiator, a polymerizable monomer which gives a polymer by polymerization, i.e., a compound having a polymerizable carbon-carbon double bond, and, if necessary, a chain transfer agent, a pH regulator, a polymerization degree controlling agent, a defoaming agent, a protective colloid, an internal additive, and the like are added, followed by stirring to effect polymerization. Thereby, there is obtained an emulsion in which polymer fine particles having a structure where wax is wrapped with the polymer (i.e., polymer primary particles) are dispersed in the liquid medium. As the structure where wax is wrapped with the polymer, core-shell type, phase separation type, occlusion type, and the like are mentioned but the core-shell type is preferred.

(i. Wax)

As the wax, any one known to be usable in this application can be used. Examples include olefin-based waxes such as low-molecular-weight polyethylene, low-molecular-weight polypropylene, and copolymer polyolefins; paraffin waxes; silicone waxes having an alkyl group; fluorinated resin-based waxes such as low-molecular-weight polytetrafluoroethylene; higher aliphatic acids such as stearic acid; long chain aliphatic alcohols such as eicosanol; ester-based waxes having a long-chain aliphatic group, such as behenyl behenate, montanate esters, and stearyl stearate; ketones having a long-chain alkyl group such a as distearyl ketone; vegetable waxes such as hydrogenated caster oil and carnauba wax; esters or partial esters obtained from a polyhydric alcohol such as glycerin or pentaerythritol and a long-chain fatty acid; higher aliphatic acid amides such as oleamide and stearamide; low-molecular weight polyesters; and the like. Among these, preferred are those having at least one exothermic peak by differential scanning calorimetry (DSC) at 50 to 100° C.

Among the waxes, for example, the ester-based waxes, paraffin waxes, olefin-based waxes such as low-molecular-weight polypropylene and copolymer polyethylene, silicone waxes, and the like are preferred since a releasing effect is obtained in a small amount. Particularly, paraffin waxes are preferred.

Waxes may be used singly or two or more thereof may be used in combination at any combination and in any ratio.

In the case of using the wax, the amount is arbitrary. However, it is desirable to use the wax in an amount of usually 3 parts by weight or more, preferably 5 parts by weight or more and usually 40 parts by weight or less, preferably 30 parts by weight or less relative to 100 parts by weight of the polymer. When the amount of the wax is too small, there is a possibility that a fixing temperature range is insufficient, while when the amount is too large, there is a risk that device members are stained to deteriorate image quality.

(ii. Emulsifier)

There is no limitation on the emulsifier and anyone can be used within the range where the advantages of the invention are not remarkably impaired. For example, any of nonionic, anionic, cationic, and amphoteric surfactants can be used.

Examples of the nonionic surfactant include polyoxyalkylene alkyl ethers such as polyoxyethylene lauryl ether; polyoxyalkylene alkylphenyl ether such as polyoxyethylene octylphenyl ether; sorbitan fatty acid esters such as sorbitan monolaurate; and the like.

Moreover, examples of the anionic surfactant include fatty acid salts such as sodium stearate and sodium oleate; alkylarylsulfonates salts such as sodium dodecylbenzenesulfonate; alkyl sulfate esters such as sodium lauryl sulfate; and the like.

Furthermore, examples of the cationic surfactant include alkylamine salts such as laurylamine acetate; quaternary ammonium salts such as lauryltrimethylammonium chloride; and the like.

Additionally, examples of the amphoteric surfactant include alkyl betaines such as lauryl betaine, and the like.

Of these, nonionic surfactants and anionic surfactants are preferred.

The emulsifier may be used singly or two or more thereof may be used in combination at any combination and in any ratio.

Furthermore, the mixing amount of the emulsifier is arbitrary so long as the advantages of the invention are not remarkably impaired but the emulsifier is used in a ratio of usually 1 to 10 parts by weight relative to 100 parts by weight of the polymerizable monomer.

(iii. Liquid Medium)

As the liquid medium, an aqueous medium is usually used and particularly preferably, water is used. However, the quality of the liquid medium relates to coarse particle formation by re-agglomeration of the particles in the liquid medium and when conductivity of the liquid medium is high, dispersion stability with time tends to be deteriorated. Therefore, in the case where an aqueous medium such as water is used as the liquid medium, it is preferred to use ion-exchange water or distilled water subjected to demineralization treatment so that the conductivity becomes usually 10 μS/cm or less, preferably 5 μS/cm or less. In this connection, the measurement of the conductivity is conducted at 25° C. using a conductivity meter (a personal SC meter Model SC72 and a detector SC72SN-11 manufactured by Yokogawa Electric Corporation).

Moreover, there is no limitation on the amount of the liquid medium to be used but it is usually used in an amount of about 1 to 20 weight equivalents by weight of the polymerizable monomer(s).

The liquid medium may be used singly or two or more thereof may be used in combination at any combination and in any ratio.

By dispersing the above wax into the liquid medium in the presence of an emulsifier, wax fine particles are obtained. Although the order of mixing the emulsifier and wax with the liquid medium is arbitrary, usually, the emulsifier is first mixed with the liquid medium and then wax is mixed therewith. Moreover, the emulsifier may be continuously mixed with the liquid medium.

(iv. Polymerization Initiator)

After the above wax fine particles are prepared, a polymerization initiator is mixed with the liquid medium. As the polymerization initiator, anyone may be used so far as the advantages of the invention are not remarkably impaired. Examples thereof include persulfate salts such as sodium persulfate and ammonium persulfate; organic peroxides such as t-butyl hydroperoxide, cumene hydroperoxide, and p-menthane hydroperoxide; inorganic peroxides such as hydrogen peroxide; and the like. Of these, inorganic peroxides are preferred. The polymerization initiator may be used singly or two or more thereof may be used in combination at any combination and in any ratio.

Furthermore, as the other examples of the polymerization initiator, a persulfate salt, an organic or inorganic peroxide and a reductive organic compound such as ascorbic acid, tartaric acid, or citric acid, a reductive inorganic compound such as sodium thiosulfate, sodium bisulfate, or sodium metabisulfate are used in combination to form a redox initiator. In this case, the reductive inorganic compound may be used singly or two or more thereof may be used in combination at any combination and in any ratio.

Moreover, there is no limitation on the amount of the polymerization initiator to be used but it is usually used in an amount of 0.05 to 2 parts by weight relative to 100 parts by weight of the polymerizable monomer(s).

(v. Polymerizable Monomer)

After the above wax fine particles are prepared, the liquid medium is mixed with polymerizable monomer(s) in addition to the polymerization initiator. There is no limitation on the polymerizable monomer(s) but, for example, monofunctional monomers such as styrenes, (meth)acrylate esters, acrylamides, monomers having a Brφnsted acid group (hereinafter sometimes simply abbreviated as "acidic monomer"), and monomers having a Brφnsted basic group (hereinafter sometimes simply abbreviated as "basic monomer") are mainly used. Moreover, a monofunctional monomer can be used in combination with a polyfunctional monomer.

Examples of the styrenes include styrene, methylstyrene, chlorostyrene, dichlorostyrene, p-tert-butylstyrene, p-n-butylstyrene, p-n-nonylstyrene, and the like.

Moreover, examples of the (meth)acrylate esters include methyl acrylate, ethyl acrylate, propyl acrylate, n-butyl acrylate, isobutyl acrylate, hydroxyethyl acrylate, 2-ethylhexyl acrylate, methyl methacrylate, ethyl methacrylate, propyl methacrylate, n-butyl methacrylate, isobutyl methacrylate, hydroxyethyl methacrylate, 2-ethylhexyl methacrylate, and the like.

Examples of the acrylamides include acrylamide, N-propylacrylamide, N,N-dimethylacrylamide, N,N-dipropylacrylamide, N,N-dibutylacrylamide, and the like.

Furthermore, examples of the acidic monomer include monomers having a carboxyl group, such as acrylic acid, methacrylic acid, maleic acid, fumalic acid, and cinnamic acid; monomers having a sulfonic acid group, such as sulfonated styrene; monomers having a sulfonamido group, such as vinylbenzenesulfonamide; and the like.

Moreover, examples of the basic monomer include aromatic vinyl compounds having an amino group, such as aminostyrene; monomers containing an nitrogen-containing heterocycle, such as vinylpyridine and vinylpyrrolidone; (meth)acrylate esters having an amino group, such as dimethylaminoethyl acrylate and diethylaminoethyl methacrylate; and the like.

The acidic monomers and basic monomers may be present as salts with counter ions.

Furthermore, examples of the polyfunctional monomers include divinylbenzene, hexanediol diacrylate, ethylene glycol dimethacrylate, diethylene glycol dimethacrylate, diethylene glycol diacrylate, triethylene glycol diacrylate, neopentyl glycol dimethacrylate, neopentyl glycol diacrylate, diallyl phthalate, and the like. Additionally, it is also possible to use monomers having a reactive group, such as glycidyl methacrylate, N-methylol acrylamide, and acrolein. Of these, radically polymerizable difunctional monomers, particularly divinlbenzene and hexanediol diacrylate are preferred.

Of these, the polymerizable monomer is preferably composed of at least a styrene, a (meth)acrylate ester, and/or an acidic monomer having a carboxyl group. Particularly, styrene is preferred as the styrene, butyl acrylate is preferred as the (meth)acrylate ester, and acrylic acid is preferred as the acidic monomer having a carboxyl group.

The polymerizable monomer may be used singly or two or more thereof may be used in combination at any combination and in any ratio.

At the time when emulsion polymerization is carried out using wax as a seed, the acidic monomer or the basic monomer is preferably used in combination with a monomer other than these monomers. This is because the dispersion stability of the polymer primary particles can be improved by combined use of the acidic monomer or the basic monomer.

On this occasion, the mixing amount of the acidic monomer or the basic monomer is arbitrary but it is desirable that the amount of the acidic monomer or the basic monomer to be used relative to 100 parts by weight of the total polymerizable monomer(s) is usually 0.05 part by weight or more, preferably 0.5 part by weight or more, more preferably 1 part by weight or more and usually 10 parts by weight or less, preferably 5 parts by weight or less. When the mixing amount of the acidic monomer or the basic monomer is less than the above range, there is a possibility that the dispersion stability of the polymer primary particles may be deteriorated, while when the amount exceeds the upper limit, there is a possibility that the charging property of the toner may be adversely influenced.

Moreover, in the case of the polyfunctional monomer is used in combination, the mixing amount is arbitrary but it is desirable that the amount of the polyfunctional monomer to be used relative to 100 parts by weight of the total polymerizable monomer(s) is usually 0.005 part by weight or more, preferably 0.1 part by weight or more, more preferably 0.3 part by weight or more and usually 5 parts by weight or less, preferably 3 parts by weight or less, more preferably 1 part by weight or less. By using the polyfunctional monomer, the fixing property of the toner can be improved. When the mixing amount of the polyfunctional monomer is less than the above range, there is a possibility that the high-temperature offset property may be poor, while when the amount exceeds the upper limit, there is a possibility that the low-temperature fixing property may be poor.

The method for mixing the polymerizable monomer with the liquid medium is not particularly limited. For example, any of addition at once, continuous addition, and intermittent addition may be used but, in view of reaction control, continuous mixing is preferred. Moreover, in the case where two or more polymerizable monomers are used in combination, individual polymerizable monomers may be separately mixed or may be mixed with the liquid medium after they have been blended beforehand. Furthermore, they may be mixed with changing the composition of the monomer mixture.

(vi. Chain Transfer Agent, etc.)

After the above wax fine particles are prepared, if necessary, additives such as a chain transfer agent, a pH regulator, a polymerization degree controlling agent, a defoaming agent, a protective colloid, and an internal additive are mixed with the liquid medium in addition to the polymerization initiator and the polymerizable monomer(s). These additives are arbitrary used so long as the advantages of the invention are not remarkably impaired. These additives may be used singly or two or more thereof may be used in combination at any combination and in any ratio.

As the chain transfer agent, any known one can be used. Specific examples include t-dodecylmercaptan, 2-mercaptoethanol, diisopropylxanthogen, carbon tetrachloride, trichlorobromoethane, and the like. Moreover, the chain transfer agent is used in a ratio of usually 5 parts by weight or less relative to 100 parts by weight of the polymerizable monomer(s).

Furthermore, as the protective colloid, anyone known to be usable in this application can be used. Specific examples include polyvinyl alcohols such as partially or completely saponified polyvinyl alcohols, cellulose derivatives such as hydroxyethyl cellulose, and the like.

Moreover, as the internal additive, there may be, for example, mentioned those for modifying pressure-sensitive adhesiveness, agglomeration ability, fluidity, charging property, surface resistance, and the like of the toner, such as silicone oil, silicone varnish, and fluorinated oil.

(Vii. Polymer Primary Particles)

The polymer primary particles are obtained by mixing the liquid medium containing wax fine particles with the polymerization initiator and the polymerizable monomer(s) and, if necessary, additives, followed by stirring to effect polymerization. The polymer primary particles can be obtained in an emulsion state in the liquid medium.

The order of mixing the polymerization initiator, the polymerizable monomer(s), additives, and the like with the liquid medium is not limited. Also, the methods of mixing and stirring are not limited and arbitrary.

Furthermore, the reaction temperature of the polymerization (emulsion polymerization reaction) is also arbitrary so long as the reaction proceeds. However, the polymerization temperature is usually 50° C. or higher, preferably 60° C. or higher, more preferably 70° C. or higher and usually 120° C. or lower, preferably 100° C. or lower, more preferably 90° C. or lower.

There is no limitation on the volume average particle size of the polymer primary particles but is usually 0.02 μm or more, preferably 0.05 μm or more, more preferably 0.1 μm or more and usually 3 μm or less, preferably 2 μm or less, more preferably 1 μm or less. When the volume average particle size is too small, the control of the agglomeration speed is sometimes difficult, while when the volume average particle size is too large, the particle size of the toner obtained by agglomeration tends to be large and it is sometimes difficult to obtain a toner having an objective particle size. The volume average particle size can be measured by means of a particle size analyzer using the dynamic light scattering method to be mentioned below.

In the invention, the volume average particle size is measured by the dynamic light scattering method. This methodology determines particle size by detecting, through irradiation of the particles with a laser light, scattering (Doppler shift) of lights having different phases depending on the speed of Brownian motion of the particles finely dispersed. In actual measurement, with regard to the above volume particle size, the measurement is conducted under the following conditions using an ultrafine particle size distribution measuring apparatus (manufactured by Nikkiso Co., Ltd., UPA-EX150, hereinafter abbreviated as UPA).

Upper limit in measurement: 6.54 μm
Lower limit in measurement: 0.0008 μm
Number of channels: 52
Time for measurement: 100 sec.
Particle transparency: absorption
Particle diffractive index: N/A (not applied)
Particle shape: non-spherical
Density: 1 g/cm$^3$
Kind of dispersion medium: WATER
Diffractive index of dispersion medium: 1.333

At the measurement, the dispersion of the particles is diluted with a liquid medium so that the concentration index of the sample falls within the range of 0.01 to 0.1 and a sample subjected to dispersion treatment in an ultrasonic washer is measured. The volume average particle size is measured as an arithmetic average value of the results of the above volume particle size distribution.

The polymer constituting the polymer primary particles desirably has at least one of the peak molecular weights in gel permeation chromatography (hereinafter optionally abbreviated as "GPC") of usually 3,000 or more, preferably 10,000 or more, more preferably 30,000 or more and usually 100,000 or less, preferably 70,000 or less, more preferably 60,000 or less. When the peak molecular weight is present within the above range, durability, storability, and fixing ability of the toner tend to be good. As the above peak molecular weight, a value in terms of polystyrene is used and, at the measurement, a solvent-insoluble ingredient is removed. It is possible to measure the peak molecular weight in the same manner as in the case of the toner to be mentioned below.

Particularly, in the case where the above polymer is a styrene-based resin, the number-average molecular weight of the polymer in gel permeation chromatography is usually 2,000 or more, preferably 2,500 or more, more preferably 3,000 or more as the lower limit and usually 50,000 or less, preferably 40,000 or less, more preferably 35,000 or less as the upper limit. Furthermore, the weight-average molecular weight of the polymer is usually 20,000 or more, preferably 30,000 or more, more preferably 50,000 or more as the lower limit and usually 1,000,000 or less, preferably 500,000 or less as the upper limit. This is because the resulting toner has good durability, storability, fixing ability in the case where there is used, as the polymer, a styrene-based resin wherein at least one of the number-average molecular weight and the weight-average molecular weight, preferably both of them fall within the above ranges. Furthermore, in the molecular weight distribution, those having two main peaks may be used. The styrene-based resin refers to a polymer wherein styrenes are contained in a ratio of usually 50% by weight or more, preferably 65% by weight or more in the whole polymer.

Moreover, the softening point of the polymer (hereinafter, sometimes, referred to as "Sp") is usually 150° C. or lower, preferably 140° C. or lower in view of low-energy fixing and usually 80° C. or higher, preferably 100° C. or higher in view of high-temperature offset resistance and durability. The softening point of the polymer can be determined as a temperature at a middle point of a strand from the start and finish of flow when 1.0 g of a sample is measured under conditions of a nozzle of 1 mm×10 mm, a load of 30 kg, a preheating time of 5 minutes at 50° C., and a temperature-elevating rate of 3° C./minute in a flow tester.

Furthermore, the glass transition temperature [Tg] of the polymer is usually 80° C. or lower, preferably 70° C. or lower. When the glass transition temperature [Tg] of the polymer is too high, there is a possibility that low-energy fixing may not be achieved. Moreover, the lower limit of the glass transition temperature [Tg] of the polymer is usually 40° C. or higher, preferably 50° C. or higher. When the glass transition temperature [Tg] of the polymer is too low, there is a risk that blocking resistance may be lowered. The glass transition temperature [Tg] of the polymer can be determined as a temperature at a crossing point of two tangent lines when the tangent lines are drawn at transition (inflection) start points of a curve measured under a temperature-elevating rate of 10° C./minute in a differential scanning calorimeter.

The softening point and the glass transition temperature [Tg] of the polymer can be adjusted to the above range by controlling the kind, monomer composition ratio, molecular weight, etc. of the polymer.

2. Mixing Step and Agglomeration Step

An emulsion of agglomerated matter (agglomerated particles) containing a polymer and a pigment is obtained by mixing pigment particles into an emulsion containing the above polymer primary particles dispersed therein, followed by agglomeration. On this occasion, with regard to the pigment, it is preferred that a pigment particle dispersion where the pigment is homogeneously dispersed in the liquid medium beforehand using a surfactant or the like is prepared and the dispersion is mixed into the emulsion of the polymer primary particles. At that time, as the liquid medium for the pigment particle dispersion, an aqueous solvent such as water is usually used and the pigment particle dispersion is prepared as an aqueous dispersion. Moreover, at that time, wax, a charge-regulating agent, a releasing agent, an internal additive, and the like may be mixed into the emulsion. Furthermore, in order to maintain the stability of the pigment particle dispersion, the aforementioned emulsifier may be added.

As the polymer primary particles, the aforementioned polymer primary particles obtained by emulsion polymerization can be used. On this occasion, the polymer primary particles may be used singly or two or more thereof may be used in combination at any combination and in any ratio. Furthermore, polymer primary particles (hereinafter optionally referred to as "combination-use polymer particles") produced from starting materials and reaction conditions different from the case of the aforementioned emulsion polymerization may be used in combination.

As the combination-use polymer particles, for example, fine particles obtained by suspension polymerization and pulverization may be mentioned. As a material for such combination-use polymer particles, a resin can be used. As the resin, in addition to the (co)polymers of the monomers for use in the aforementioned emulsion polymerization, there may be, for example, mentioned homopolymers and copolymers of vinylic monomers such as vinyl acetate, vinyl chloride, vinyl alcohol, vinyl butyral, and vinylpyrrolidone; thermoplastic resins such as saturated polyester resins, polycarbonate resins, polyamide resins, polyolefin resins, polyarylate resins, polysulfone resins, and polyphenylene ether resins; thermosetting resins such as unsaturated polyester resins, phenol resins, epoxy resins, urethane resins, and rosin-modified maleic acid resins; and the like. These combination-use polymer particles may be used singly or two or more thereof may be used in combination at any combination and in any ratio. However, the ratio of the combination-use polymer particles is usually 5% by weight or less, preferably 4% by weight or less, more preferably 3% by weight or less relative to the total of the polymers of the polymer primary particles and the combination-use polymer particles.

Moreover, there is no limitation on the pigment and anyone may be used depending on its application. However, the pigment is usually present in a particle form as colorant particles and the particles of the pigment preferably have small difference in density from the polymer primary particles in the emulsion polymerization agglomeration process. This is because small density difference may result in a homogeneous agglomeration state in the case of agglomerating the polymer primary particles and the pigment and hence the performance of the resulting toner is improved. In this connection, the density of the polymer primary particles is usually from 1.1 to 1.3 g/cm$^3$.

From the aforementioned viewpoint, the true density of the pigment particles measured by the picno meter method defined by JIS K 5101-11-1:2004 is usually 1.2 g/cm$^3$ or more, preferably 1.3 g/cm$^3$ or more and usually less than 2.0 g/cm$^3$, preferably 1.9 g/cm$^3$ or less, more preferably 1.8 g/cm$^3$ or less. In the case where the true density of the pigment is large, the precipitation ability particularly in the liquid medium tends to become worse. In addition, in consideration of the problems such as storability and sublimation property, the pigment is preferably carbon black or an organic pigment.

Examples of the pigment satisfying the above requirements include yellow pigments, magenta pigments, cyan pigments, and the like shown in the following. Moreover, as black pigment, carbon black or a pigment toned to black by mixing a yellow pigment/magenta pigment/cyan pigment shown in the following is utilized.

Among them, carbon black to be used as a black pigment is present as agglomerated matter of very fine primary particles and, when dispersed as a pigment particle dispersion, coarse particle formation of carbon black particles by re-agglomeration is apt to occur. The degree of the re-agglomeration of the carbon black particles correlates to the amount of impurities (degree of residual undecomposed organic substances) contained in the carbon black and, when the amount of the impurities is large, coarse particle formation by re-agglomeration after dispersing tends to be remarkable.

With regard to the quantitative evaluation of the amount of the impurities, the ultraviolet absorbance of the toluene extract of the carbon black measured by the following measuring method is usually 0.05 or less, preferably 0.03 or less. In general, since the carbon black from the channel process tends to contain a large amount of impurities, one produced by the furnace process is preferred as the carbon black to be used in the invention.

In this connection, the ultraviolet absorbance ($\lambda c$) of carbon black is determined by the following method. Namely, 3 g of carbon black is first thoroughly dispersed and mixed in 30 mL of toluene and subsequently the mixed solution is filtrated using No. 5C filter. Thereafter, the filtrate is placed in a quartz cell having an absorbing part 1 cm square and ultraviolet absorbance is determined according to the equation: $\lambda c = \lambda s - \lambda o$ from a value ($\lambda s$) of absorbance of the filtrate measured at wavelength of 336 nm using a commercially available ultraviolet spectrophotometer and a value ($\lambda o$) of absorbance of toluene alone in the same manner as a reference. As the commercially available spectrophotometer, there are an ultraviolet-visible spectrophotometer (UV-3100PC) manufactured by Shimadzu Corporation and the like.

Moreover, as the yellow pigments, for example, compounds including condensed azo compounds, isoindolinon compounds, and the like as representatives are used. Specifically, C. I. Pigment Yellow 12, 13, 14, 15, 17, 62, 74, 83, 93, 94, 95, 109, 110, 111, 128, 129, 147, 168, 180, 185, etc. are suitably used.

Furthermore, as the magenta pigments, for example, condensed azo compounds, diketopyrrolopyrrole compounds, anthraquinone, quinacridone compounds, basic dye lake compounds, naphthol compounds, benzimidazolone compounds, thioindigo compounds, perylene compounds, and the like are used. Specifically, C. I. Pigment Red 2, 3, 5, 6, 7, 23, 48:2, 48:3, 48:4, 57:1, 81:1, 122, 144, 146, 166, 169, 177, 184, 185, 202, 206, 207, 209, 220, 221, 238, 254, C. I. Pigment Violet 19, etc. are suitably used.

Of these, quinacridone-based pigments represented by C. I. Pigment Red 122, 202, 207, 209, C. I. Pigment Violet 19 are particularly preferred. The quinacridone-based pigments are suitable as magenta pigments because of vivid hue, high light fastness, and the like. Among the quinacridone-based pigments, the compound represented by C. I. Pigment Red 122 is particularly preferred.

Moreover, as the cyan pigments, for example, copper phthalocyanine compounds and derivatives thereof, anthraquinone compounds, basic dye lake compounds, and the like can be utilized. Specifically, C. I. Pigment Blue 1, 7, 15, 15:1, 15:2, 15:3, 15:4, 60, 62, 66, etc. are particularly suitably utilized.

The pigments may be used singly or two or more thereof may be used in combination at any combination and in any ratio.

The above pigment is dispersed into a liquid medium to form a pigment particle dispersion and is then mixed with an emulsion containing the polymer primary particles. On this occasion, the amount of the pigment particles to be used in the pigment particle dispersion is usually 3 parts by weight or more, preferably 5 parts by weight or more and usually 50 parts by weight or less, preferably 40 parts by weight or less relative to 100 parts by weight of the liquid medium. When the mixing amount of the colorant is more than the above range, the pigment concentration is thick and hence the probability of re-agglomeration of the pigment particles during dispersing increases, so that the case is not preferred. When the amount is less than the above range, dispersing is excessively promoted and it becomes difficult to obtain a suitable particle size distribution, so that the case is not preferred.

Moreover, the ratio of the amount of the pigment relative to the polymer contained in the polymer primary particles is usually 1% by weight or more, preferably 3% by weight or more and usually 20% by weight or less, preferably 15% by weight or less. When the amount of the pigment to be used is too small, there is a possibility that image density decreases, while when the amount is too large, there is a possibility that the control of the agglomeration becomes difficult.

Furthermore, a surfactant may be contained in the pigment particle dispersion. The surfactant is not particularly limited but there may be, for example, mentioned those the same as the surfactants exemplified as emulsifiers in the explanation of the emulsion polymerization process. Of these, nonionic surfactants, anionic surfactants including alkylarylsulfonate salts such as sodium dodecylbenzenesulfonate, polymeric surfactants, and the like are preferably used. Moreover, on this occasion, the surfactants may be used singly or two or more thereof may be used in combination at any combination and in any ratio.

The ratio of the pigment in the pigment particle dispersion is usually from 10 to 50% by weight.

As the liquid medium for the pigment particle dispersion, an aqueous medium is usually used and particularly preferably, water is used. On this occasion, the water quality of the polymer primary particles and pigment particle dispersion relates to coarse particle formation by re-agglomeration of the individual particles in the liquid medium and, when conductivity is high, dispersion stability with time tends to be deteriorated. Therefore, it is preferred to use ion-exchange water or distilled water subjected to demineralization treatment so that the conductivity becomes usually 10 µS/cm or less, preferably 5 µS/cm or less. In this connection, the measurement of the conductivity is conducted at 25° C. using a conductivity meter (a personal SC meter Model SC72 and a detector SC72SN-11 manufactured by Yokogawa Electric Corporation).

Moreover, at the time when a pigment is mixed with the emulsion containing the polymer primary particles, wax may be mixed with the emulsion. As the wax, those the same as described in the explanation of the emulsion polymerization process can be used. The wax may be mixed at any time before, during, or after the pigment is mixed with the emulsion containing the polymer primary particles.

Also, at the time when a pigment is mixed with the emulsion containing the polymer primary particles, a charging regulator may be mixed with the emulsion.

As the charging regulator, any one known to be usable in this application can be used. Examples of a positively charged charging regulator include nigrosine-based dyes, quaternary ammonium salts, triphenylmethane-based compounds, imidazole-based compounds, polyamine resins, and the like. Moreover, examples of a negatively charged charging regulator include azo complex compound dyes containing an atom such as Cr, Co, Al, Fe, or B; metal salts or metal complexes of salicylic acid or alkylsalicylic acid; carixarene compounds, metal salts or metal complexes of benzylic acid, amide compounds, phenol compounds, naphthol compounds, phenolamide compounds, and the like. Of these, in order to avoid tone disorder as a toner, colorless or light color one is preferably selected. Of these, in order to avoid color tone disorder, colorless or hypochromic ones are preferably selected. Particularly, as the positively charged charging regulator, quaternary ammonium salts and imidazole-based compounds are preferred and, as the negatively charged charging regulator, alkylsalicylic acid complex compounds containing an atom such as Cr, Co, Al, Fe, or B and carixarene compounds are preferred. The charging regulator may be used singly or two or more thereof may be used in combination at any combination and in any ratio.

There is no limitation on the amount of the charging regulator to be used but the amount is usually 0.01 part by weight or more, preferably 0.1 part by weight or more and 10 parts by weight or less, preferably 5 parts by weight or less relative to 100 parts by weight of the polymer. When the amount of the charging regulator is too small or too large, there is a possibility that a desired charge amount is not obtained.

The charging regulator may be mixed at any time before, during, or after the pigment is mixed with the emulsion containing the polymer primary particles.

Moreover, the charging regulator is desirably mixed at agglomeration in an emulsion state in a liquid medium (usually an aqueous medium) as in the case of the above pigment particles.

After the pigment is mixed with the emulsion containing the above polymer primary particles, the polymer primary particles and the pigment are agglomerated. As mentioned above, the pigment is usually mixed as a pigment particle dispersion at mixing.

The agglomeration method is not limited and arbitrary but, for example, heating, mixing of an electrolyte, pH regulation, and the like are mentioned. Of these, a method of mixing an electrolyte is preferred.

As the electrolyte in the case of agglomeration by mixing the electrolyte, there may be, for example, chlorides such as NaCl, KCl, LiCl, $MgCl_2$, and $CaCl_2$; inorganic salts including sulfate salts such as $Na_2SO_4$, $K_2SO_4$, $Li_2SO_4$, $MgSO_4$, $CaSO_4$, $ZnSO_4$, $Al_2(SO_4)_3$ and $Fe_2(SO_4)_3$; organic salts such as $CH_3COONa$, $C_6H_5SO_3Na$; and the like. Of these, inorganic salts having a divalent to polyvalent metal cation are preferred.

The electrolyte may be used singly or two or more thereof may be used in combination at any combination and in any ratio.

The amount of the electrolyte to be used varies depending on the kind of the electrolyte but is usually 0.05 part by weight or more, preferably 0.1 part by weight or more and usually 25 parts by weight or less, preferably 15 parts by weight or less, more preferably 10 parts by weight or less relative to 100 parts by weight of solid components in the emulsion. In the case where the electrolyte is mixed to effect agglomeration, when the amount of the electrolyte to be used is too small, the proceeding of the agglomeration reaction becomes slow and there is a possibility that fine powder of 1 μm or less remains after the agglomeration reaction or average particle size does not reach objective particle size. When the amount of the electrolyte to be used is too large, the agglomeration reaction rapidly occurs and hence the control of the particle size becomes difficult, so that there is a possibility that coarse powder and amorphous one are contained in the resulting agglomerate.

The resulting agglomerate is preferably transformed into spherical one by subsequently heating it in the liquid medium as in the case of a secondary agglomerate (an agglomerate passed through a melting step) to be mentioned below. Heating may be carried out in the same conditions as in the case of the secondary agglomerate (the same conditions as described in the explanation of the fusion step).

On the other hand, in the case of conducting the agglomeration by heating, the temperature condition is arbitrary so long as the agglomeration proceeds. With regard to the specific temperature condition, the agglomeration is conducted under a temperature condition of usually 15° C. or higher, preferably 20° C. or higher and the glass transition temperature [Tg] of the polymer of the polymer primary particles or lower, preferably 55° C. or lower. The time required for agglomeration is also arbitrary but is usually 10 minutes or more, preferably 60 minutes or more and usually 300 minutes or less, preferably 180 minutes or less.

At the agglomeration, it is preferred to carry out stirring. The device to be used for stirring is not particularly limited but one having double helical blades is preferred.

The resulting agglomerate may be subjected to the next step where a resin coating layer is formed (encapsulation step) without further treatment or may be subjected to the encapsulation step after subsequent fusion treatment by heating is carried out in the liquid medium. Desirably, it is preferred to conduct the encapsulation step after the agglomeration step and then to conduct the fusion step by heating the encapsulated resin fine particles to a temperature higher than the glass transition temperature [Tg] of the fine particles or higher since the steps can be simplified and deterioration (thermal deterioration) of the performance of the toner does not occur.

3. Encapsulation Step

After the agglomerate is obtained, on the agglomerate, it is preferred to form a resin coating layer according to need. The encapsulation step where a resin coating layer is formed on the agglomeration is a step where the agglomerate is coated with a resin by forming a resin coating layer on the surface of the agglomerate. Thereby, the produced toner is provided with the resin coating layer. In the encapsulation step, there is a case where the whole toner is not completely coated but there can be obtained a toner wherein the pigment is substantially not exposed on the surface of the toner particles. The thickness of the resin coating layer on this occasion is not limited but is usually in the range of 0.01 to 0.5 μm.

The method for forming the above resin coating layer is not particularly limited but there may be, for example, mentioned a spray dry method, a mechanical particle complicating method, an in-situ polymerization method, a in-liquid particle coating method, and the like.

As the method for forming the resin coating layer by the above spray dry method, for example, a resin coating layer can be formed on the agglomerate surface by dispersing the agglomerate that forms an inner layer and resin fine particles that forms the resin coating layer in a water medium to prepare a dispersion liquid and subsequently spraying the dispersion liquid, followed by drying.

Moreover, the method for forming the resin coating layer by the above mechanical particle complicating method includes, for example, a method of dispersing the agglomerate that forms an inner layer and resin fine particles that forms the resin coating layer in a gas phase and converting the resin fine particles into a film on the agglomerate surface by imparting a mechanical force in a narrow gap. For example, an apparatus such as a hybridization system (manufactured by Nara Machinery Co., Ltd.), a mechanofusion system (manufactured by Hosokawa Micron Corp.), and the like can be employed.

Furthermore, the above in-situ polymerization method includes, for example, a method of forming a resin coating layer on the surface of the agglomerate as an inner layer, which comprises dispersing the agglomerate in water, mixing a monomer and an polymerization initiator to adsorb them on the surface of the agglomerate, and subsequently heating the whole to polymerize the monomer.

Additionally, the above in-liquid particle coating method includes, for example, a method of reacting or binding the agglomerate that forms an inner layer and resin fine particles that forms an outer layer in a water medium to form a resin coating layer on the surface of the agglomerate that forms an inner layer.

The resin fine particles to be used in the case of forming the outer layer are particles having a particle size smaller than that of the agglomerate and mainly composed of a resin component. The resin fine particles are not particularly limited so long as the particles is constituted by a polymer. However, in view of controlling the thickness of the outer layer, it is preferred to use resin fine particles similar to the aforementioned polymer primary particles, agglomerate, or fused particles formed by fusing the above agglomerate. In this connection, the resin fine particles similar to these polymer primary particles, etc. can be produced similarly to the polymer primary particles in the agglomerate to be used for the inner layer.

Moreover, the amount of the resin fine particles is arbitrary but the particles are desirably used in the range of usually 1% by weight or more preferably 5% by weight or more and usually 50% by weight or less, preferably 25% by weight or less relative to the toner particles.

Furthermore, in order to effectively conduct adhesion or fusion of the resin fine particles to the agglomerate, with regard to the particle size of the resin fine particles, particles having the size of about 0.04 to 1 μm are preferably used.

Desirably, the glass transition temperature [Tg] of the polymer component (resin component) to be used for the resin coating layer is usually 60° C. or higher, preferably 70° C. or higher and usually 110° C. or lower. Furthermore, the glass transition temperature [Tg] of the polymer component to be used for the resin coating layer is preferably not less than 5° C., more preferably not less than 10° C. higher than the glass transition temperature [Tg] of the polymer primary particles. When the glass transition temperature [Tg] is too low, the storage in general environment is difficult, while when the temperature is too high, a sufficient melting ability is not obtained, so that the cases are not preferred.

Furthermore, it is preferred to contain polysiloxane wax in the resin coating layer. Thereby, an advantage of improved high-temperature offset resistance can be obtained. Examples of the siloxane wax include silicone waxes having an alkyl group, and the like.

The content of the siloxane wax is not limited but is, in the toner, usually 0.01% by weight or more, preferably 0.05% by weight or more, more preferably 0.08% by weight or more and usually 2% by weight or less, preferably 1% by weight or less, more preferably 0.5% by weight of less. When the amount of the polysiloxane wax is too small, there is a possibility that the high-temperature offset resistance becomes insufficient, while when the amount is too large, there is a risk that blocking resistance may decrease.

The method for incorporating the polysiloxane wax into the resin coating layer is arbitrary but, for example, emulsion polymerization is carried out using the polysiloxane wax as a seed and the resulting resin fine particles and the agglomerate that forms an inner layer are reacted or bonded in an aqueous medium to form a resin coating layer containing the polysiloxane wax on the surface of the agglomerate that forms an inner layer, thereby it being possible to incorporate the wax.

4. Fusion Step

In the fusion step, the polymer constituting the agglomerate is fused and integrated by heating the agglomerate.

In the case where encapsulated resin fine particles are formed by foaming a resin coating layer on the agglomerate, fusion integration of the polymer constituting the agglomerate and the resin coating layer thereon is achieved by heating. Thereby, the pigment particles are obtained in a state substantially not exposed on the surface.

The temperature for the heating in the fusion step is a temperature of glass transition temperature [Tg] of the polymer primary particles constituting the agglomerate or higher. Moreover, in the case where a resin coating layer is formed, the temperature is a temperature of the glass transition temperature [Tg] of the polymer component constituting the resin coating layer or higher. Specific temperature condition is arbitrary but it is preferably not less than 5° C. higher than the glass transition temperature [Tg] of the polymer component constituting the resin coating layer. The upper limit is not limited but is preferably a "temperature 50° C. higher than the glass transition temperature [Tg] of the polymer component constituting the resin coating layer" or lower.

The time for heating depends on processing ability and the amount to be produced but is usually from 0.5 to 6 hours.

5. Washing/Drying Step

In the case where the aforementioned each step is carried out in a liquid medium, after the fusion step, a toner can be obtained by removing the liquid medium through washing and drying the resulting encapsulated resin particles. The method for washing and drying is not limited and is arbitrary.

[Physical Properties Relating to Toner Particle Size]

The volume-average particle size [Dv] of the toner of the invention is not limited and is arbitrary unless it remarkably impairs the advantages of the invention but is usually 4 μm or more, preferably 5 μm or more and usually 10 μm or less, preferably 8 μm or less. When the volume-average particle size [Dv] of the toner is too small, there is a possibility that the stability of the image quality may decrease, while when it is too large, there is a risk that resolution may decrease.

Moreover, with regard to the toner of the invention, it is desirable that a value [Dv/Dn] obtainable by dividing the volume-average particle size [Dv] by number-average particle size [Dn] is usually 1.0 or more and usually 1.25 or less, preferably 1.20 or less, more preferably 1.15 or less. The value [Dv/Dn] shows a state of particle size distribution and the value closer to 1.0 shows sharp particle size distribution. The sharper particle size distribution is desirable since the charging property of the toner becomes uniform.

Furthermore, with regard to the toner of the invention, a volume fraction of the particles having a particle size of 25 μm or more is usually 1% or less, preferably 0.5% or less, more preferably 0.1% or less, further preferably 0.05% or less. The smaller value is more preferred. This means that the ratio of the coarse powder contained in the toner is small. When the ratio of the coarse powder is small, the consumed amount of the toner at continuous development is small and the image quality is stabilized, so that the case is preferred. In this connection, entirely no presence of the coarse powder having a particle size of 25 μm or more is most preferred but achievement thereof is difficult at actual production and usually, there arises no trouble even when the ratio is not 0.005% or less.

Moreover, with regard to the toner of the invention, a volume fraction of the particles having a particle size of 15 μm or more is usually 2% or less, preferably 1% or less, more preferably 0.1% or less. Entirely no presence of the coarse powder having a particle size of 15 μm or more is also most preferred but achievement thereof is difficult at actual production and usually, there arises no trouble even when the ratio is not 0.01% or less.

Furthermore, desirably, with regard to the toner of the invention, a number fraction of the particle having a particle size of 5 μm or less is usually 15% or less, preferably 10% or less since image fogging is improved.

The volume-average particle size [Dv], number-average particle size [Dn], volume fraction, number fraction, and the like can be measured as follows. Namely, a multisizer type II or III of Coulter counter (manufactured by Beckman Coulter Co.) is used as a measuring apparatus of particle size of the toner, which is used through connection to an interface that outputs number distribution and volume distribution and a general personal computer. As an electrolytic solution, Isoton II is used. As a measuring method, 0.1 to 5 mL of a surfactant (preferably alkylbenzenesulfonate salt) as a dispersant is added into 100 to 150 mL of the above electrolytic solution and 2 to 20 mg of a sample to be measured (toner) is further added thereto. Then, the electrolytic solution containing the suspended sample is subjected to dispersion treatment on an ultrasonic dispersing device for about 1 to 3 minutes and then measurement is conducted by means of the above multisizer type II or III of Coulter counter using a 100 μm aperture. Thus, the number and volume of the toner are measured and the number distribution and volume distribution are calculated respectively, followed by determination of respective volume-average particle size [Dv] and number-average particle size [Dn].

[Physical Properties relating to Molecular Weight of Toner]

At least one of the peak molecular weights of THF-soluble part of the toner of the invention in gel permeation chromatography is usually 10,000 or more, preferably 20,000 or more, more preferably 30,000 or more and usually 150,000 or less, preferably 100,000 or less, more preferably 70,000 or less. In this connection, THF means tetrahydrofuran. In the case where all the peak molecular weights are lower than the above range, mechanical durability in a nonmagnetic one-component developing mode becomes worse in some cases, while when all the peak molecular weights are higher than the above range, the low-temperature fixing ability and fixing strength sometimes becomes worse.

Furthermore, a THF-insoluble part is usually 10% or more, preferably 20% or more and usually 60% or less, preferably 50% or less when measured by the weight method through celite filtration to be mentioned below. When the amount is out of the range, both of the mechanical durability and the low-temperature fixing ability are difficult to achieve simultaneously in some cases.

In this connection, the peak molecular weight of the toner of the invention is measured using a measuring apparatus: HLC-8120GPC (manufactured by Tosoh Corporation) under the following conditions.

Namely, columns are stabilized in a heat chamber at 40° C. and tetrahydrofuran (THF) as a solvent is passed through the columns at the temperature at a rate of 1 mL per minute. Then, after the toner is dissolved in THF, the solution is filtrated through a 0.2 μm filter and the filtrate is used as a sample.

The measurement is carried out by injecting 50 to 200 μL, of a THF solution of a resin into the measuring apparatus, the sample concentration (concentration of the resin) being adjusted to 0.05 to 0.6% by mass. At the molecular weight measurement of the sample (a resin component in the toner), the molecular weight distribution of the sample is calculated based on the relation between the logarithmic value and the count number in the calibration curve prepared with several kinds of monodisperse polystyrene standard samples. As the standard polystyrene samples for calibration curve preparation, for example, those having a molecular weight of $6 \times 10^2$, $2.1 \times 10^3$, $4 \times 10^3$, $1.75 \times 10^4$, $5.1 \times 10^4$, $1.1 \times 10^5$, $3.9 \times 10^5$, $8.6 \times 10^5$, $2 \times 10^6$, or $4.48 \times 10^6$ manufactured by Pressure Chemical Co. or Tosoh Corporation are used and it is suitable to use at least about 10 samples of the standard polystyrene samples. Moreover, an RI (refractive index) detector is used as a detector.

Furthermore, as columns to be used in the above measuring method, in order to measure the molecular weight region of $10^3$ to $2 \times 10^6$ precisely, two or more commercially available polystyrene gel columns are suitably combined and, for example, a combination of μ-styragel 500, 103, 104, and 105 (manufactured by Waters Co.) or a combination of shodex KA801, 802, 803, 804, 805, 806, and 807 (manufactured by Showa Denko Co.) is preferred.

Moreover, the measurement of tetrahydrofuran (THF)-insoluble part of the toner can be carried out as follows. Namely, 1 g of the sample (toner) is added to 100 g of THF and the whole was allowed to stand at 25° C. for 24 hours for dissolution. After filtration using 10 g of celite, the solvent of the filtrate is removed by filtration and a THF-soluble part is quantitatively determined. Then, a THF insoluble part can be calculated by subtracting the weight of the THF-soluble part from 1 g.

[Softening Point and Glass transition Temperature of Toner]

The softening point [Sp] of the toner of the invention is not limited and is arbitrary unless it remarkably impairs the advantages of the invention. However, in view of fixing at low energy, the softening point is usually 150° C. or lower, preferably 140° C. or lower. Moreover, in view of high-temperature offset property and durability, the softening point is usually 80° C. or higher, preferably 100° C. or higher.

In this connection, the softening point [Sp] of the toner can be determined as a temperature at a middle point of a strand from the start and finish of flow when 1.0 g of a sample is measured under conditions of a nozzle of 1 mm×10 mm, a load of 30 kg, a preheating time of 5 minutes at 50° C., and a temperature-elevating rate of 3° C./minute in a flow tester.

Moreover, the glass transition temperature [Tg] of the toner of the invention is not limited and is arbitrary unless it remarkably impairs the advantages of the invention but desirably, it is usually 80° C. or lower, preferably 70° C. or lower since fixing can be achieved at low energy. Moreover, desirably, the glass transition temperature [Tg] is usually 40° C. or higher, preferably 50° C. or higher in view of blocking resistance.

In this connection, the glass transition temperature [Tg] of the toner can be determined as a temperature at a crossing point of two tangent lines when the tangent lines are drawn at transition (inflection) start points of a curve measured under a temperature-elevating rate of 10° C./minute in a differential scanning calorimeter.

The softening point [Sp] and the glass transition temperature [Tg] of the toner is remarkably influenced by the kind and composition ratio of the polymer contained in the toner. Therefore, the softening point [Sp] and the glass transition temperature [Tg] of the toner can be adjusted by suitably controlling the kind and composition of the above polymer. Moreover, it is possible to adjust them by the molecular weight of the polymer, gel component, and the kind and mixing amount of low-melting components such as wax.

[Wax in Toner]

In the case where the toner contains wax, the dispersion particle size of the wax in the toner particles is, as an average particle size, usually 0.1 µm or more, preferably 0.3 µm or more and an upper limit is usually 3 µm or less, preferably 1 µm or less. When the dispersion particle size is too small, there is a possibility that an effect of improving filming resistance of the toner may not be obtained, while when the dispersion particle size is too large, the wax tends to be exposed on the surface of the toner, so that charging property and heat resistance may decrease.

The dispersion particle size of the wax can be confirmed by a method of transforming the toner into a slice and observing it on an electron microscope and also by a method of eluting the polymer in the toner with an organic solvent or the like which does not dissolve the wax, filtrating the whole through a filter, and measuring wax particles which remain on the filter.

Moreover, the ratio of the wax in the toner is arbitrary unless it remarkably impairs the advantages of the invention but is usually 0.05% by weight or more, preferably 0.1% by weight or more and usually 20% by weight or less, preferably 15% by weight or less. When the amount of the wax is too small, the range of the fixing temperature may become insufficient, while when the amount is too large, there is a possibility that the wax may stain the device members to lower image quality.

[Externally Adding Fine Particles]

In order to improve fluidity, charging stability, and blocking resistance at high temperature of the toner, externally adding fine particles may be attached to the surface of the toner particles.

As a method for attaching the externally adding fine particles to the surface of the toner particles, for example, in the aforementioned process for producing the toner, there may be mentioned a method of adhering the externally adding fine particles on the toner particles by heating after mixing the secondary agglomerate and the externally adding fine particle in the liquid medium; a method of mixing or adhering the externally adding fine particles in a dry manner with the toner particles obtained by separating secondary agglomerate from the liquid medium and washing and drying the agglomerate; and the like.

Examples of the mixing machine to be used in the case of mixing the toner particles and the externally adding fine particles in a dry manner include Henschel mixer, super mixer, Nauter mixer, V type mixer, redeige mixer, double corn mixer, drum type mixer, and the like. Of these, mixing is preferably achieved by homogeneously stirring and mixing with suitably setting blade shape, rotation number, time, number of driving-stopping, and the like using a high-speed mixing machine such as Henschel mixer or super mixer.

Moreover, as an apparatus to be used in the case of adhering the toner particles and the externally adding fine particles in a dry manner, there may be mentioned a compressive shear treatment apparatus capable of imparting compressive shear stress, a particle surface fusion treatment apparatus capable of fusing the particle surface, and the like.

The compressive shear treatment apparatus generally has a narrow gap part constituted by a head face which relatively moves with keeping a space and a head face, a head face and a wall face, or a wall face and a wall face and is constituted so that compressive stress and shear stress are imparted to the particle surface by compulsorily passing particles to be treated through the gap part, without substantial pulverization. As such a compressive shear treatment apparatus, there may be, for example, a mechanofusion apparatus manufactured by Hosokawa Micron Corp. and the like.

On the other hand, the particle surface fusion treatment apparatus is generally constituted so that a mixture of mother fine particles and the externally adding fine particles is instantaneously heated to melt-starting temperature of the mother fine particles or higher to adhere the externally adding fine particles utilizing hot air flow or the like. As such a particle surface fusion treatment apparatus, there may be, for example, mentioned a surfusing system manufactured by Nippon Pneumatic Mfg. Co., Ltd. and the like.

Moreover, as the externally adding fine particles, a known one which is known to be usable in this application can be used. For example, inorganic fine particles, organic fine particles, and the like may be mentioned.

As the inorganic fine particles, there may be used carbides such as silicon carbide, boron carbide, titanium carbide, zirconium carbide, hafnium carbide, vanadium carbide, tantalum carbide, niobium carbide, tungsten carbide, chromium carbide, molybdenum carbide, and carcium carbide; nitrides such as boron nitride, titanium nitride, zirconium nitride, and silicon nitride; borides such as zirconium boride; oxides and hydroxides such as silica, colloidal silica, titanium oxide, aluminum oxide, calcium oxide, magnesium oxide, zinc oxide, copper oxide, zirconium oxide, cerium oxide, talc, and hydrotalcite; various titanate compounds such as calcium titanate, magnesium titanate, strontium titanate, barium titanate; phosphate compounds such as tricalcium phosphate, calcium dihydrogen phosphate, calcium monohydrogen phosphate, substituted calcium phosphate where part of phosphate ions is substituted by anion(s); sulfides such as molybdenum disulfide; fluorides such as magnesium fluoride and carbon fluoride; metal soaps such as aluminum stearate, calcium stearate, zinc stearate, and magnesium stearate; talcite, bentonite, various carbon blacks such as conductive carbon black; and the like. In addition, magnetic substances such as magnetite, maghematite, intermediates of magnetite and maghematite and the like may be used.

On the other hand, as the organic fine particles, there may be used fine particles of styrene-based resins, acrylic resins such as polymethyl acrylate and polymethyl methacrylate, epoxy resins, melamine resins, tetrafluoroethylene resins, trifluoroethylene resins, polyvinyl chloride, polyethylene, polyacrylonitrile, and the like.

Among these externally adding fine particles, particularly, silica, titanium oxide, alumina, zinc oxide, carbon black, and the like are suitably used.

In this connection, the externally adding fine particles may be singly or two or more thereof may be used in combination at any combination and in any ratio.

Moreover, the surface of these inorganic or organic fine particles may be subjected to surface treatment such as hydrophobic treatment with a treating agent such as a silane coupling agent, a titanate-based coupling agent, a silicone oil, a modified silicone oil, a silicone varnish, a fluorinated silane coupling agent, a fluorinated silicone oil, or a coupling agent having an amino group or a quaternary ammonium salt group. The treating agent may be singly or two or more thereof may be used in combination at any combination and in any ratio.

Furthermore, the number-average particle size of the externally adding fine particles is arbitrary unless it remarkably impairs the advantages of the invention but is usually 0.001 µm or more, preferably 0.005 µm or more and usually 3 μm or less, preferably 1 μm or less. Two or more of the particles having different average particle sizes may be mixed. In this connection, the average particle size can be determined by observation on an electron microscope, conversion of the value of BET specific surface area, or the like.

Moreover, the ratio of the externally adding fine particles to the toner is arbitrary unless it remarkably impairs the advantages of the invention. However, it is desirable that the ratio of the externally adding fine particles to the total weight of the toner and the externally adding fine particles is usually 0.1% by weight or more, preferably 0.3% by weight or more, more preferably 0.5% by weight or more and usually 10% by weight or less, preferably 6% by weight or less, more preferably 4% by weight or less. When the amount of the externally adding fine particles is too small, there is a possibility that fluidity and charging stability may be insufficient, while when it is too large, there is a possibility that fixing ability becomes worse.

[Miscellaneous]

The charging property of the toner of the invention may be negative charging or positive charging and can be set depending on the mode of the image-forming device to be used. The charging property of the toner can be regulated by selection and composition ratio of the mother particle-constituting substance of the charging regulator, selection and composition ratio of the externally adding fine particles, and the like.

Moreover, the toner of the invention can be used as a one-component developer or as a two-component developer mixed with a carrier.

In the case of the use as the two-component developer, as the carrier which is mixed with the toner to form a developer, for example, magnetic substances such as known iron powder-based, ferrite-based, magnetite-based carriers or those obtained by subjecting the surface thereof to resin coating and magnetic resin carriers can be used.

As the coating resin for the carriers, for example, commonly known styrene-based resins, acrylic resins, styrene/acrylic copolymer resins, silicone-based resins, modified silicone-based resins, fluorinated resins, and the like can be utilized but the resin is not limited thereto.

Moreover, the average particle size of the carrier is not particularly limited but those having an average particle size of 10 to 200 μm are preferred. These carriers are preferably used in a ratio of 5 to 100 parts by weight relative to 1 part by weight of the toner.

Meanwhile, the formation of full-color images by an electrophotographic procedure can be carried out in a usual manner using individual color toners of magenta, cyan, and yellow and, if necessary, a black toner.

There is no limitation on the kind of the transfer device 5 and it is possible to use various devices employing any methods including electrostatic transfer methods such as corona transfer, roller transfer, and belt transfer; pressure transfer method; and adhesive transfer method. In this embodiment, the transfer device 5 is constituted by a transfer charger, a transfer roller, a transfer belt, and the like, which are diposed facing the electrophotographic photoreceptor 1. The transfer device 5 applies a predetermined voltage (transfer voltage) having a reverse polarity to the electric potential charged to the toner T to thereby transfer the toner image formed on the electrophotographic photoreceptor 1 onto a recording paper (form, medium) P.

The cleaning device 6 is not particularly limited and it is possible to use any cleaning devices including brush cleaners, magnetic brush cleaners, electrostatic brush cleaners, magnetic roller cleaners, and blade cleaners. The cleaning device 6 scrapes away residual toner attached to the photoreceptor 1 by means of a cleaning member to collect the residual toner. The cleaning device 6 may be omitted in the case where only a small amount or almost no amount of residual toner appears.

The fixing device 7 comprises an upper fixing member (fixing roller) 71 and a lower fixing member (fixing roller) 72, and a heating device 73 is disposed at the inside of either fixing member 71 or 72. FIG. 1 illustrates an example in which the heating device 73 is provided at the inside of the upper fixing member 71. As each of the upper and lower fixing member 71, 72, it is possible to use various known heat fixing members including a fixing roll in which a metal tube such as stainless or aluminum is coated with silicone rubber, a fixing roll further coated with Teflon (registered trademark) resin, a fixing sheet, etc. In addition, the fixing members 71, 72 may be configured to provide a mold release agent such as a silicone oil for improving mold releasing ability, and also may be forced to exert pressure on each other by means of a spring or the like.

The toner transferred onto the paper P is passes through the upper fixing member 71 and the lower fixing member 72 heated at a predetermined temperature, during which passage the toner is heated and brought into a fused state. After the passage, the toner is then cooled and fixed on the recording paper P.

There is no particular limitation on the selection of the fixing device, which may employ any methods, e.g., the method used in the above and heat-roller fixing, flash fixing, oven fixing, pressure fixing, and the like.

In the image-forming device constituted above, image recording is carried out according to the following manner (image-forming method of the invention).

Namely, the surface of the photoreceptor 1 (photosensitive surface) is electrically charged to a predetermined potential (e.g., −600V) by the charging device 2. The charging may be carried out either using a direct current voltage or using a current in which a direct current voltage is superimposed on an alternating current voltage.

Subsequently, the charged photosensitive surface of the photoreceptor 1 is then subjected to exposure by the exposing device 3 in accordance with an image to be recorded, so that an electrostatic latent image is formed on the photosensitive surface. Then, the electrostatic latent image formed on the photosensitive surface of the photoreceptor 1 undergoes development by the developing device 4.

In the developing device 4, the toner T provided by the feeding roller 43 is made into the form of a thin layer by the regulating member (developing blade) 45 while being charged with a predetermined polarity (in the embodiment, the same polarity as that of the potential charged to the photoreceptor 1, i.e., negative polarity) through frictional charging. The toner is then carried and transferred by the developing roller 44 and brought into contact with the surface of the photoreceptor 1.

When the charged toner T carried by the developing roller 44 is come into contact with the surface of the photoreceptor 1, a toner image corresponding to the electrostatic latent image is formed on the photosensitive surface of the photoreceptor 1. The toner image is then transferred onto the recording paper P by the transfer device 5, after which the cleaning device 6 removes the residual toner that stays on the photosensitive surface of the photoreceptor 1 without being transferred.

Subsequently to the transfer of the toner image onto the paper P, the toner image is passed through the fixing device 7 and thermally fixed on the recording paper P, whereby the ultimate image is obtained.

The image-forming device may be configured to carry out an erase step in addition to the aforementioned configuration. The erase step is a step of removing electrical charge of the electrophotographic photoreceptor through exposure of the electrophotographic photoreceptor. As the erasing device, a fluorescent lamp, LED, or the like may be used. The light used for the erase step frequently has exposure whose intensity is three-times or more as high as that of the exposure light or still higher in many cases.

Also, the image-forming device may be constituted with further modifications. For example, it may be configured to carry out an additional steps such as a pre-exposure step or an auxiliary charging step, may be configured for offset printing, and may be configured as a full-color tandem type employing plural kinds of toners.

In this connection, it is also possible to use the electrophotographic photoreceptor 1 singly or to combine the electrophotographic photoreceptor 1 with any one or any two or more of the charging device 2, the exposing device 3, the developing device 4, the transfer device 5, the cleaning device 6, and the fixing device 7 to form an integral-type cartridge (hereinafter, optionally referred to as "electrophotographic photoreceptor cartridge"), and to make the electrophotographic photoreceptor cartridge detachable from and attachable to the main body of the image-forming device such as a copying machine or a laser-beam printer. In this case, using a cartridge case configured to be detachable from and attachable to the image-forming device, an electrophotographic photoreceptor cartridge can be formed by casing and supporting the electrophotographic photoreceptor 1 alone or in combination with the aforementioned elements. According to the constitution, even when the electrophotographic photoreceptor 1 or any other component becomes deteriorated, for example, it becomes possible to detach the electrophotographic photoreceptor cartridge from the main body of the image-forming device and attach a new electrophotographic photoreceptor cartridge to the main body of the image-forming device, thereby the maintenance and management of the image-forming device being facilitated.

EXAMPLES

The present invention will be explained in further detail with reference to Examples and Comparative Examples mentioned below. The following Examples are mentioned for the sake of explaining the invention in detail, and the invention is not limited to the following Examples unless it runs counter to the spirit of the invention.

[Conditions for Measuring Powder XRD Spectra and Calculating Peak Halfband Width]

The powder X-ray diffraction spectra of the phthalocyanines obtained in individual Synthetic Examples and Comparative Synthetic Examples to be mentioned below were measured by the following procedure. Namely, as a measuring apparatus, PW1700 manufactured by PANalytical Co. was used, which is a convergent optical system powder X-ray diffractometer using CuKα characteristic X-ray (wavelength of 1.541 angstrom) as a source. The measuring conditions are as follows: X-ray output 40 kV, 30 mA; scanning range (2θ) 3 to 40°; scan step width 0.05°; scanning rate 3.0°/min; divergence slit 1.0°; dispersion slit 1.0°; and receiving slit 0.2 mm.

The peak halfband width was calculated by a profile fitting method. The profile fitting was carried out using a powder X-ray diffraction pattern-analyzing software JADE5.0+ manufactured by MDI Co. The calculation conditions are as follows. Namely, background was fixed to an ideal position from the whole measuring range (2θ=3.0 to 40.0°). As a fitting function, a Peason-VII function considering the contribution of CuKα$_2$ was employed. As variables of the fitting function, three variables, i.e., diffraction angle (2θ), peak height, peak halfband width ($β_0$) were made precise. The influence of CuKα$_2$ was eliminated and the diffraction angle (2θ), peak height, and peak halfband width ($β_0$) derived from CuKα$_1$ were calculated. Asymmetry is fixed to 0 and shape constant to 1.5.

The peak halfband width ($β_0$) calculated by the above profile fitting was corrected in accordance with the following equation by the peak halfband width ($β_{Si}$) of 111 peak (2θ=28.442°) of standard Si (NIST Si 640b) calculated under the same measuring conditions and the same profile fitting conditions to thereby determine a peak halfband width (β) derived from the sample.

$$β=\sqrt{β_0^2-β_{Si}^2}$$ [Num 3]

Synthetic Example 1 (β type oxytitanium phthalocyanine crystal)

Figure 6:
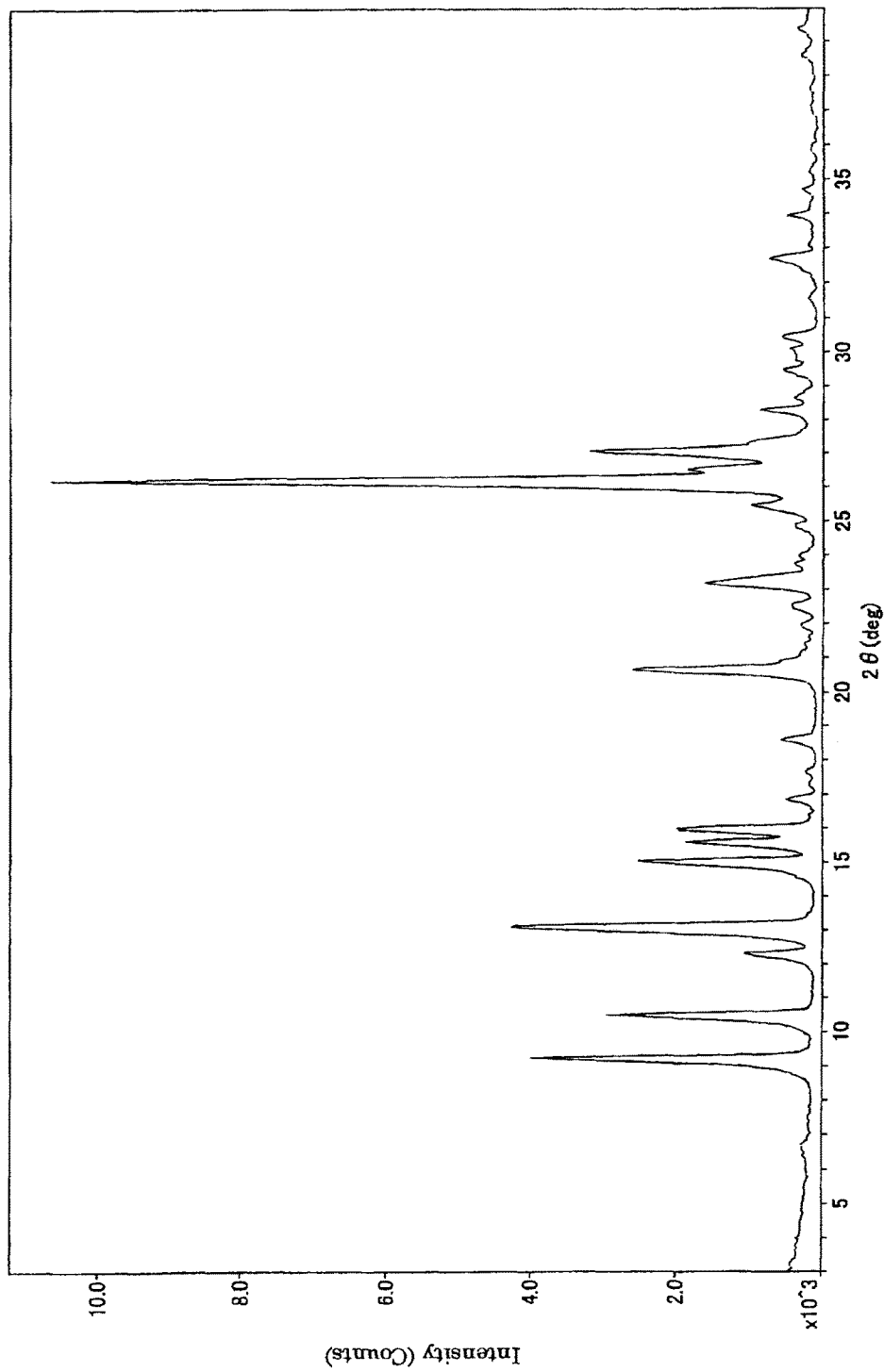
FIG. 6 is a powder XRD spectrum of the crystalline β-form oxytitanium phthalocyanine obtained in Synthetic Example 1.

In accordance with the procedures of "Production Example and subsequent "Example 1" of Crude TiOPc" described in JP-A-10-7925, β type oxytitanium phthalocyanine crystal was prepared. FIG. 6 shows a powder XRD spectrum of the resulting β type oxytitanium phthalocyanine crystal. Moreover, as a result of analyzing the chlorine content contained in the resulting β type oxytitanium phthalocyanine crystal in accordance with the procedure described in the article of <Chlorine Content Measuring Conditions (Elemental Analysis)> of [Best Mode for Carrying Out the Invention] in the above, the chlorine content was found to be 0.20% by weight or less which is a lower detection limit or less. Furthermore, when the peak intensity ratio of chlorooxytitanium phthalocyanine to oxytitanium phthalocyanine in the resulting β type oxytitanium phthalocyanine crystal was measured in accordance with the procedure described in the article of <Mass Spectrum Measuring Condition> of [Best Mode for Carrying Out the Invention] in the above, it was 0.002.

Synthetic Example 2 (low-crystalline oxytitanium phthalocyanine)

Figure 7:
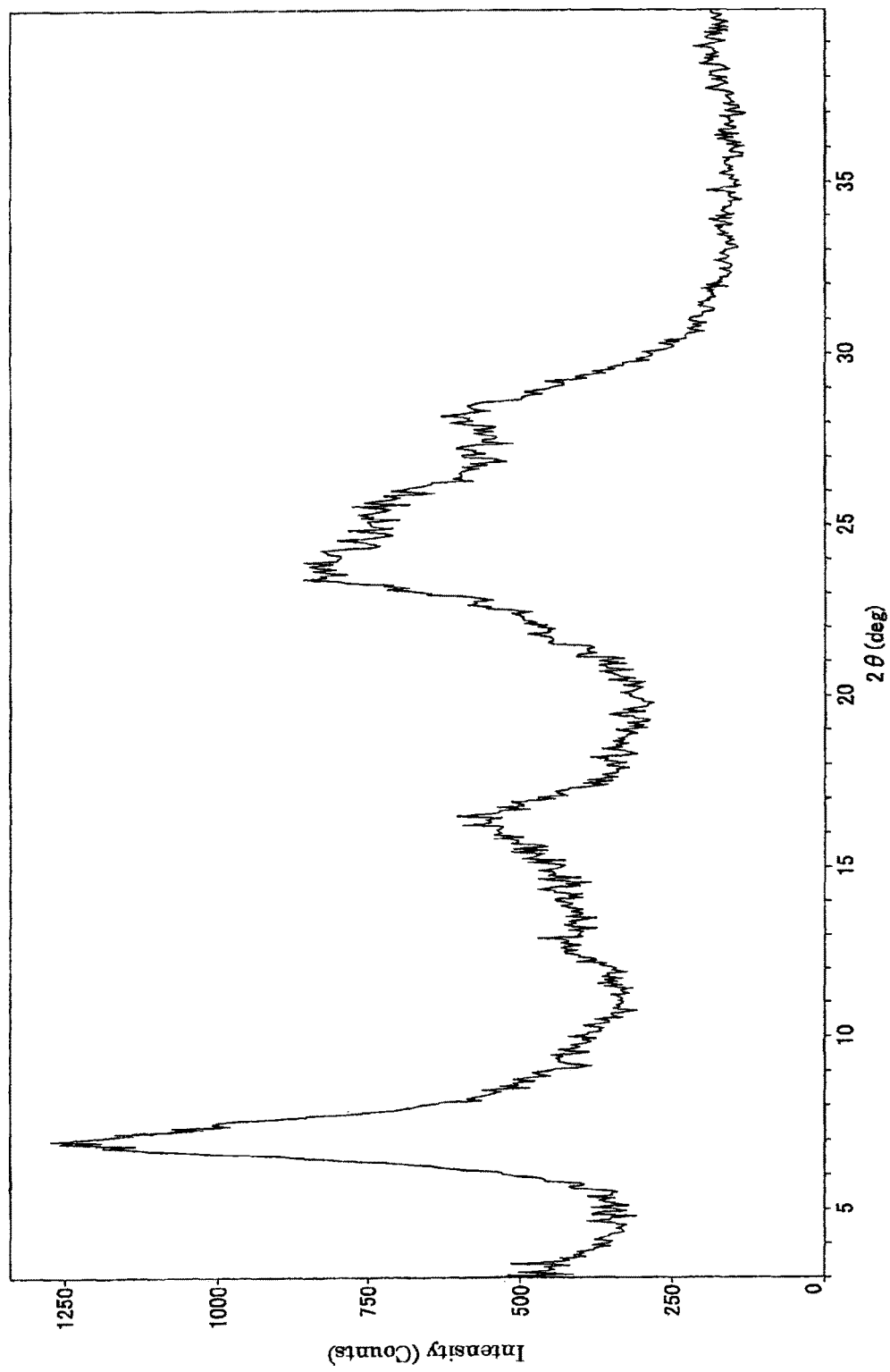
FIG. 7 is a powder XRD spectrum of the low-crystalline oxytitanium phthalocyanine obtained in Synthetic Example 2.
Figure 8:
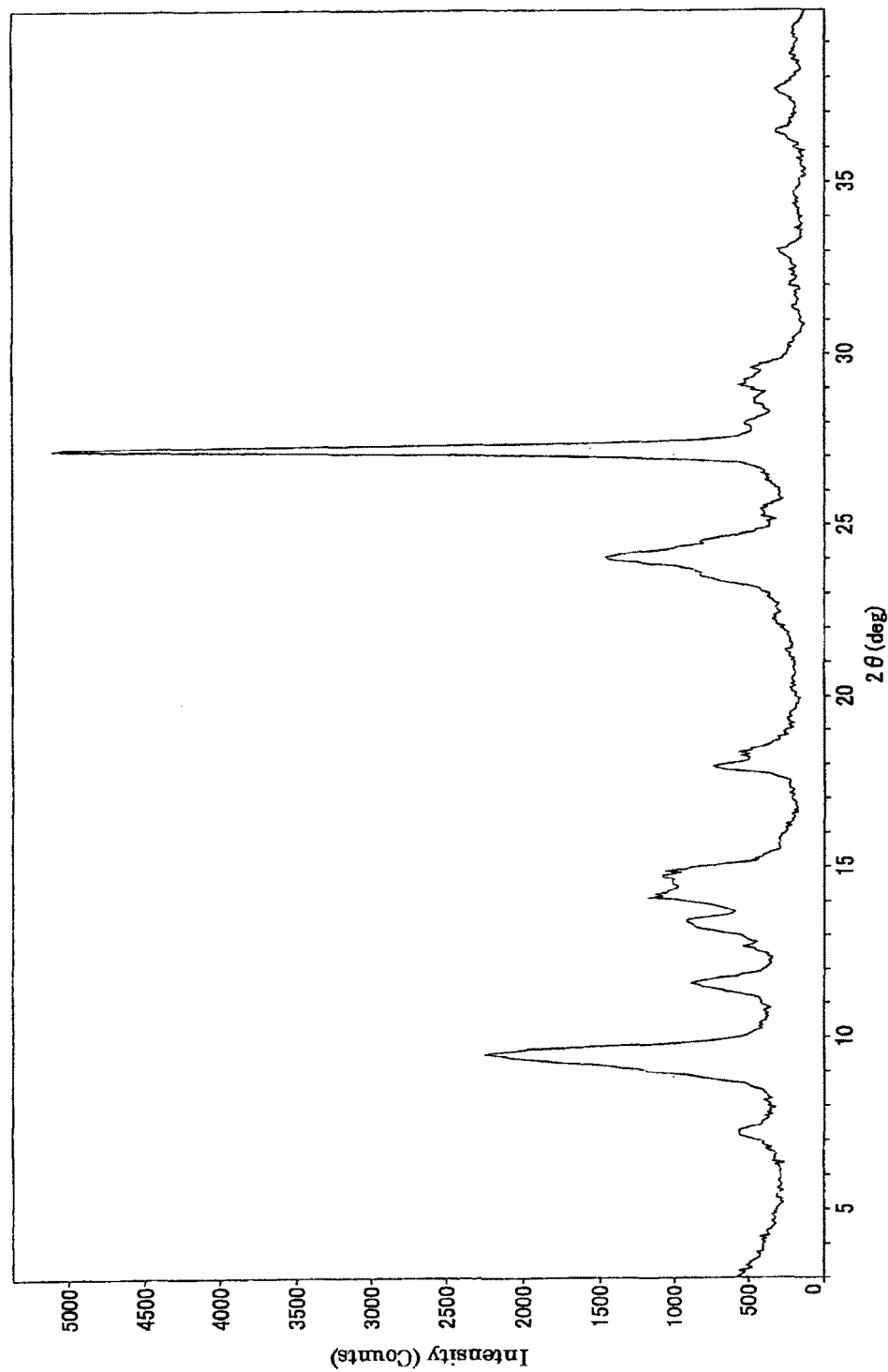
FIG. 8 is a powder XRD spectrum of the phthalocyanine crystal (a crystal of oxytitanium phthalocyanine alone) obtained in Example 1.
Figure 9:
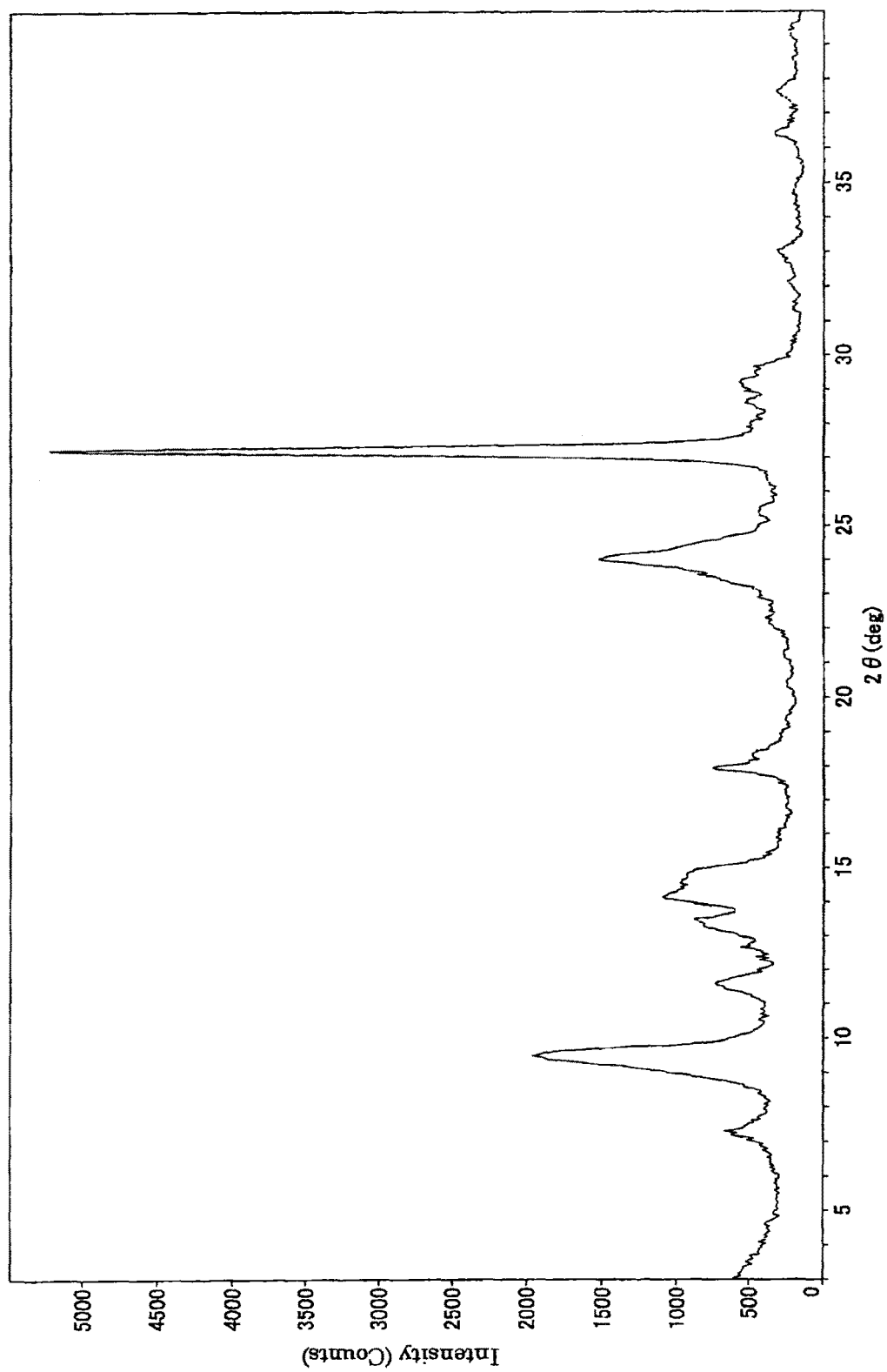
FIG. 9 is a powder XRD spectrum of the phthalocyanine crystal (a crystal of oxytitanium phthalocyanine alone) obtained in Example 2.
Figure 10:
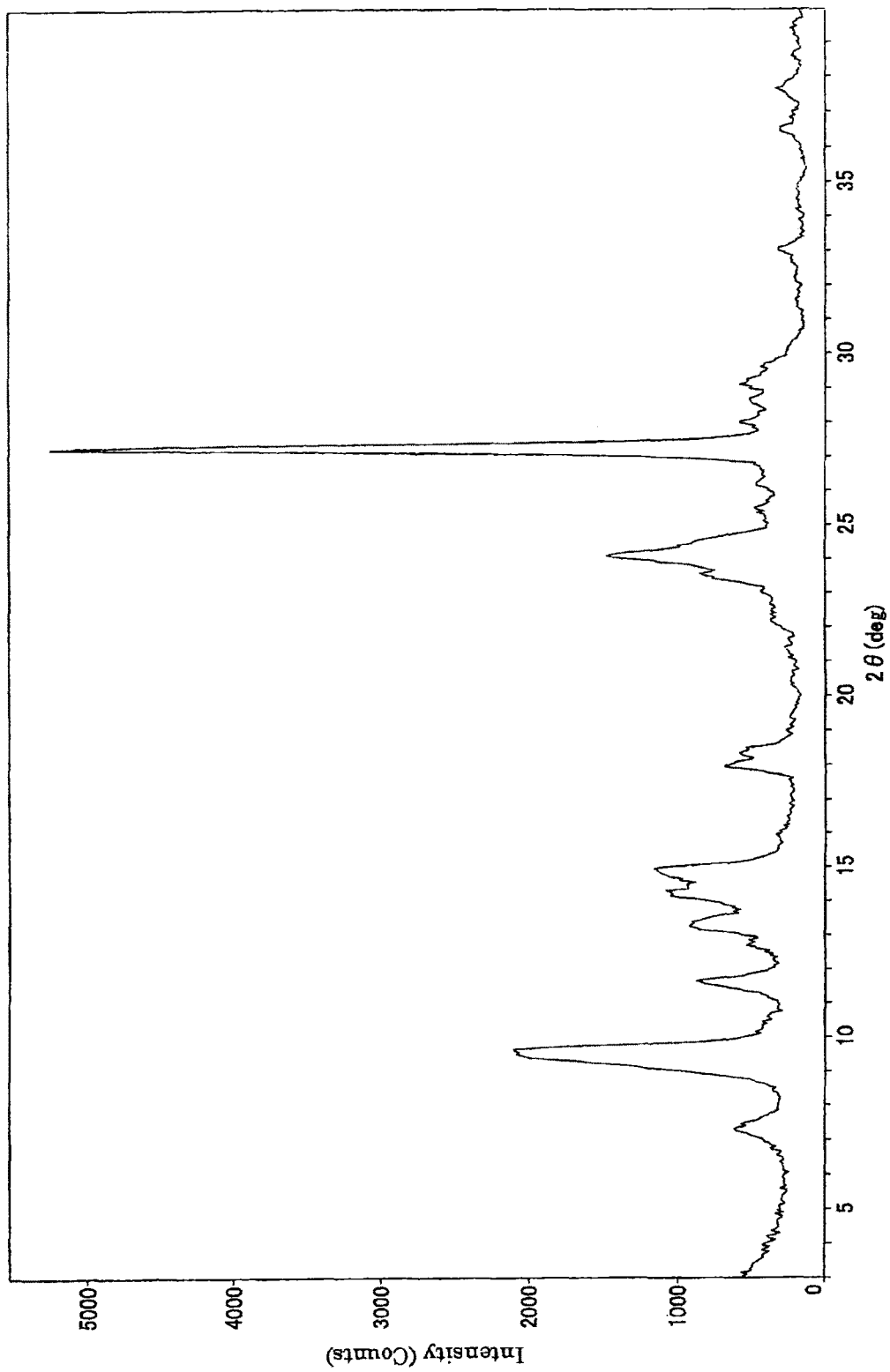
FIG. 10 is a powder XRD spectrum of the phthalocyanine crystal (a crystal of oxytitanium phthalocyanine alone) obtained in Example 3.
Figure 11:
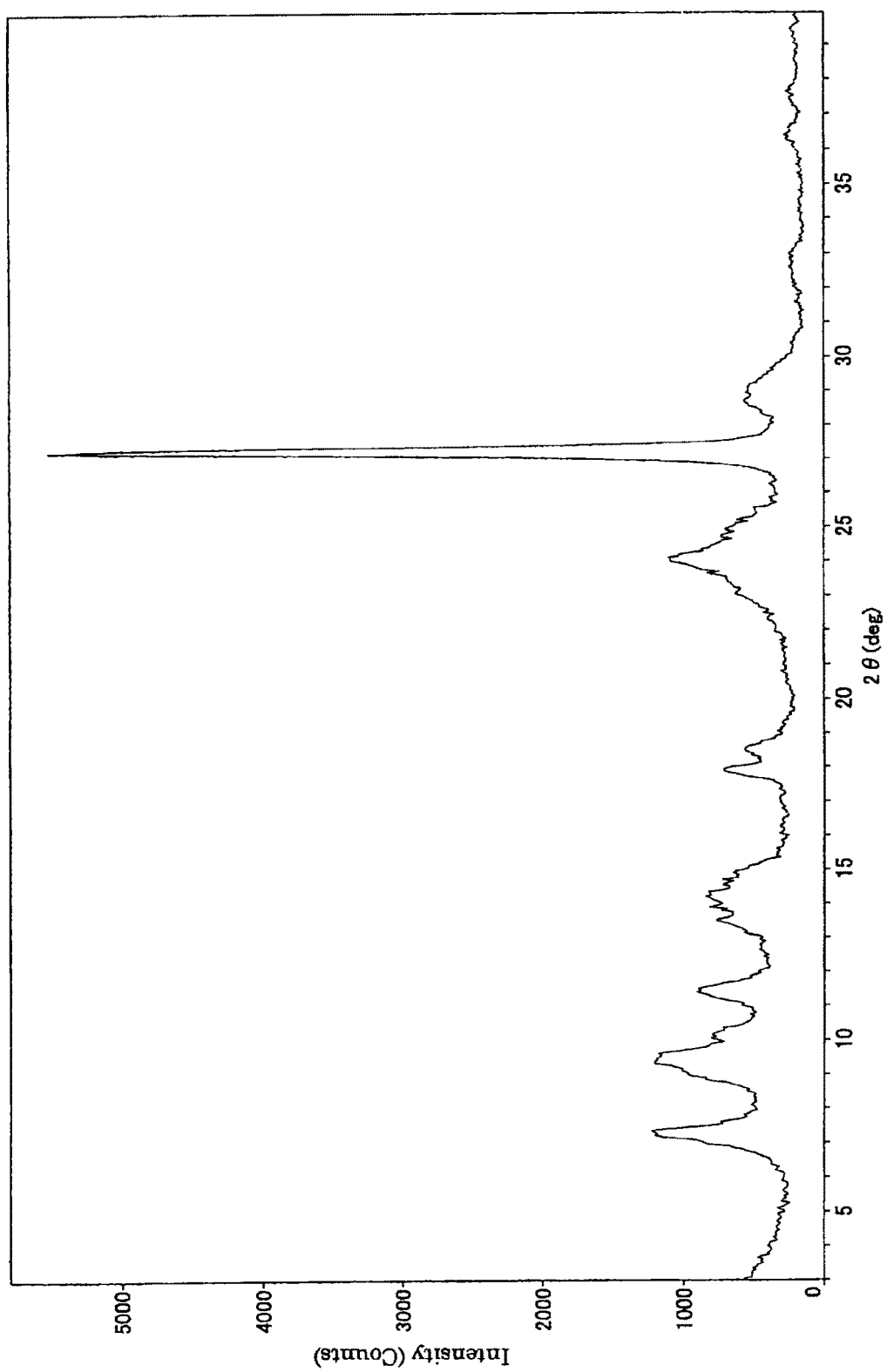
FIG. 11 is a powder XRD spectrum of the phthalocyanine crystal (a crystal of oxytitanium phthalocyanine alone) obtained in Example 4.
Figure 12:
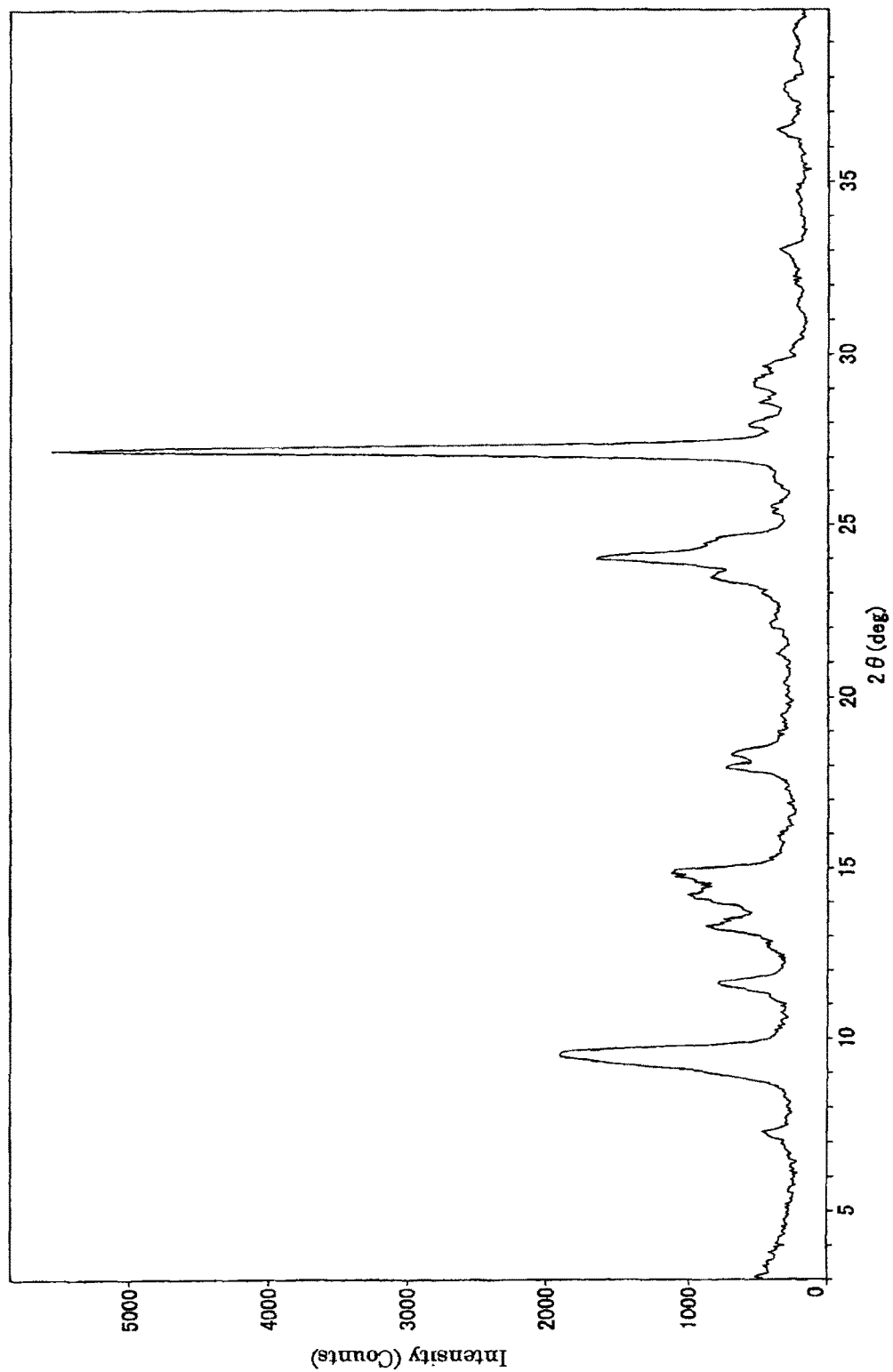
FIG. 12 is a powder XRD spectrum of the phthalocyanine crystal (a crystal of oxytitanium phthalocyanine alone) obtained in Comparative Synthetic Example 1.

Fifty parts by weight of the β type oxytitanium phthalocyanine crystal 50 parts by weight obtained in Synthetic Example 1 was added into 1250 parts by weight of 95% conc. sulfuric acid cooled to −10° C. or lower. On this occasion, the compound was slowly added so that the inner temperature of the sulfuric acid solution did not exceed −5° C. After the addition was finished, the conc. sulfuric acid solution was stirred for 2 hours at a temperature of −5° C. or lower. After stirring, the conc. sulfuric acid solution was filtrated through a glass filter and insoluble matter was removed by filtration. Thereafter, the conc. sulfuric acid solution was poured into 12,500 parts by weight of ice water to thereby precipitate oxytitanium phthalocyanine, followed by stirring for 1 hour after pouring. After stirring, the solution was filtrated off and the resulting wet cake was again washed in 2500 parts by weight of water for 1 hour, followed by filtration. The washing operation was repeated until the ion conductivity of the filtrate reached 0.5 mS/m to thereby obtain 452 parts by weight of wet cake of low-crystalline oxytitanium phthalocyanine (content of oxytitanium phthalocyanine: 11.1% by weight). FIG. 7 shows a powder XRD spectrum of the resulting oxytitanium phthalocyanine crystal.

Examples 1 to 4, Comparative Synthetic Example 1

As a phthalocyanine crystal precursor, 33 parts by weight of wet cake of the low-crystalline oxytitanium phthalocyanine obtained in Synthetic Example 2 was added into 90 parts by weight of water, followed by stirring at room temperature for 30 minutes. Thereafter, 13 parts by weight of each of respective compounds shown in the right column of the following Table 2 was added thereto, followed by further stirring at room temperature for 1 hour. After stirring, water was separated and 80 parts by weight of methanol was added, followed by stirring and washing at room temperature for 1 hour. After washing, the product was filtrated off and 80 parts by weight of methanol was again added, followed by stirring and washing for 1 hour. Thereafter, it was filtrated off and was heated and dried in a vacuum drier to thereby obtain crystals consisting of oxytitanium phthalocyanine alone (hereinafter, they are optionally referred to as phthalocyanine crystals of Examples 1 to 4 and Comparative Synthetic Example 1). FIGS. 8 to 12 show powder XRD spectra of the phthalocyanine crystals of Examples 1 to 4 and Comparative Synthetic Example 1, respectively. As apparent from the powder XRD spectra of FIGS. 8 to 12, any of the phthalocyanine crystals of Examples 1 to 4 and Comparative Synthetic Example 1 had a main diffraction peak at Bragg angle (2θ±0.2°) of 27.2° toward CuKα characteristic X-ray (wavelength 1.541 angstrom).

TABLE 2

|  | Compound to be brought into contact with phthalocyanine crystal precursor |
|---|---|
| Example 1 | 3-chlorobenzaldehyde(*) |
| Example 2 | m-anisbenzaldehyde(*) |
| Example 3 | 2-fluorobenzaldehyde(*) |
| Example 4 | 1-naphthobenzaldehyde(*) |
| Comparative Synthetic Example 1 | o-dichlorobenzene |

(*)aromatic aldehyde compound

Synthetic Example 3 (low-phthalocyanine crystal composition)

Figure 13:
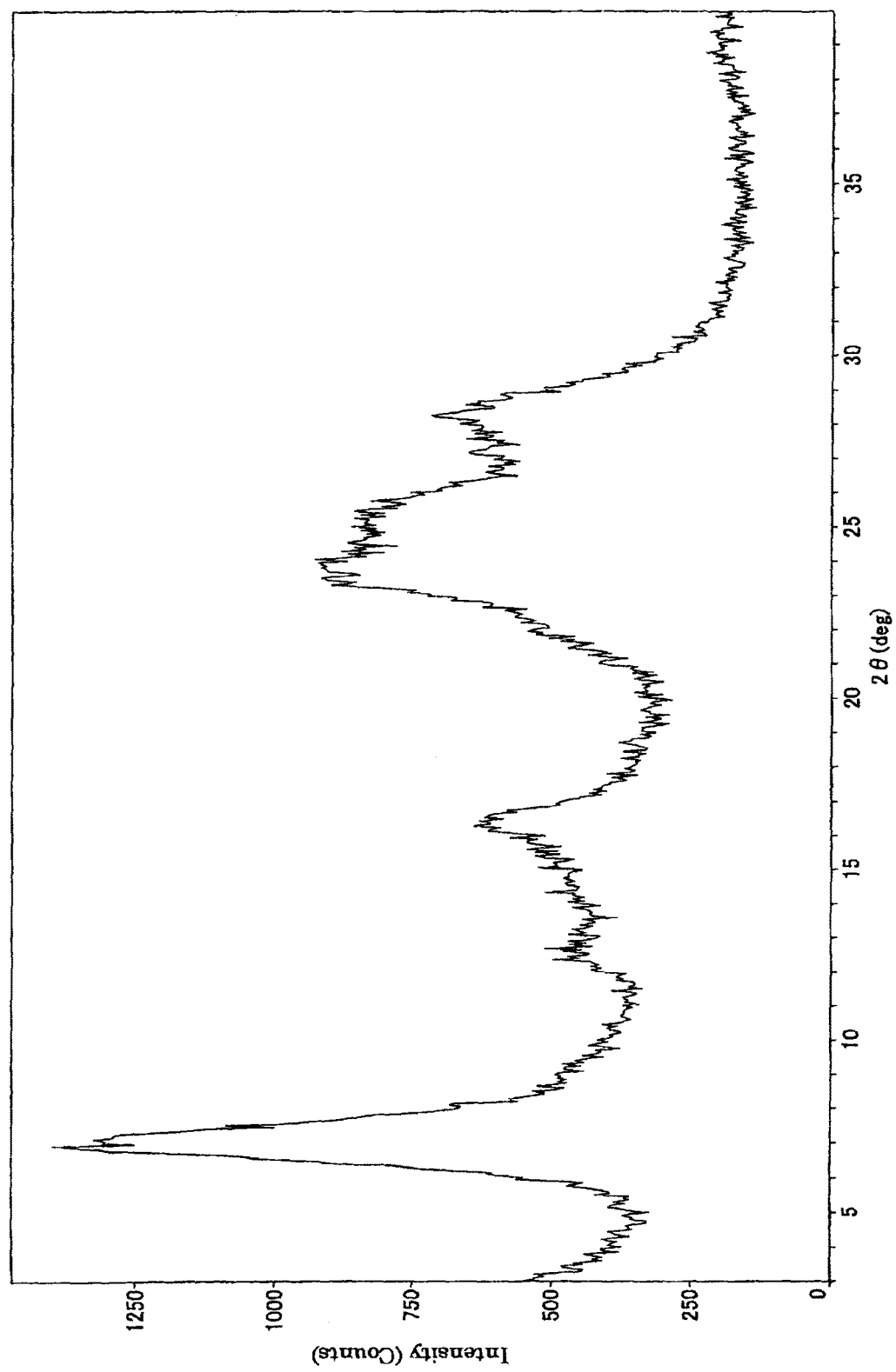
FIG. 13 is a powder XRD spectrum of the low-phthalocyanine crystal (a composition containing oxytitanium phthalocyanine and metal-free phthalocyanine) obtained in Synthetic Example 3.
Figure 14:
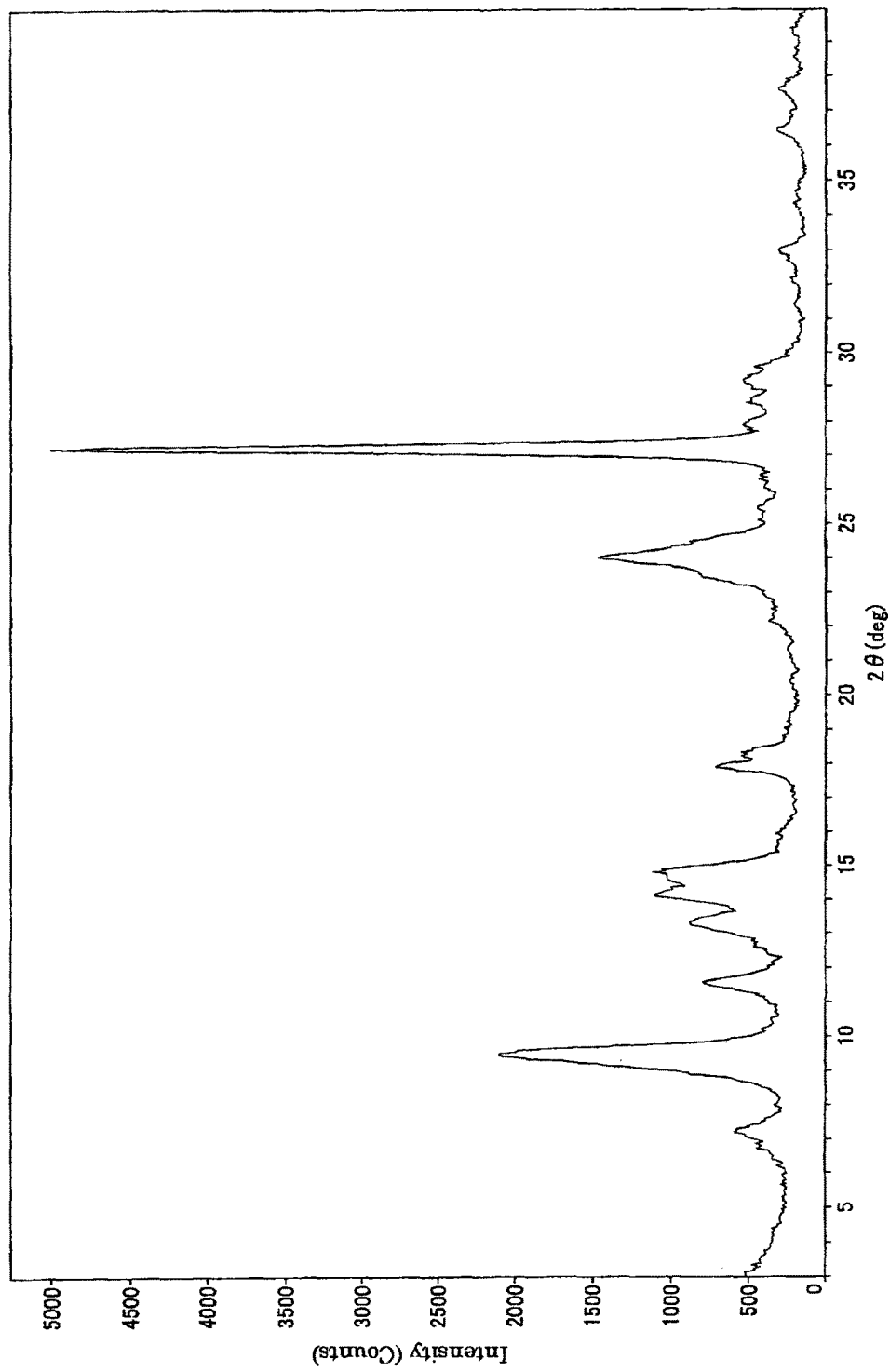
FIG. 14 is a powder XRD spectrum of the phthalocyanine crystal (a mixed crystal of oxytitanium phthalocyanine and metal-free phthalocyanine) obtained in Example 5.
Figure 15:
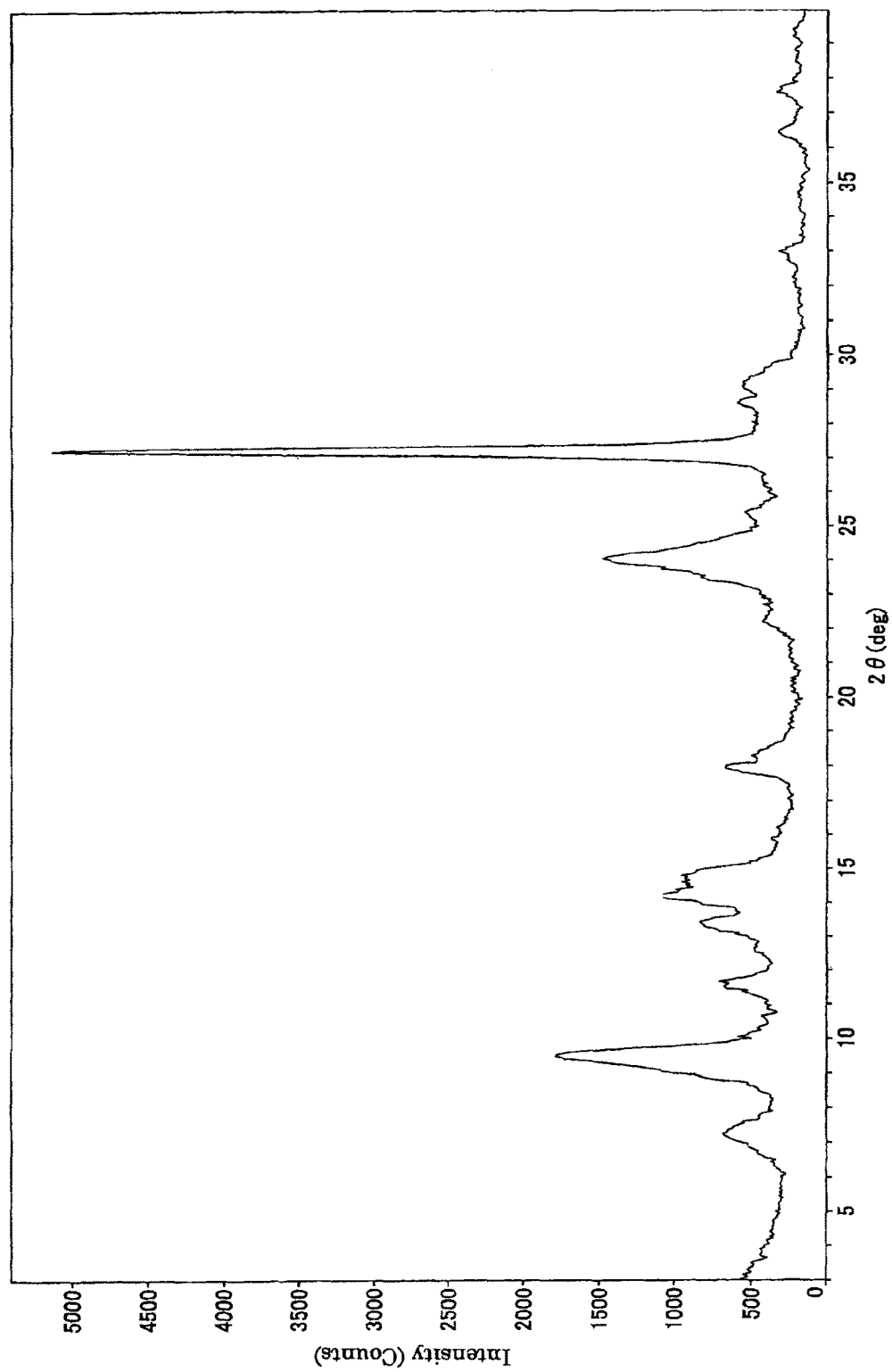
FIG. 15 is a powder XRD spectrum of the phthalocyanine crystal (a mixed crystal of oxytitanium phthalocyanine and metal-free phthalocyanine) obtained in Example 6.
Figure 16:
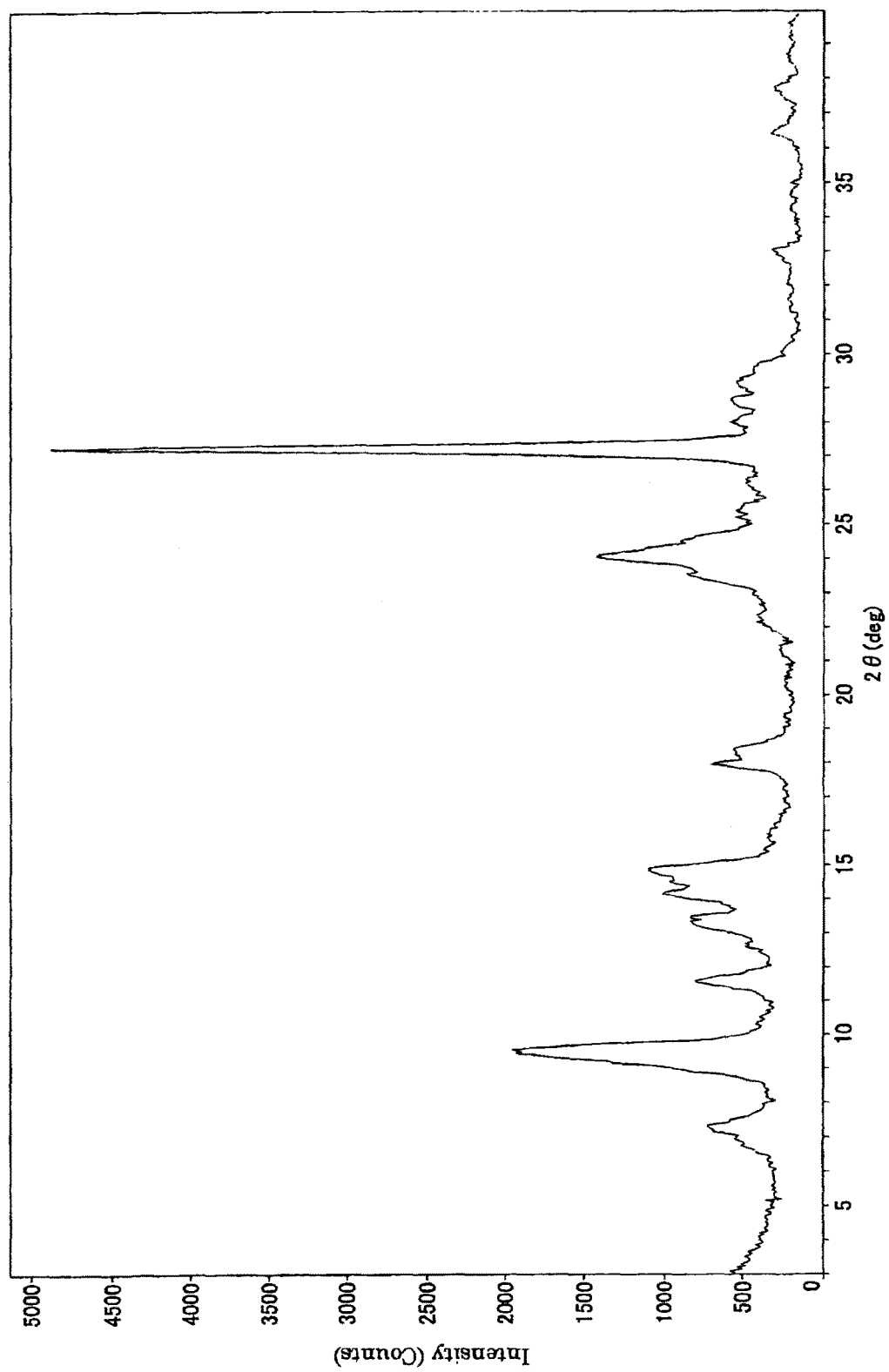
FIG. 16 is a powder XRD spectrum of the phthalocyanine crystal (a mixed crystal of oxytitanium phthalocyanine and metal-free phthalocyanine) obtained in Example 7.
Figure 17:
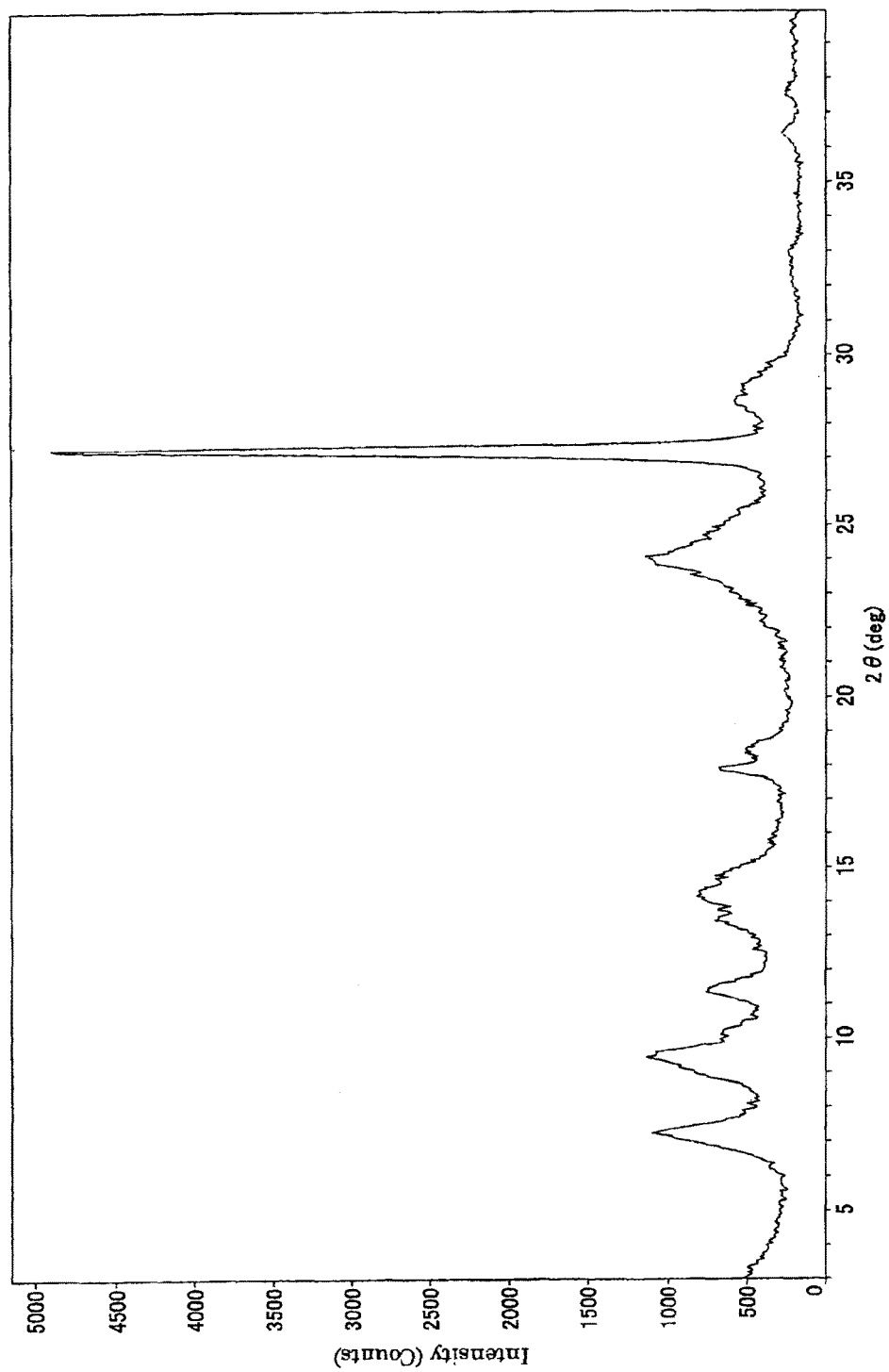
FIG. 17 is a powder XRD spectrum of the phthalocyanine crystal (a mixed crystal of oxytitanium phthalocyanine and metal-free phthalocyanine) obtained in Example 8.
Figure 18:
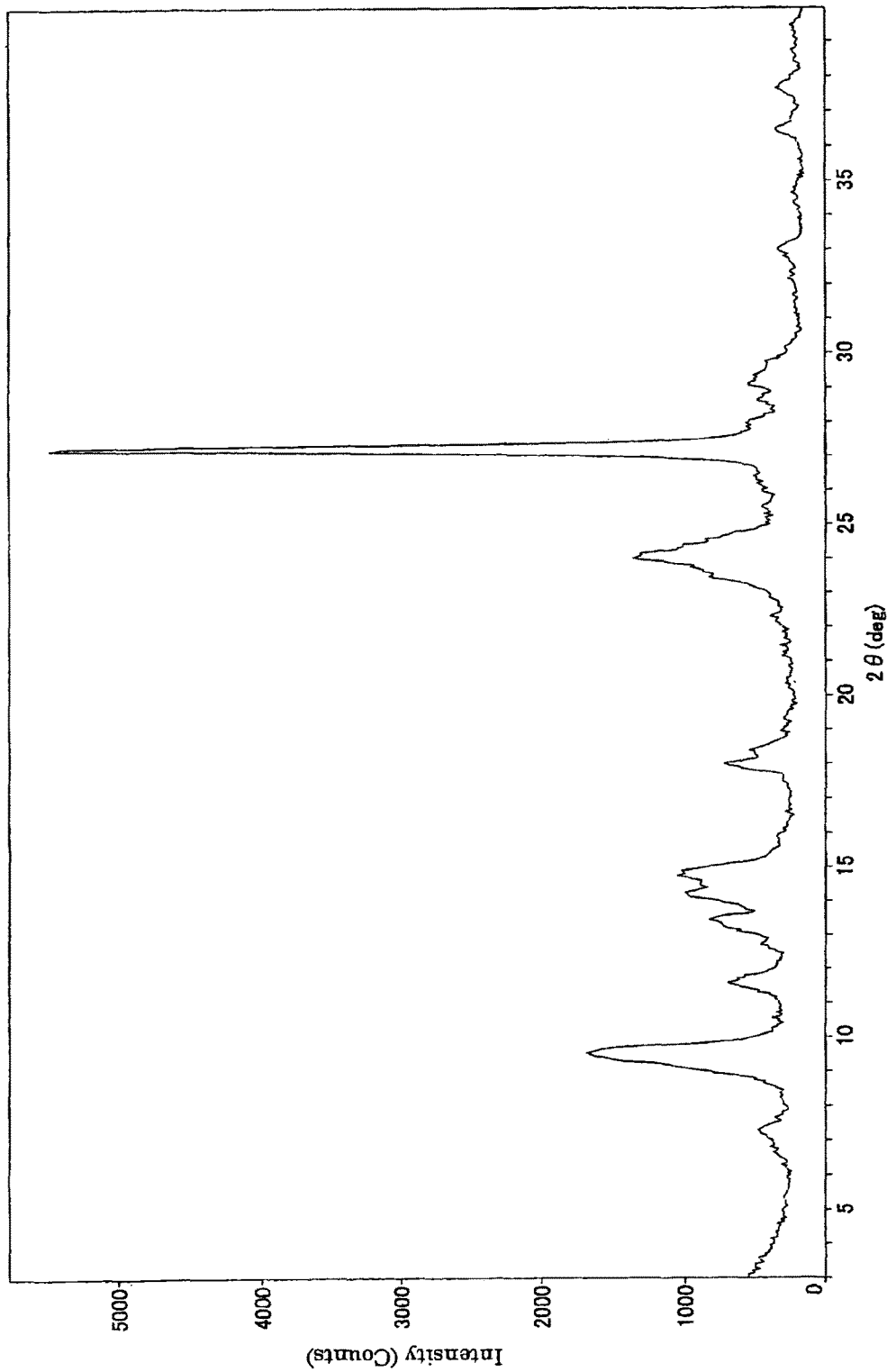
FIG. 18 is a powder XRD spectrum of the phthalocyanine crystal (a mixed crystal of oxytitanium phthalocyanine and metal-free phthalocyanine) obtained in Comparative Synthetic Example 2.
Figure 19:
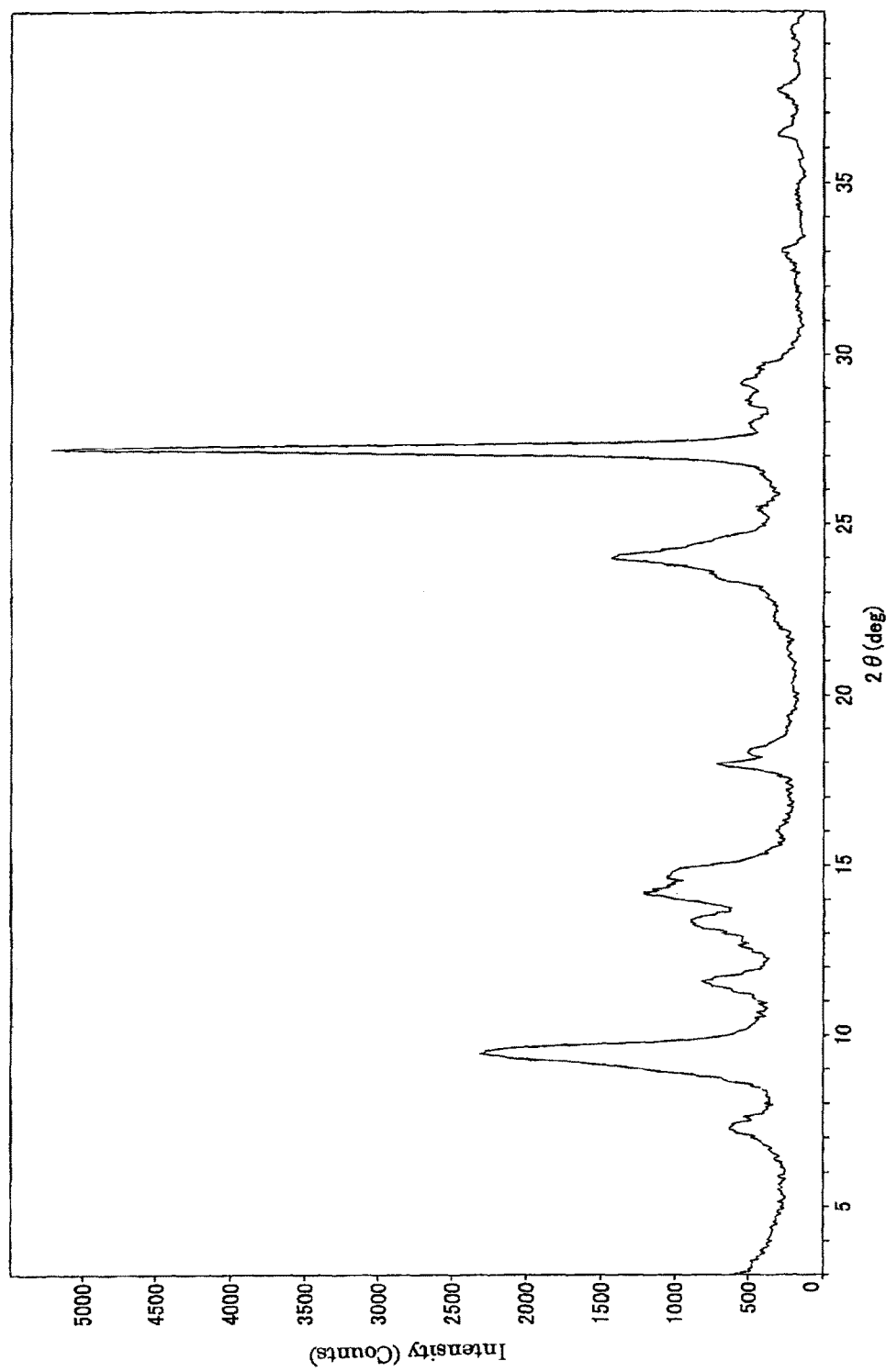
FIG. 19 is a powder XRD spectrum of the phthalocyanine crystal (a crystal of oxytitanium phthalocyanine alone) obtained in Example 17.
Figure 20:
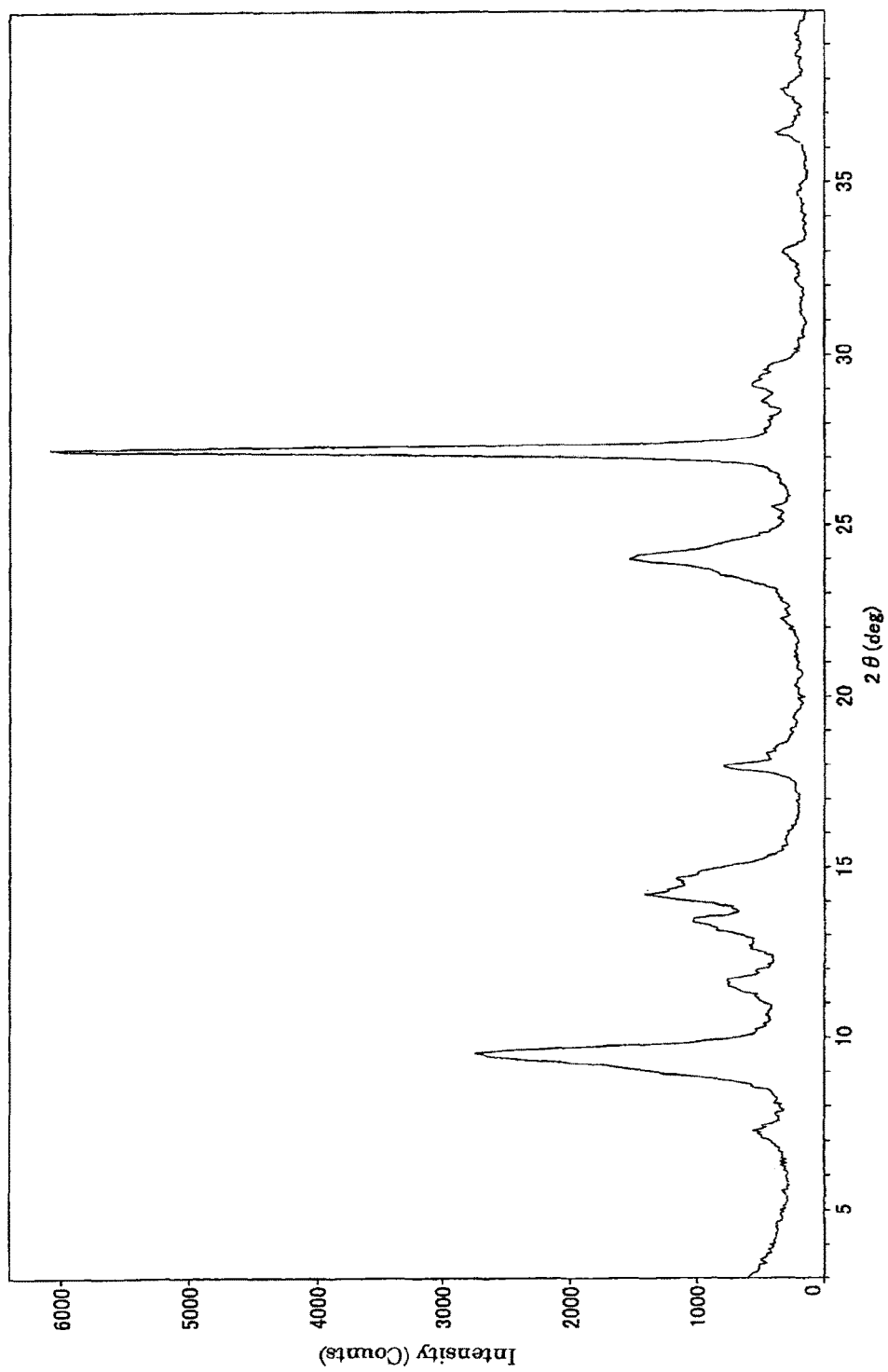
FIG. 20 is a powder XRD spectrum of the phthalocyanine crystal (a crystal of oxytitanium phthalocyanine alone) obtained in Example 18.
Figure 21:
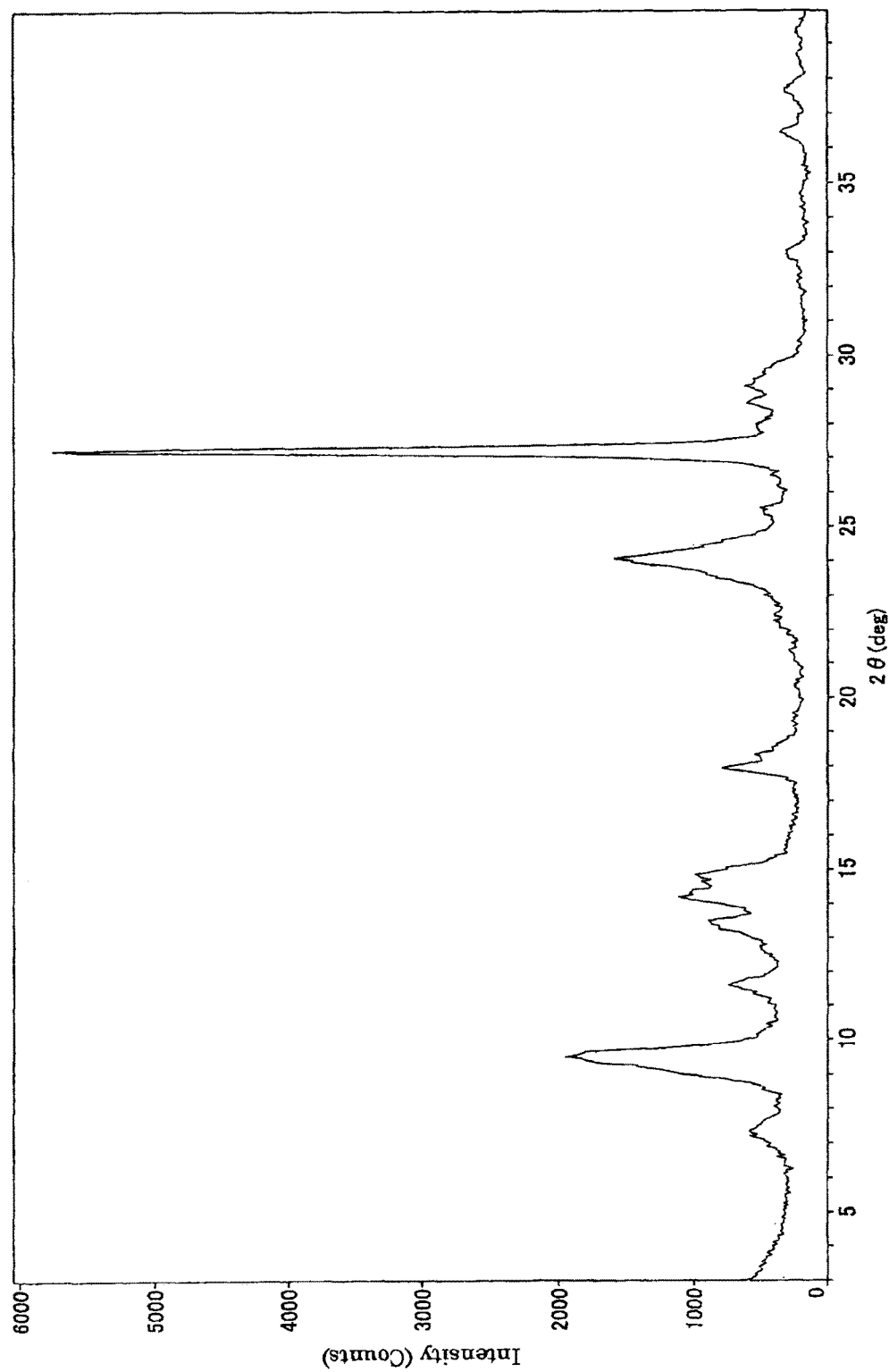
FIG. 21 is a powder XRD spectrum of the phthalocyanine crystal (a crystal of oxytitanium phthalocyanine alone) obtained in Example 19.
Figure 22:
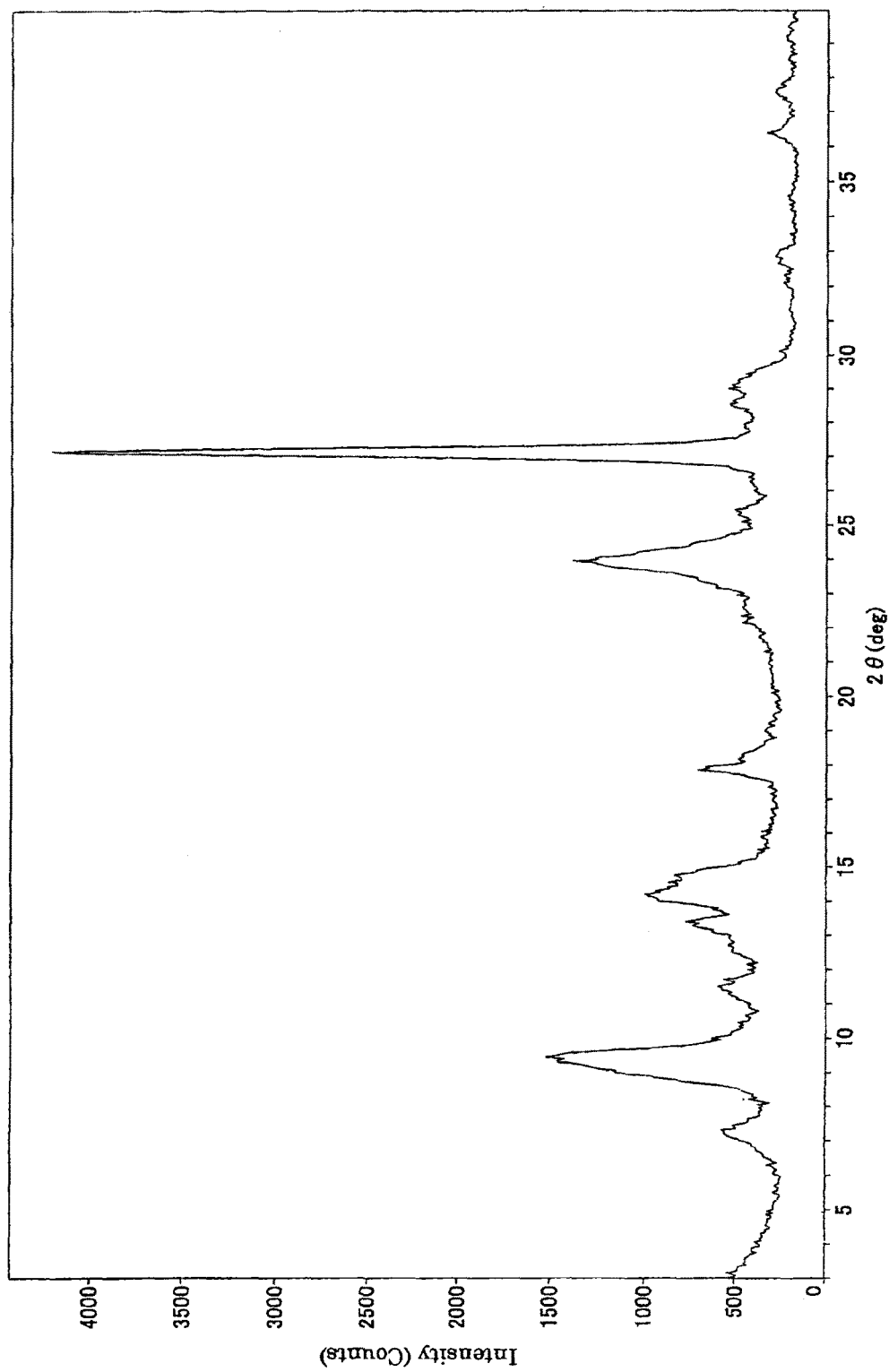
FIG. 22 is a powder XRD spectrum of the phthalocyanine crystal (a crystal of oxytitanium phthalocyanine alone) obtained in Example 20.
Figure 23:
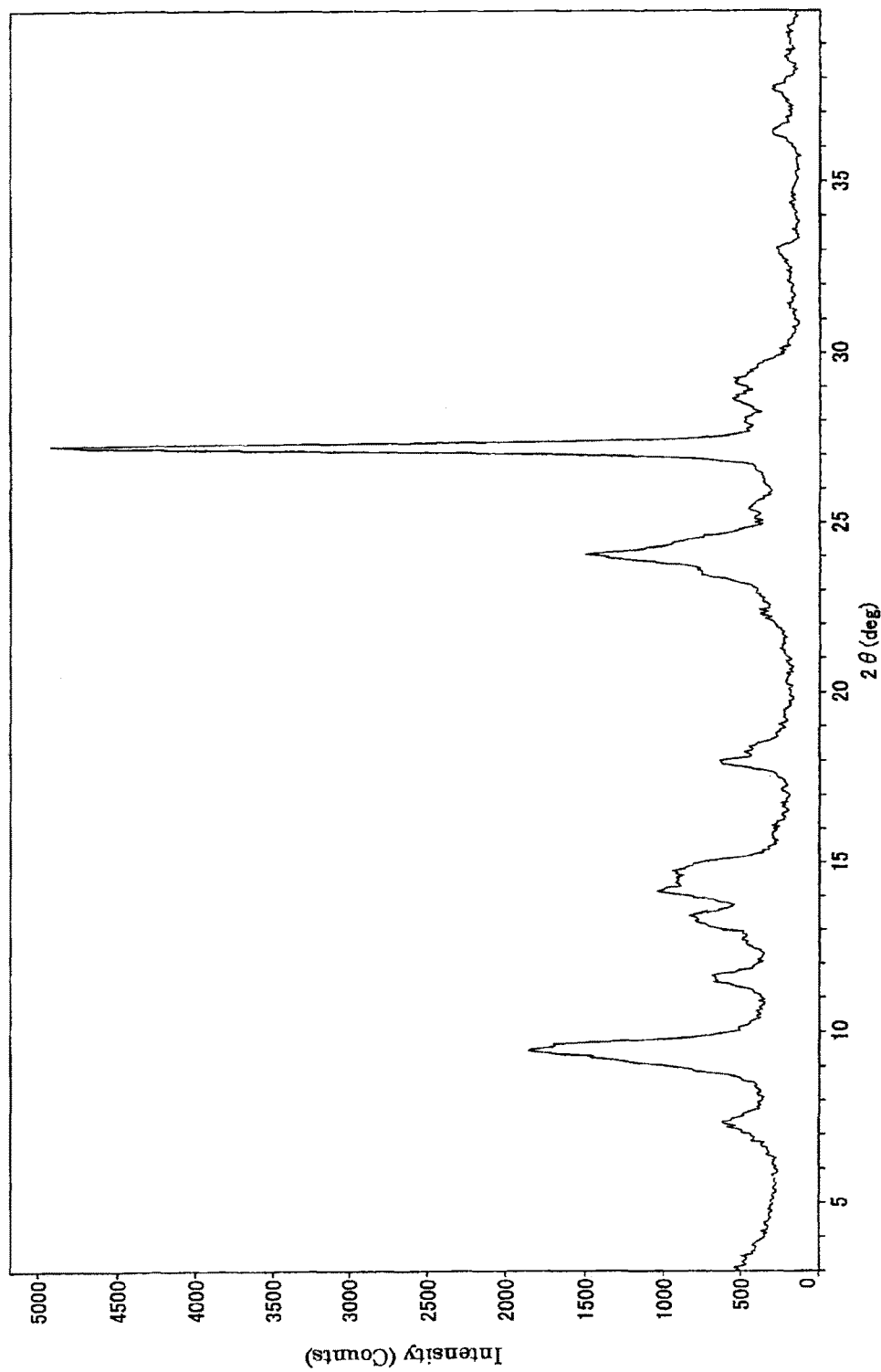
FIG. 23 is a powder XRD spectrum of the phthalocyanine crystal (a crystal of oxytitanium phthalocyanine alone) obtained in Example 21.
Figure 24:
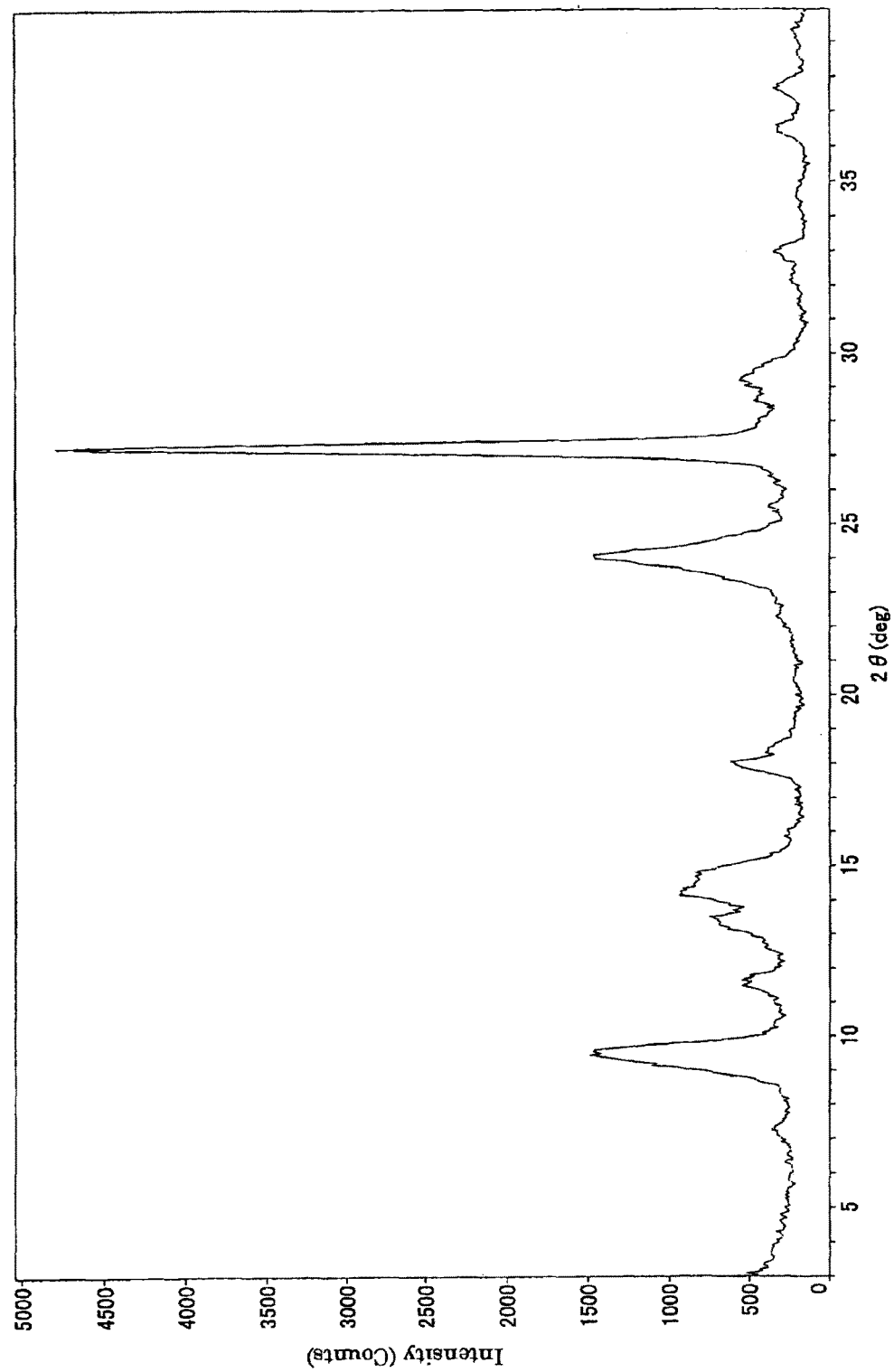
FIG. 24 is a powder XRD spectrum of the phthalocyanine crystal (a crystal of oxytitanium phthalocyanine alone) obtained in Example 22.
Figure 25:
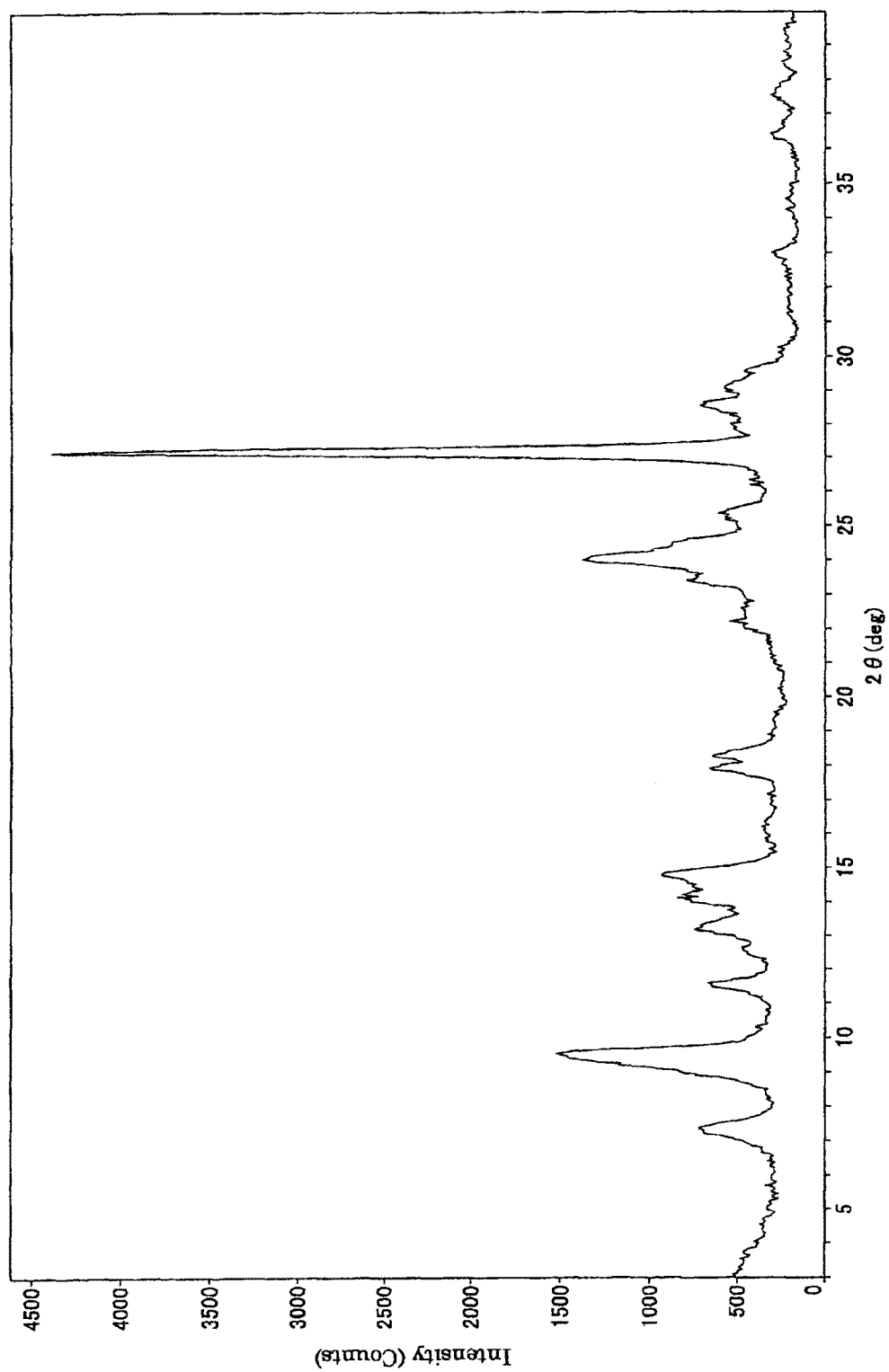
FIG. 25 is a powder XRD spectrum of the phthalocyanine crystal (a crystal of oxytitanium phthalocyanine alone) obtained in Comparative Synthetic Example 3.
Figure 26:
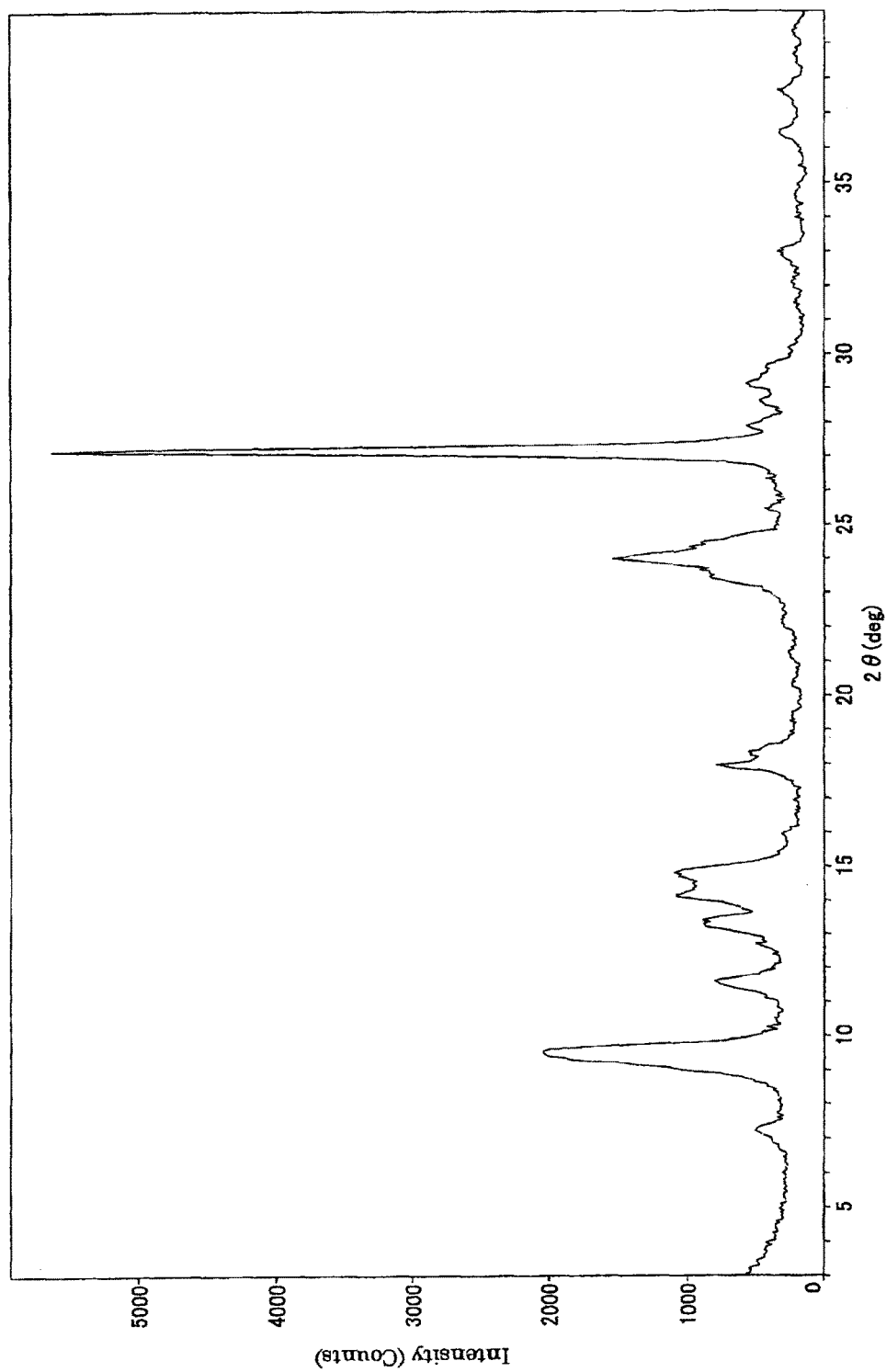
FIG. 26 is a powder XRD spectrum of the phthalocyanine crystal (a crystal of oxytitanium phthalocyanine alone) obtained in Comparative Synthetic Example 4.
Figure 27:
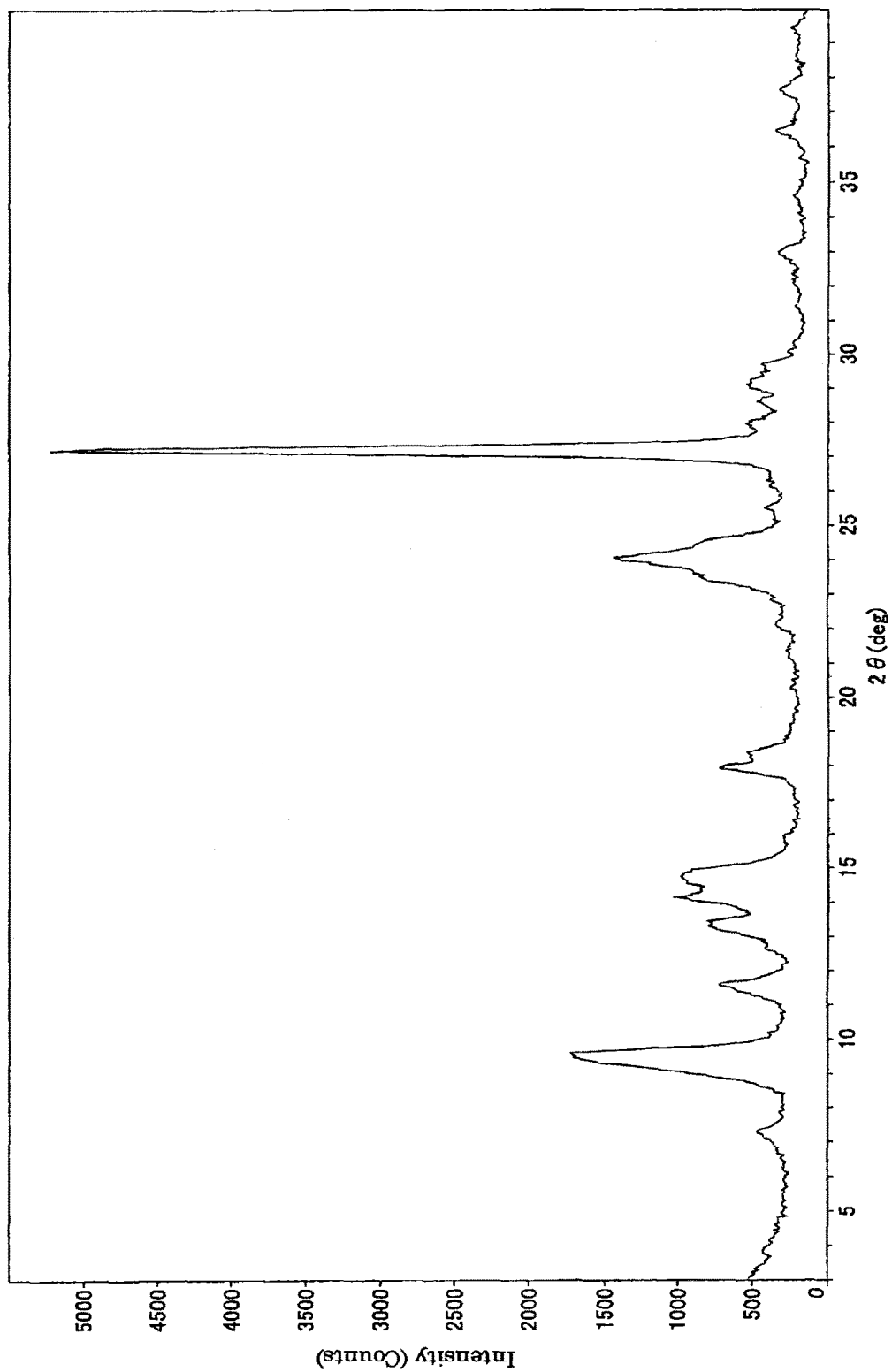
FIG. 27 is a powder XRD spectrum of the phthalocyanine crystal (a crystal of oxytitanium phthalocyanine alone) obtained in Comparative Synthetic Example 5.
Figure 28:
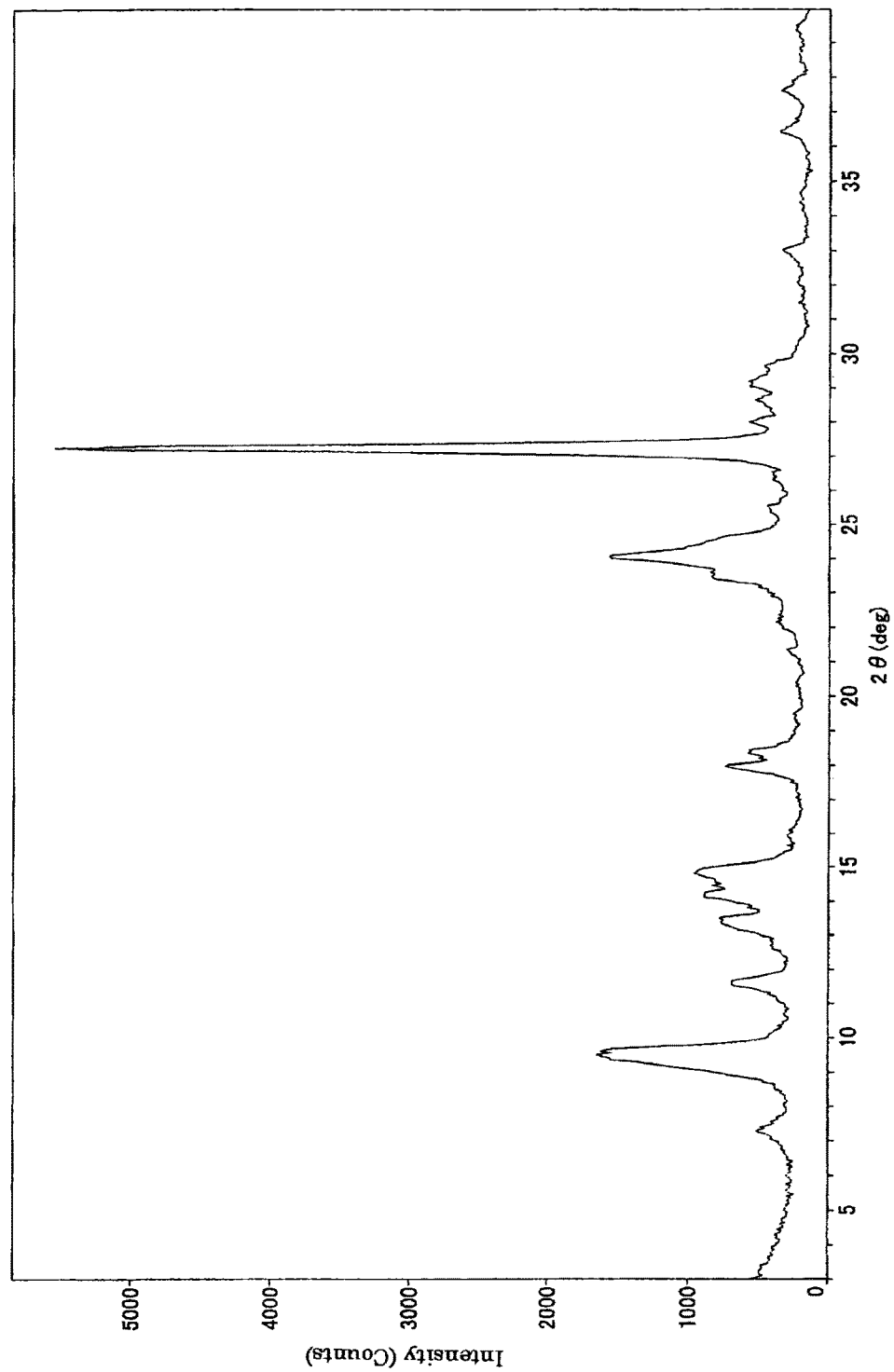
FIG. 28 is a powder XRD spectrum of the phthalocyanine crystal (a crystal of oxytitanium phthalocyanine alone) obtained in Comparative Synthetic Example 6.
Figure 29:
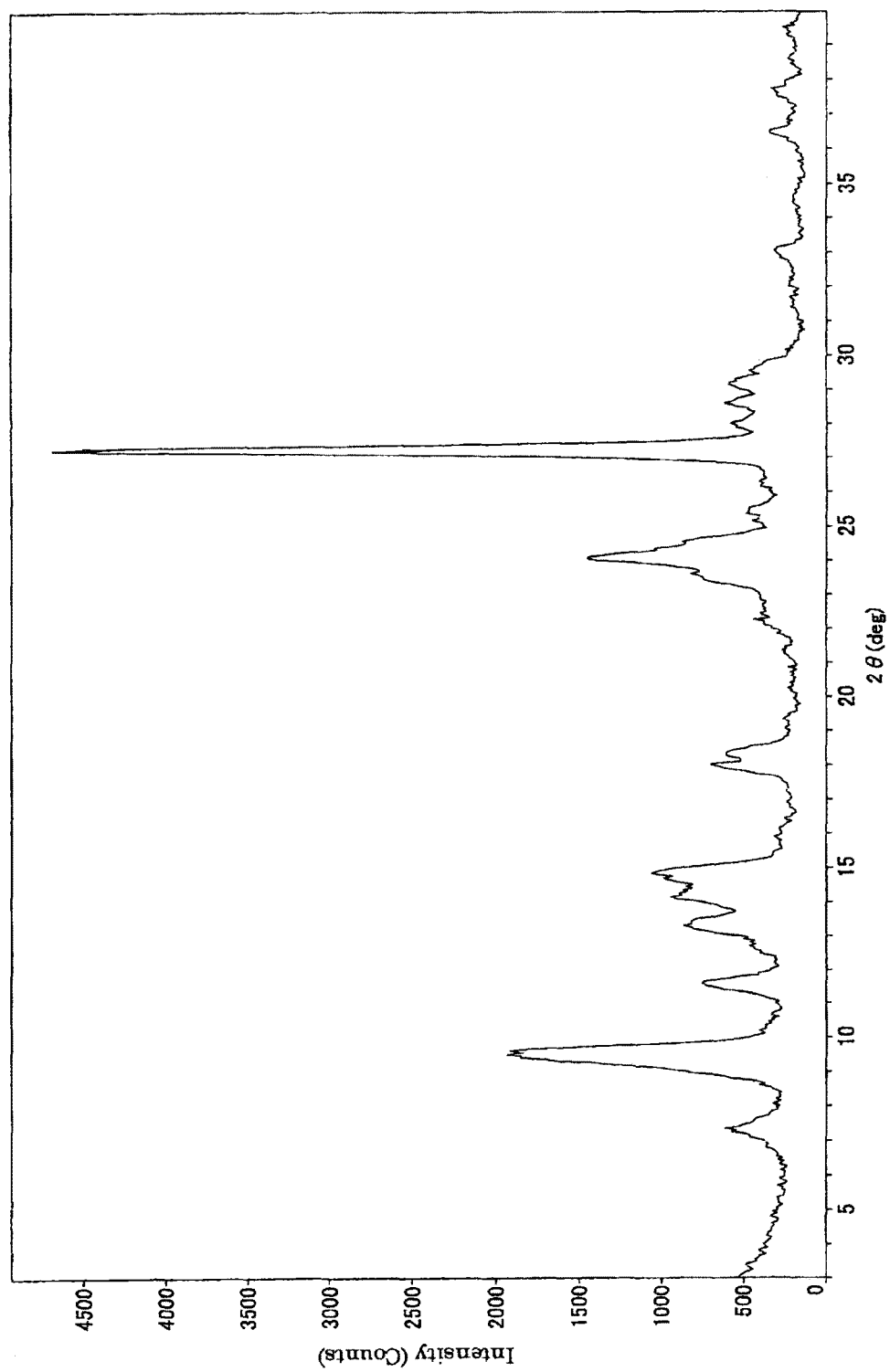
FIG. 29 is a powder XRD spectrum of the phthalocyanine crystal (a crystal of oxytitanium phthalocyanine alone) obtained in Comparative Synthetic Example 7.
Figure 30:
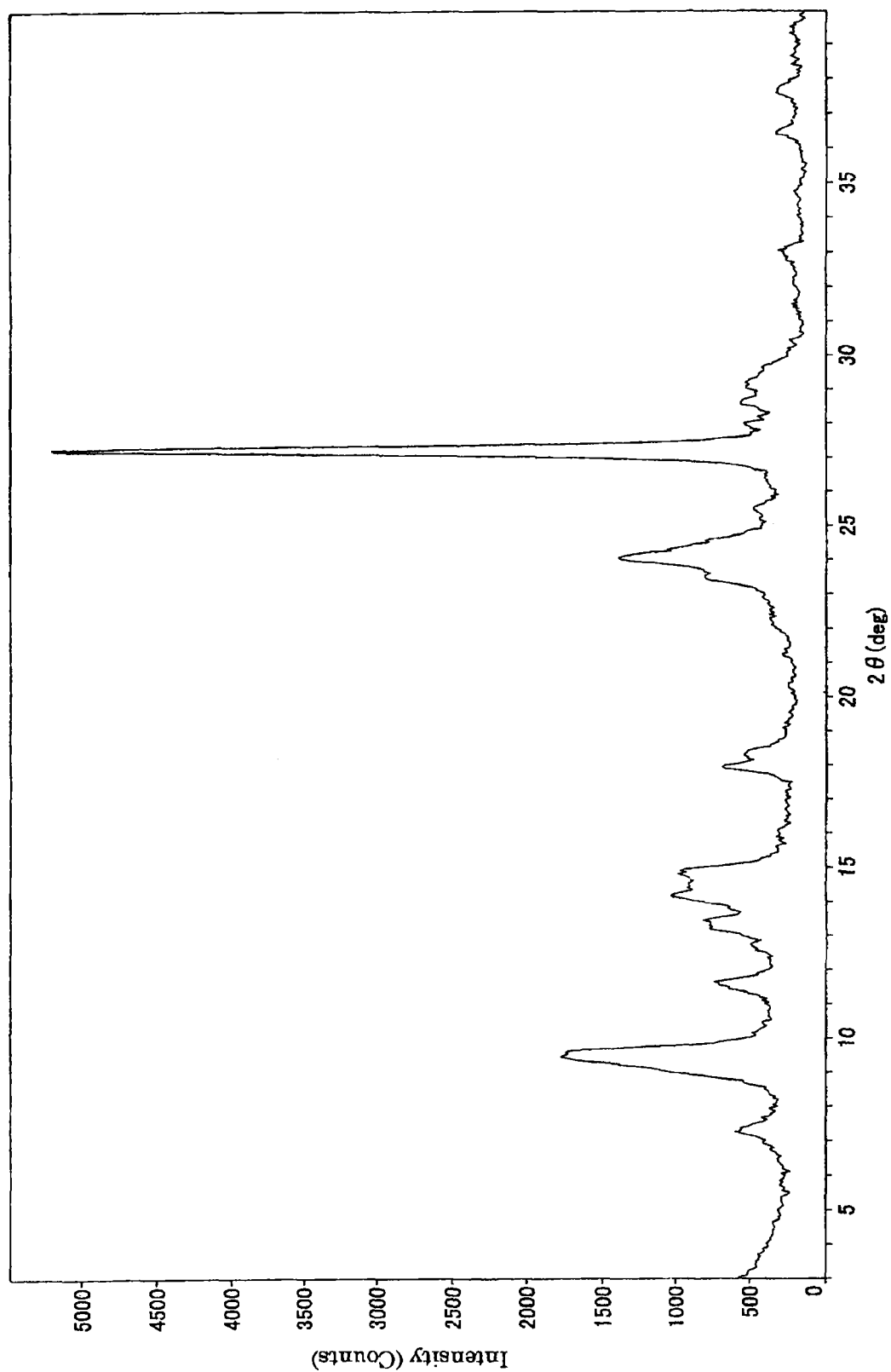
FIG. 30 is a powder XRD spectrum of the phthalocyanine crystal (a crystal of oxytitanium phthalocyanine alone) obtained in Comparative Synthetic Example 8.
Figure 31:
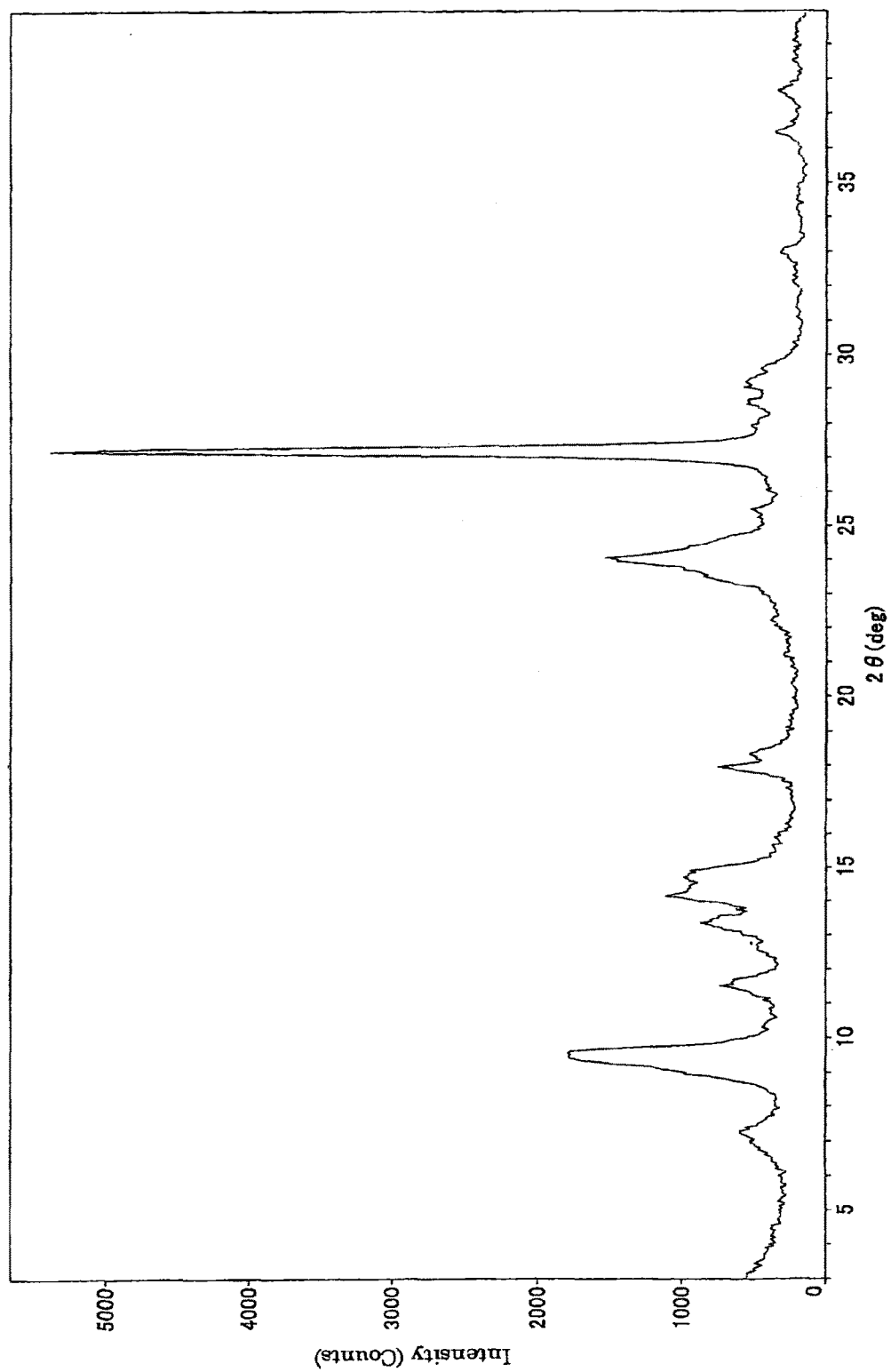
FIG. 31 is a powder XRD spectrum of the phthalocyanine crystal (a crystal of oxytitanium phthalocyanine alone) obtained in Example 23.
Figure 32:
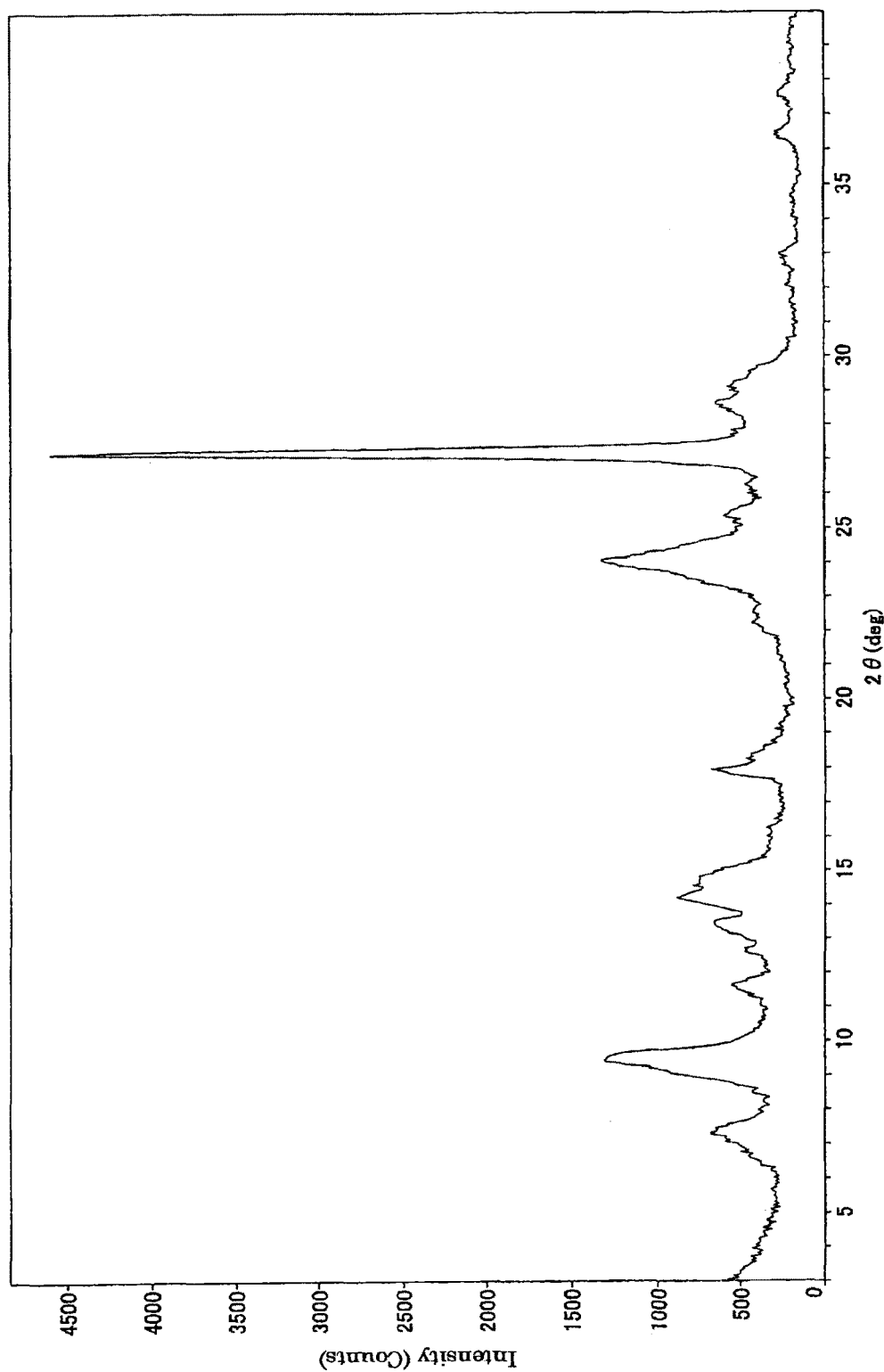
FIG. 32 is a powder XRD spectrum of the phthalocyanine crystal (a mixed crystal of oxytitanium phthalocyanine and metal-free phthalocyanine) obtained in Example 24.
Figure 33:
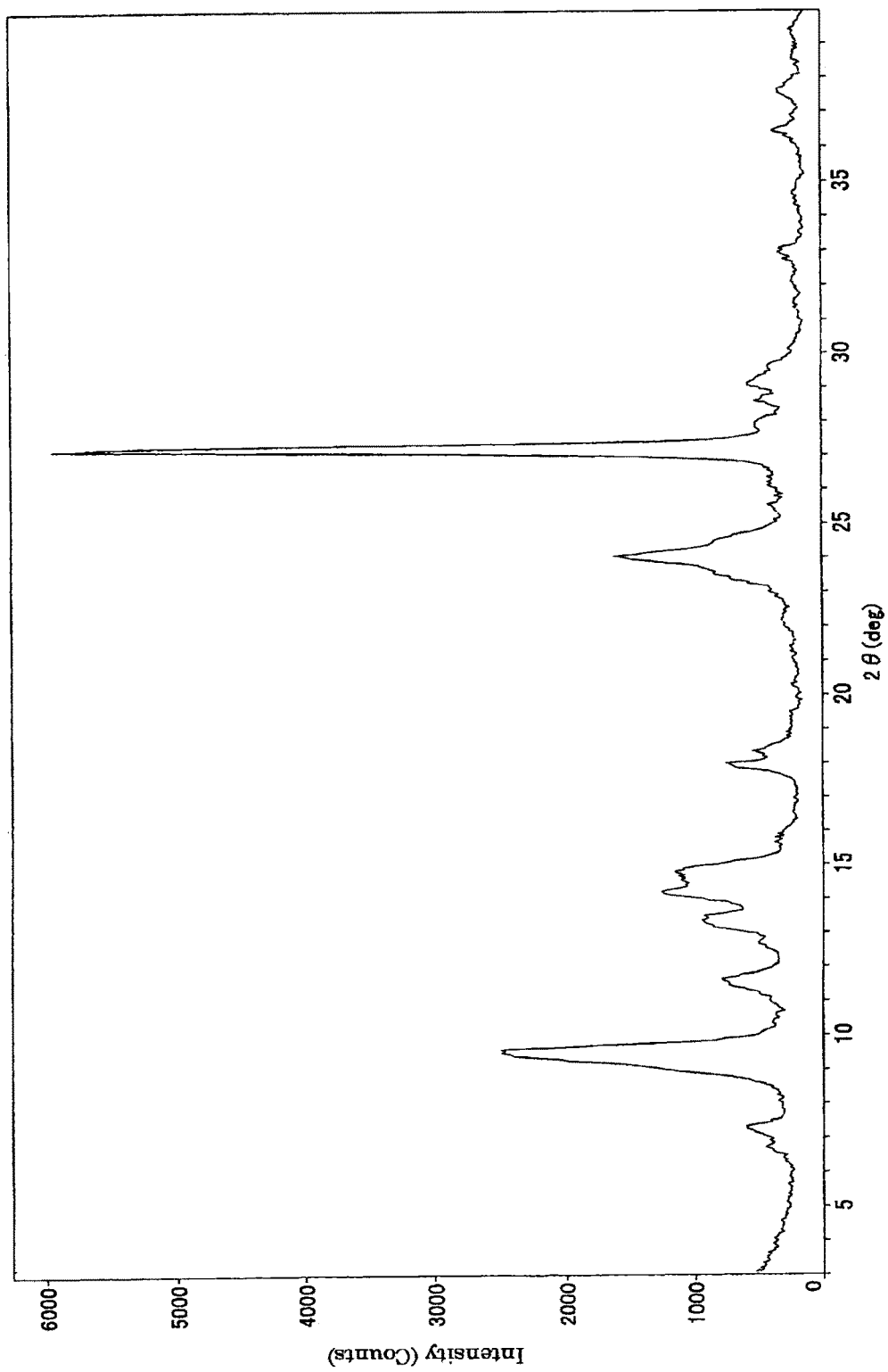
FIG. 33 is a powder XRD spectrum of the phthalocyanine crystal (a mixed crystal of oxytitanium phthalocyanine and metal-free phthalocyanine) obtained in Example 25.
Figure 34:
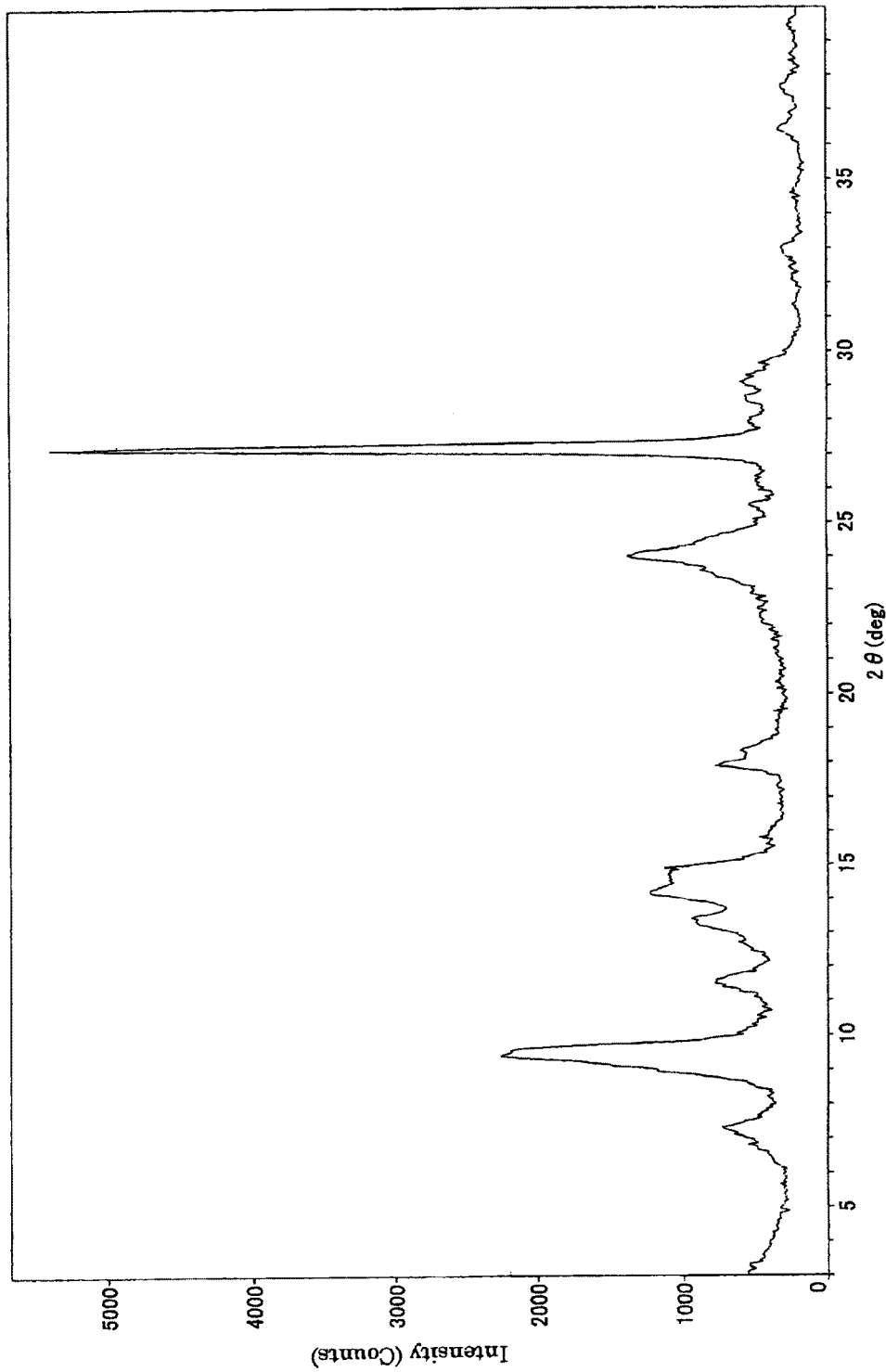
FIG. 34 is a powder XRD spectrum of the phthalocyanine crystal (a mixed crystal of oxytitanium phthalocyanine and metal-free phthalocyanine) obtained in Comparative Synthetic Example 9.
Figure 35:
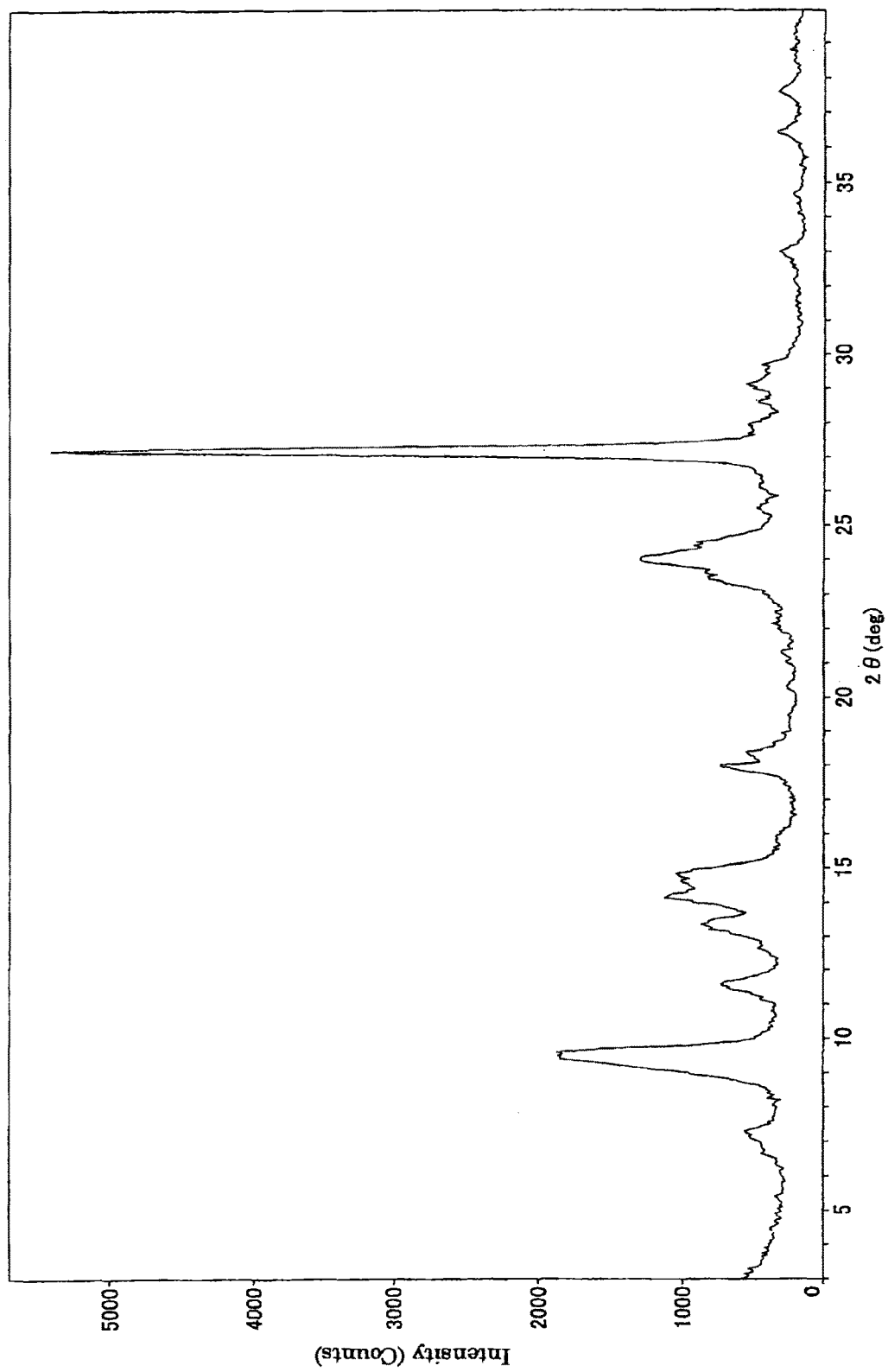
FIG. 35 is a powder XRD spectrum of the phthalocyanine crystal (a mixed crystal of oxytitanium phthalocyanine and metal-free phthalocyanine) obtained in Comparative Synthetic Example 10.
Figure 36:
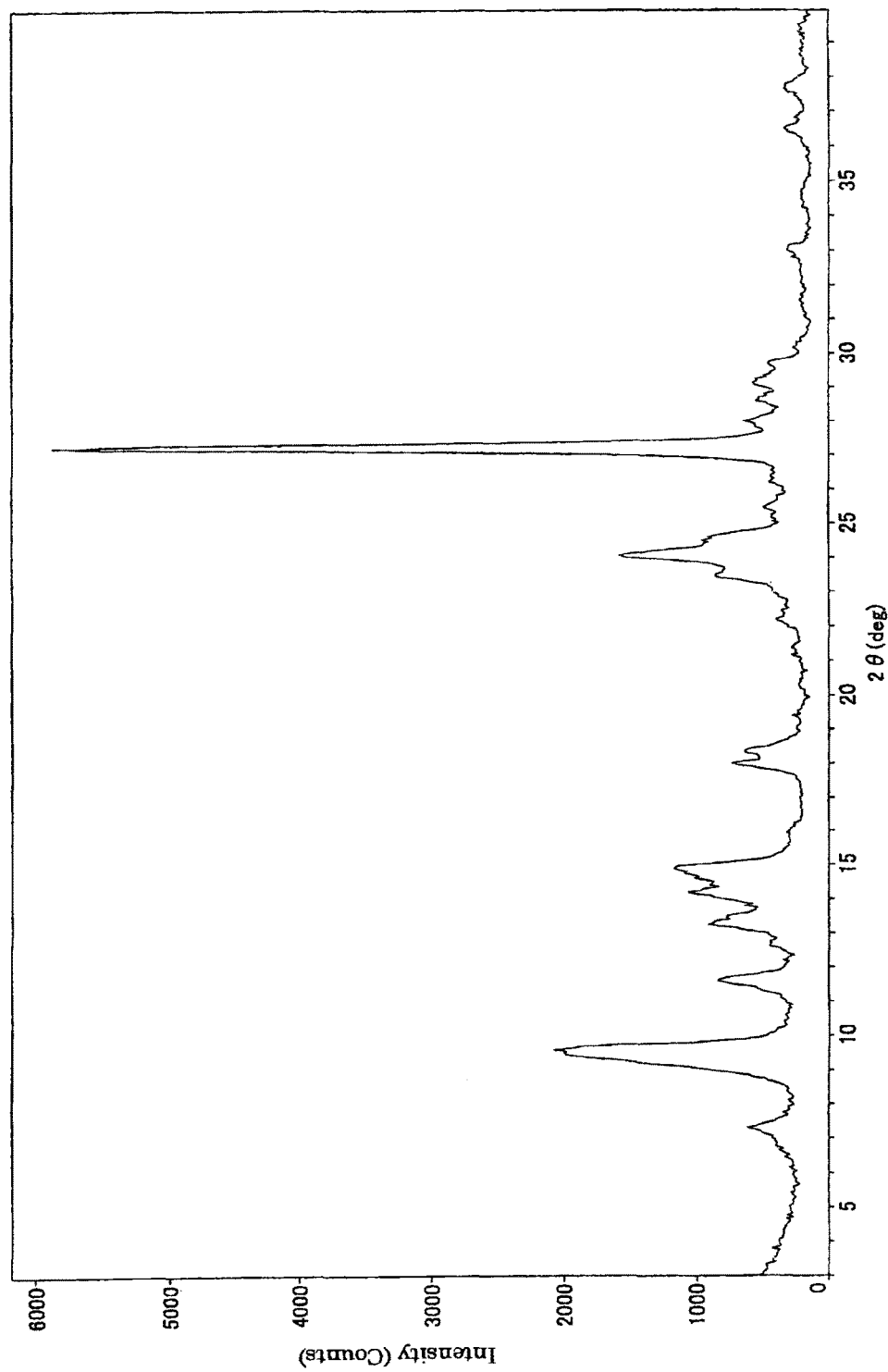
FIG. 36 is a powder XRD spectrum of the phthalocyanine crystal (a mixed crystal of oxytitanium phthalocyanine and metal-free phthalocyanine) obtained in Comparative Synthetic Example 11.
Figure 37:
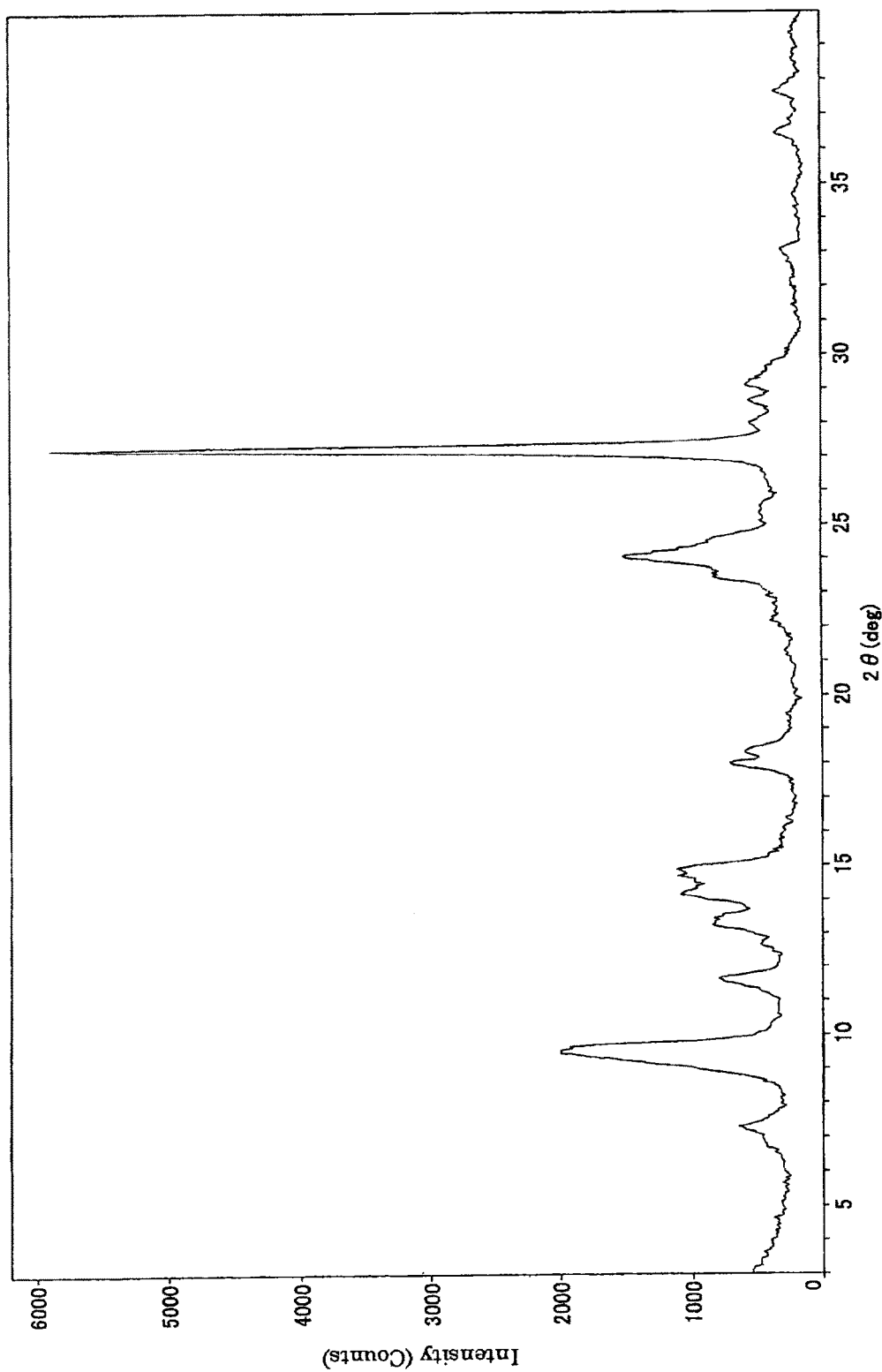
FIG. 37 is a powder XRD spectrum of the phthalocyanine crystal (a mixed crystal of oxytitanium phthalocyanine and metal-free phthalocyanine) obtained in Comparative Synthetic Example 12.
Figure 38:
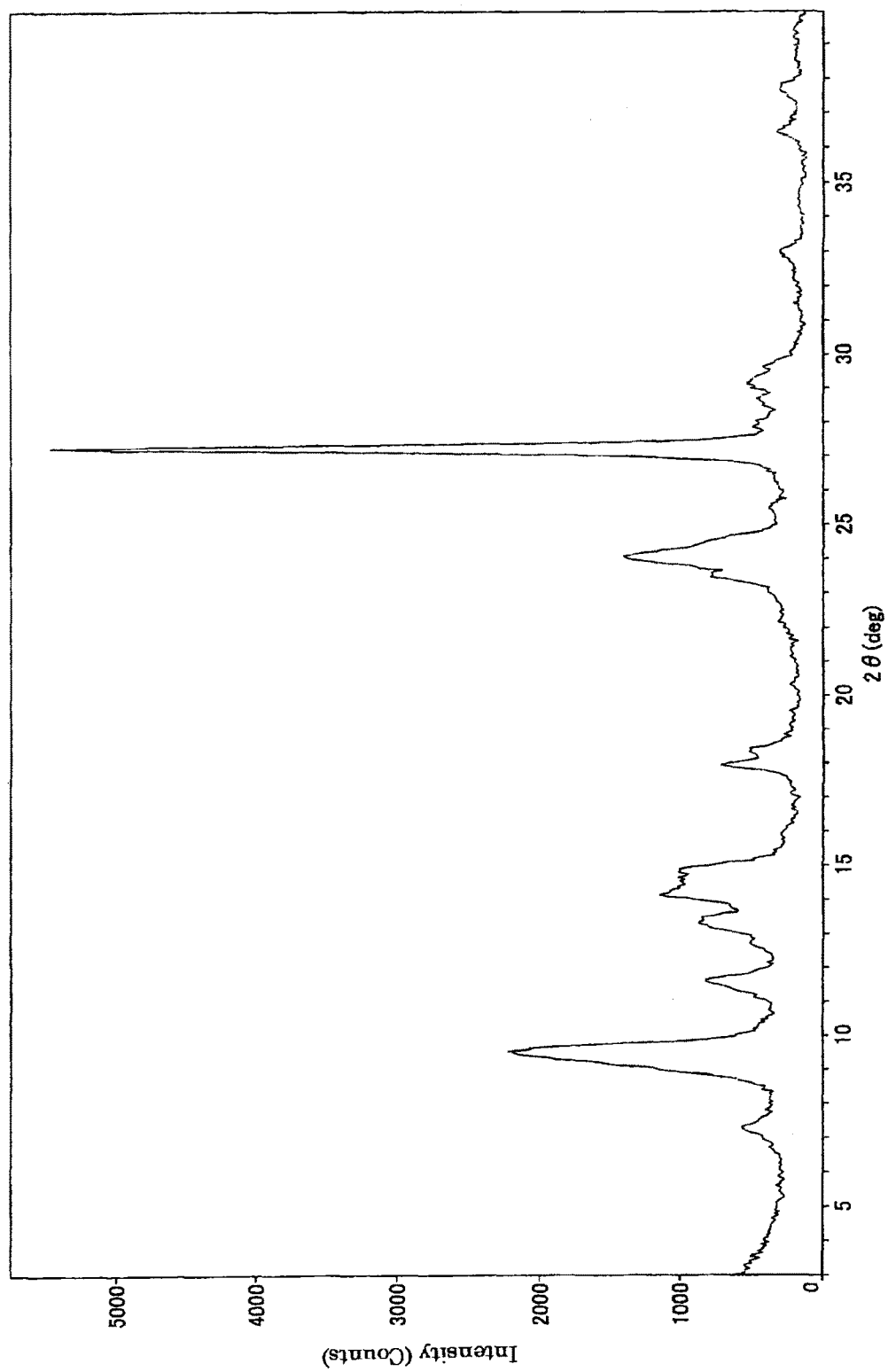
FIG. 38 is a powder XRD spectrum of the phthalocyanine crystal (a crystal of oxytitanium phthalocyanine alone) obtained in Example 35.
Figure 39:
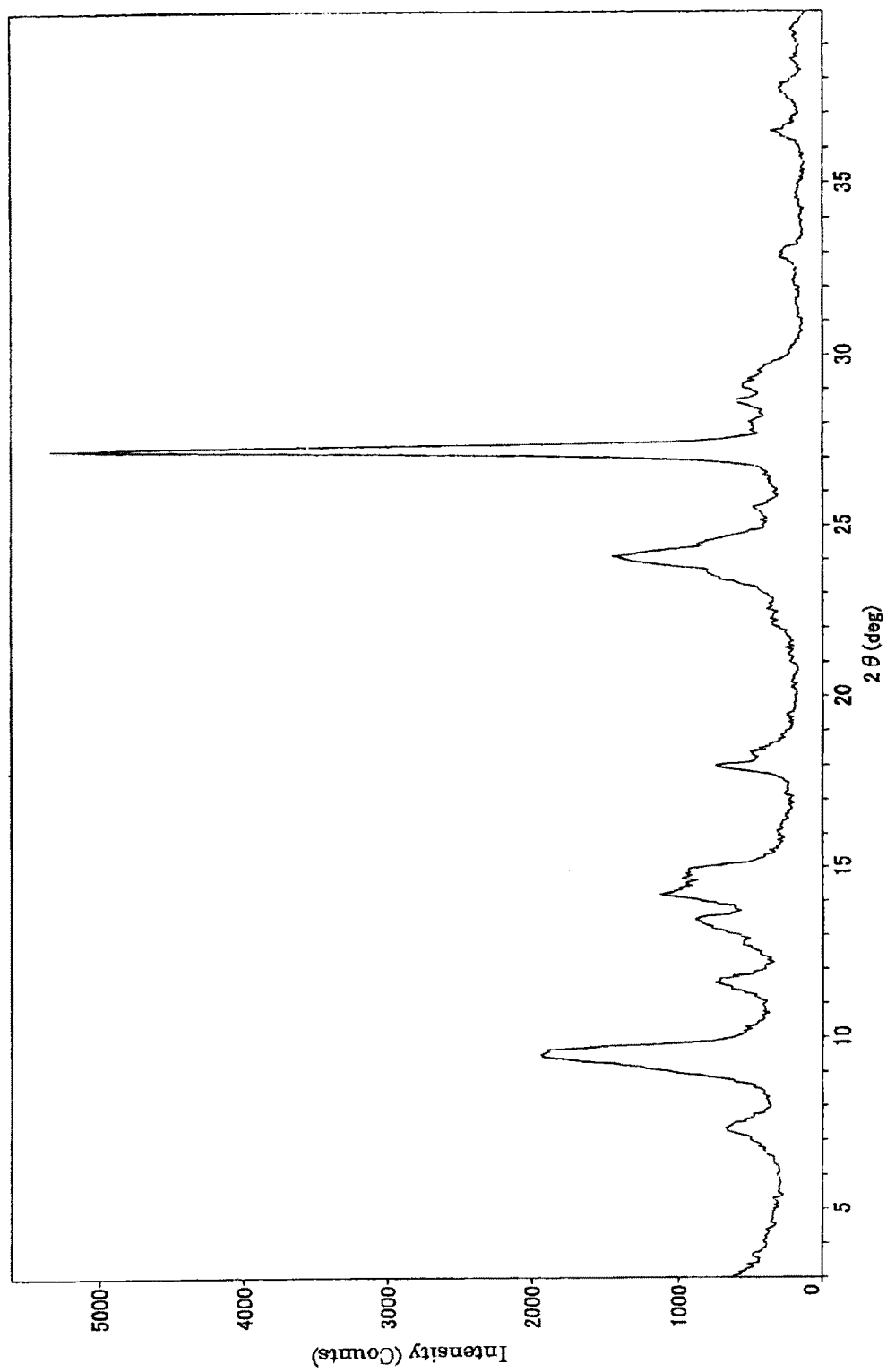
FIG. 39 is a powder XRD spectrum of the phthalocyanine crystal (a crystal of oxytitanium phthalocyanine alone) obtained in Example 64.
Figure 40:
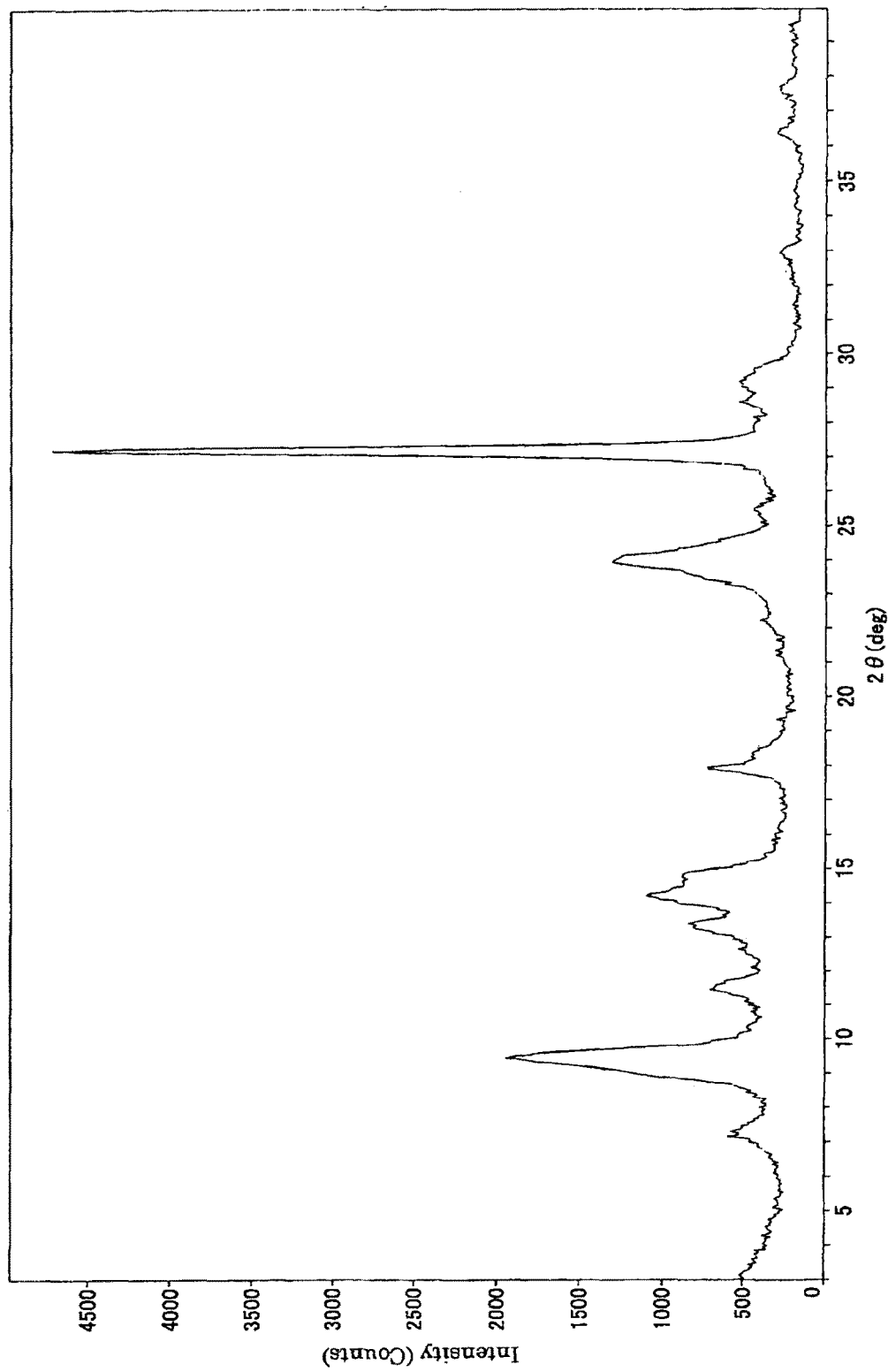
FIG. 40 is a powder XRD spectrum of the phthalocyanine crystal (a crystal of oxytitanium phthalocyanine alone) obtained in Example 66.
Figure 41:
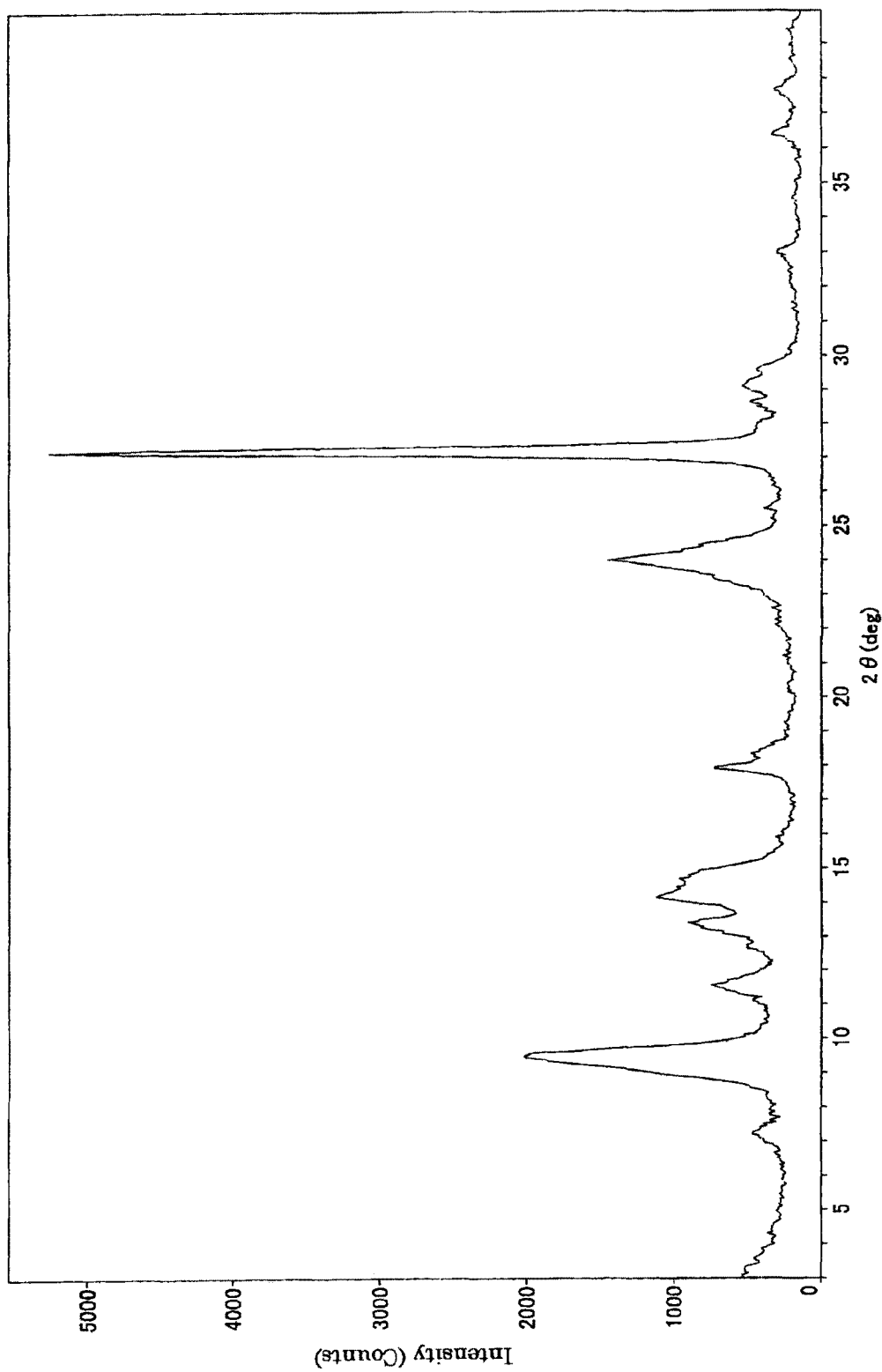
FIG. 41 is a powder XRD spectrum of the phthalocyanine crystal (a crystal of oxytitanium phthalocyanine alone) obtained in Example 67.
Figure 42:
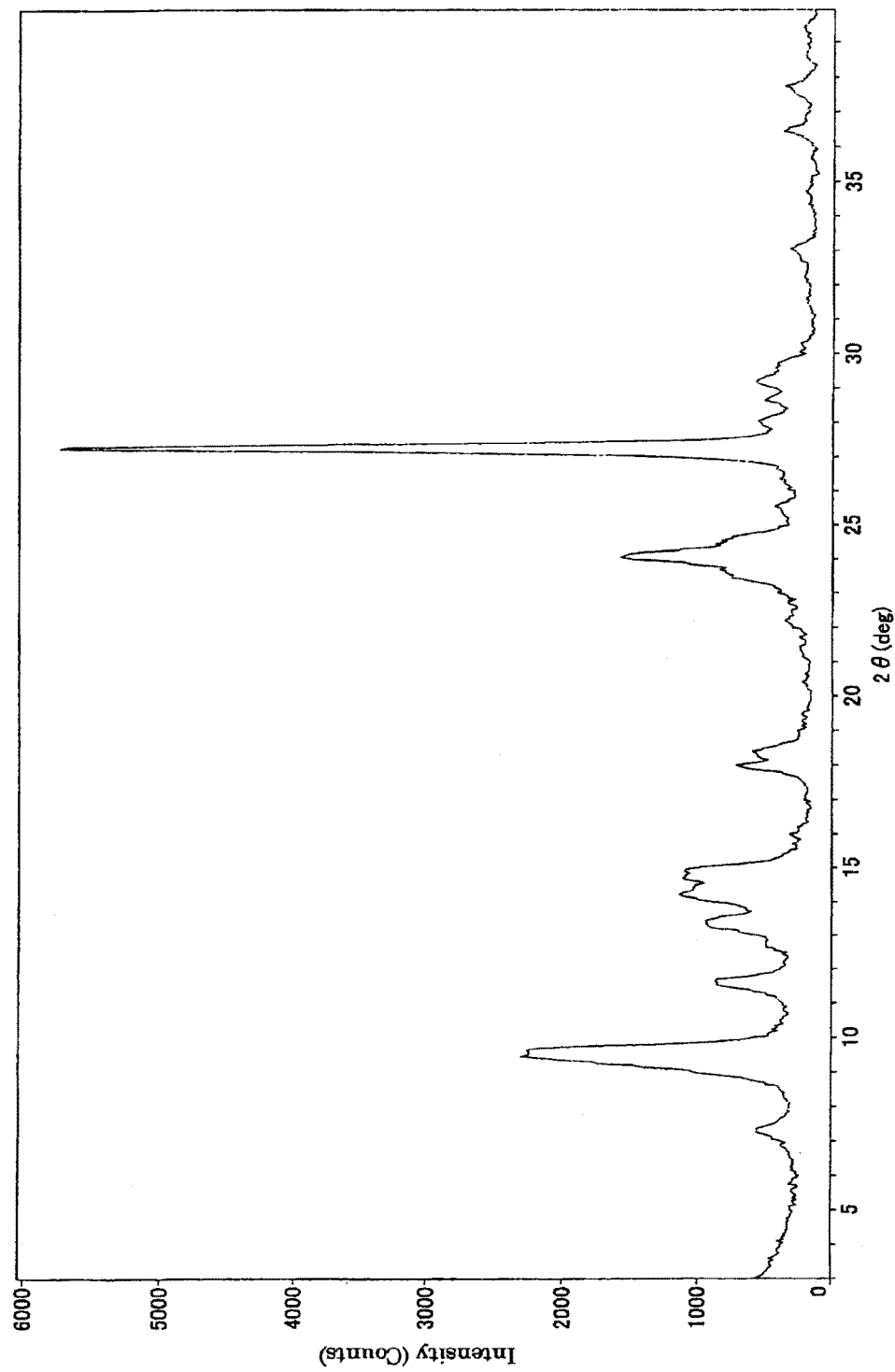
FIG. 42 is a powder XRD spectrum of the phthalocyanine crystal (a crystal of oxytitanium phthalocyanine alone) obtained in Example 68.

The operations the same as in Synthetic Example 2 were carried out except that 50 parts by weight of the oxytitanium phthalocyanine crystal of Synthetic Example 1 used as a starting material in Synthetic Example 2 was changed to a mixture of 47.5 parts by weight of the oxytitanium phthalocyanine crystal of Synthetic Example 1 and 2.5 parts by weight of non-metal phthalocyanine ("FastgenBlue8120BS" manufactured by Dainippon Ink And Chemicals, Incorporated), thereby 410 parts by weight of wet cake of a low-phthalocyanine crystal composition (content of phthalocyanines: 12.2% by weight). FIG. 13 shows a powder XRD spectrum of the resulting low-phthalocyanine crystals.

Examples 5 to 8, Comparative Synthetic Example 2

As a phthalocyanine crystal precursor, 33 parts by weight of wet cake of the low-crystalline oxytitanium phthalocyanine obtained in Synthetic Example 7 was added into 90 parts by weight of water, followed by stirring at room temperature for 30 minutes. Thereafter, 13 parts by weight of each of respective compounds shown in the right column of the following Table 3 was added thereto, followed by further stirring at room temperature for 1 hour. After stirring, water was separated and 80 parts by weight of methanol was added, followed by stirring and washing at room temperature for 1 hour. After washing, the product was filtrated off and 80 parts by weight of methanol was again added, followed by stirring and washing for 1 hour. Thereafter, it was filtrated off and was heated and dried in a vacuum drier to thereby obtain mixed crystals of oxytitanium phthalocyanine and metal-free phthalocyanine (they are referred to as phthalocyanine crystals of Examples 5 to 8 and Comparative Synthetic Example 2). FIGS. 14 to 18 show powder XRD spectra of the phthalocyanine crystals of Examples 5 to 8 and Comparative Synthetic Example 2, respectively. As apparent from the powder XRD spectra of FIGS. 14 to 18, any of the phthalocyanine crystals of Examples 5 to 8 and Comparative Synthetic Example 2 had a main diffraction peak at Bragg angle (2θ±0.2°) of 27.2° toward CuKα characteristic X-ray (wavelength 1.541 angstrom).

TABLE 3

|  | Compound to be brought into contact with phthalocyanine crystal precursor |
|---|---|
| Example 5 | 3-chlorobenzaldehyde(*) |
| Example 6 | m-anisbenzaldehyde(*) |
| Example 7 | 2-fluorobenzaldehyde(*) |
| Example 8 | 1-naphthobenzaldehyde(*) |
| Comparative Synthetic Example 2 | o-dichlorobenzene |

(*)aromatic aldehyde compound

[Process for Producing Photoreceptor]

Using a conductive substrate obtained by forming an aluminum deposited film (thickness: 70 nm) on the surface of a biaxially stretched polyethylene terephthalate resin film (thickness: 75 μm), a dispersion liquid for an undercoat layer prepared by the method shown below was applied on the deposited layer of the substrate with a bar coater so that film thickness after drying was 1.25 μm and dried to form an undercoat leery.

The preparation of the dispersion liquid for an undercoat layer was carried out by the following method. Namely, rutile type titanium oxide having an average primary particle size of 40 nm ("TTO55N" manufactured by Ishihara Sangyo Kaisha, Ltd.) and 3 parts by weight of methyldimethoxysilane ("TSL8117" manufactured by Toshiba Silicone Co., Ltd.) relative to the titanium oxide were charged into a high-speed flowing mixing kneader ("SMG300" manufactured by Kawata Mfg. Co., Ltd.), followed by high-speed mixing at a rotation peripheral velocity of 34.5 m/second. The resulting surface-treated titanium oxide was dispersed into methanol/1-propanol in a ball mill to form a dispersion slurry of hydrophobic treated titanium oxide. The dispersion slurry, a mixed solvent of methanol/1-propanol/toluene, and pellets of a copolymer polyamide consisting of ε-caprolactam [a compound represented by the following formula (A)]/bis(4-amino-3-methylcyclohexyl)methane [a compound represented by the following formula (B)]/hexamethylenediamine [a compound represented by the following formula (C)]/decamethylenedicarboxylic acid [a compound represented by the following formula (D)]/octadecamethylenedicarboxylic acid [a compound represented by the following formula (E)] in a compositional molar ratio of 60%/15%/5%/15%/5% were stirred and mixed under heating to dissolve the polyamide pellets. Thereafter, the whole was subjected to ultrasonic dispersion treatment to thereby form a dispersion liquid for an undercoat layer having a solid concentration of 18.0% wherein a weight ratio of methanol/1-propanol/toluene was 7/1/2 and the hydrophobic treated titanium oxide/the copolymer polyamide were contained in a weight ratio of 3/1.

[Chem 4]

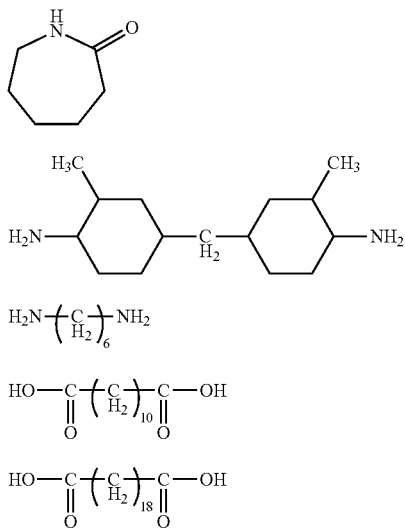

On the other hand, using 20 parts by weight of each phthalocyanine crystal to be mentioned below as a charge generation substance, it was mixed with 280 parts by weight of 1,2-dimethoxyethane and the mixture was pulverized in a sand grind mill for 2 hours to conduct fine particle formation/dispersion treatment. Moreover, 10 parts by weight of polybutyral (trade name "Denka butyral" #6000C manufactured by Denki Kagaku Kogyo K.K.) was dissolved into a mixed solution of 253 parts by weight of 1,2-dimethoxyethane and 85 parts by weight of 4-methoxy-4-methyl-2-pentanone to prepare a binder solution. The finely dispersed treatment solution obtained by the aforementioned fine particle formation/dispersion treatment and the above binder solution were mixed with 230 parts by weight of 1,2-dimethoxyethane to prepare a coating solution for a charge generation layer. The coating solution for a charge generation layer was applied on the undercoat layer formed on the above conductive substrate with a bar coater so that film thickness after drying was 0.4 μm and then dried to form a charge generation layer.

Furthermore, 50 parts by weight of a mixture consisting of a compound group of geometric isomers synthesized based on Example 1 of JP-A-2002-80432 and containing a structure represented by the following structural formula (F) as a main component was used as a charge transport substance, 100 parts by weight of a polycarbonate resin consisting of 51% by mol of a repeating unit of 2,2-bis(4-hydroxy-3-methylphenyl)propane represented by the following structural formula (G) as an aromatic diol component and 49% by mol of a repeating unit of 1,1-bis(4-hydroxyphenyl)-1-phenylethane represented by the following structural formula (H) as an aromatic diol component and having a terminal structural formula derived from p-t-butylphenol was used as a binder resin. The above substances and additionally, 8 parts by weight of 2,6-di-t-butyl-4-methylphenol, 0.03 part by weight of a silicone oil (trade name "KF96" manufactured by Shin-Etsu Chemical Co., Ltd.) were dissolved in 640 parts by weight mixed solvent of tetrahydrofuran/toluene (weight ratio 8/2) to prepare a coating solution A for a charge transport layer. The coating solution for a charge transport layer was applied on the resin film having the charge generation layer provided thereon so that film thickness after drying was 25 μm and then dried to form a charge transport layer, thereby an electrophotographic photoreceptor having a multilayer photosensitive layer being prepared.

[Chem 5]

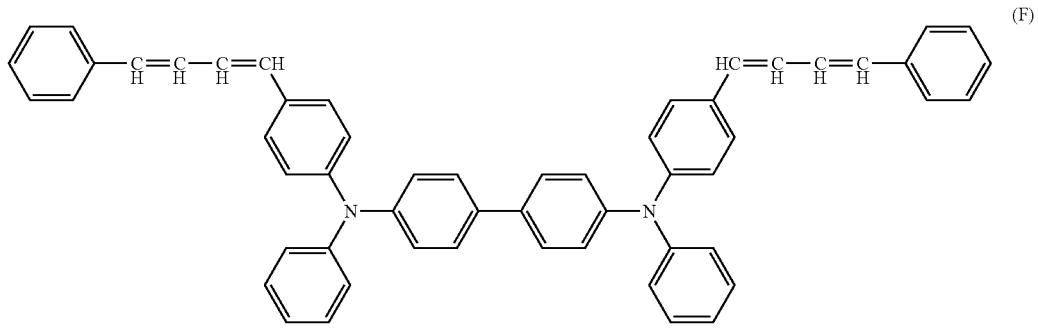

[Chem 6]

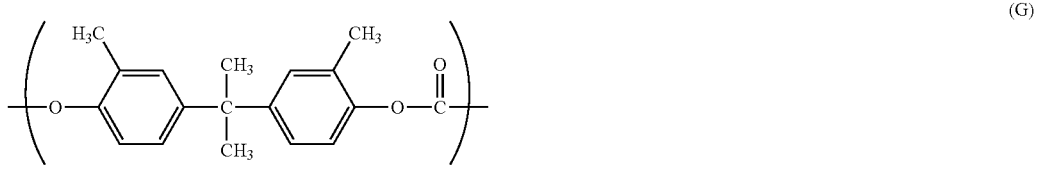

[Chem 7]

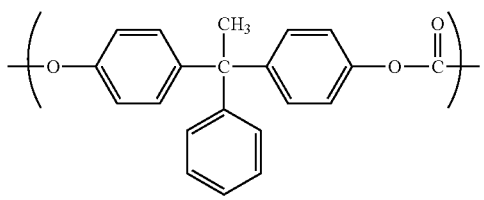

(H)

Examples 9 to 16, Comparative Examples 1, 2

Using phthalocyanine crystals of Examples 9 to 16 and Comparative Synthetic Examples 1 and 2 as charge generation substances, electrophotographic photoreceptors were produced in accordance with the aforementioned process for producing the photoreceptor (hereinafter, they are optionally referred to as electrophotographic photoreceptors of Examples 9 to 16 and Comparative Examples 1 and 2). The correspondence of each electrophotographic photoreceptor to the phthalocyanine crystal used as the charge generation substance and a composition thereof was shown in the following Table 4.

TABLE 4

| Electrophotographic photoreceptor | Charge generation substance (phthalocyanine crystal) | |
|---|---|---|
| Example 9 | Example 1 | Crystals consisting of oxytitanium phthalocyanine alone |
| Example 10 | Example 2 | |
| Example 11 | Example 3 | |
| Example 12 | Example 4 | |
| Comparative Example 1 | Comparative Synthetic Example 1 | |
| Example 13 | Example 5 | Mixed crystals of oxytitanium phthalocyanine and metal-free phthalocyanine |
| Example 14 | Example 6 | |
| Example 15 | Example 7 | |
| Example 16 | Example 8 | |
| Comparative Example 2 | Comparative Synthetic Example 2 | |

[Evaluation of Electrophotographic Photoreceptor]

The electrophotographic photoreceptors of Examples 9 to 16 and Comparative Examples 1 and 2 were mounted on an electrophotographic property-evaluating apparatus manufactured according to the standard of the Society of Electrophotography ["Zoku Denshishashin Gijutsu No Kiso To Oyo", edited by the Society of Electrophotography, issued by Corona Publishing Co. Ltd, pp. 404-405] and electrical properties were evaluated through a cycle of charging, exposure, measurement of potential, and erase according to the following procedure.

A charging device was disposed at an angle of −70°, an exposing device at an angle of 0° C., a surface potentiometer probe at an angle of 36°, and an erasing device at an angle of −150° C. Individual devices were disposed so that the distance from the photoreceptor surface was 2 mm. For the charging, a scorotron charging device was used. As an exposing lamp, a halogen lamp JDR110V-85WLN/K7 manufactured by Ushio, Inc. was used and monochromatic light of 780 nm was formed using a filter MX0780 manufactured by Asahi Spectra Co., Ltd. LED light of 660 nm was used as an erasing light.

The photoreceptor was charged with rotation at a constant rotation speed (60 rpm) so as that an absolute value of initial surface potential of the photoreceptor is −700 V. When the charged photoreceptor surface passed through an exposure portion irradiated with monochromatic light of 780 nm and reached the probe position, the surface potential was measured (time for exposure to potential measurement: 100 ms).

The monochromatic light of 780 nm was passed through ND filter to change light intensity and the photoreceptor was irradiated with the light. Thus, irradiation energy (exposure) at the time when surface potential reached −350 V was measured.

A value obtained by measuring the irradiation energy (exposure) under the NN environment after being allowed to stand for 8 hours under the NN environment (unit: µJ/cm$^2$) was regarded as standard-humidity sensitivity (hereinafter sometimes referred to as "$En_{1/2}$") and a value obtained by measuring the irradiation energy (exposure) under the NL environment after being allowed to stand for 8 hours under the NL environment (unit: µJ/cm$^2$) was regarded as low-humidity sensitivity (hereinafter sometimes referred to as "$El_{1/2}$").

The sensitivity retention for a humidity change was calculated by calculation according to the following equation using the resulting standard humidity sensitivity $En_{1/2}$ and low-humidity sensitivity $El_{1/2}$ (unit: %).

Sensitivity retention (%) for humidity change=Standard humidity sensitivity $En_{1/2}$ (µJ/cm$^2$)/low humidity sensitivity $El_{1/2}$(µJ/cm$^2$)×100    [Num 4]

The following Table 5 shows evaluation results of the electrical properties on the electrophotographic photoreceptors of Examples 1 to 8 and Comparative Examples 1 and 2.

TABLE 5

| Electrophotographic photoreceptor | Low-humidity sensitivity $El_{1/2}$ (µJ/cm$^2$) | Standard-humidity sensitivity $En_{1/2}$ (µJ/cm$^2$) | Sensitivity retention (%) |
|---|---|---|---|
| Example 9 | 0.083 | 0.075 | 90.2 |
| Example 10 | 0.085 | 0.075 | 88.5 |
| Example 11 | 0.091 | 0.084 | 91.9 |
| Example 12 | 0.081 | 0.071 | 88.0 |
| Comparative Example 1 | 0.085 | 0.073 | 85.6 |
| Example 13 | 0.086 | 0.080 | 92.5 |
| Example 14 | 0.090 | 0.083 | 91.8 |
| Example 15 | 0.095 | 0.088 | 93.1 |
| Example 16 | 0.091 | 0.084 | 91.9 |
| Comparative Example 2 | 0.088 | 0.077 | 87.6 |

As apparent from the powder XRD spectra (FIGS. 8 to 12 and 14 to 18), any of the phthalocyanine crystals of Examples 1 to 8 and Comparative Synthetic Examples 1 and 2 were phthalocyanine crystals having a main diffraction peak at Bragg angle (2θ±0.2°) of 27.2° toward CuKα characteristic X-ray (wavelength 1.541 angstrom).

These electrophotographic photoreceptors of Examples 9 to 16 and Comparative Examples 1 and 2 using the phthalocyanine crystals of Examples 1 to 8 and Comparative Synthetic Examples 1 and 2 as charge generation substances were divided into two groups {(crystals consisting of oxytitanium phthalocyanine alone: Examples 9 to 12 and Comparative Example 1) and (mixed crystals of oxytitanium phthalocyanine and metal-free phthalocyanine: Examples 13 to 16 and Comparative Example 2)} according to the composition of the phthalocyanine crystal. When Examples and Comparative Example are compared on each group, the standard-humidity sensitivity $El_{1/2}$ is equal to one another. However, when the values of the sensitivity retention are compared, the electrophotographic photoreceptors of Examples show little fluctuation in sensitivity for a humidity change as compared with the electrophotographic photoreceptors of Comparative Examples.

From the above results, it was evident that sensitivity fluctuation for a change in usage environment can be remarkably improved when the phthalocyanine crystals of Examples 1 to 4 and 5 to 8 obtained through a step of converting the crystal form by bringing a phthalocyanine crystal precursor into contact with an aromatic aldehyde compound (i.e., phthalocyanine crystals of the invention) were used for electrophotographic photoreceptors.

Examples 17 to 22, Comparative Synthetic Examples 3 to 8

As a phthalocyanine crystal precursor, 38 parts by weight of wet cake of the low-crystalline oxytitanium phthalocyanine obtained in Synthetic Example 2 was added into 100 parts by weight of water, followed by stirring at room temperature for 30 minutes. Thereafter, 9 ml of each of the respective aromatic compounds shown in the right column of the following Table 6 was added thereto, followed by further stirring at room temperature for 1 hour. After stirring, water was separated and 80 parts by weight of methanol was added, followed by stirring and washing at room temperature for 1 hour. After washing, the product was filtrated off and 80 parts by weight of methanol was again added, followed by stirring and washing for 1 hour. Thereafter, it was filtrated off and was heated and dried in a vacuum drier to thereby obtain crystals consisting of oxytitanium phthalocyanine alone (hereinafter, they are optionally referred to as phthalocyanine crystals of Examples 17 to 22 and Comparative Synthetic Examples 3 to 8). FIGS. 19 to 30 show powder XRD spectra of the phthalocyanine crystals of Examples 17 to 22 and Comparative Synthetic Examples 3 to 8, respectively. As apparent from the powder XRD spectra of FIGS. 19 to 30, any of the phthalocyanine crystals of Examples 17 to 22 and Comparative Synthetic Examples 3 to 8 had a main diffraction peak at Bragg angle (2θ±0.2°) of 27.2° toward CuKα characteristic X-ray (wavelength 1.541 angstrom).

TABLE 6

| | Aromatic compound to be brought into contact with phthalocyanine crystal precursor |
|---|---|
| Example 17 | 2-chloroacetophenone(*) |
| Example 18 | 3-chloro-4-fluoroacetophenone(*) |
| Example 19 | methyl 2-chlorobenzoate(*) |
| Example 20 | 2,6-dichloroanisole(*) |
| Example 21 | 2-chlorophenyl acetate(*) |
| Example 22 | 2,4-dichloronitrobenzene(*) |

TABLE 6-continued

| | Aromatic compound to be brought into contact with phthalocyanine crystal precursor |
|---|---|
| Comparative Synthetic Example 3 | acetophenone |
| Comparative Synthetic Example 4 | methyl 2-methylbenzoate |
| Comparative Synthetic Example 5 | anisole |
| Comparative Synthetic Example 6 | phenyl acetate |
| Comparative Synthetic Example 7 | nitrobenzene |
| Comparative Synthetic Example 8 | 2-fluoronitrobenzene |

(*)particular substituent-containing aromatic compound

Examples 23 to 25, Comparative Synthetic Examples 9 to 12

As a phthalocyanine crystal precursor, 33 parts by weight of wet cake of the low-crystalline oxytitanium phthalocyanine obtained in Synthetic Example 3 was added into 90 parts by weight of water, followed by stirring at room temperature for 30 minutes. Thereafter, 9 ml of each of the respective aromatic compounds shown in the right column of the following Table 7 was added thereto, followed by further stirring at room temperature for 1 hour. After stirring, water was separated and 80 parts by weight of methanol was added, followed by stirring and washing at room temperature for 1 hour. After washing, the product was filtrated off and 80 parts by weight of methanol was again added, followed by stirring and washing for 1 hour. Thereafter, it was filtrated off and was heated and dried in a vacuum drier to thereby obtain mixed crystals of oxytitanium phthalocyanine and metal-free phthalocyanine (they are referred to as phthalocyanine crystals of Examples 23 to 25 and Comparative Synthetic Examples 9 to 12). FIGS. 31 to 37 show powder XRD spectra of the phthalocyanine crystals of Examples 23 to 25 and Comparative Synthetic Examples 9 to 12, respectively. As apparent from the powder XRD spectra of FIGS. 31 to 37, any of the phthalocyanine crystals of Examples 23 to 25 and Comparative Synthetic Examples 9 to 12 had a main diffraction peak at Bragg angle (2θ±0.2°) of 27.2° toward CuKα characteristic X-ray (wavelength 1.541 angstrom).

TABLE 7

| | Aromatic compound to be brought into contact with phthalocyanine crystal precursor |
|---|---|
| Example 23 | 2-chloroacetophenone(*) |
| Example 24 | 2-chloroanisole(*) |
| Example 25 | 2-chloronitrobenzene(*) |
| Comparative Synthetic Example 9 | acetophenone |
| Comparative Synthetic Example 10 | anisole |
| Comparative Synthetic Example 11 | nitrobenzene |
| Comparative Synthetic Example 12 | 2-fluoronitrobenzene |

(*)particular substituent-containing aromatic compound

Examples 26 to 34, Comparative Examples 3 to 12

Using phthalocyanine crystals of Examples 17 to 25 and Comparative Synthetic Examples 3 to 12 as charge generation substances, electrophotographic photoreceptors were produced in accordance with the aforementioned process for producing the photoreceptor (hereinafter, they are optionally referred to as electrophotographic photoreceptors of Examples 26 to 34 and Comparative Examples 3 to 12). The correspondence of each electrophotographic photoreceptor to the phthalocyanine crystal used as the charge generation substance was shown in the following Table 8 and Table 9.

[Evaluation of Electrophotographic Photoreceptor]

The electrophotographic photoreceptors of Examples 26 to 34 and Comparative Examples 3 to 12 were evaluated on electrical properties in the same manner as the evaluation of Examples 9 to 16. The following Table 8 and Table 9 show evaluation results of the electrical properties on the electrophotographic photoreceptors of Examples 26 to 34 and Comparative Examples 3 to 12. In the following Table 8 and Table 9, Example(s) and Comparative Example using phthalocyanine crystals each obtained by bringing an aromatic compound having a similar structure into contact with a phthalocyanine crystal precursor are shown above and below.

TABLE 8

| Electrophotographic photoreceptor | Charge generation substance (phthalocyanine crystal) | Aromatic compound to be brought into contact with phthalocyanine crystal precursor | Standard-humidity sensitivity $En_{1/2}$ ($\mu J/cm^2$) |
|---|---|---|---|
| Example 26 | Example 17 | 2-chloroacetophenone(*) | 0.081 |
| Example 27 | Example 18 | 3-chloro-4-fluoroacetophenone(*) | 0.076 |
| Comparative Example 3 | Comparative Synthetic Example 3 | acetophenone | 0.089 |
| Example 28 | Example 19 | methyl 2-chlorobenzoate(*) | 0.081 |
| Comparative Example 4 | Comparative Synthetic Example 4 | methyl 2-methylbenzoate | 0.092 |
| Example 29 | Example 20 | 2,6-dichloroanisole(*) | 0.081 |
| Comparative Example 5 | Comparative Synthetic Example 5 | 1,2-methylenedioxybenzene | 0.09 |
| Example 30 | Example 21 | 2-chlorophenyl acetate(*) | 0.085 |
| Comparative Example 6 | Comparative Synthetic Example 6 | phenyl acetate | 0.094 |
| Example 31 | Example 22 | 2,4-dichloronitrobenzene(*) | 0.079 |
| Comparative Example 7 | Comparative Synthetic Example 7 | nitrobenzene | 0.101 |
| Comparative Example 8 | Comparative Synthetic Example 8 | 2-fluoronitrobenzene | 0.09 |

(*)particular substituent-containing aromatic compound

TABLE 9

| Electrophotographic photoreceptor | Charge generation substance (phthalocyanine crystal) | Aromatic compound to be brought into contact with phthalocyanine crystal precursor | Standard-humidity sensitivity $En_{1/2}$ ($\mu J/cm^2$) |
|---|---|---|---|
| Example 32 | Example 23 | 2-chloroacetophenone(*) | 0.087 |
| Comparative Example 9 | Comparative Synthetic Example 8 | acetophenone | 0.096 |
| Example 33 | Example 24 | 2-chloroanisole(*) | 0.101 |
| Comparative Example 10 | Comparative Synthetic Example 10 | 1,2-methylenedioxybenzene | 0.111 |
| Example 34 | Example 25 | 2-chloronitrobenzene(*) | 0.085 |
| Comparative Example 11 | Comparative Synthetic Example 11 | nitrobenzene | 0.104 |
| Comparative Example 12 | Comparative Synthetic Example 12 | 2-fluoronitrobenzene | 0.09 |

(*)particular substituent-containing aromatic compound

As apparent from the powder XRD spectra (FIGS. 19 to 37), any of the phthalocyanine crystals of Examples 17 to 25 and Comparative Synthetic Examples 3 to 12 were phthalocyanine crystals having a main diffraction peak at Bragg angle (2θ±0.2°) of 27.2° toward CuKα characteristic X-ray (wavelength 1.541 angstrom).

These electrophotographic photoreceptors of Examples 26 to 34 and Comparative Examples 3 to 12 using the phthalocyanine crystals of Examples 17 to 25 and Comparative Synthetic Examples 3 to 12 as charge generation substances were divided into eight groups (Examples 26, 27 and Comparative Example 3; Example 28 and Comparative Example 4; Example 29 and Comparative Example 5; Example 30 and Comparative Example 6; Example 31 and Comparative Examples 7, 8; Example 32 and Comparative Example 9; Example 33 and Comparative Example 10; Example 34 and Comparative Example 11, 12) according to the composition of the phthalocyanine crystal used and the structure of the aromatic compound used in crystal conversion treatment at the production of the phthalocyanine crystal. When Example(s) and Comparative Example(s) are compared on each group, it is realized that high standard-humidity sensitivity $En_{1/2}$ is obtained in the electrophotographic photoreceptors of Examples as compared with the electrophotographic photoreceptors of Comparative Examples.

From the above results, it was evident that high standard-humidity sensitivity $En_{1/2}$ is obtained when the phthalocyanine crystals of Examples 17 to 25 obtained through a step of converting the crystal form by bringing a phthalocyanine crystal precursor into contact with a particular substituent-containing aromatic compound (i.e., phthalocyanine crystals of the invention) were used for electrophotographic photoreceptors.

Examples 35 to 68, Comparative Synthetic Examples 13 to 14

As a phthalocyanine crystal precursor, 40 parts by weight of wet cake of the low-crystalline oxytitanium phthalocyanine obtained in Synthetic Example 2 was added into 90 parts by weight of water, followed by stirring at room temperature for 30 minutes. Thereafter, 9 ml of each of the contact treatment solutions of Examples 35 to 68 (solutions each obtained by mixing a particular organic acid compound into a non-acidic organic compound in a predetermined concentration) shown in the following Table 10 was added thereto, followed by further stirring at room temperature for 1 hour. After stirring, water was separated and 80 parts by weight of methanol was added, followed by stirring and washing at room temperature for 1 hour. After washing, the product was filtrated off and 80 parts by weight of methanol was again added, followed by stirring and washing for 1 hour. Thereafter, it was filtrated off and was heated and dried in a vacuum drier to thereby obtain crystals each consisting of oxytitanium phthalocyanine alone (hereinafter, they are optionally referred to as phthalocyanine crystals of Examples 35 to 69).

Moreover, the operations the same as in Examples 35 to 68 were carried out except that contact treatment solutions of Comparative Synthetic Examples 13 and 14 shown in the following Table 11 (solutions each consisting of a non-acidic organic compound alone) were used in an amount of 9 ml, respectively instead of the contact treatment solutions of Examples 35 to 68 to obtain crystals consisting of oxytitanium phthalocyanine alone (hereinafter, they are optionally referred to as phthalocyanine crystals of Comparative Examples 13 and 14).

Powder XRD spectra of the phthalocyanine crystals of Examples 35 to 69 and Comparative Synthetic Examples 13 and 14 were measured. In the powder XRD spectra obtained, any of the phthalocyanine crystals had a main diffraction peak at Bragg angle (2θ±0.2°) of 27.2° toward CuKα characteristic X-ray (wavelength 1.541 angstrom). In this connection, when the non-acidic organic compounds used were the same, powder X-ray diffraction spectra each having about the same shape were obtained regardless of the presence of the particular organic acid compound. As representative examples, the powder XRD spectra of the phthalocyanine crystals of Examples 35, 64, 65, 67, and 68 are shown in FIGS. 38 to 42, respectively.

Example 69

Figure 43:
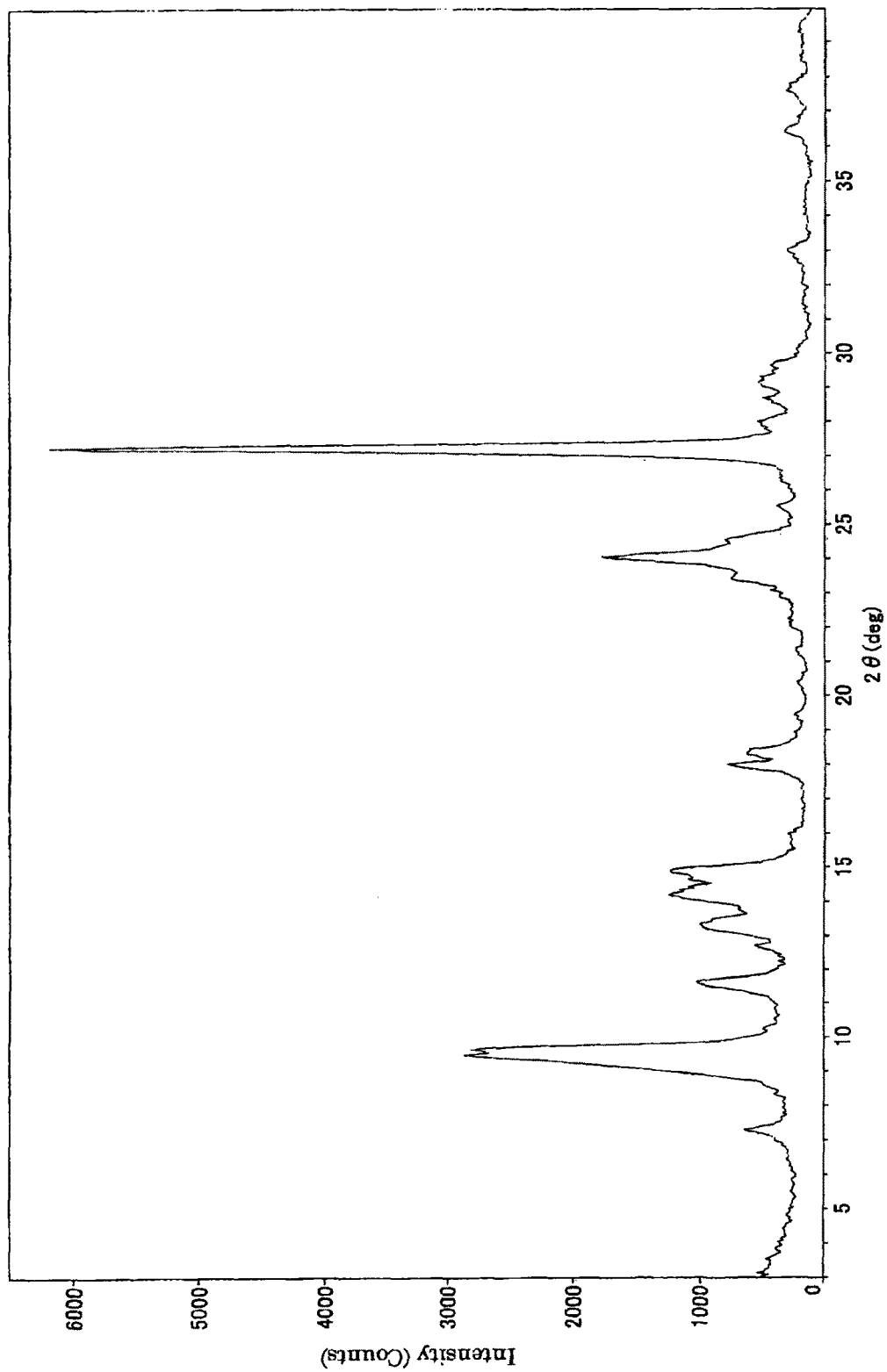
FIG. 43 is a powder XRD spectrum of the phthalocyanine crystal (a crystal of oxytitanium phthalocyanine alone) obtained in Example 69.

Forty parts by weight of wet cake of the low-crystalline oxytitanium phthalocyanine (phthalocyanine crystal precursor) obtained in Synthetic Example 2 was added into a solution (a contact treatment solution of Example 69 shown in the following Table 10) obtained by dissolving 15 g of 3-chlorobenzoic acid (a particular organic acid compound) in 100 ml of tetrahydrofuran (a non-acidic organic compound), followed by stirring at room temperature for 3 hours. After stirring, the product was filtrated off and was heated and dried in a vacuum drier to thereby obtain crystals consisting of oxytitanium phthalocyanine alone (hereinafter, they are optionally referred to as phthalocyanine crystal of Example 69). FIG. 43 shows a powder XRD spectrum of the phthalocyanine crystal of Example 69. As apparent from FIG. 43, the phthalocyanine crystal of Synthetic Example 37 had a main diffraction peak at Bragg angle (2θ±0.2°) of 27.2° toward CuKα characteristic X-ray (wavelength 1.541 angstrom).

Comparative Synthetic Example 15

The operations the same as in Example 69 was carried out except that 100 ml of tetrahydrofuran was used instead of the tetrahydrofuran solution of 3-chlorobenzoic acid in the above Example 69, thereby crystals consisting of oxytitanium phthalocyanine alone being obtained (hereinafter, they are optionally referred to as phthalocyanine crystal of Comparative Synthetic Example 15). When a powder XRD spectrum was measured on the phthalocyanine crystal of Comparative Synthetic Example 6, the resulting powder XRD spectrum had about the same shape as the powder XRD spectrum (FIG. 43) of the phthalocyanine crystal of the above Example 69.

TABLE 10

| | Contact treatment solution | | |
|---|---|---|---|
| | Non-acidic organic compound | Particular organic acid compound | Concentration of particular organic acid compound (g/ml) |
| Example 35 | 3-chlorobenzaldehyde | benzoic acid | 0.056 |
| Example 36 | 3-chlorobenzaldehyde | benzoic acid | 0.250 |
| Example 37 | 3-chlorobenzaldehyde | 3-chlorobenzoic acid | 0.018 |
| Example 38 | 3-chlorobenzaldehyde | 3-chlorobenzoic acid | 0.037 |
| Example 39 | 3-chlorobenzaldehyde | 3-chlorobenzoic acid | 0.056 |
| Example 40 | 3-chlorobenzaldehyde | 3-methoxybenzoic acid | 0.056 |
| Example 41 | 3-chlorobenzaldehyde | 3-methylbenzoic acid | 0.056 |
| Example 42 | 3-chlorobenzaldehyde | 3-nitrobenzoic acid | 0.056 |
| Example 43 | 3-chlorobenzaldehyde | anthranilic acid | 0.056 |
| Example 44 | 3-chlorobenzaldehyde | phthalic acid | 0.018 |
| Example 45 | 3-chlorobenzaldehyde | trimellitic acid | 0.018 |
| Example 46 | 3-chlorobenzaldehyde | phthalic anhydride | 0.056 |
| Example 47 | 3-chlorobenzaldehyde | trimellitic anhydride | 0.056 |
| Example 48 | 3-chlorobenzaldehyde | pyromellitic anhydride | 0.037 |
| Example 49 | 3-chlorobenzaldehyde | 2-phenylpropionic acid | 0.056 |
| Example 50 | 3-chlorobenzaldehyde | 1-naphtoic acid | 0.056 |
| Example 51 | 3-chlorobenzaldehyde | 2,6-naphthalenedicarboxylic acid | 0.018 |
| Example 52 | 3-chlorobenzaldehyde | 1,8-naphthalic anhydride | 0.037 |
| Example 53 | 3-chlorobenzaldehyde | 1,2-naphthalic anhydride | 0.056 |
| Example 54 | 3-chlorobenzaldehyde | indole-2-carboxylic acid | 0.056 |
| Example 55 | 3-chlorobenzaldehyde | benzofuran-2-carboxylic acid | 0.056 |
| Example 56 | 3-chlorobenzaldehyde | phenylboronic acid | 0.056 |
| Example 57 | 3-chlorobenzaldehyde | benzenesulfonic acid | 0.056 |
| Example 58 | 3-chlorobenzaldehyde | methyl benzenesulfonate | 0.056 |
| Example 59 | 3-chlorobenzaldehyde | phenyl phosphoric acid | 0.056 |
| Example 60 | 3-chlorobenzaldehyde | phenylphosphonic acid | 0.056 |
| Example 61 | 3-chlorobenzaldehyde | dimethyl phenylphosphonate | 0.056 |
| Example 62 | 3-chlorobenzaldehyde | acetic acid | 0.056 |
| Example 63 | 3-chlorobenzaldehyde | methanesulfonic acid | 0.056 |
| Example 64 | 2-chloroacetophenone | 3-chlorobenzoic acid | 0.056 |

TABLE 10-continued

| | Contact treatment solution | | |
|---|---|---|---|
| | Non-acidic organic compound | Particular organic acid compound | Concentration of particular organic acid compound (g/ml) |
| Example 65 | 2-chloroacetophenone | trimellitic anhydride | 0.056 |
| Example 66 | methyl 2-chlorobenzoate | 3-chlorobenzoic acid | 0.056 |
| Example 67 | 2,4-dichlorofluorobenzene | 3-chlorobenzoic acid | 0.056 |
| Example 68 | 2-fluoronitrobenzene | 3-chlorobenzoic acid | 0.056 |
| Example 69 | tetrahydrofuran | 3-chlorobenzoic acid | 0.15 |
| Comparative Synthetic Example 13 | 2,4-dichlorofluorobenzene | — | — |
| Comparative Synthetic Example 14 | 2-fluoronitrobenzene | — | — |
| Comparative Synthetic Example 15 | tetrahydrofuran | — | — |

Examples 70 to 74

As a phthalocyanine crystal precursor, 33 parts by weight of wet cake of the low-crystalline oxytitanium phthalocyanine obtained in Synthetic Example 3 was added into 90 parts by weight of water, followed by stirring at room temperature for 30 minutes. Thereafter, 9 ml of each of the contact treatment solutions of Examples 70 to (solutions each obtained by mixing a particular organic acid compound into a non-acidic organic compound in a predetermined concentration) shown in the following Table 11 was added thereto, followed by further stirring at room temperature for 1 hour. After stirring, water was separated and 80 parts by weight of methanol was added, followed by stirring and washing at room temperature for 1 hour. After washing, the product was filtrated off and 80 parts by weight of methanol was again added, followed by stirring and washing for 1 hour. Thereafter, it was filtrated off and was heated and dried in a vacuum drier to thereby obtain mixed crystals of oxytitanium phthalocyanine and metal-free phthalocyanine (they are referred to as phthalocyanine crystals of Examples 70 to 74, respectively).

Figure 44:
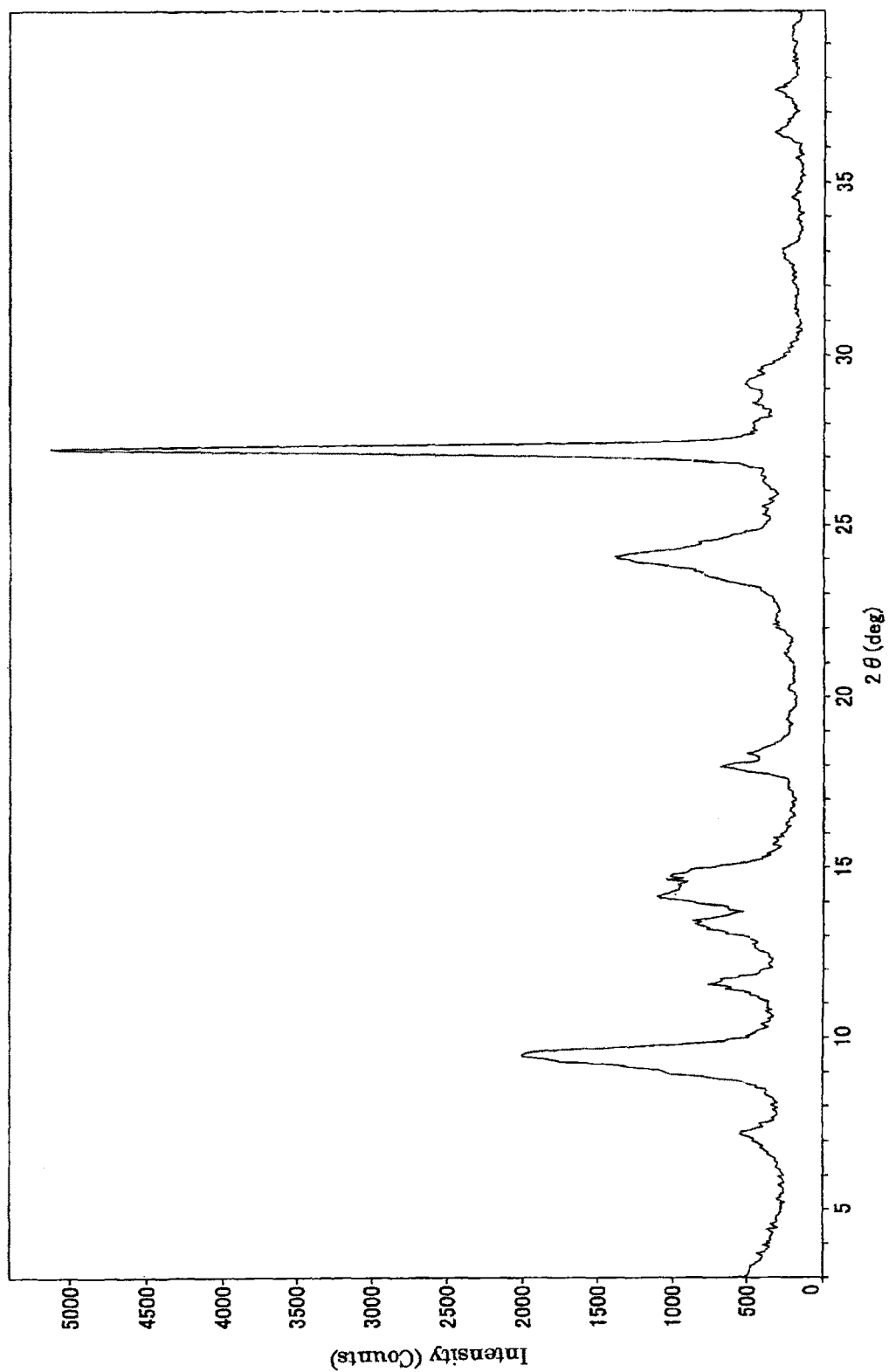
FIG. 44 is a powder XRD spectrum of the phthalocyanine crystal (a mixed crystal of oxytitanium phthalocyanine and metal-free phthalocyanine) obtained in Example 70.
Figure 45:
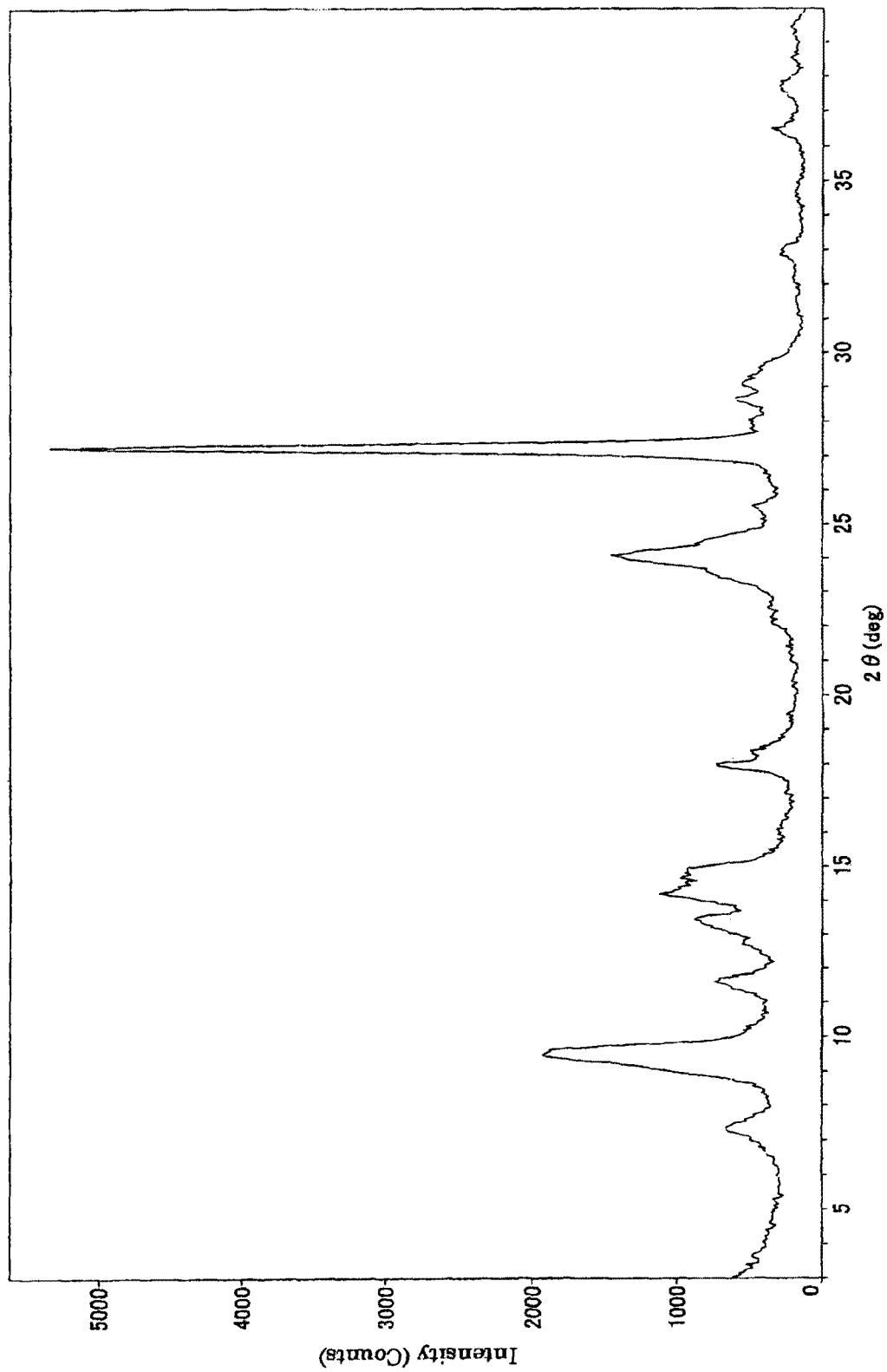
FIG. 45 is a powder XRD spectrum of the phthalocyanine crystal (a crystal of oxytitanium phthalocyanine alone) obtained in Example 128.
Figure 46:
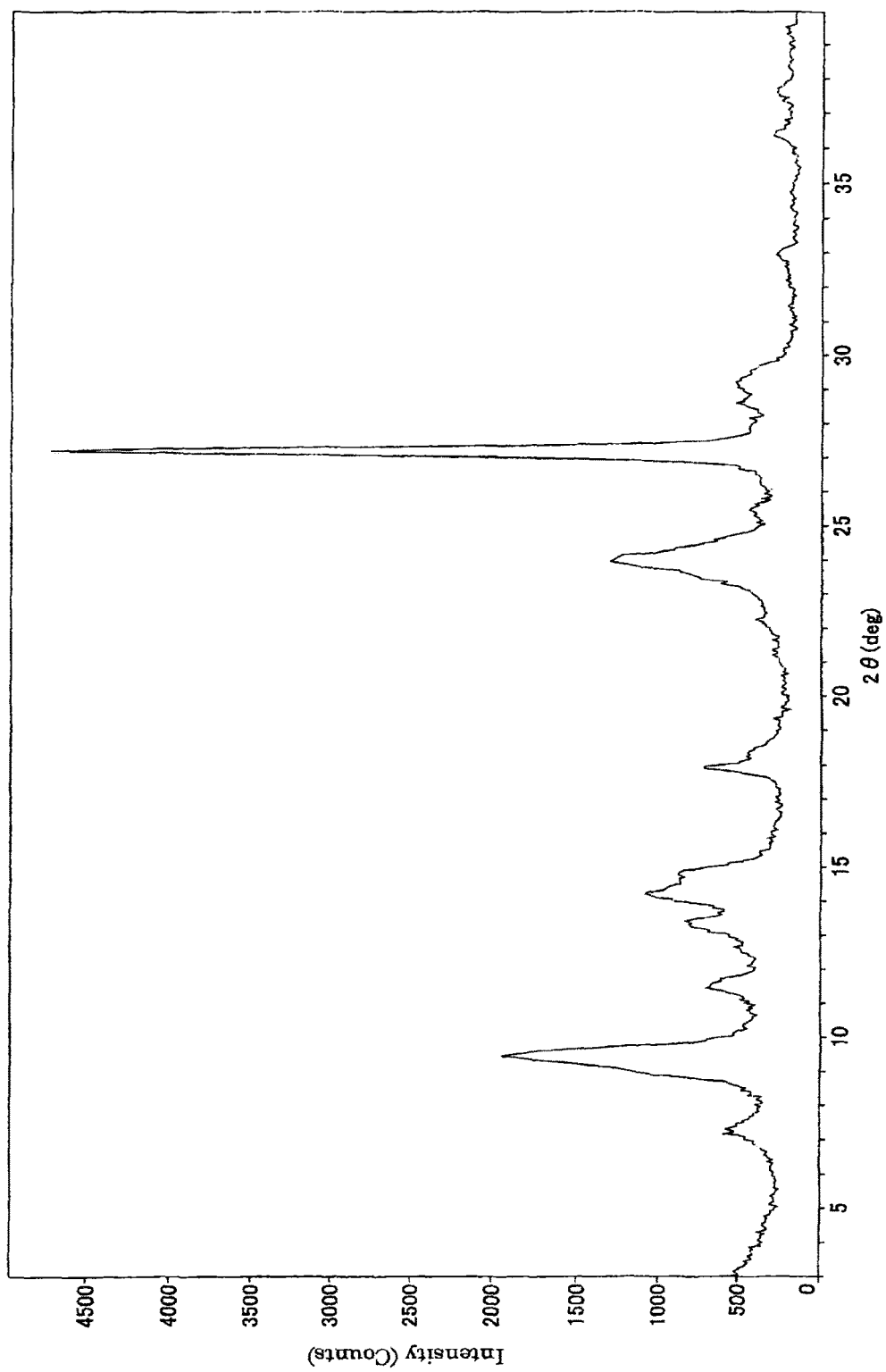
FIG. 46 is a powder XRD spectrum of the phthalocyanine crystal (a crystal of oxytitanium phthalocyanine alone) obtained in Example 139.
Figure 47:
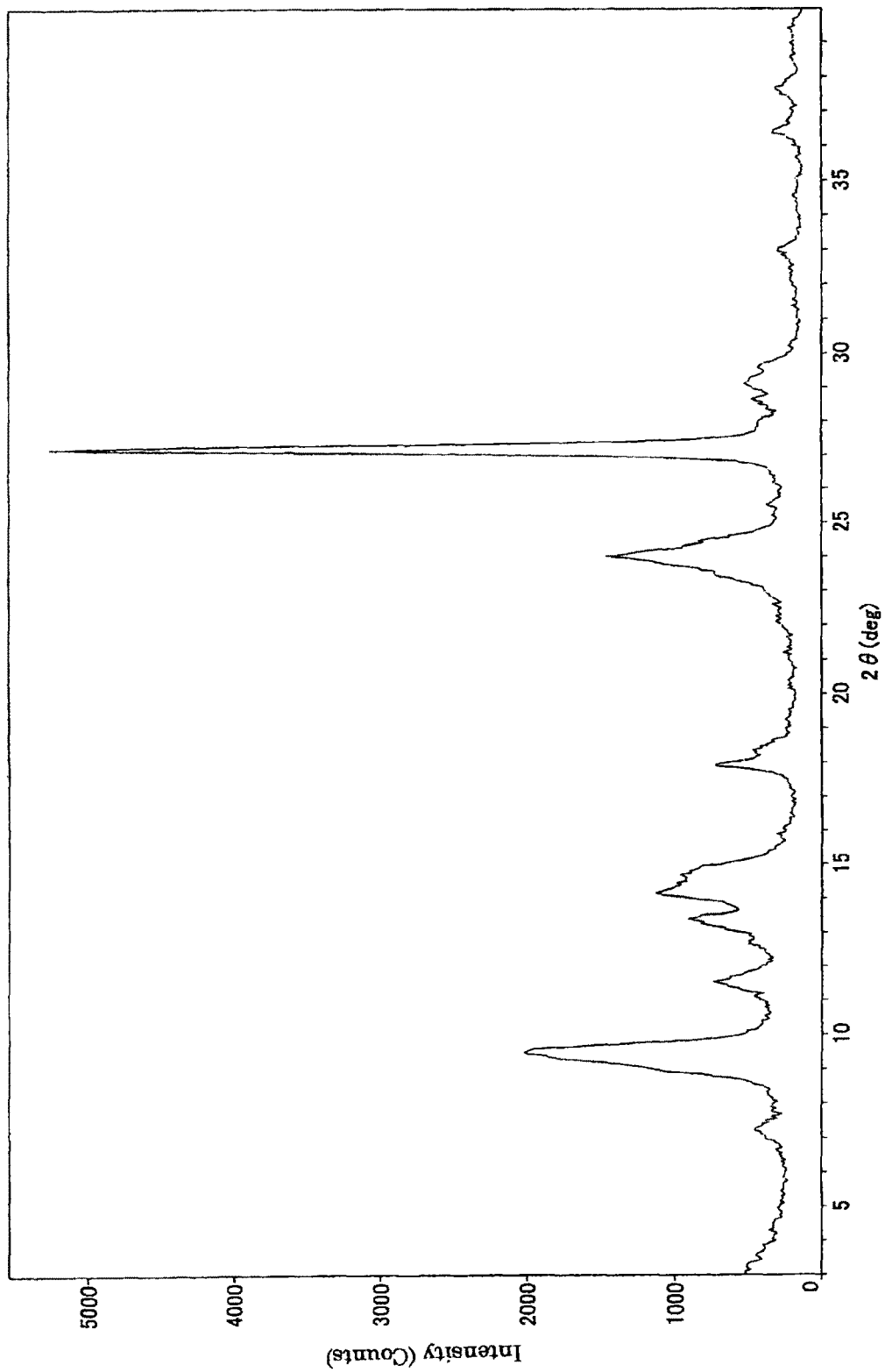
FIG. 47 is a powder XRD spectrum of the phthalocyanine crystal (a crystal of oxytitanium phthalocyanine alone) obtained in Example 130.
Figure 48:
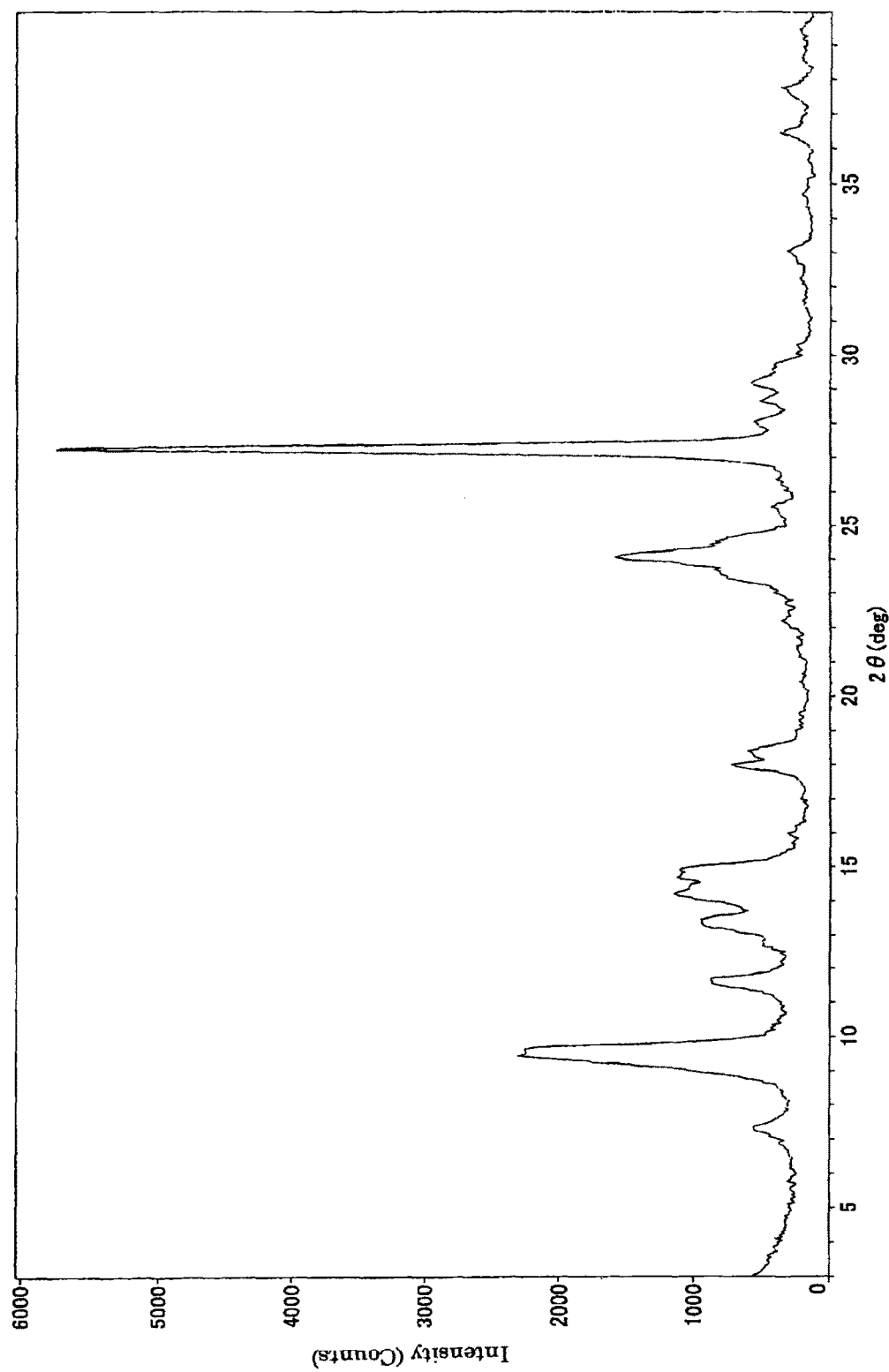
FIG. 48 is a powder XRD spectrum of the phthalocyanine crystal (a crystal of oxytitanium phthalocyanine alone) obtained in Example 131.

Powder XRD spectra of the phthalocyanine crystals of Examples 70 to 74 were measured. In the powder XRD spectra obtained, any of the phthalocyanine crystals had a main diffraction peak at Bragg angle (2θ±0.2°) of 27.2° toward CuKα characteristic X-ray (wavelength 1.541 angstrom). Moreover, powder X-ray diffraction spectra each had about the same shape. As representative examples, FIG. 44 shows a powder XRD spectrum of the phthalocyanine crystal obtained in Example 70.

TABLE 11

| | Contact treatment solution | | |
|---|---|---|---|
| | Non-acidic organic compound | Particular organic acid compound | Concentration of particular organic acid compound (g/ml) |
| Example 70 | 3-chlorobenzaldehyde | 3-chlorobenzoic acid | 0.028 |
| Example 71 | 3-chlorobenzaldehyde | 3-chlorobenzoic acid | 0.056 |
| Example 72 | 3-chlorobenzaldehyde | phthalic anhydride | 0.028 |
| Example 73 | 3-chlorobenzaldehyde | trimellitic anhydride | 0.028 |
| Example 74 | 3-chlorobenzaldehyde | pyromellitic anhydride | 0.028 |

Examples 75 to 114

Using phthalocyanine crystals of Examples 35 to 74 as charge generation substances, electrophotographic photoreceptors were produced in accordance with the aforementioned process for producing the photoreceptor (hereinafter, they are optionally referred to as electrophotographic photoreceptors of Examples 75 to 114). The correspondence of each electrophotographic photoreceptor to the phthalocyanine crystal used as the charge generation substance and a composition ratio thereof was shown in the following Table 12 and Table 13.

[Evaluation of Electrophotographic Photoreceptor]

The electrophotographic photoreceptors of Examples 75 to 114 and Comparative Examples 13 to 15 were evaluated on electrical properties in the same manner as the evaluation of Examples 9 to 16. The following Table 12 and Table 13 show evaluation results of the sensitivity retention on the electrophotographic photoreceptors of Examples 75 to 114 and Comparative Examples 13 to 15. In the following Table 12 and Table 13, Example(s) and Comparative Example using phthalocyanine crystals each obtained using the same non-acidic organic compound are shown above and below.

TABLE 12

| Electrophotographic photoreceptor | Charge generation substance (phthalocyanine crystal) | Non-acidic organic compound | Particular organic acid compound | Sensitivity retention (%) |
|---|---|---|---|---|
| Example 75 | Example 35 | 3-chlorobenzaldehyde | benzoic acid | 92.1% |
| Example 76 | Example 36 | 3-chlorobenzaldehyde | benzoic acid | 92.0% |
| Example 77 | Example 37 | 3-chlorobenzaldehyde | 3-chlorobenzoic acid | 92.3% |
| Example 78 | Example 38 | 3-chlorobenzaldehyde | 3-chlorobenzoic acid | 92.1% |
| Example 79 | Example 39 | 3-chlorobenzaldehyde | 3-chlorobenzoic acid | 94.3% |
| Example 80 | Example 40 | 3-chlorobenzaldehyde | 3-methoxybenzoic acid | 92.6% |
| Example 81 | Example 41 | 3-chlorobenzaldehyde | 3-methylbenzoic acid | 92.5% |
| Example 82 | Example 42 | 3-chlorobenzaldehyde | 3-nitrobenzoic acid | 94.8% |
| Example 83 | Example 43 | 3-chlorobenzaldehyde | anthranilic acid | 93.4% |
| Example 84 | Example 44 | 3-chlorobenzaldehyde | phthalic acid | 93.4% |
| Example 85 | Example 45 | 3-chlorobenzaldehyde | trimellitic acid | 95.5% |
| Example 86 | Example 46 | 3-chlorobenzaldehyde | phthalic anhydride | 94.4% |
| Example 87 | Example 47 | 3-chlorobenzaldehyde | trimellitic anhydride | 96.6% |
| Example 88 | Example 48 | 3-chlorobenzaldehyde | pyromellitic anhydride | 94.6% |
| Example 89 | Example 49 | 3-chlorobenzaldehyde | 2-phenylpropionic acid | 92.0% |
| Example 90 | Example 50 | 3-chlorobenzaldehyde | 1-naphtoic acid | 92.6% |
| Example 91 | Example 51 | 3-chlorobenzaldehyde | 2,6-naphthalenedicarboxylic acid | 93.4% |
| Example 92 | Example 52 | 3-chlorobenzaldehyde | 1,8-naphthalic anhydride | 92.9% |
| Example 93 | Example 53 | 3-chlorobenzaldehyde | 1,2-naphthalic anhydride | 91.6% |
| Example 94 | Example 54 | 3-chlorobenzaldehyde | indole-2-carboxylic acid | 93.6% |
| Example 95 | Example 55 | 3-chlorobenzaldehyde | benzofuran-2-carboxylic acid | 92.6% |
| Example 96 | Example 56 | 3-chlorobenzaldehyde | phenylboronic acid | 93.6% |
| Example 97 | Example 57 | 3-chlorobenzaldehyde | benzenesulfonic acid | 94.8% |
| Example 98 | Example 58 | 3-chlorobenzaldehyde | methyl benzenesulfonate | 92.6% |
| Example 99 | Example 59 | 3-chlorobenzaldehyde | phenyl phosphoric acid | 93.7% |
| Example 100 | Example 60 | 3-chlorobenzaldehyde | phenylphosphonic acid | 91.5% |
| Example 101 | Example 61 | 3-chlorobenzaldehyde | dimethyl phenylphosphonate | 91.8% |
| Example 102 | Example 62 | 3-chlorobenzaldehyde | acetic acid | 91.6% |
| Example 103 | Example 63 | 3-chlorobenzaldehyde | methanesulfonic acid | 92.6% |
| Example 104 | Example 64 | 2-chloroacetophenone | 3-chlorobenzoic acid | 91.1% |
| Example 105 | Example 65 | 2-chloroacetophenone | trimellitic anhydride | 91.1% |
| Example 106 | Example 66 | methyl 2-chlorobenzoate | 3-chlorobenzoic acid | 90.3% |
| Example 107 | Example 67 | 2,4-dichlorofluorobenzne | 3-chlorobenzoic acid | 91.9% |
| Comparative Example 13 | Comparative Synthetic Example 13 | 2,4-dichlorofluorobenzne | — | 88.5% |
| Example 108 | Example 68 | 2-fluoronitrobenzene | 3-chlorobenzoic acid | 93.1% |
| Comparative Example 14 | Comparative Synthetic Example 14 | 2-fluoronitrobenzene | — | 90.7% |
| Example 109 | Example 69 | tetrahydrofuran | 3-chlorobenzoic acid | 91.3% |
| Comparative Example 15 | Comparative Synthetic Example 15 | tetrahydrofuran | — | 89.1% |

TABLE 13

| Electrophotographic photoreceptor | Charge generation substance (phthalocyanine crystal) | Non-acidic organic compound | Particular organic acid compound | Sensitivity retention (%) |
|---|---|---|---|---|
| Example 110 | Example 70 | 3-chlorobenzaldehyde | 3-chlorobenzoic acid | 92.7% |
| Example 111 | Example 71 | 3-chlorobenzaldehyde | 3-chlorobenzoic acid | 93.6% |
| Example 112 | Example 72 | 3-chlorobenzaldehyde | phthalic anhydride | 92.7% |
| Example 113 | Example 73 | 3-chlorobenzaldehyde | trimellitic anhydride | 95.7% |
| Example 114 | Example 74 | 3-chlorobenzaldehyde | pyromellitic anhydride | 92.9% |

When these electrophotographic photoreceptors of Examples 75 to 114 and Comparative Examples 13 to 15 using the phthalocyanine crystals of Examples 35 to 74 and Comparative Synthetic Examples 13 to 15 as charge generation substances were compared, the electrophotographic photoreceptors of Comparative Examples 14 and 15 were poor in standard-humidity sensitivity $En_{1/2}$ and also poor in sensitivity retention. Moreover, the electrophotographic photoreceptors of Comparative Example 13 had standard-humidity sensitivity $En_{1/2}$ equal to that of the electrophotographic photoreceptors of Examples. However, when the values of the sensitivity retention are compared, the electrophotographic photoreceptors of Examples using phthalocyanine crystals obtained by the contact with the non-acidic organic compound and the particular organic acid compound show little fluctuation in sensitivity for a humidity change as compared with the electrophotographic photoreceptors of Comparative Examples using phthalocyanine crystals obtained by the contact with the non-acidic organic compound alone.

Examples 115, 116

An electrophotographic photoreceptor was produced in accordance with the procedure of the above [Process for Producing Photoreceptor] except that 20 parts by weight of the phthalocyanine crystal of Example 1 and 1.25 parts by weight of 3-chlorobenzoic acid were used in combination at the preparation of the coating solution for a charge generation layer in the above [Process for Producing Photoreceptor] instead of 20 parts by weight of the phthalocyanine crystal of each of the above Examples and Comparative Synthetic Examples. Hereinafter, this photoreceptor is optionally referred to as an electrophotographic photoreceptor of Example 115.

Moreover, an electrophotographic photoreceptor was produced in accordance with the procedure the same as in Example 115 except that 1.25 parts by weight of trimellitic organic acid anhydride was used instead of 1.25 parts by weight of 3-chlorobenzoic acid. Hereinafter, this photoreceptor is optionally referred to as an electrophotographic photoreceptor of Example 116.

Also on these electrophotographic photoreceptors of Examples 115 and 116, electrical properties were evaluated in accordance with the procedure the same as in the cases of the electrophotographic photoreceptors of the above Examples 9 to 16 and Comparative Examples 1 and 2.

The following Table 14 shows the evaluation results of the electrical properties on the electrophotographic photoreceptors of Examples 79, 86, 115, and 116.

TABLE 14

| Electrophotographic photoreceptor | Charge generation substance | Non-acidic organic compound | Particular organic acid compound | Additive at preparation of coating solution for charge generation layer | Sensitivity retention (%) |
|---|---|---|---|---|---|
| Example 79 | Example 39 | 3-chloro-benzaldehyde | 3-chloro-benzoic acid | — | 94.3% |
| Example 86 | Example 46 |  | phthalic anhydride | — | 96.6% |
| Example 115 | Example 1 | — | — | 3-chloro-benzoic acid | 90.7% |
| Example 116 | Example 1 | — | — | trimellitic organic acid anhydride | 90.6% |

From the above results, it is realized that the effect of improving sensitivity and suppressing sensitivity fluctuation for a humidity change in usage environment is small only by adding the aforementioned particular organic acid compound at the preparation of the coating solution for the charge generation layer.

Examples 117 to 131

As a phthalocyanine crystal precursor, 40 parts by weight of wet cake of the low-crystalline oxytitanium phthalocyanine obtained in Synthetic Example 2 was added into 100 parts by weight of water, followed by stirring at room temperature for 30 minutes. Thereafter, 9 ml of each of the contact treatment solutions of Examples 117 to 131 (solutions each obtained by mixing an electron-withdrawing particular aromatic compound into a non-acidic particular organic compound in a predetermined concentration) shown in the following Table 15 was added thereto, followed by further stirring at room temperature for 1 hour. After stirring, water was separated and 80 parts by weight of methanol was added, followed by stirring and washing at room temperature for 1 hour. After washing, the product was filtrated off and 80 parts by weight of methanol was again added, followed by stirring and washing for 1 hour. Thereafter, it was filtrated off and was heated and dried in a vacuum drier to thereby obtain crystals of oxytitanium phthalocyanine alone (hereinafter, they are optionally referred to as phthalocyanine crystals of Examples 117 to 131).

Powder XRD spectra of the phthalocyanine crystals of Examples 117 to 131 were measured. In the powder XRD spectra obtained, any of the phthalocyanine crystals had a main diffraction peak at Bragg angle (2θ±0.2°) of 27.2° toward CuKα characteristic X-ray (wavelength 1.541 angstrom). In the case where the non-acidic particular organic compounds used were the same, powder X-ray diffraction spectra each having about the same shape were obtained regardless of the presence of the electron-withdrawing particular aromatic compound. As representative examples, FIGS. 45 to 48 show powder XRD spectra of the phthalocyanine crystals obtained in Examples 128 to 131.

Example 132

Figure 49:
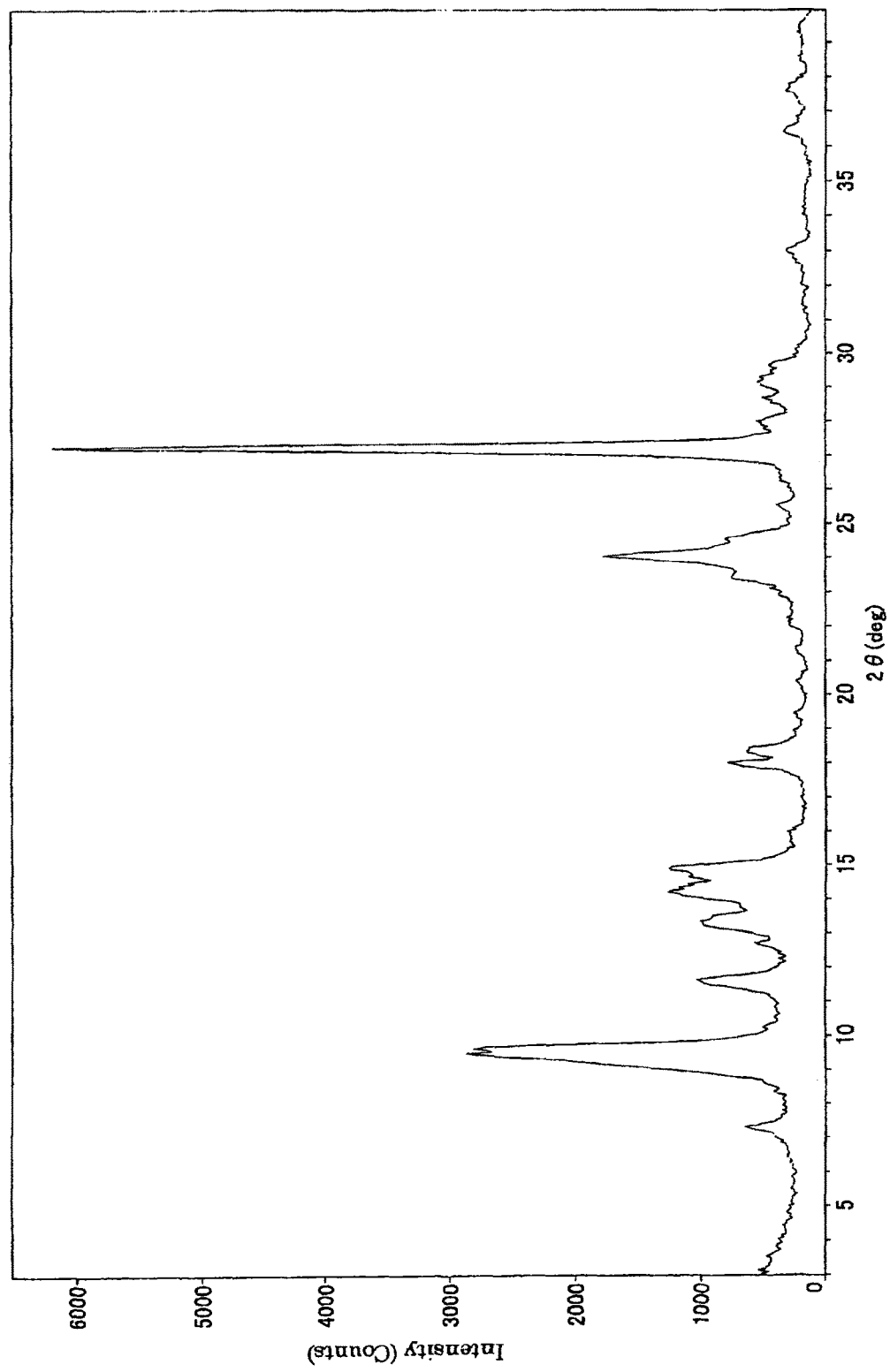
FIG. 49 is a powder XRD spectrum of the phthalocyanine crystal (a crystal of oxytitanium phthalocyanine alone) obtained in Example 132.

Forty parts by weight of wet cake of the low-crystalline oxytitanium phthalocyanine (phthalocyanine crystal precursor) obtained in Synthetic Example 2 was added into a mixed solution (a contact treatment solution of Example 132 shown in the following Table 15) obtained by dissolving 15 g of phthalide (an electron-withdrawing particular aromatic compound) in 100 ml of tetrahydrofuran (a non-acidic particular organic compound), followed by stirring at room temperature for 3 hours. After stirring, the product was filtrated off and was heated and dried in a vacuum drier to thereby obtain crystals consisting of oxytitanium phthalocyanine alone (hereinafter, they are optionally referred to as phthalocyanine crystal of Example 132). FIG. 49 shows a powder XRD spectrum of the phthalocyanine crystal of Example 132. As apparent from FIG. 49, the powder XRD spectrum of the phthalocyanine crystal in Example 132 had a main diffraction peak at Bragg angle (2θ±0.2°) of 27.2° toward CuKα characteristic X-ray (wavelength 1.541 angstrom).

TABLE 15

| | Contact treatment solution | | |
|---|---|---|---|
| | Non-acidic particular organic compound | Electron-withdrawing particular aromatic compound | Concentration of electron-withdrawing particular aromatic compound (g/ml) |
| Example 117 | 3-chlorobenzaldehyde | 3,5-dinitrobenzoic acid | 0.056 |
| Example 118 | 3-chlorobenzaldehyde | 3-fluorobenzoic acid | 0.056 |
| Example 119 | 3-chlorobenzaldehyde | phthalide | 0.056 |
| Example 120 | 3-chlorobenzaldehyde | 2-sulfobenzoic anhydride | 0.056 |
| Example 121 | 3-chlorobenzaldehyde | 1,3-dinitrobenzne | 0.056 |
| Example 122 | 3-chlorobenzaldehyde | 4-nitrophthalonitrile | 0.056 |
| Example 123 | 3-chlorobenzaldehyde | 3-nitroacetophenone | 0.056 |
| Example 124 | 3-chlorobenzaldehyde | phthalic anhydride | 0.056 |
| Example 125 | 3-chlorobenzaldehyde | 4-nitrophthalic anhydride | 0.056 |
| Example 126 | 3-chlorobenzaldehyde | pyromellitic anhydride | 0.037 |
| Example 127 | 3-chlorobenzaldehyde | 1,8-naphthalic anhydride | 0.037 |
| Example 128 | 2,4-dichlorofluorobenzene | phthalide | 0.056 |
| Example 129 | 2-chloroacetophenone | phthalide | 0.056 |
| Example 130 | methyl 2-chlorobenzoate | 2-sulfobenzoic acid | 0.056 |
| Example 131 | 2-fluoronitrobenzene | 2-sulfobenzoic acid | 0.056 |
| Example 132 | tetrahydrofuran | phthalide | 0.15 |

Examples 133 to 136

As a phthalocyanine crystal precursor, 33 parts by weight of wet cake of the low-crystalline oxytitanium phthalocyanine obtained in Synthetic Example 3 was added into 90 parts by weight of water, followed by stirring at room temperature for 30 minutes. Thereafter, 9 ml of each of the contact treatment solutions of Examples 133 to 136 (solutions each obtained by mixing an electron-withdrawing particular aromatic compound into a non-acidic particular organic compound of 3-chlorobenzaldehyde in a predetermined concentration) shown in the following Table 16 was added thereto, followed by further stirring at room temperature for 1 hour. After stirring, water was separated and 80 parts by weight of methanol was added, followed by stirring and washing at room temperature for 1 hour. After washing, the product was filtrated off and 80 parts by weight of methanol was again added, followed by stirring and washing for 1 hour. Thereafter, it was filtrated off and was heated and dried in a vacuum drier to thereby obtain mixed crystals of oxytitanium phthalocyanine and metal-free phthalocyanine (they are referred to as phthalocyanine crystals of Examples 133 to 136, respectively).

Figure 50:
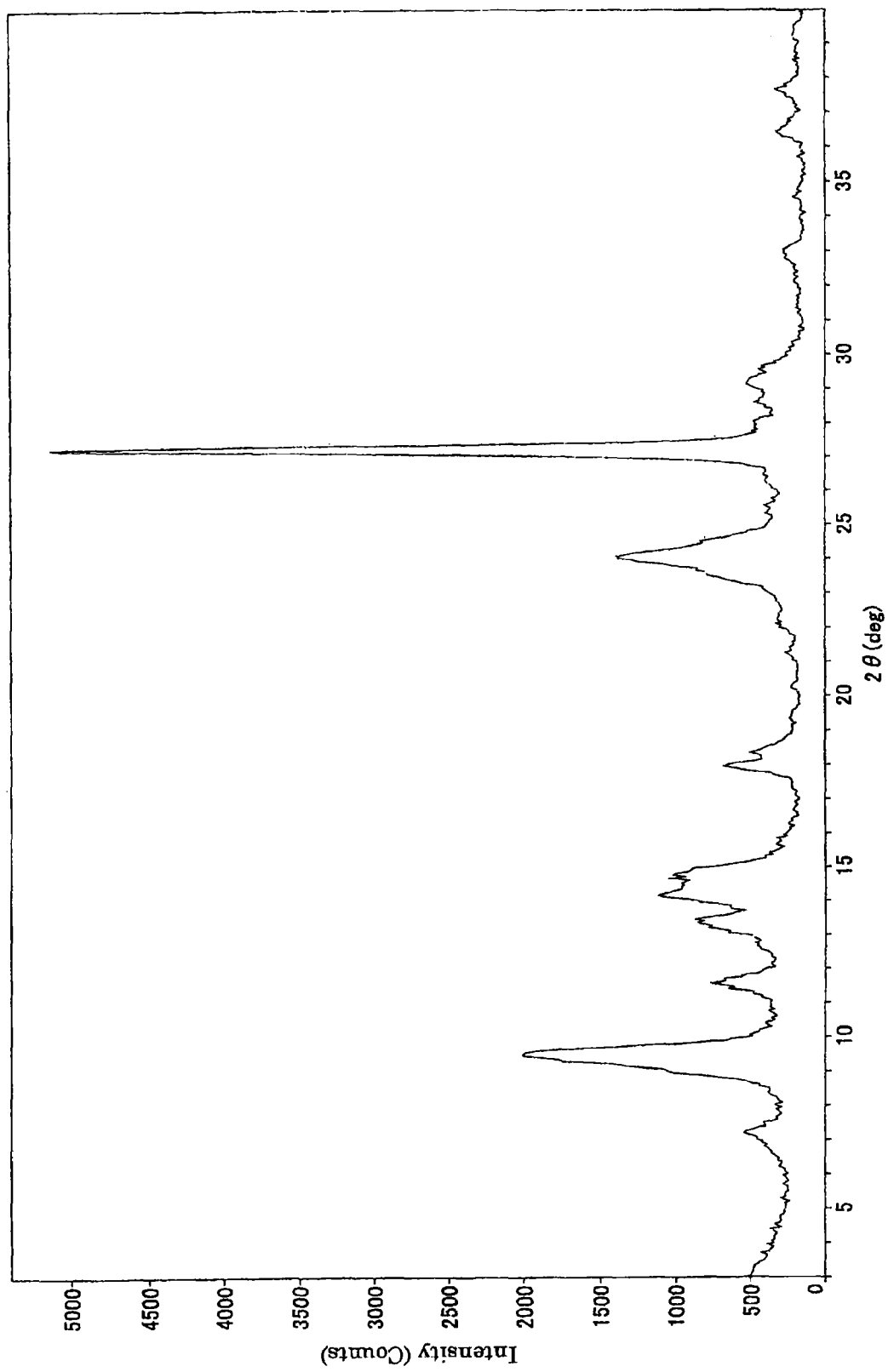
FIG. 50 is a powder XRD spectrum of the phthalocyanine crystal (a crystal of oxytitanium phthalocyanine alone) obtained in Example 133.

Powder XRD spectra of the phthalocyanine crystals of Examples 133 to 136 were measured. In the powder XRD spectra obtained, any of the phthalocyanine crystals had a main diffraction peak at Bragg angle (2θ±0.2°) of 27.2° toward CuKα characteristic X-ray (wavelength 1.541 angstrom). Moreover, powder X-ray diffraction spectra each had about the same shape. As an representative example, FIG. 50 shows a powder XRD spectrum of the phthalocyanine crystal obtained in Example 133.

TABLE 16

| | Contact treatment solution | | |
|---|---|---|---|
| | Non-acidic particular organic compound | Electron-withdrawing particular aromatic compound | Concentration of electron-withdrawing particular aromatic compound (g/ml) |
| Example 133 | 3-chlorobenzaldehyde | phthalide | 0.028 |
| Example 134 | 3-chlorobenzaldehyde | 2-sulfobenzoic anhydride | 0.056 |
| Example 135 | 3-chlorobenzaldehyde | 4-nitrophthalic anhydride | 0.028 |
| Example 136 | 3-chlorobenzaldehyde | pyromellitic anhydride | 0.028 |

Examples 137 to 156

Using phthalocyanine crystals of Examples 117 to 136 as charge generation substances, electrophotographic photoreceptors were produced in accordance with the above [Process for Producing Photoreceptor] (hereinafter, they are optionally referred to as electrophotographic photoreceptors of Examples 137 to 156). The correspondence of each electrophotographic photoreceptor to the phthalocyanine crystal used as the charge generation substance and a composition ratio thereof was shown in the following Table 17 and Table 18.

[Evaluation of Electrophotographic Photoreceptor]

The electrophotographic photoreceptors of Examples 137 to 156 and Comparative Examples 13 to 15 were evaluated on electrical properties in the same manner as the evaluation of Examples 9 to 16. The following Table 17 and Table 18 show evaluation results of the sensitivity retention on the electrophotographic photoreceptors of Examples 137 to 156 and Comparative Examples 13 to 15. In the following Table 17 and Table 18, Example(s) and Comparative Example using phthalocyanine crystals each obtained using the same non-acidic organic compound are shown above and below.

TABLE 17

| Electro-photographic photoreceptor | Charge generation substance (phthalocyanine crystal) | Non-acidic particular organic compound | Electron-withdrawing particular aromatic compound | Sensitivity retention (%) |
|---|---|---|---|---|
| Example 137 | Example 117 | 3-chlorobenzaldehyde | 3,5-dinitrobenzoic acid | 94.7% |
| Example 138 | Example 118 | 3-chlorobenzaldehyde | 3-fluorobenzoic acid | 93.5% |
| Example 139 | Example 119 | 3-chlorobenzaldehyde | phthalide | 92.8% |
| Example 140 | Example 120 | 3-chlorobenzaldehyde | 2-sulfobenzoic anhydride | 93.0% |
| Example 141 | Example 121 | 3-chlorobenzaldehyde | 1,3-dinitrobenzne | 93.3% |
| Example 142 | Example 122 | 3-chlorobenzaldehyde | 4-nitrophthalonitrile | 92.4% |
| Example 143 | Example 123 | 3-chlorobenzaldehyde | 3-nitroacetophenone | 92.6% |
| Example 144 | Example 124 | 3-chlorobenzaldehyde | phthalic anhydride | 94.4% |
| Example 145 | Example 125 | 3-chlorobenzaldehyde | 4-nitrophthalic anhydride | 94.7% |
| Example 146 | Example 126 | 3-chlorobenzaldehyde | pyromellitic anhydride | 94.6% |
| Example 147 | Example 127 | 3-chlorobenzaldehyde | 1,8-naphthalic anhydride | 92.9% |
| Example 148 | Example 128 | 2-chloroacetophenone | phthalide | 88.1% |
| Example 149 | Example 129 | methyl 2-chlorobenzoate | 2-sulfobenzoic anhydride | 90.3% |
| Example 150 | Example 130 | 2,4-dichlorofluorobenzene | phthalide | 90.2% |
| Comparative Example 13 | Synthetic Comparative Example 13 | 2,4-dichlorofluorobenzene | — | 88.5% |
| Example 151 | Example 131 | 2-fluoronitrobenzene | 2-sulfobenzoic anhydride | 91.9% |
| Comparative Example 14 | Synthetic Comparative Example 14 | 2-fluoronitrobenzene | — | 90.7% |
| Example 152 | Example 132 | tetrahydrofuran | phthalide | 91.1% |
| Comparative Example 15 | Synthetic Comparative Example 15 | tetrahydrofuran | — | 89.1% |

TABLE 18

| Electro-photographic photoreceptor | Charge generation substance (phthalocyanine crystal) | Non-acidic particular organic compound | Electron-withdrawing particular aromatic compound | Sensitivity retention (%) |
|---|---|---|---|---|
| Example 153 | Example 133 | 3-chlorobenzaldehyde | phthalide | 90.8% |
| Example 154 | Example 134 | 3-chlorobenzaldehyde | 2-sulfobenzoic anhydride | 91.1% |
| Example 155 | Example 135 | 3-chlorobenzaldehyde | 4-nitrophthalic anhydride | 92.2% |
| Example 156 | Example 136 | 3-chlorobenzaldehyde | pyromellitic anhydride | 92.9% |

When these electrophotographic photoreceptors of Examples 137 to 156 and Comparative Examples 13 to 15 using the phthalocyanine crystals of Examples 117 to 136 and Comparative Synthetic Examples 13 to 15 as charge generation substances were compared, the electrophotographic photoreceptors of Comparative Examples 14 and 15 were poor in standard-humidity sensitivity $En_{1/2}$. The electrophotographic photoreceptors of Comparative Example 13 had standard-humidity sensitivity $En_{1/2}$ equal to that of the electrophotographic photoreceptors of Examples. However, when the values of the sensitivity retention are compared, the electrophotographic photoreceptors of Examples using phthalocyanine crystals obtained by the contact with the non-acidic particular organic compound and the electron-withdrawing particular aromatic compound show little fluctuation in sensitivity for a humidity change as compared with the electrophotographic photoreceptors of Comparative Examples using phthalocyanine crystals obtained by the contact with the non-acidic particular organic compound alone.

Examples 157, 158

An electrophotographic photoreceptor was produced in accordance with the procedure of the above [Process for Producing Photoreceptor] except that 20 parts by weight of the phthalocyanine crystal of Example 1 and 1.25 parts by weight of phthalide were used in combination in the fine-dispersion treatment step at the preparation of the coating solution for a charge generation layer in the above [Process for Producing Photoreceptor]. Hereinafter, this photoreceptor is optionally referred to as an electrophotographic photoreceptor of Example 157.

Moreover, an electrophotographic photoreceptor was produced in accordance with the procedure the same as in Example 157 except that 1.25 parts by weight of 2-sulfobenzoic anhydride was used instead of 1.25 parts by weight of phthalide. Hereinafter, this photoreceptor is optionally referred to as an electrophotographic photoreceptor of Example 158.

On these electrophotographic photoreceptors of Examples 157 and 158, electrical properties were also evaluated in accordance with the procedure the same as in the cases of the electrophotographic photoreceptors of the above Examples 9 to 16. The following Table 19 shows the evaluation results.

TABLE 19

| Electro-photographic photoreceptor | Charge generation substance | Contact solution Non-acidic particular organic compound | Contact solution Electron-withdrawing particular aromatic compound | Additive at preparation of coating solution for charge generation layer | Sensitivity retention (%) |
|---|---|---|---|---|---|
| Example 139 | Example 119 | 3-chloro-benzaldehyde | phthalide | — | 92.8% |
| Example 140 | Example 120 | 3-chloro-benzaldehyde | 2-sulfobenzoic anhydride | — | 93.0% |
| Example 157 | Example 1 | — | — | phthalide | 90.7% |
| Example 158 | Example 1 | — | — | 2-sulfobenzoic anhydride | 90.6% |

From the above results, it was realized that the above effect (effect of improving sensitivity and suppressing sensitivity fluctuation for a humidity change in usage environment) is small by sole addition of the aforementioned electron-withdrawing particular aromatic compound at the preparation of the coating solution for the charge generation layer.

Example 159

An aluminum cylinder made of aluminum alloy which has an outer diameter of 30 mm, a length of 350 mm, and a wall thickness of 1.0 mm and whose surface had been roughly cut (Rmax=1.2) was subjected to anodic oxidation and then to sealing treatment with a sealing agent containing nickel acetate as a main component, whereby an anodic oxidation film (almite film) of about 6 µm was formed.

The cylinder was dip-coated with the coating solution for charge generation layer previously prepared in Example 87 to thereby form a charge generation layer in such a manner that the film thickness after drying was 0.4 µm. Subsequently, 100 parts by weight of a polycarbonate resin (viscosity-average molecular weight: 49,200) having a terminal structural formula derived from p-t-butylphenol consisting of 51% by mol of a repeating unit represented by the above structural formula (G) and 49% by mol of a repeating unit represented by the above structural formula (H), 50 parts by weight of a mixture consisting of a compound group of geometric isomers having a structure represented by the above formula (F), 8 parts by weight of BHT (3,5-di-t-butyl-4-hydroxytoluene) as an antioxidant, and 0.05 part by weight of silicone oil as a leveling agent were mixed with 640 parts by weight of a mixed solvent of tetrahydrofuran and toluene (80% by weight of tetrahydrofuran and 20% by weight of toluene) to prepare a coating solution for charge transport layer. The above-produced cylinder having the charge generation layer thereon was dip-coated with the coating solution for charge transport layer to form a charge transport layer having a film thickness of 35 µm after drying, whereby an electrophotographic photoreceptor was produced. This photoreceptor is referred to as an electrophotographic photoreceptor of Example 159.

Example 160

An electrophotographic photoreceptor was produced in the same manner as in Example 159 except that the film thickness of the charge transport layer was 30 µm. This photoreceptor is referred to as an electrophotographic photoreceptor of Example 160.

Example 161

An electrophotographic photoreceptor was produced in the same manner as in Example 159 except that the film thickness of the charge transport layer was 25 µm. This photoreceptor is referred to as an electrophotographic photoreceptor of Example 161.

Example 162

An electrophotographic photoreceptor was produced in the same manner as in Example 159 except that the film thickness of the charge transport layer was 20 µm. This photoreceptor is referred to as an electrophotographic photoreceptor of Example 162.

Example 163

An electrophotographic photoreceptor was produced in the same manner as in Example 159 except that the film thickness of the charge transport layer was 15 µm. This photoreceptor is referred to as an electrophotographic photoreceptor of Example 163.

Example 164

An electrophotographic photoreceptor was produced in the same manner as in Example 159 except that the coating solution for charge generation layer prepared in Example 105 was used instead of the coating solution for charge generation layer used in Example 159. This photoreceptor is referred to as an electrophotographic photoreceptor of Example 164.

Example 165

An electrophotographic photoreceptor was produced in the same manner as in Example 164 except that the film thickness of the charge transport layer was 30 µm. This photoreceptor is referred to as an electrophotographic photoreceptor of Example 165.

Example 166

An electrophotographic photoreceptor was produced in the same manner as in Example 164 except that the film thickness of the charge transport layer was 25 µm. This photoreceptor is referred to as an electrophotographic photoreceptor of Example 166.

Example 167

An electrophotographic photoreceptor was produced in the same manner as in Example 164 except that the film thickness of the charge transport layer was 20 µm. This photoreceptor is referred to as an electrophotographic photoreceptor of Example 167.

Example 168

An electrophotographic photoreceptor was produced in the same manner as in Example 164 except that the film thickness of the charge transport layer was 15 μm. This photoreceptor is referred to as an electrophotographic photoreceptor of Example 168.

Example 169

An electrophotographic photoreceptor was produced in the same manner as in Example 159 except that the coating solution for charge generation layer prepared in Example 97 was used instead of the coating solution for charge generation layer used in Example 159. This photoreceptor is referred to as an electrophotographic photoreceptor of Example 169.

Example 170

An electrophotographic photoreceptor was produced in the same manner as in Example 169 except that the film thickness of the charge transport layer was 30 μm. This photoreceptor is referred to as an electrophotographic photoreceptor of Example 170.

Example 171

An electrophotographic photoreceptor was produced in the same manner as in Example 169 except that the film thickness of the charge transport layer was 25 μm. This photoreceptor is referred to as an electrophotographic photoreceptor of Example 171.

Example 172

An electrophotographic photoreceptor was produced in the same manner as in Example 169 except that the film thickness of the charge transport layer was 20 μm. This photoreceptor is referred to as an electrophotographic photoreceptor of Example 172.

Example 173

An electrophotographic photoreceptor was produced in the same manner as in Example 169 except that the film thickness of the charge transport layer was 15 μm. This photoreceptor is referred to as an electrophotographic photoreceptor of Example 173.

Example 174

An electrophotographic photoreceptor was produced in the same manner as in Example 159 except that the coating solution for charge generation layer prepared in Example 79 was used instead of the coating solution for charge generation layer used in Example 159. This photoreceptor is referred to as an electrophotographic photoreceptor of Example 174.

Example 175

An electrophotographic photoreceptor was produced in the same manner as in Example 174 except that the film thickness of the charge transport layer was 30 μm. This photoreceptor is referred to as an electrophotographic photoreceptor of Example 175.

Example 176

An electrophotographic photoreceptor was produced in the same manner as in Example 174 except that the film thickness of the charge transport layer was 25 μm. This photoreceptor is referred to as an electrophotographic photoreceptor of Example 176.

Example 177

An electrophotographic photoreceptor was produced in the same manner as in Example 174 except that the film thickness of the charge transport layer was 20 μm. This photoreceptor is referred to as an electrophotographic photoreceptor of Example 177.

Example 178

An electrophotographic photoreceptor was produced in the same manner as in Example 174 except that the film thickness of the charge transport layer was 15 μm. This photoreceptor is referred to as an electrophotographic photoreceptor of Example 178.

Example 179

An electrophotographic photoreceptor was produced in the same manner as in Example 159 except that the coating solution for charge generation layer prepared in Example 145 was used instead of the coating solution for charge generation layer used in Example 159. This photoreceptor is referred to as an electrophotographic photoreceptor of Example 179.

Example 180

An electrophotographic photoreceptor was produced in the same manner as in Example 179 except that the film thickness of the charge transport layer was 30 μm. This photoreceptor is referred to as an electrophotographic photoreceptor of Example 180.

Example 181

An electrophotographic photoreceptor was produced in the same manner as in Example 179 except that the film thickness of the charge transport layer was 25 μm. This photoreceptor is referred to as an electrophotographic photoreceptor of Example 181.

Example 182

An electrophotographic photoreceptor was produced in the same manner as in Example 179 except that the film thickness of the charge transport layer was 20 μm. This photoreceptor is referred to as an electrophotographic photoreceptor of Example 182.

Example 183

An electrophotographic photoreceptor was produced in the same manner as in Example 179 except that the film thickness of the charge transport layer was 15 μm. This photoreceptor is referred to as an electrophotographic photoreceptor of Example 183.

Example 184

An electrophotographic photoreceptor was produced in the same manner as in Example 159 except that the coating solution for charge generation layer prepared in Example 144 was used instead of the coating solution for charge generation layer used in Example 159. This photoreceptor is referred to as an electrophotographic photoreceptor of Example 184.

Example 185

An electrophotographic photoreceptor was produced in the same manner as in Example 184 except that the film thickness of the charge transport layer was 30 µm. This photoreceptor is referred to as an electrophotographic photoreceptor of Example 185.

Example 186

An electrophotographic photoreceptor was produced in the same manner as in Example 184 except that the film thickness of the charge transport layer was 25 µm. This photoreceptor is referred to as an electrophotographic photoreceptor of Example 186.

Example 187

An electrophotographic photoreceptor was produced in the same manner as in Example 184 except that the film thickness of the charge transport layer was 20 µm. This photoreceptor is referred to as an electrophotographic photoreceptor of Example 187.

Example 188

An electrophotographic photoreceptor was produced in the same manner as in Example 184 except that the film thickness of the charge transport layer was 15 µm. This photoreceptor is referred to as an electrophotographic photoreceptor of Example 188.

Example 189

An electrophotographic photoreceptor was produced in the same manner as in Example 159 except that the coating solution for charge generation layer prepared in Example 9 was used instead of the coating solution for charge generation layer used in Example 159. This photoreceptor is referred to as an electrophotographic photoreceptor of Example 189.

Example 190

An electrophotographic photoreceptor was produced in the same manner as in Example 159 except that the coating solution for charge generation layer prepared in Example 26 was used instead of the coating solution for charge generation layer used in Example 159. This photoreceptor is referred to as an electrophotographic photoreceptor of Example 190.

Comparative Example 16

An electrophotographic photoreceptor was produced in the same manner as in Example 159 except that the coating solution for charge generation layer prepared in Comparative Example 15 was used instead of the coating solution for charge generation layer used in Example 159. This photoreceptor is referred to as an electrophotographic photoreceptor of Comparative Example 16.

Comparative Example 17

An electrophotographic photoreceptor was produced in the same manner as in Comparative Example 16 except that the film thickness of the charge transport layer was 30 µm. This photoreceptor is referred to as an electrophotographic photoreceptor of Comparative Example 17.

Comparative Example 18

An electrophotographic photoreceptor was produced in the same manner as in Comparative Example 16 except that the film thickness of the charge transport layer was 25 µm. This photoreceptor is referred to as an electrophotographic photoreceptor of Comparative Example 18.

Comparative Example 19

An electrophotographic photoreceptor was produced in the same manner as in Comparative Example 16 except that the film thickness of the charge transport layer was 20 µm. This photoreceptor is referred to as an electrophotographic photoreceptor of Comparative Example 19.

Comparative Example 20

An electrophotographic photoreceptor was produced in the same manner as in Comparative Example 16 except that the film thickness of the charge transport layer was 15 µm. This photoreceptor is referred to as an electrophotographic photoreceptor of Comparative Example 20.

[Evaluation of Electrophotographic Photoreceptor]

The half-decay exposure E½ of the electrophotographic photoreceptors obtained in Examples 159 to 190 and Comparative Examples 16 to 20 was measured using a commercially available photoreceptor-evaluating apparatus (Cynthia 55 manufactured by Gentec Co.) in a static mode in accordance with the procedure illustrated in the following.

A charging device was disposed at an angle of 0°, an exposing device and a surface potentiometer probe at an angle of 90°, and an erasing device at an angle of 270° C. The charging device, surface potentiometer probe, and erasing device were disposed so that the distance from the photoreceptor surface is 2 mm. The photoreceptor after having been allowed to stand in environment of a temperature of 25° C.±2° C. and relative humidity of 50% rh±5% for 8 hours was electrically charged in a dark place by being passed at a constant rotation speed (30 rpm) on a scorotron charging device, which was set in such a manner that the electrical discharge was carried out so that the surface potential of the photoreceptor was adjusted to be about −700 V.

When the photoreceptor surface after electrical charging reached the probe position, it was stopped and, 2.5 seconds after it was stopped, it was irradiated with monochromatic light of 780 nm in the intensity of 0.15 µW/cm$^2$ for 7.5 seconds obtained from an annexed spectral light source system POLAS34. The exposure required for increasing the surface potential of the photoreceptor from −550 V to −275 V was measured. After the photoreceptor was again rotated and full arc erase was conducted with an erasing device, the same operations were carried out. The cycle was repeated six times and the measured values of the exposure obtained in 5 cycles excluding first cycle were averaged and the resulting average value was determined as half-decay exposure E½ (μJ/cm²). The measured results were shown in Table 20.

Then, the photoreceptor was mounted on an electrophotographic property-evaluating apparatus, which was manufactured according to the standard of the Society of Electrophotography ["Zoku Denshishashin Gijutsu No Kiso To Oyo", edited by the Society of Electrophotography, issued by Corona Publishing Co. Ltd, pp. 404-405] and electrical properties were evaluated through a cycle of charging, exposure, measurement of potential, and erase.

A charging device was disposed at an angle of −70°, an exposing device at an angle of 0° C., a surface potentiometer probe at an angle of 36°, and an erasing device at an angle of −150° C. Individual devices were disposed so that the distance from the photoreceptor surface is 2 mm. For the charging, a scorotron charging device is used. As an exposing lamp, a halogen lamp JDR110V-85WLN/K7 manufactured by Ushio, Inc. was used and monochromatic light of 780 nm is formed using a filter MX0780 manufactured by Asahi Spectra Co., Ltd. LED light of 660 nm was used as an erasing light.

The photoreceptor after having been allowed to stand in environment of a temperature of 25° C.±2° C. and relative humidity of 50% rh±5% for 8 hours was charged with rotation at a constant rotation speed (60 rpm) so that an initial surface potential of the photoreceptor was −700 V. When the charged photoreceptor surface passed through an exposure portion irradiated with monochromatic light of 780 nm and reached the probe position, the surface potential was measured (time for exposure to potential measurement: 100 ms).

The monochromatic light of 780 nm was passed through ND filter to change light intensity, the photoreceptor was irradiated with a light in an exposure 0 to 10 times the half-decay exposure $E_{1/2}$, and surface potential was measured at each exposure. The operations were carried out under the environment of a temperature of 25° C.±2° C. and a humidity of 50% rh±5% (normal temperature and normal humidity environment; hereinafter suitably sometimes referred to as "NN environment") and potential after exposure under the NN environment at each exposure (hereinafter suitably sometimes referred to as "$V_{NN}$") was measured.

Thereafter, after the photoreceptor had been allowed to stand in the environment of a temperature of 25° C.±2° C. and relative humidity of 10% rh±5%, the same operations are carried out in the environment of a temperature of 25° C.±2° C. and a humidity of 10% rh±5% (hereinafter sometimes referred to as "NL environment") and potential after exposure under the NL environment at each exposure (hereinafter sometimes referred to as "$V_{NL}$") was measured.

An absolute value of the difference between potential after exposure $V_{NN}$ under the NN environment and $V_{NL}$ under the NL environment at the same exposure ($|V_{NN}-V_{NL}|$) was calculated and the maximum value was determined as environmental fluctuation dependence, the value being shown in the following Table 20.

Moreover, images formed using the electrophotographic photoreceptor were evaluated by the following evaluation method.

The electrophotographic photoreceptor was mounted on the cartridge for a digital copying machine DIALTA Di350 manufactured by Minolta Co. and then the cartridge was mounted on the copying machine. After the copying machine was allowed to stand under the environment of a temperature of 35° C.±2° C. and relative humidity of 83% rh±5% for 24 hours and then further allowed to stand under the environment of a temperature of 5° C.±2° C. and relative humidity of 10% rh±5% for 5 hours, halftone images were printed.

At that time, the occurrence of black streaks generated through one round of the electrophotographic photoreceptor was compared. The copying machine manufactured by Minolta Co. is an apparatus wherein an electrophotographic photoreceptor is charged by a scorotron charging device and developed in a two-component contact developing method and hence black streaks tend to occur.

TABLE 20

| | Solvent | Additive | Film thickness (μm) | Half-decay exposure E½ (μJ/cm²) | Environmental fluctuation dependence (V) | Image evaluation |
|---|---|---|---|---|---|---|
| Example 159 | 3-chlorobenzaldehyde | Trimellitic acid | 35 | 0.049 | 20 | ⊚ |
| Example 160 | 3-chlorobenzaldehyde | Trimellitic acid | 30 | 0.051 | 18 | ⊚ |
| Example 161 | 3-chlorobenzaldehyde | Trimellitic acid | 25 | 0.055 | 20 | ⊚ |
| Example 162 | 3-chlorobenzaldehyde | Trimellitic acid | 20 | 0.066 | 17 | ⊚ |
| Example 163 | 3-chlorobenzaldehyde | Trimellitic acid | 15 | 0.075 | 16 | ⊚ |
| Example 164 | 2-chloroacetophenone | Trimellitic acid | 35 | 0.053 | 19 | ⊚ |
| Example 165 | 2-chloroacetophenone | Trimellitic acid | 30 | 0.057 | 20 | ⊚ |
| Example 166 | 2-chloroacetophenone | Trimellitic acid | 25 | 0.060 | 18 | ⊚ |
| Example 167 | 2-chloroacetophenone | Trimellitic acid | 20 | 0.069 | 16 | ⊚ |
| Example 168 | 2-chloroacetophenone | Trimellitic acid | 15 | 0.078 | 15 | ⊚ |
| Example 169 | 3-chlorobenzaldehyde | benzenesulfonic acid | 35 | 0.048 | 19 | ⊚ |
| Example 170 | 3-chlorobenzaldehyde | benzenesulfonic acid | 30 | 0.050 | 19 | ⊚ |
| Example 171 | 3-chlorobenzaldehyde | benzenesulfonic acid | 25 | 0.053 | 19 | ⊚ |

TABLE 20-continued

|  | Solvent | Additive | Film thickness (μm) | Half-decay exposure E½ (μJ/cm²) | Environmental fluctuation dependence (V) | Image evaluation |
|---|---|---|---|---|---|---|
| Example 172 | 3-chlorobenz-aldehyde | benzene-sulfonic acid | 20 | 0.064 | 17 | ⊚ |
| Example 173 | 3-chlorobenz-aldehyde | benzene-sulfonic acid | 15 | 0.074 | 15 | ⊚ |
| Example 174 | 3-chlorobenz-aldehyde | 3-chloro-benzoic acid | 35 | 0.050 | 30 | ⊚ |
| Example 175 | 3-chlorobenz-aldehyde | 3-chloro-benzoic acid | 30 | 0.052 | 30 | ⊚ |
| Example 176 | 3-chlorobenz-aldehyde | 3-chloro-benzoic acid | 25 | 0.056 | 29 | ⊚ |
| Example 177 | 3-chlorobenz-aldehyde | 3-chloro-benzoic acid | 20 | 0.068 | 27 | ⊚ |
| Example 178 | 3-chlorobenz-aldehyde | 3-chloro-benzoic acid | 15 | 0.077 | 26 | ⊚ |
| Example 179 | 3-chlorobenz-aldehyde | 4-nitro-phthalic anhydride | 35 | 0.048 | 28 | ⊚ |
| Example 180 | 3-chlorobenz-aldehyde | 4-nitro-phthalic anhydride | 30 | 0.051 | 29 | ⊚ |

\* The occurrence of black streaks observed at the image evaluation by the above-defined procedure is shown by the following symbols.
⊚: black streaks are entirely not observed
○: black streaks are hardly observed
Δ: black streaks are slightly observed
X: black streaks are clearly observed

TABLE 21

|  | Solvent | Additive | Film thickness (μm) | Half-decay exposure E½ (μJ/cm²) | Environmental fluctuation dependence (V) | Image evaluation |
|---|---|---|---|---|---|---|
| Example 181 | 3-chlorobenz-aldehyde | 4-nitro-phthalic anhydride | 25 | 0.056 | 26 | ⊚ |
| Example 182 | 3-chlorobenz-aldehyde | 4-nitro-phthalic anhydride | 20 | 0.066 | 25 | ⊚ |
| Example 183 | 3-chlorobenz-aldehyde | 4-nitro-phthalic anhydride | 15 | 0.076 | 23 | ⊚ |
| Example 184 | 3-chlorobenz-aldehyde | phthalic anhydride | 35 | 0.050 | 30 | ⊚ |
| Example 185 | 3-chlorobenz-aldehyde | phthalic anhydride | 30 | 0.053 | 29 | ⊚ |
| Example 186 | 3-chlorobenz-aldehyde | phthalic anhydride | 25 | 0.056 | 30 | ⊚ |
| Example 187 | 3-chlorobenz-aldehyde | phthalic anhydride | 20 | 0.067 | 29 | ⊚ |
| Example 188 | 3-chlorobenz-aldehyde | phthalic anhydride | 15 | 0.078 | 27 | ⊚ |
| Example 189 | 3-chlorobenz-aldehyde | none | 25 | 0.058 | 34 | ○ |
| Example 190 | 2-chloro-acetophenone | none | 25 | 0.061 | 35 | ○ |
| Comparative Example 16 | tetrahydro-furan | none | 35 | 0.052 | 55 | X |
| Comparative Example 17 | tetrahydro-furan | none | 30 | 0.054 | 50 | X |
| Comparative Example 18 | tetrahydro-furan | none | 25 | 0.059 | 49 | X |
| Comparative Example 19 | tetrahydro-furan | none | 20 | 0.070 | 47 | X |
| Comparative Example 20 | tetrahydro-furan | none | 15 | 0.078 | 42 | Δ |

\* The occurrence of black streaks observed at the image evaluation by the above-defined procedure is shown by the following symbols.
⊚: black streaks are entirely not observed
○: black streaks are hardly observed
Δ: black streaks are slightly observed
X: black streaks are clearly observed From the results of Table 20, the following are found. When compared at the same film thickness, the electrophotographic photoreceptors of Examples 159 to 190 have smaller half-decay exposure E½ and higher sensitivity and also smaller environmental fluctuation dependence than the photoreceptors of Comparative Examples have. When images were formed by an image-forming device in a contact development mode on which these electrophotographic photoreceptors were mounted and the image properties were evaluated, black streaks were observed in the case of the photoreceptors of Comparative Examples, while no black streaks were observed in the case of the electrophotographic photoreceptors of the invention.

From the above, it is evident that the electrophotographic photoreceptors of Examples 159 to 190 are highly sensitive and less in fluctuation of properties for a humidity change and a process cartridge and an image-forming device on which these electrophotographic photoreceptors are mounted can provide high quality images without image defects for a environment change.

Example 191

One hundred parts by weight of a polycarbonate resin having a terminal structural formula derived from p-t-butylphenol consisting of 51% by mol of a repeating unit represented by the above structural formula (G) and 49% by mol of a repeating unit represented by the above structural formula (H), 50 parts by weight of a charge transport substance represented by the following structural formula (I), and 0.05 part by weight of silicone oil were mixed with 640 parts by weight of a mixed solvent of tetrahydrofuran and toluene in a ratio of 8:2 to prepare a coating solution for charge transport layer.

[Chem 8]

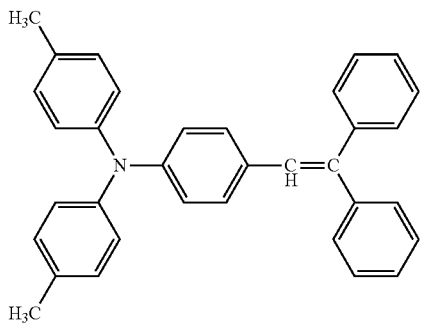

(I)

An electrophotographic photoreceptor was produced in the same manner as in Example 9 except that the coating solution for charge transport layer prepared by the above method was used instead of the coating solution for charge transport layer used in Example 9. This photoreceptor is referred to as an electrophotographic photoreceptor of Example 191.

Example 192

An electrophotographic photoreceptor was produced in the same manner as in Example 191 except that the compound represented by the following structural formula (J) was used instead of the compound represented by the following structural formula (I) used in Example 191. This photoreceptor is referred to as an electrophotographic photoreceptor of Example 192.

[Chem 9]

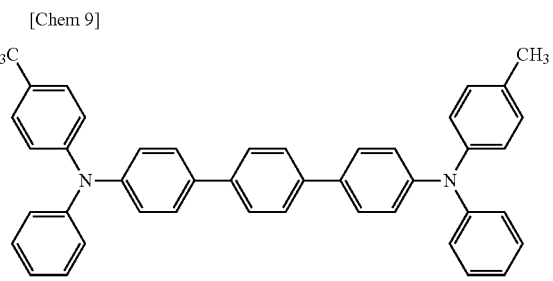

Example 193

An electrophotographic photoreceptor was produced in the same manner as in Example 191 except that the compound represented by the following structural formula (K) was used instead of the compound represented by the following structural formula (I) used in Example 191. This photoreceptor is referred to as an electrophotographic photoreceptor of Example 193.

[Chem 10]

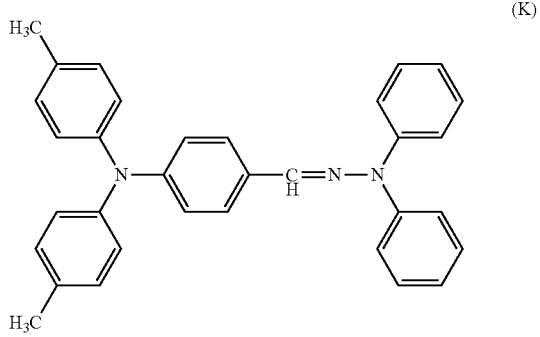

(K)

Example 194

An electrophotographic photoreceptor was produced in the same manner as in Example 191 except that a mixture of the compounds represented by the following structural formulae (L) and (M) in a ratio of L/M=1/1 (by weight) were used instead of the compound represented by the structural formula (I) used in Example 191 so that the total weight was the same as the weight of the compound of the structural formula (I) used in Example 191 as well as the coating solution for charge generation layer used in Example 87 was used instead of the coating solution for charge generation layer used in Example 9. This photoreceptor is referred to as an electrophotographic photoreceptor of Example 194.

[Chem 11]

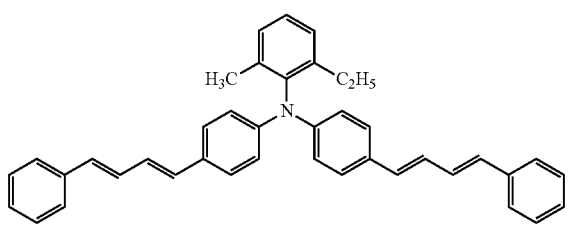

(L)

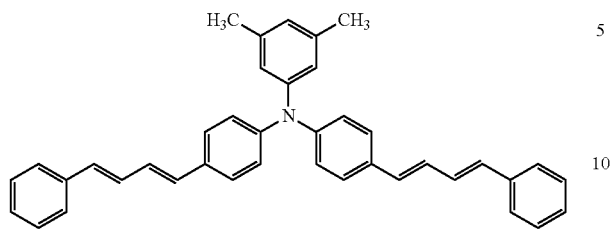

Example 195

An electrophotographic photoreceptor was produced in the same manner as in Example 194 except that a mixture of the compounds represented by the following structural formulae (N) and (O) in a ratio of N/O=1/1 (by weight) was used instead of the compounds represented by the structural formulae (L) and (M) used in Example 194. This photoreceptor is referred to as an electrophotographic photoreceptor of Example 195.

[Chem 12]

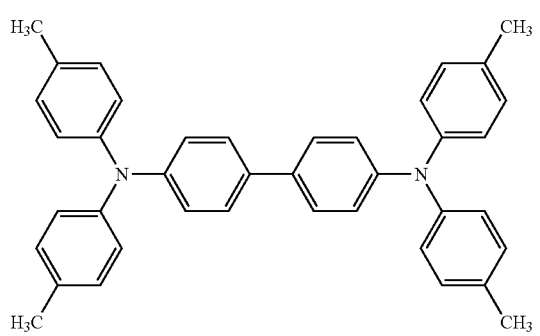

Example 196

An electrophotographic photoreceptor was produced in the same manner as in Example 194 except that the compound represented by the following structural formula (P) was used in the same amount as the total weight of the mixture of the structural formulae (L) and (M) used in Example 194. This photoreceptor is referred to as an electrophotographic photoreceptor of Example 196.

[Chem 13]

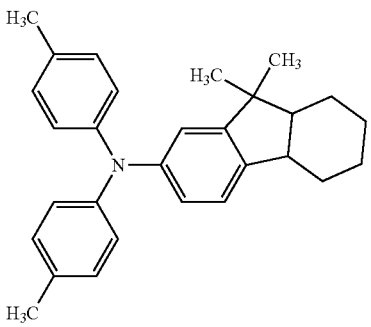

Example 197

An electrophotographic photoreceptor was produced in the same manner as in Example 196 except that a polycarbonate resin consisting of the repeating structural unit represented by the following structural formula (Q) was used instead of the polycarbonate resin used for the coating solution for charge transport layer in Example 196. This photoreceptor is referred to as an electrophotographic photoreceptor of Example 197.

[Chem 14]

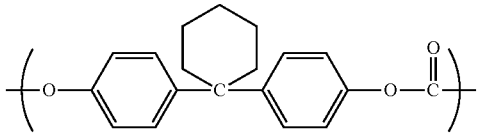

Example 198

An electrophotographic photoreceptor was produced in the same manner as in Example 196 except that a binder resin consisting of the repeating structural unit represented by the following structural formula (R) was used instead of the polycarbonate resin used for the coating solution for charge transport layer and a mixture consisting of the compound group of geometric isomers containing a structure represented by the above structural formula (F) as a main component was used instead of the compound represented by the above structural formula (P) in Example 196. This photoreceptor is referred to as an electrophotographic photoreceptor of Example 198.

[Chem 15]

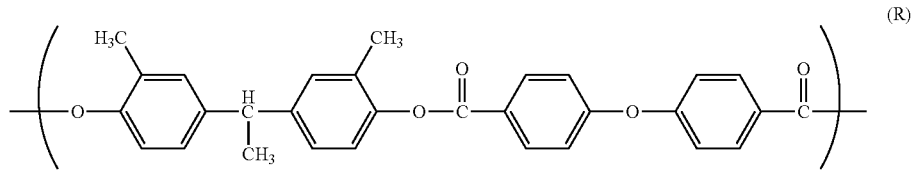

(R)

Example 199

An electrophotographic photoreceptor was produced in the same manner as in Example 198 except that a binder resin consisting of the repeating structural unit represented by the following structural formula (S) was used instead of the binder resin consisting of the repeating structural unit represented by the structural formula (R) used in Example 198 and the coating solution for charge transport layer used in Example 79 was used as a coating solution for charge transport layer. This photoreceptor is referred to as an electrophotographic photoreceptor of Example 199.

[Chem 16]

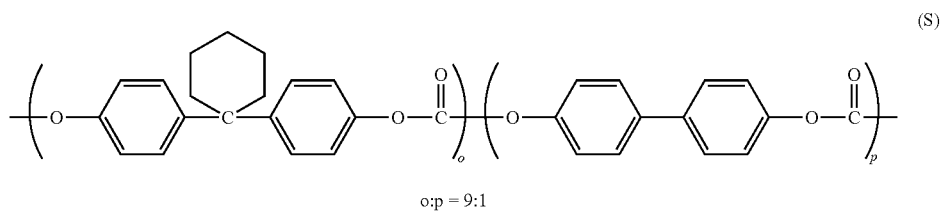

o:p = 9:1

(S)

Example 200

An electrophotographic photoreceptor was produced in the same manner as in Example 198 except that a polycarbonate resin consisting of the repeating structural unit represented by the following structural formula (T) was used instead of the binder resin used for the coating solution for charge transport layer in Example 198. This photoreceptor is referred to as an electrophotographic photoreceptor of Example 200.

[Chem 17]

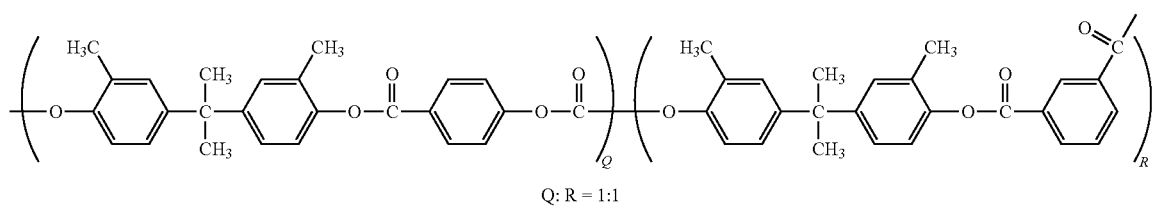

Q:R = 1:1

T

Example 201

An electrophotographic photoreceptor was produced in the same manner as in Example 198 except that the coating solution for charge generation layer used in Example 97 was used instead of the coating solution for charge generation layer used in Example 198 and a binder resin consisting of the repeating structural unit represented by the following structural formula (U) was used as a binder resin for the coating solution for charge transport layer. This photoreceptor is referred to as an electrophotographic photoreceptor of Example 201.

[Chem 18]

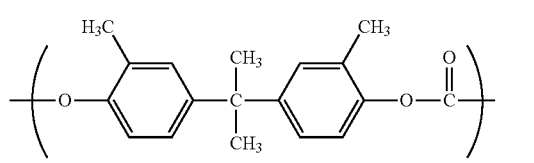

(U)

Example 202

An electrophotographic photoreceptor was produced in the same manner as in Example 198 except that a binder resin consisting of the repeating structural unit represented by the following structural formula (V) was used instead of the binder resin used for the coating solution for charge transport layer used in Example 201. This photoreceptor is referred to as an electrophotographic photoreceptor of Example 202.

[Chem 19]

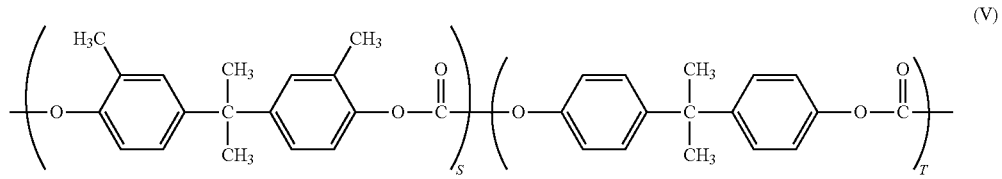

(V)

S:T = 3:7

Comparative Example 21

An electrophotographic photoreceptor was produced in the same manner as in Example 191 except that the charge generation substance for the coating solution for charge generation layer was changed to the compound obtained in Comparative Synthetic Example 1. This photoreceptor is referred to as an electrophotographic photoreceptor of Comparative Example 21.

Comparative Example 22

An electrophotographic photoreceptor was produced in the same manner as in Example 192 except that the charge generation substance for the coating solution for charge generation layer was changed to the compound obtained in Comparative Synthetic Example 1. This photoreceptor is referred to as an electrophotographic photoreceptor of Comparative Example 22.

<Measurement of Properties of Electrophotographic Photoreceptor>

On the electrophotographic photoreceptors produced in Examples 191 to 202 and Comparative Examples 21 to 22, standard-humidity sensitivity $En_{1/2}$ and low-humidity sensitivity $El_{1/2}$ were measured in accordance with the same procedure as in the case of the electrophotographic photoreceptors of Examples 9 to 16 and the sensitivity retention (%) for a humidity change was determined. The results are shown in the following Table 22.

TABLE 22

| Electrophotographic photoreceptor | Charge generation substance (phthalocyanine crystal) | Non-acidic organic compound | Particular organic acid compound | Sensitivity retention (%) |
| --- | --- | --- | --- | --- |
| Example 191 | Example 1 | 3-chlorobenzaldehyde | none | 93.1 |
| Example 192 | Example 1 | 3-chlorobenzaldehyde | none | 93.2 |
| Example 193 | Example 1 | 3-chlorobenzaldehyde | none | 93.6 |
| Example 194 | Example 47 | 3-chlorobenzaldehyde | trimellitic anhydride | 93.6 |
| Example 195 | Example 47 | 3-chlorobenzaldehyde | trimellitic anhydride | 98.7 |
| Example 196 | Example 47 | 3-chlorobenzaldehyde | trimellitic anhydride | 95.8 |
| Example 197 | Example 47 | 3-chlorobenzaldehyde | trimellitic anhydride | 95.9 |
| Example 198 | Example 47 | 3-chlorobenzaldehyde | trimellitic anhydride | 95.2 |
| Example 199 | Example 39 | 3-chlorobenzaldehyde | 3-chlorobenzoic acid | 90.8 |
| Example 200 | Example 39 | 3-chlorobenzaldehyde | 3-chlorobenzoic acid | 89.7 |
| Example 201 | Example 57 | 3-chlorobenzaldehyde | benzenesulfonic acid | 91.1 |
| Example 202 | Example 57 | 3-chlorobenzaldehyde | benzenesulfonic acid | 92.0 |
| Comparative Example 21 | Comparative Synthetic Example 1 | o-dichlorobenzene | none | 85.3 |
| Comparative Example 22 | Comparative Synthetic Example 1 | o-dichlorobenzene | none | 85.3 |

Example 203

An aluminum cylinder made of aluminum which had an outer diameter of 30 mm, a length of 376 mm, and a wall thickness of 0.75 mm and whose surface had been mirror-finished was subjected to anodic oxidation and then to sealing treatment with a sealing agent containing nickel acetate as a main component, whereby an anodic oxidation film (almite film) of about 6 µm was formed. The cylinder was dip-coated with the coating solution for charge generation layer previously prepared in Example 87 to thereby form a charge generation layer in such a manner that the film thickness after drying became 0.4 µm.

Subsequently, 50 parts by weight of a mixture consisting of a compound group of geometric isomers containing a structure represented by the above structural formula (F) as a main component, 100 parts by weight of a polycarbonate resin (viscosity-average molecular weight: 49,200) having a terminal structural formula derived from p-t-butylphenol consisting of 51% by mol of a repeating unit represented by the above structural formula (G) and 49% by mol of a repeating unit represented by the above structural formula (H), 8 parts by weight of 3,5-di-t-butyl-4-hydroxytoluene as an antioxidant, and 0.05 part by weight of silicone oil as a leveling agent were mixed with 640 parts by weight of a mixed solvent of tetrahydrofuran and toluene (80% by weight of tetrahydrofuran and 20% by weight of toluene) to prepare a coating solution for charge transport layer.

The above-produced cylinder having the charge generation layer thereon was dip-coated with the coating solution for charge transport layer to form a charge transport layer having a film thickness of 18 µm after drying, whereby an electrophotographic photoreceptor was produced. This photoreceptor is referred to as an electrophotographic photoreceptor of Example 203.

Example 204

An electrophotographic photoreceptor was produced in the same manner as in Example 203 except that the coating solution for charge generation layer used in Example 203 was changed to the coating solution for charge generation layer prepared in Example 105. This photoreceptor is referred to as an electrophotographic photoreceptor of Example 204.

Comparative Example 23

An electrophotographic photoreceptor was produced in the same manner as in Example 203 except that the coating solution for charge generation layer used in Example 203 was changed to the coating solution for charge generation layer prepared in Comparative Example 15.

<Production of Toner for Development>
Preparation of Wax/Long-Chain Polymerizable Monomer Dispersion Liquid A1

Twenty-seven parts (540 g) of paraffin wax (HNP-9 manufactured by Nippon Seiro Co., Ltd., surface tension 23.5 mN/m, melting point 82° C., melting calorie 220 J/g, melt peak half bandwidth 8.2° C., crystallized peak half bandwidth 13.0° C.), 2.8 parts by weight of stearyl acrylate (manufactured by Tokyo Chemical Industry Co., Ltd.), 1.9 parts by weight of an aqueous solution of 20% by weight of sodium dodecylbenzenesulfonate (Neogen S20A manufactured by Dai-Ichi Kogyo Seiyaku Co., Ltd., hereinafter, optionally abbreviated as "20% aqueous DBS solution"), and 68.3 parts of demineralized water were heated to 90° C. and stirred at a round number of 8000 rpm in a homomixer (Mark II f model manufactured by Tokusyu Kika Kogyo Co.) for 10 minutes.

Then, the dispersion liquid was heated to 90° C. and circulation emulsification was started under a pressurized condition of about 25 MPa using a homogenizer (15-M-8PA type manufactured by Golin Co.) to effect dispersion under measurement by means of microtrack UPA manufactured by Nikkiso Co., Ltd. (hereinafter, optionally abbreviated as "microtrack UPA") so as to achieve a volume-average particle size of 250 nm, whereby a wax/long-chain polymerizable monomer dispersion liquid A1 (emulsion solid matter concentration=30.2% by weight) was prepared.

Preparation of Silicone Wax Dispersion Liquid A2

Twenty-seven parts (540 g) of alkyl-modified silicone wax (melting point 72° C.), 1.9 parts by weight of 20% aqueous DBS solution, and 71.1 parts of demineralized water were placed in a 3 L stainless steel vessel, heated to 90° C., and stirred at a round number of 8000 rpm in a homomixer (Mark II f model manufactured by Tokusyu Kika Kogyo Co.) for 10 minutes.

Then, the dispersion liquid was heated to 99° C. and circulation emulsification was started under a pressurized condition of about 45 MPa using a homogenizer (15-M-8PA type manufactured by Golin Co.) to effect dispersion under measurement by means of microtrack UPA so as to achieve volume-average particle size of 240 nm, whereby a silicone wax dispersion liquid A2 (emulsion solid matter concentration=27.4% by weight) was prepared.

Preparation of Polymer Primary Particle Dispersion Liquid A1

Into a reaction vessel (inner volume 21 L, inner diameter 250 mm, height 420 mm) fitted with a stirring apparatus (three blades), a heating/cooling apparatus, a concentrating apparatus, and a material/auxiliary charging apparatus were charged 35.6 parts by weight (712.12 g) of the wax/long-chain polymerizable monomer dispersion liquid A1 and 259 parts of demineralized water, and the whole was heated to 90° C. under stirring at a rotation number of 103 rpm under a nitrogen stream.

Then, a mixture of the following monomers and aqueous emulsifier solution was added thereto over a period of 5 hours from the initiation of polymerization. The time when the addition of the mixture of the monomers and aqueous emulsifier solution was started was regarded as the initiation of polymerization. The following aqueous initiator solution was added over a period of 4.5 hours from 30 minutes after the initiation of polymerization. Furthermore, the following additional aqueous initiator solution was added over a period of 2 hours from 5 hours after the initiation of polymerization and the whole was further kept at a round number of 103 rpm and an inner temperature of 90° C. for 1 hour.

| [Monomers] | |
| --- | --- |
| Styrene | 76.8 parts (1535.0 g) |
| Butyl acrylate | 23.2 parts |
| Acrylic acid | 1.5 parts |
| Trichlorobromomethane | 1.0 part |
| Hexanediol diacrylate | 0.7 part |
| [Aqueous Emulsifier Solution] | |
| 20% aqueous DBS solution | 1.0 part |
| Demineralized water | 67.1 parts |
| [Aqueous Initiator Solution] | |
| 8% aqueous hydrogen peroxide solution | 15.5 parts |
| 8% aqueous L(+)-ascorbic acid solution | 15.5 parts |

-continued

[Additional Aqueous Initiator Solution]

| | |
|---|---|
| 8% aqueous L(+)-ascorbic acid solution | 14.2 parts |

After the polymerization was finished, the whole was cooled to obtain a milk-white polymer primary particle dispersion liquid A1. The volume-average particle size measured by means of microtrack UPA was 280 nm and the solid matter concentration was 21.1% by weight.

Preparation of Polymer Primary Particle Dispersion Liquid A2

Into a reaction vessel (inner volume 21 L, inner diameter 250 mm, height 420 mm) fitted with a stirring apparatus (three blades), a heating/cooling apparatus, a concentrating apparatus, and a material/auxiliary charging apparatus were charged 23.6 parts by weight (472.3 g) of the silicone wax dispersion liquid A2, 1.5 parts by weight of 20% aqueous DBS solution, and 324 parts of demineralized water, and the whole was heated to 90° C. under a nitrogen stream and 3.2 parts by weight of an 8% aqueous hydrogen peroxide solution and 3.2 parts by weight of an 8% aqueous L(+)-ascorbic acid solution were added at once under stirring at 103 rpm.

After 5 minutes, a mixture of the following monomers and aqueous emulsifier solution was added thereto over a period of 5 hours from the initiation of polymerization (after 5 minutes from the time when the mixture of 3.2 parts by weight of an 8% aqueous hydrogen peroxide solution and 3.2 parts by weight of an 8% aqueous L(+)-ascorbic acid solution were added at once). The following aqueous initiator solution was added over a period of 6 hours from the initiation of polymerization. Furthermore, the whole was kept at a round number of 103 rpm and an inner temperature of 90° C. for 1 hour.

| [Monomers] | |
|---|---|
| Styrene | 92.5 parts (1850.0 g) |
| Butyl acrylate | 7.5 parts |
| Acrylic acid | 1.5 parts |
| Trichlorobromomethane | 0.6 part |
| [Aqueous Emulsifier Solution] | |
| 20% aqueous DBS solution | 1.5 part |
| Demineralized water | 66.2 parts |
| [Aqueous Initiator Solution] | |
| 8% aqueous hydrogen peroxide solution | 18.9 parts |
| 8% aqueous L(+)-ascorbic acid solution | 18.9 parts |

After the polymerization was finished, the whole was cooled to obtain a milk-white polymer primary particle dispersion liquid A2. The volume-average particle size measured by means of microtrack UPA was 290 nm and the solid matter concentration was 19.0% by weight.

Preparation of Colorant Dispersion Liquid A

To a vessel having an inner volume of 300 L fitted with a stirrer (propeller blade) were added 20 parts (40 kg) of carbon black (Mitsubishi Carbon Black MA100S manufactured by Mitsubishi Chemical Corporation) having an ultraviolet absorbance of toluene extract of 0.02 and a true density of 1.8 g/cm$^3$ and produced by furnace process, 1 part of 20% aqueous DBS solution, 4 parts of a nonionic surfactant (Emulgen 120 manufactured by Kao Corporation), and 75 parts of ion-exchange water having an conductivity of 2 μS/cm, and the whole was pre-dispersed to obtain a pigment pre-mixed liquid. The measurement of the conductivity was carried out using a conductivity meter (a personal SC meter Model SC72 and a detector SC72SN-11 manufactured by Yokogawa Electric Corporation).

The volume-cumulative 50% diameter $Dv_{50}$ of the carbon black in the dispersion liquid after pre-mixing was about 90 μm. The above pre-mixed liquid was fed to a wet type beads mill as a raw material slurry and one-path dispersion was carried out. The inner diameter of stator was ϕ75 mm, the diameter of separator was ϕ60 mm, and the distance between the separator and disk was 15 mm. As media for dispersion, zirconia beads having a diameter of 50 μm (true density 6.0 g/cm$^3$) was used. The effective inner diameter of the stator was about 0.5 L and the packed volume of the media was 0.35 L, so that the media-packed ratio was 70%. The rotation speed of the rotor was constant (peripheral velocity at the terminal end of the rotor was about 11 m/sec) and the above pre-mixed slurry was continuously fed at a feeding rate of about 50 L/hr by means of a pulseless metering pump and continuously discharged from the exhaust, whereby a black colorant dispersion A was obtained. The volume-average particle size measured by means of microtrack UPA was 150 nm and the solid matter concentration was 24.2% by weight.

Production of Mother Particle A for development

Polymer primary particle dispersion liquid A1:
95 parts as solid matter
(998.2 g as solid matter)
Polymer primary particle dispersion liquid A2:
5 parts as solid matter
Colorant fine particle dispersion liquid A:
6 parts as colorant solid matter
20% aqueous DBS solution:
0.1 part as solid matter Using the above individual components, a toner was produced by the following procedure.

Into a mixing vessel (volume 12 L, inner diameter 208 mm, height 355 mm) fitted with a stirring apparatus (double helical blades), a heating/cooling apparatus, a concentrating apparatus, and a material/auxiliary charging apparatus were charged the polymer primary particle dispersion liquid A1 and the 20% aqueous DBS solution, followed by homogeneous mixing at an inner temperature of 12° C. at 40 rpm for 5 minutes. Subsequently, the stirring round number was increased to 250 rpm at an inner temperature of 12° C. and 0.52 part (as $FeSO_4.7H_2O$) of a 5% aqueous ferrous sulfate solution was added over a period of 5 minutes. Then, the colorant fine particle dispersion liquid A was added over a period of 5 minutes and the whole was homogeneously mixed at an inner temperature of 12° C. at 250 rpm. Further, 0.5% aqueous aluminum sulfate solution was added dropwise under the same conditions (solid matter in an amount of 0.10 part relative to resin solid matter). Thereafter, the inner temperature was elevated to 53° C. over a period of 75 minutes still at 250 rpm and then to 56° C. over a period of 170 minutes.

When the particle size was measured by a precise particle size distribution measuring apparatus (Multisizer III: manufactured by Beckman Coulter Co.; hereinafter optionally abbreviated as "Multisizer") whose aperture diameter was 100 μm, the 50% volume diameter was 6.7 μm.

Thereafter, the polymer primary particle dispersion liquid A2 was added thereto over a period of 3 minutes still at 250 rpm and the whole was kept for 60 minutes as it was. Immediately after the rotation number was decreased to 168 rpm, the 20% aqueous DBS solution (6 parts as solid matter) was added over a period of 10 minutes and then the whole was heated to 90° C. over a period of 30 minutes still at 168 rpm and kept for 60 minutes.

The whole was then cooled to 30° C. over a period of 20 minutes and the resulting slurry was taken out and subjected to suction filtration through a No. 5C filter (No5C manufactured by Toyo Filter Paper Co., Ltd.) by means of an aspirator. The cake remaining on the filter was transferred to a stainless steel vessel having an inner volume of 10 L fitted with a stirrer (propeller blade) and was homogeneously dispersed by adding 8 kg of ion-exchange water having a conductivity of 1 µS/cm and stirring at 50 rpm, followed by stirring for another 30 minutes.

Thereafter, suction filtration was again carried out through a No. 5C filter (No5C manufactured by Toyo Filter Paper Co., Ltd.) by means of an aspirator. The cake remaining on the filter was again transferred to a stainless steel vessel having an inner volume of 10 L fitted with a stirrer (propeller blade) and containing 8 kg of ion-exchange water having a conductivity of 1 µS/cm and the cake was homogeneously dispersed by stirring at 50 rpm, followed by stirring for another 30 minutes. When the process was repeated five times, the conductivity of the filtrate was lowered to 2 µS/cm. The measurement of the conductivity was carried out using a conductivity meter (a personal SC meter Model SC72 and a detector SC72SN-11 manufactured by Yokogawa Electric Corporation).

The cake thus obtained was spread on a stainless steel pad so that the height became about 20 mm and dried in a air-blowing drier set at 40° C. for 48 hours to obtain a mother particle A for development.

Production of Toner A for Development

Into a Henschel mixer fitted with a stirrer (Z/A$_0$ blade) and a deflector facing perpendicular to the wall from the upside and having an inner volume of 10 L (diameter 230 mm, height 240 mm) was charged 100 parts (1000 g) of the mother particle A for development. Subsequently, 0.5 part of silica fine particles subjected to hydrophobic treatment with silicone oil and having a volume-average primary particle size of 0.04 µm and 2.0 parts of silica fine particles subjected to hydrophobic treatment with silicone oil and having a volume-average primary particle size of 0.012 µm were added thereto and the whole was mixed and stirred at 3000 rpm for 10 minutes and filtrated off through a 150 mesh sieve to obtain a toner A for development. A volume-average particle size of the toner A measured by Multisizer II was 7.05 µm, Dv/Dn was 1.14, and an average circularity measured by FPIA 2000 was 0.963.

[Evaluation of Image Formation]

Each of the electrophotographic photoreceptors produced in Examples 203 and 204 and Comparative Example 23 and the above toner A for development were loaded on a black drum cartridge and a black toner cartridge for a color printer MICROLINE Pro 9800PS-E manufactured by Oki Date Co., Ltd., respectively, and respective cartridges were mounted on the above printer.

Specification of MICROLINE Pro 9800PS-E
  Four tandems
  Color 36 ppm, monochrome 40 ppm
  1200 dpi
  Contact roller charging (imparting direct current voltage)
  LED exposure
  Erasing light is used After the printer was allowed to stand in the NN environment for 8 hours, halftone images were formed under the NN environment. Further, after the printer was allowed to stand in the NL environment for another 8 hours, halftone images were formed under the NL environment. Then, the images were compared. In the case where the electrophotographic photoreceptor of Comparative Example 23 was used, decrease in halftone density was observed in the images formed in the NL environment. However, in the case where the electrophotographic photoreceptors of Examples 203 and 204 were used, decrease in density was not observed even in the images formed in the NL environment and good images were obtained.

While the invention has been described in detail and with reference to specific embodiments thereof, it will be apparent to one skilled in the art that various changes and modifications can be made therein without departing from the spirit and scope thereof.

The present application is based on Japanese Patent Application No. 2006-077251 filed on Mar. 20, 2006, Japanese Patent Application No. 2006-088867 filed on Mar. 28, 2006, Japanese Patent Application No. 2006-161372 filed on Jun. 9, 2006, and Japanese Patent Application No. 2006-167881 filed on Jun. 16, 2006, and the contents are incorporated herein by reference.

INDUSTRIAL APPLICABILITY

The phthalocyanine crystal of the present invention has advantages of high sensitivity and little fluctuation in sensitivity for a humidity change in a use environment. Therefore, it can be suitably used as a material (particularly, a charge generation substance) for solar battery, electronic paper, electrophotographic photoreceptor, etc.

Moreover, the electrophotographic photoreceptor, electrophotographic photoreceptor cartridge, and image-forming device of the invention can be suitably used in various fields such as various electrophotographic devices, e.g., copying machines, printers, fax machines, etc. in which an electrophotographic technology is employed.

The invention claimed is:

1. A phthalocyanine composition, comprising:
oxytitanium phthalocyanine, and
an aromatic compound comprising an oxygen atom-comprising group and a halogen atom having an atomic weight of 30 or more,
wherein the phthalocyanine composition is obtained by a process comprising bringing a low-crystalline or amorphous phthalocyanine comprising oxytitanium into contact with the aromatic compound comprising an oxygen atom-containing group and a halogen atom having an atomic weight of 30 or more as substituents, thereby converting a crystal form of the phthalocyanine;
wherein the oxytitanium phthalocyanine has a main diffraction peak at Bragg angle (2θ±0.2°) of 27.2° toward CuKα characteristic X-ray of wavelength 1.541 angstroms;
wherein the phthalocyanine composition has, as a combination of definite peaks at Bragg angle (2θ±0.2°) of 27.2° toward CuKα characteristic X-ray of wavelength 1.541 angstroms:
(i) 9.6°, 24.1°, 27.2°,
(ii) 9.5°, 9.7°, 24.1°, 27.2°,
or
(iii) 9.0°, 14.2°, 23.9°, 27.1°;
and
wherein the low-crystalline or amorphous phthalocyanine is obtained by a chemical treatment process.

2. The phthalocyanine composition according to claim 1, wherein the oxygen atom-comprising group is a carbonyl-comprising organic group, a nitro group, or an ether group.

3. An electrophotographic photoreceptor comprising an electroconductive substrate and a photosensitive layer on the substrate, wherein the photosensitive layer comprises the phthalocyanine composition of claim 1.

4. The phthalocyanine composition of claim 1, wherein the chemical treatment process comprises an acid paste process.

5. The phthalocyanine composition of claim 1, wherein the chemical treatment process comprises an acid slurry process.

6. The phthalocyanine composition of claim 1, wherein the low-crystalline or amorphous phthalocyanine is a low-crystalline or amorphous titanium phthalocyanine, and wherein the phthalocyanine crystal is an oxytitanium phthalocyanine crystal.

7. The electrophotographic photoreceptor of claim 3, having a sensitivity retention of greater than 92.6%.

* * * * *